(12) United States Patent
Taguchi et al.

(10) Patent No.: US 7,393,094 B2
(45) Date of Patent: Jul. 1, 2008

(54) INK FOR INKJET, INK SET FOR INKJET, AND INKJET RECORDING METHOD

(75) Inventors: Toshiki Taguchi, Shizuoka (JP); Takashi Ozawa, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 115 days.

(21) Appl. No.: 10/574,404

(22) PCT Filed: Oct. 1, 2004

(86) PCT No.: PCT/JP2004/014886

§ 371 (c)(1),
(2), (4) Date: Mar. 31, 2006

(87) PCT Pub. No.: WO2005/033223

PCT Pub. Date: Apr. 14, 2005

(65) Prior Publication Data

US 2007/0120920 A1    May 31, 2007

(30) Foreign Application Priority Data

Oct. 2, 2003   (JP) .............................. 2003-344403
Oct. 3, 2003   (JP) .............................. 2003-345488
Jan. 14, 2004  (JP) .............................. 2004-006832

(51) Int. Cl.
*G01D 11/00* (2006.01)

(52) U.S. Cl. ........................ 347/100; 347/95; 106/31.27

(58) Field of Classification Search ................ 347/100, 347/95, 96, 101; 106/31.6, 31.27, 31.13; 523/160

See application file for complete search history.

(56) References Cited

U.S. PATENT DOCUMENTS

2003/0159617 A1 *  8/2003  Nishita et al. ............ 106/31.48
2004/0010052 A1 *  1/2004  Ishizuka et al. ............... 522/75

FOREIGN PATENT DOCUMENTS

| JP | 55-161856 A | | 12/1980 |
|----|----|----|----|
| JP | 61-36362 A | | 2/1986 |
| JP | 2-212566 A | | 8/1990 |
| JP | 11-504958 A | | 5/1999 |
| JP | 2003-12981 A | | 1/2003 |
| JP | 2003-041162 | * | 2/2003 |
| JP | 2003-41162 A | | 2/2003 |
| JP | 2003-128954 A | | 5/2003 |
| JP | 2003-221518 A | | 8/2003 |
| JP | 2003-221522 A | | 8/2003 |
| JP | 2003-221532 A | | 8/2003 |
| JP | 2003-231850 A | | 8/2003 |
| JP | 2003-528965 A | | 9/2003 |
| JP | 2003-292849 A | | 10/2003 |
| JP | 2003-292850 A | | 10/2003 |

* cited by examiner

*Primary Examiner*—Manish S Shah
(74) *Attorney, Agent, or Firm*—Sughrue Mion, PLLC

(57) ABSTRACT

An ink for inkjet including: a dye; and water and/or a water-miscible organic solvent, wherein the dye includes a dye compound having at least one heterocyclic structure, and the ink further includes, as an additive, at least one compound capable of chemically interacting with the dye compound.

20 Claims, No Drawings

INK FOR INKJET, INK SET FOR INKJET, AND INKJET RECORDING METHOD

TECHNICAL FIELD

The present invention relates to an ink for inkjet, an ink set for inkjet, and an inkjet recording method.

BACKGROUND ART

With the recent popularization of computers, inkjet printers are much used for printing on paper, films, cloths and others, not only in office work but also for home use.

The inkjet recoding method includes a system of applying pressure to ink drops by the use of a piezoelectric device to thereby make the ink drops jet out, a system of thermally bubbling ink to jet the ink drops, a system of using ultrasonic waves, and a system of sucking and jetting ink drops by electrostatic force. For the ink compositions for such inkjet recording, usable are aqueous inks, oily inks and solid (hot-melt) inks. Of those, aqueous inks are most used because of their productivity, handlability, odorlessness and safety.

Colorant to be used in such inkjet recording inks must satisfy the following requirements: Its solubility in solvent is good; it enables high-density recording; its hue is good; its fastness to light, heat, air, water and chemicals is good; it well fixes in image-receiving material and hardly bleeds out; its storage stability in inks is good; it is not toxic; its purity is high; and it is inexpensive and is readily available. However, it is extremely difficult to seek such colorant that satisfies all these requirements on a high level.

Various dyes and pigments have been already proposed for inkjet, and are now in practical use. At present, however, no one knows colorant that satisfies all the requirements. Dyes and pigments heretofore well known in the art such as those listed in Color Index (C.I.) could hardly satisfy both the color hue and the fastness, which inks for inkjet need.

As dyes of improved fastness, azo dyes derived from aromatic amines and 5-membered heterocyclic amines are proposed, as in JP-A 55-161856. However, these dyes have an unfavorable hue in a region of yellow and cyan, and are therefore problematic in that they worsen color reproducibility.

JP-A 61-36362 and 2-212566 disclose an inkjet recording ink that may satisfy the two requirements of color hue and light fastness. However, the dyes used in these patent publications are unsatisfactory in point of their solubility in water when they are to be in water-soluble inks. In addition, when the dyes described in these patent publications are used in water-soluble inks for inkjet, they are problematic in point of the wet heat fastness thereof.

To solve these problems, compounds and ink compositions are proposed as in JP-T 11-504958 (the term "JP-T" as used herein means a published Japanese translation of a PCT patent application). In addition, an inkjet recording ink that comprises a pyrazolylanilinazo dye for improving the color hue and the light fastness of the ink is described in JP-A 2003-231850. However, these inkjet recording inks are all unsatisfactory in point of the color reproducibility thereof and the fastness of the outputted images.

Further, it has been found that, when images are printed on photograph-level, inkjet-dedicated glossy paper and when the prints are put up in the room, then the storability of the images thereon is often extremely bad. We, the present inventors presume that this phenomenon may be caused by any oxidizing gas in air such as ozone. If the prints are kept in glass frames or the like so as to protect them from exposure to air streams, then the phenomenon may hardly occur, but it restricts the use condition of the prints.

The phenomenon is extremely remarkable in photograph-level inkjet-dedicated glossy paper, and this is one serious problem with the current inkjet recording system in which the photograph-level quality of the images to be formed is one important characteristic of the system.

Heretofore, we, the present inventors have investigated various dyes of good color hue and good fastness, and have developed those favorable for colorants for inkjet recording. However, we have known that the single use of water-soluble dye alone could not attain satisfactory fastness.

In addition, we have further investigated dye-containing, aqueous inkjet inks, and have found a problem with them in that, in a weather test of gray continuous-tone images and portraits, low-density yellow parts are readily faded to break the color balance of the images.

On the other hand, when the solvent remaining in ink is removed insufficiently, then it causes a problem in that the inkjet print density lowers during storage (for example, yellow parts may look faded or black parts may change). In particular, it is important to prevent the density reduction at high temperature and high humidity.

DISCLOSURE OF THE INVENTION

In consideration of the above-mentioned problems, an object of the present invention is to provide inks and ink sets for inkjet, which have good color hue and image fastness, and to provide an inkjet recording method.

The above-mentioned object of the invention is attained by the following ink and ink set for inkjet and the following inkjet recording method.

<First Aspect of the Invention>

1) An ink for inkjet comprising a dye, and water and/or a water-miscible organic solvent, wherein the dye comprises a dye compound having at least one heterocyclic structure, and the ink further comprises, as an additive thereto, at least one compound capable of chemically interacting with the dye compound.

2) The ink of above 1), wherein the dye compound has two hetero-aromatic rings bonded to each other via an azo bond.

3) The ink of above 1) or 2), wherein the dye compound has a metal-chelated hetero-aromatic ring structure.

4) The ink of any of above 1) to 3), wherein the additive is a hydrogen-bonding compound.

5) The ink of any of above 1 to 4), wherein % max of a visible-range absorption spectrum of a diluted aqueous solution is shifted by at least 5 nm as compared with that in an absence of the additive, the diluted aqueous solution being a mixture of the additive and a heterocyclic structure having dye mixed in a molar ratio of 1/1 and having a concentration of at most 1 mmol/liter,.

6) The ink of any of above 1) to 5), wherein the additive has a cyclic amide structure and the dye compound has a nitrogen-containing 6-membered hetero-aromatic ring.

7) The ink of any of above 1) to 6), wherein the additive is a compound having a partial structure of the following formula (A):

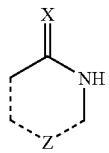

wherein X represents an oxygen atom, a sulfur atom, or N—R (R represents a hydrogen atom, or any of an alkyl group, an alkenyl group, an alkynyl group, an aralkyl group, an aryl group or a heterocyclic group); and Z represents an atomic group capable of forming a 5- to 8-membered ring.

8) An ink set containing at least one ink of any of above 1) to 7).

9) An inkjet recording method, which comprises using the ink or ink set of any of above 1) to 8) for image recording with an inkjet printer.

<Second Aspect of the Invention>

10) An ink set comprising: at least one yellow ink, the yellow ink comprising an aqueous medium and an yellow dye dispersed or dissolved in the aqueous medium, and the yellow dye having: an oxidation potential of more positive than 1.0 V (vs SCE); λmax within a range of from 390 nm to 470 nm; and an absorbance ratio of I(λmax+70 nm)/I(λmax) of at most 0.4, wherein I(λmax) is an absorbance of λmax, and I(λmax+70 nm) is an absorbance of λmax+70 nm; and black ink comprising at least one of the yellow dye. In the present invention, λmax of the ink means a wavelength which gives a maximum absorbance measured by the spectrophotometer after diluting the ink with water so that the maximum absorption concentration (Abs) is within a range of 1 to 2.

11) The ink set of above 10), wherein the absorbance ratio of I(λmax+70 nm)/I(λmax) of the yellow dye is at most 0.2.

12) The ink set of above 10) or 11), wherein the yellow dye is a compound of the following formula (1):

(A-N=N—B)n-L            (1)

wherein A and B each independently represents an optionally-substituted heterocyclic group; n is 1 or 2; and L represents a hydrogen atom or a substituent bonding to A or B at any desired position.

13) The ink set of any of above 10) to 12), wherein an accelerated fading rate constant of the yellow ink is smaller than that of the black ink and wherein the accelerated fading rate constant is determined as follows—an ink to be analyzed is printed on a reflection medium, and its reflection density ($D_B$) is measured through a status A filter; one point of a sample having a reflection density ($D_B$) of from 0.90 to 1.10 in an yellow region is defined as an initial density of the ink, and the printed sample is forcedly faded by the use of an ozone fading tester where 5 ppm ozone is generated all the time; a period of time in which the reflection density of the faded sample is reduced to 80% of the initial density of the original sample is counted, and the accelerated fading rate constant of the ink is derived from it.

14) The ink set of any of above 10) to 13), wherein a water-soluble organic solvent concentration in the yellow ink is lower than that in the black ink.

15) The ink set of any of above 10) to 14), wherein a total solvent concentration in the yellow ink is lower than that in the black ink, and the total solvent concentration being determined by summing up the concentrations of at least any two solvents selected from a glycol-type organic solvent, a glycol alkyl ether-type organic solvent and an amide-type organic solvent.

<Third Aspect of the Invention>

16) An inkjet color recording method, wherein an ink composition containing at least one yellow or black azo dye and a water-miscible organic solvent is used to record an image on an image-receiving material having an image-receiving layer on a support thereof, and wherein an absolute value of an image density change at a point at which the reflection density at a λmax region of the recorded image is 1.5, is at most 20%.

17). The inkjet color recording method of above 16), wherein the image having a reflection density of 1.5 at a λmax region thereof is printed, and the density change is represented by the following formula in which Da indicates an initial density of an image area, and Db indicates a density thereof after left in an atmosphere of 80° C. and 15% RH for 7 days:

Density Change (%)=(Db−Da)/Da×100.

18) The inkjet color recording method of above 16) or 17), wherein the dye is an yellow dye of the following formula (1):

(A-N=N—B)n-L            (1)

wherein A and B each independently represents an optionally-substituted heterocyclic group; L represents a hydrogen atom, a chemical bond or a divalent linking group; n is 1 or 2; provided that when n is 1, then L is a hydrogen atom, and A and B are both monovalent heterocyclic groups, and when n is 2, then L is a chemical bond or a divalent linking group, and one of A and B is a monovalent heterocyclic group and the other is a divalent heterocyclic group; when n is 2, then two A's may be the same or different, and two B's may be the same or different.

The hetero ring is preferably a 5-membered or 6-membered hetero ring. It may have a monocyclic structure or a multi-cyclic structure of two or more rings condensed to each other; or may be an aromatic hetero ring or a non-aromatic hetero ring. Preferably, the hetero atom to constitute the hetero ring includes N, O and S atoms. More preferably, n is 2.

When L is a hydrogen atom, then L may bond to A or B at any desired position. When L is a chemical bond or a divalent linking group, then L may bond to A or B at any desired position, but preferably bonds to the ring-forming carbon atom or hetero atom (preferably, nitrogen atom) of the heterocyclic group A or B.

19) The inkjet color recording method of any of above 16) to 18), wherein the ink composition further contains a surfactant and the surfactant is a betaine-type surfactant.

20) The inkjet color recording method of above 19), wherein the betaine-type surfactant is represented by the following formula (6):

(R)p-N-[L-(COOM)q]r            (6)

wherein R represents a hydrogen atom, an alkyl group, an aryl group, or a heterocyclic group; L represents a divalent linking group; M represents a hydrogen atom, an alkali metal atom, an ammonium group, a protonated organic amine or nitrogen-containing heterocyclic group, or a quaternary ammonium ion group, and when it is a counter ion to the ammonium ion with the N atom in the formula, then it is a group not existing as a cation; q indicates an integer of 1 or more; r indicates an integer of from 1 to 4; p indicates an integer of from 0 to 4; p+r is 3 or 4; when p+r is 4, then the N atom in the formula is a protonated ammonium atom (=N+=); when q is 2 or more, then COOM's may be the same or different; when r is 2 or more, then (L-(COOM)q)'s may be the same or different; when p is 2 or more, then R's may be the same or different.

21) The inkjet color recording method of any of above 16) to 20), wherein the ink composition contains as the water-miscible organic solvent at least one of triethylene glycol monobutyl ether, diethylene glycol monobutyl ether, tripropylene glycol monomethyl ether, and dipropylene glycol monomethyl ether.

22) The inkjet color recording method of any of above 16) to 21), wherein the dye has an oxidation potential of more positive than 1.0 V (vs SCE).

23) The inkjet color recording method of any of above 16) to 22), wherein the image-receiving layer contains a white inorganic pigment particle.

BEST MODE OF CARRYING OUT THE INVENTION

<First Aspect of the Invention>

The invention is described in detail hereinunder.

The ink for inkjet of the invention (this may be simply referred to as "ink") is characterized in that it comprises a heterocyclic structure-having compound as the dye therein, and contains a compound capable of interacting with the dye molecule.

The heterocyclic structure-having dye for use in the invention is grouped into the following three types.

The first group includes dyes having a hetero-aromatic ring at the chromophoric site thereof. Examples of the dyes of this type are azo dyes, azomethine dyes, indaniline dyes, triarylmethane dyes, cyanine dyes, merocyanine dyes, oxonole dyes, anthraquinone dye derivatives, anthrapyridone dyes and others having a hetero-aromatic ring at the chromophoric site thereof. The chromophoric site as referred to herein is meant to indicate the structural site that participates in color formation in the backbone of the dye. The structural site is a partial structure of the dye which, when added to or deleted from the dye, significantly varies the absorption region of the dye. Principally, the site constructs a π-electron structure or a conjugated structure that governs the absorption characteristics of dye. For example, when the site is removed, then the main absorption of the dye may change from cyantomagenta, or the dye may become completely colorless.

The second group includes chelate dyes having a hetero-aromatic ring as the partial structure thereof. Their examples are phthalocyanine dyes, azo-chelate dyes, etc.

The third group includes dyes having a hetero-aromatic ring in a site except the chromophoric site thereof.

For example, the dyes have a linking group for introducing a solubilizing group thereinto, or a linking group for linking two or more dye molecules to each other to form "bis-type" or "tris-type" compounds.

Of those, preferred for use in the invention are azo dyes, azomethine dyes, anthrapyridone dyes and phthalocyanine dyes having a hetero-aromatic ring in the chromophoric site thereof, as well as bis-type azo dyes having a hetero-aromatic ring in the linking group thereof. More preferred are azo dyes having a hetero-aromatic ring in the chromophoric site thereof.

Above all, even more preferred for use in the invention are dyes having two hetero-aromatic rings bonding to each other via an azo bond, and dyes having a metal-chelated hetero-aromatic ring structure (that is, dyes having a hetero-aromatic ring that forms a chelate structure with a metal therein).

Preferred dyes for use in the invention may be represented by the following formulae:

$$(A-N=N-B)n-L \quad (1)$$

The dyes of formula (1) are preferably yellow dyes.

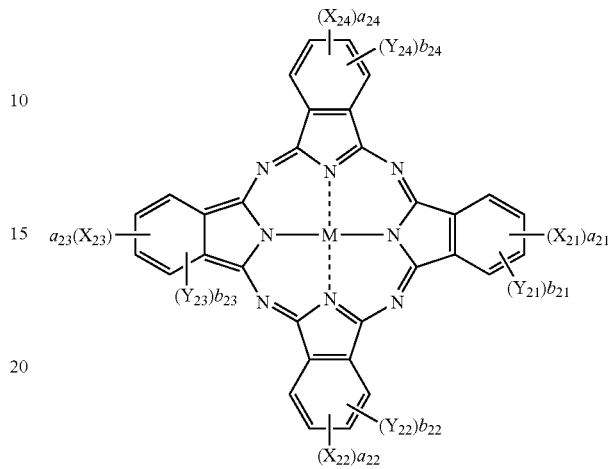

(2)

The dyes of formula (2) are preferably cyan dyes.

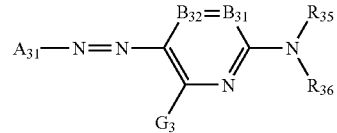

(3)

The dyes of formula (3) are preferably magenta dyes.

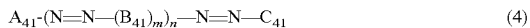

$$A_{41}-(N=N-(B_{41})_m)_n-N=N-C_{41} \quad (4)$$

The dyes of formula (4) are preferably black dyes.

In formula (1), A and B each independently represents an optionally-substituted heterocyclic group. The hetero ring is preferably a 5-membered or 6-membered hetero ring. It may have a monocyclic structure or a multi-cyclic structure of two or more rings condensed to each other; or may be an aromatic hetero ring or a non-aromatic hetero ring. Preferably, the hetero atom to constitute the hetero ring includes N, O and S atoms. n indicates an integer selected from 1 or 2; and L represents a substituent bonding to A or B at any desired position. when n is 1, then L is a hydrogen atom or a monovalent substituent; and when n is 2, then L is a chemical bond or a divalent linking group.

In formula (2), $X_{21}$, $X_{22}$, $X_{23}$ and $X_{24}$ each independently represents $-SO-Z_2$, $-SO_2-Z_2$, $-SO_2NR_{21}R_{22}$, a sulfo group, $-CONR_{21}R_{22}$, or $-COOR_{21}$.

$Z_2$ independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. $R_{21}$ and $R_{22}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. $Y_{21}$, $Y_{22}$, $Y_{23}$ and $Y_{24}$ each independently represents a monovalent substituent.

$a_{21}$ to $a_{24}$, and $b_{21}$ to $b_{24}$ indicate the number of the substituents of $X_{21}$ to $X_{24}$ and $Y_{21}$ to $Y_{24}$, respectively. $a_{21}$ to $a_{24}$ each independently represents a number of from 0 to 4, but all of these are not 0 at the same time. $b_{21}$ to $b_{24}$ each independently represents a number of from 0 to 4. When $a_{21}$ to $a_{24}$, and $b_{21}$ to $b_{24}$ are a number of 2 or more, then plural $X_{21}$'s to $X_{24}$'s and $Y_{21}$'s to $Y_{24}$'s may be the same or different. M represents a hydrogen atom, a metal atom or its oxide, hydroxide or halide, In formula (3), $A_{31}$ represents a residue of a 5-membered hetero ring diazo component $A_{31}$-$N_2$—.

$B_{31}$ and $B_{32}$ each represent =$CR_{31}$— or —$CR_{32}$=, or either one of them is a nitrogen atom and the other is =$CR_{31}$— or —$CR_{32}$=. $R_{35}$ and $R_{36}$ each independently represents a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group, and each group may be substituted.

$G_3$, $R_{31}$ and $R_{32}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group (including an arylamino group, a heterocyclic amino group), an acylamino group, an ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, an alkyl or arylsulfonyl group, a heterocyclic sulfonyl group, an alkyl or arylsulfinyl group, a heterocyclic sulfinyl group, a sulfamoyl group, a sulfo group, or a heterocyclic-thio group, and each group may be substituted.

$R_{31}$ and $R_{35}$, or $R_{35}$ and $R_{36}$ may bond to each other to form a 5- or 6-membered ring.

In formula (4), $A_{41}$, $B_{41}$ and $C_{41}$ each independently represents an optionally-substituted aromatic or heterocyclic group; $A_{41}$ and $C_{41}$ are monovalent groups, and $B_{41}$ is a divalent group. m is 1 or 2; and n is an integer of 0 or more. At least one of $A_{41}$, $B_{41}$ and $C_{41}$ is a heterocyclic group.

The dyes of formula (2) are preferably those represented by the following formula (5):

(5)

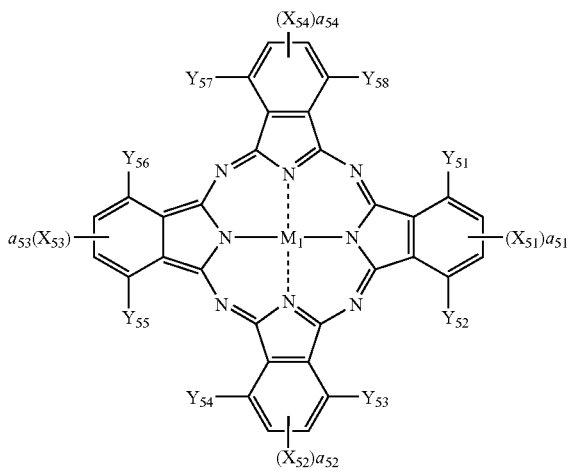

In formula (5), $X_{51}$ to $X_{54}$, $Y_{51}$ to $Y_{58}$, and $M_1$ have the same meanings as $X_{21}$ to $X_{24}$, $Y_{21}$ to $Y_{24}$, and M in formula (2), respectively. a51 to a54 each independently represents an integer of 1 or 2.

Preferably, the dyes for use in the invention have an oxidation potential (Eox) of at least 1.00 V (vs SCE). More preferably, the dyes have a positive oxidation potential over 1.00 V (vs SCE), even preferably over 1.10 V (vs SCE), still more preferably over 1.20 V (vs SCE), most preferably over 1.25 V (vs SCE).

For measuring the oxidation potential, herein various methods are employable, for example, cyclic voltammetry (CV), rotary ring-disc electrode method or combed electrode method. Measurement of the oxidation potential is described concretely. A sample to be analyzed is dissolved in a solvent such as dimethylformamide or acetonitrile that contains a supporting electrolyte such as sodium perchlorate or tetrapropylammonium perchlorate to have a concentration of from $1\times10^{-6}$ to $1\times10^{-2}$ mol/dm$^{-3}$, and its value of oxidation potential versus SCE (standard saturated calomel electrode) is measured according to the method mentioned above. The supporting electrolyte and the solvent to be used may be suitably selected, depending on the oxidation potential and the solubility of the test sample. Examples of the supporting electrolyte and the solvent usable herein are described in Akira Fujishima et al., *Electrochemical Measurement Methods* (1984, Gihodo Publishing), pp. 101-118.

The value of oxidation potential may deviate by tens millivolts or so, owing to the influence of the liquid junction potential or the sample solution resistance thereon, but it may be calibrated with a standard sample (e.g., hydroquinone). In that manner, the reproducibility of the thus-measured potential value is ensured.

In the invention, the oxidation potential of dye is measured in N,N-dimethylformamide (in this, the concentration of the dye is $1\times10^{-3}$ mol·dm$^{-3}$) that contains a tetrapropylammonium perchlorate of 0.1 mol·dm$^{-3}$ as a supporting electrolyte, by using SCE (standard saturated calomel electrode) as a reference electrode, a graphite electrode as a working electrode, and a platinum electrode as a counter electrode. Some water-soluble dyes would be difficult to directly dissolve in N,N-dimethylformamide. In such a case, the dye is dissolved in a smallest possible amount of water, and then it is diluted with N,N-dimethylformamide to reduce the water content of the resulting dye solution to at most 2%.

Preferred examples of the dyes for use in the invention are described in JP-A 2002-309115, 2002-309116, 2002-371079, 2002-371214, 2002-322151, 2003-64275, 2003-49100, 2002-302623, 2002-294097, 2002-285050, 2002-275386, 2002-256167, 2002-327132, 2002-309118, 2003-3086, 2003-3109, 2003-3099, 2003-12966, 2003-64287, 2003-119415, 2003-12952, 2004-91509, 2004-91528, and 2004-124017, and Japanese Patent Application No. 2002-333603.

The ink for inkjet of the invention contains the above-mentioned dye in an amount of from 0.01 to 50% by weight, preferably from 0.1 to 20% by weight, more preferably from 0.5 to 15% by weight.

The invention is characterized in that an additive capable of interacting with the dye is added to the ink.

In the invention, the interaction with dye means chemical interaction with it. The chemical interaction as referred to herein includes Coulomb interaction, CH-π interaction, van der Waals force, hydrogen bonding and the like, as in Yukihiro Nishio's *Introduction to Intermolecular Force for Organic Chemistry* (by Kodan-sha Scientific, 2000). In the invention, compounds capable of interacting with dye via hydrogen bonding are preferred.

The hydrogen-bonding group includes a hydroxyl group, a thio group, a carbonyl group, a carboxyl, group, an urethane group, an ureido group, an amido group, a sulfonamido group, an acylamino group, an imido group, a hydroxylamino group, an amino group, an amidino group, a guanidino group. In the invention, preferred is a group capable of forming a hydrogen bond via a nitrogen atom, including, for example, an amido group, an urethane group, an ureido group, a sulfonamido group, an acylamino group, an imido group.

Of the compounds mentioned above, more preferred for use in the invention are those having an amido bond or a sulfonamido bond. In particular, more preferred are compounds having a structure with plural amido groups continuously existing therein.

Examples of the compounds of the type are bio-related materials such as amino acid derivatives.

Their examples are glycine, glycylglycine, glycylglycylglycine, allantoin, glutamine, burette, phenylglycine, taurine, lysine.

In the invention, not only the compounds themselves as above but also their derivatives with some substituent introduced thereinto may also be used in the same manner.

Examples of the substitutable substituents are an alkyl group (preferably having from 1 to 20, more preferably from 1 to 12, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20, more preferably from 2 to 12, even more preferably from 2 to 8 carbon atoms, e.g., vinyl, allyl, 2-butenyl, 3-pentenyl), analkynyl group (preferably having from 2 to 20, more preferably from 2 to 12, even more preferably from 2 to 8 carbon atoms, e.g., propargyl, 3-pentynyl), an aryl group (preferably having from 6 to 30, more preferably from 6 to 20, even more preferably from 6 to 12 carbon atoms, e.g., phenyl, p-methylphenyl, naphthyl), an amino group (preferably having from 0 to 20, more preferably from 0 to 12, even more preferably from 0 to 6 carbon atoms, e.g., amino, methylamino, dimethylamino, diethylamino, diphenylamino, dibenzylamino), an alkoxy group (preferably having from 1 to 20, more preferably from 1 to 12, even more preferably from 1 to 8 carbon atoms, e.g., methoxy, ethoxy, butoxy), an aryloxy group (preferably having from 6 to 20, more preferably from 6 to 16, even more preferably from 6 to 12 carbon atoms, e.g., phenyloxy, 2-naphthyloxy), an acyl group (preferably having from 1 to 20, more preferably from 1 to 16, even more preferably from 1 to 12 carbon atoms, e.g., acetyl, benzoyl, formyl, pivaloyl), an alkoxycarbonyl group (preferably having from 2 to 20, more preferably from 2 to 16, even more preferably from 2 to 12 carbon atoms, e.g., methoxycarbonyl, ethoxycarbonyl), an aryloxycarbonyl group (preferably having from 7 to 20, more preferably from 7 to 16, even more preferably from 7 to 10 carbon atoms, e.g., phenyloxycarbonyl), an acyloxy group (preferably having from 2 to 20, more preferably from 2 to 16, even more preferably from 2 to 10 carbon atoms, e.g., acetoxy, benzoyloxy), an acylamino group (preferably having from 2 to 20, more preferably from 2 to 16, even more preferably from 2 to 10 carbon atoms, e.g., acetylamino, benzoylamino), an alkoxycarbonylamino group (preferably having from 2 to 20, more preferably from 2 to 16, even more preferably from 2 to 12 carbon atoms, e.g., methoxycarbonylamino), an aryloxycarbonylamino group (preferably having from 7 to 20, more preferably from 7 to 16, even more preferably from 7 to 12 carbon atoms, e.g., phenyloxycarbonylamino), a sulfonylamino group (preferably having from 1 to 20, more preferably from 1 to 16, even more preferably from 1 to 12 carbon atoms, e.g., methanesulfonylamino, benzenesulfonylamino), a sulfamoyl group (preferably having from 0 to 20, more preferably from 0 to 16, even more preferably from 0 to 12 carbon atoms, e.g., sulfamoyl, methylsulfamoyl, dimethylsulfamoyl, phenylsulfamoyl), a carbamoyl group (preferably having from 1 to 20, more preferably from 1 to 16, even more preferably from 1 to 12 carbon atoms, e.g., carbamoyl, methylcarbamoyl, diethylcarbamoyl, phenylcarbamoyl), an alkylthio group (preferably having from 1 to 20, more preferably from 1 to 16, even more preferably from 1 to 12 carbon atoms, e.g., methylthio, ethylthio), an arylthio group (preferably having from 6 to 20, more preferably from 6 to 16, even more preferably from 6 to 12 carbon atoms, e.g., phenylthio), a sulfonyl group (preferably having from 1 to 20, more preferably from 1 to 16, even more preferably from 1 to 12 carbon atoms, e.g., mesyl, tosyl), a sulfinyl group (preferably having from 1 to 20, more preferably from 1 to 16, even more preferably from 1 to 12 carbon atoms, e.g., methanesulfinyl, benzenesulfinyl), an ureido group (preferably having from 1 to 20, more preferably from 1 to 16, even more preferably from 1 to 12 carbon atoms, e.g., ureido, methylureido, phenylureido), a phosphoramido group (preferably having from 1 to 20, more preferably from 1 to 16, even more preferably from 1 to 12 carbon atoms, e.g., diethylphosphoramido, phenylphosphoramido), a hydroxyl group, a mercapto group, a halogen atom (e.g., fluorine, chlorine, bromine, iodine), a cyano group, a sulfo group, a carboxyl group, a nitro group, a hydroxamic acid group, a sulfino group, a hydrazino group, an imino group, a heterocyclic group (preferably having from 1 to 30, more preferably from 1 to 12 carbon atoms, in which the hetero atom is selected from nitrogen, oxygen and sulfur atoms, concretely such as imidazolyl, pyridyl, quinolyl, furyl, thienyl, piperidyl, morpholino, benzoxazolyl, benzimidazolyl, benzothiazolyl, carbazolyl, azepinyl), a silyl group (preferably having from 3 to 40, more preferably from 3 to 30, even more preferably from 3 to 24 carbon atoms, e.g., trimethylsilyl, triphenylsilyl). These substituents may be further substituted. If possible, the substituents may bond to each other to form a ring.

Of the compounds, more preferred for use in the invention are those having a cyclic amido structure of formula (A).

In the formula, X represents an oxygen atom, a sulfur atom, or N—R (R represents a hydrogen atom, or any of an alkyl group, an alkenyl group, an alkynyl group, an aralkyl group, an aryl group or a heterocyclic group).

X is preferably an oxygen atom, NH, or an N-alkyl group (in which the alkyl group preferably has at most 8 carbon atoms, e.g., methyl, ethyl, butyl). More preferably, X is an oxygen atom.

Z represents an atomic group capable of forming a 5- to 8-membered ring, preferably a 5- or 6-membered ring.

The structure to constitute Z may have substituents. Examples of the substitutable substituents are an alkyl group (preferably having from 1 to 20, more preferably from 1 to 12, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20, more preferably from 2 to 12, even more preferably from 2 to 8 carbon atoms, e.g., vinyl, allyl, 2-butenyl, 3-pentenyl), analkynyl group (preferably having from 2 to 20, more preferably from 2 to 12, even more preferably from 2 to 8 carbon atoms, e.g., propargyl, 3-pentynyl), an aryl group (preferably having from 6 to 30, more preferably from 6 to 20, even more preferably from 6 to 12 carbon atoms, e.g., phenyl, p-methylphenyl, naphthyl), an amino group (preferably having from 0 to 20, more preferably from 0 to 12, even more preferably from 0 to 6 carbon atoms, e.g., amino, methylamino, dimethylamino, diethylamino, diphenylamino, dibenzylamino), an alkoxy group (preferably having from 1 to 20, more preferably from 1 to 12, even more preferably from 1 to 8 carbon atoms, e.g., methoxy, ethoxy, butoxy), an aryloxy group (preferably having from 6 to 20, more preferably from 6 to 16, even more preferably from 6 to 12 carbon atoms, e.g., phenyloxy, 2-naphthyloxy), an acyl group (preferably having from 1 to 20, more preferably from 1 to 16, even more preferably from 1 to 12 carbon atoms, e.g., acetyl, benzoyl, formyl, pivaloyl), an alkoxycarbonyl group (preferably having from 2 to 20, more preferably from 2 to 16, even more preferably from 2 to 12 carbon atoms, e.g., methoxycarbonyl, ethoxycarbonyl), an aryloxycarbonyl group (preferably having from 7 to 20, more preferably from 7 to 16, even more preferably from 7 to 10 carbon atoms, e.g., phenyloxycarbonyl), an acyloxy group (preferably having from 2 to 20, more preferably from 2 to 16, even more preferably from 2 to 10 carbon atoms, e.g., acetoxy, benzoyloxy), an acylamino group (preferably having from 2 to 20, more preferably from 2 to 16, even more preferably from 2 to 10 carbon atoms, e.g., acetylamino, benzoylamino), an alkoxycarbonylamino group (preferably having from 2 to 20, more preferably from 2 to 16, even more preferably from 2 to 12 carbon atoms, e.g., methoxycarbonylamino), an aryloxycarbonylamino group (preferably having from 7 to 20, more preferably from 7 to 16, even more preferably from 7 to 12 carbon atoms, e.g., phenyloxycarbonylamino), a sulfonylamino group (preferably having from 1 to 20, more preferably from 1 to 16, even more preferably from 1 to 12 carbon atoms, e.g., methanesulfonylamino, benzenesulfonylamino), a sulfamoyl group (preferably having from 0 to 20, more preferably from 0 to 16, even more preferably from 0 to 12 carbon atoms, e.g., sulfamoyl, methylsulfamoyl, dimethylsulfamoyl, phenylsulfamoyl), a carbamoyl group (preferably having from 1 to 20, more preferably from 1 to 16, even more preferably from 1 to 12 carbon atoms, e.g., carbamoyl, methylcarbamoyl, diethylcarbamoyl, phenylcarbamoyl), an alkylthio group (preferably having from 1 to 20, more preferably from 1 to 16, even more preferably from 1 to 12 carbon atoms, e.g., methylthio, ethylthio), an arylthio group (preferably having from 6 to 20, more preferably from 6 to 16, even more preferably from 6 to 12 carbon atoms, e.g., phenylthio), a sulfonyl group (preferably having from 1 to 20, more preferably from 1 to 16, even more preferably from 1 to 12 carbon atoms, e.g., mesyl, tosyl), a sulfinyl group (preferably having from 1 to 20, more preferably from 1 to 16, even more preferably from 1 to 12 carbon atoms, e.g., methanesulfinyl, benzenesulfinyl), an ureido group (preferably having from 1 to 20, more preferably from 1 to 16, even more preferably from 1 to 12 carbon atoms, e.g., ureido, methylureido, phenylureido), a phosphoramido group (preferably having from 1 to 20, more preferably from 1 to 16, even more preferably from 1 to 12 carbon atoms, e.g., diethylphosphoramido, phenylphosphoramido), a hydroxyl group, a mercapto group, a halogen atom (e.g., fluorine, chlorine, bromine, iodine), a cyano group, a sulfo group, a carboxyl group, a nitro group, a hydroxamic acid group, a sulfino group, a hydrazino group, an imino group, a heterocyclic group (preferably having from 1 to 30, more preferably from 1 to 12 carbon atoms, in which the hetero atom is selected from nitrogen, oxygen and sulfur atoms, concretely such as imidazolyl, pyridyl, quinolyl, furyl, thienyl, piperidyl, morpholino, benzoxazolyl, benzimidazolyl, benzothiazolyl, carbazolyl, azepinyl), a silyl group (preferably having from 3 to 40, more preferably from 3 to 30, even more preferably from 3 to 24 carbon atoms, e.g., trimethylsilyl, triphenylsilyl). These substituents may be further substituted. If possible, the substituents may bond to each other to form a ring.

The additive for use in the invention (that is, the compound capable of chemically interacting with dye) is preferably a water-soluble or water-miscible compound. The water-solubility and the water-miscibility as referred to herein means that the solubility of the compound in water at 25° C. is at least 0.001% by weight, preferably at least 0.01% by weight.

The amount of the additive to be in the ink for inkjet of the invention is from 0.001 to 30% by weight, preferably from 0.01 to 20% by weight, more preferably from 0.1 to 10% by weight.

The additive for use in the invention contributes to the weather resistance of the ink of the invention, and it may have the same function as that of the functional component that is to be mentioned hereinunder. Accordingly, the additive may be within the scope of the functional component.

Preferably, λmax of the visible-range absorption spectrum of a diluted aqueous solution that is a mixture of the additive and the heterocyclic structure-having dye mixed in a molar ratio of 1/1 and has a concentration of at most 1 mmol/liter, is shifted by at least 5 nm, more preferably by at most 10 nm, even more preferably by at most 20 nm, as compared with that in the absence of the additive. Also preferably, in the absorption spectrum, ε (molecular extinction coefficient) changes by at least 5%, more preferably by at least 10%, even more preferably by at least 20%.

The above-mentioned spectral change seen in the mixture supports the intermolecular interaction of the additive and the dye, and it includes λmax shift (either to the side of long wavelength or the side of short wavelength) and ε change (either increase or decrease) as so mentioned hereinabove. Preferably, ε decreases.

Specific examples of the additives (capable of chemically interacting with dye) preferred for use in the invention are mentioned below, to which, however, the invention should not be limited.

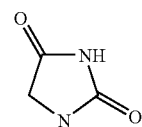

AC-1

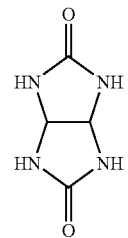

AC-2

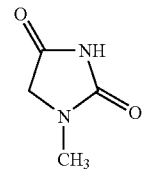

AC-3

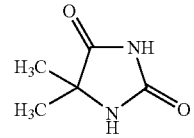

AC-4

-continued
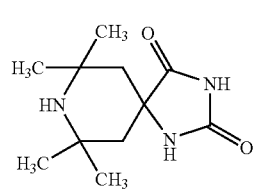
AC-5
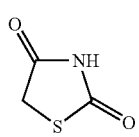
AC-6
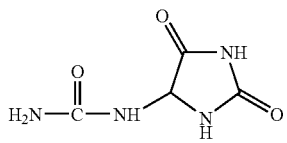
AC-7
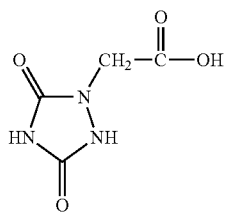
AC-8
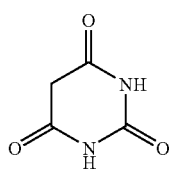
AC-9
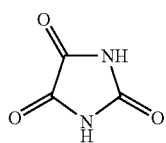
AC-10
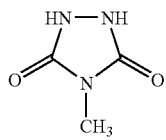
AC-11
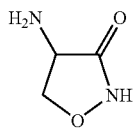
AC-12
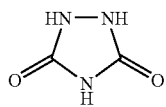
AC-13
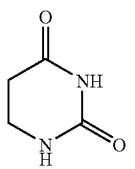
AC-14
-continued
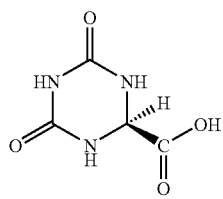
AC-16
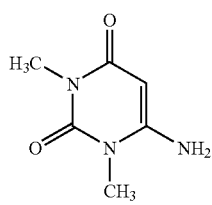
AC-17
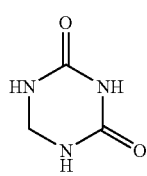
AC-18
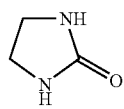
AC-19
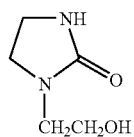
AC-20
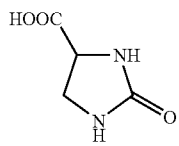
AC-21
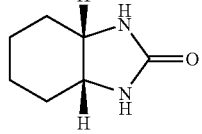
AC-22
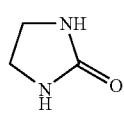
AC-23
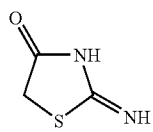
AC-24
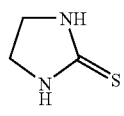
AC-25

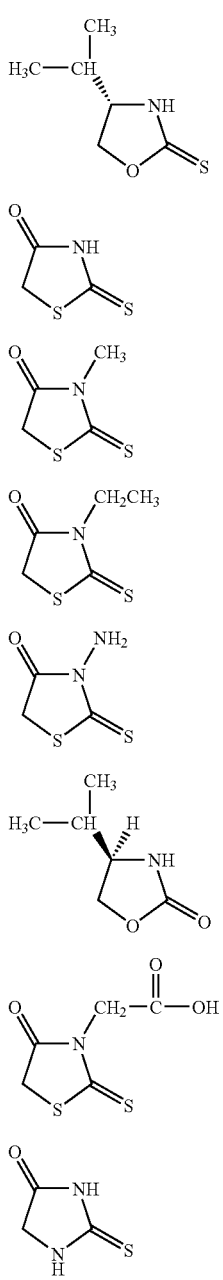

<Second Aspect of the Invention>

The ink set for inkjet in the second aspect of the invention includes an yellow ink that contains at least one yellow ink having a specific absorbance ratio and a specific oxidation potential. The content of the specific yellow dye in the yellow ink is preferably from 0.2 to 20% by weight, more preferably from 0.5 to 15% by weight.

The ink set of the invention also includes a black ink that contains at least one such specific yellow dye. The content of the specific yellow dye in the black ink is preferably from 0.1 to 60% by weight, more preferably from 1 to 50% by weight. The black ink contains other dyes or pigments mentioned below, and its color tone is thereby controlled to be black.

For evaluating the weather resistance of ink in the ink set of the invention, the following method is employed.

The ink to be analyzed is printed on a reflection medium, and its reflection density is measured through a status A filter. One point of the sample having a reflection density ($D_G$) of from 0.90 to 1.10 in a magenta region is defined as the initial density of the ink, and the printed sample is forcedly faded by the use of an ozone fading tester where 5 ppm ozone is generated all the time. The period of time (t) in which the reflection density of the faded sample is reduced to 80% of the initial reflection density ($D_G$) of the original sample is counted, and an accelerated fading rate constant ($k_G$) is derived from a relational formula, "$0.8=\exp(-k_G \cdot t)$". In the invention, the ink is preferably so designed that its rate constant ($k_G$) could be at most $5.0 \times 10^{-2}$ [hours$^{-1}$], more preferably at most $1.0 \times 10^{-2}$ [hours$^{-1}$], even more preferably at most $5.0 \times 10^{-3}$ [hours$^{-1}$].

To lower the fading rate constant of the ink for use in the invention, it is desirable that the dye for the ink is characterized by the following: 1) The dye is hardly oxidized. Concretely, the oxidation potential of the dye, which will be mentioned below, is elevated (by increasing the electron-attractive group therein, or by utilizing an electron-deficient hetero ring). 2) The initial stage reactivity for oxidation of the dye is retarded (easily-leaving protons are made not to exist around the dye, or the cation radical around the dye is made unstable). 3) The associability of the dye is increased, and the oxidation frequency per molecule is lowered (the dye is made to have a readily-associable structure). 4) The molecular structure of the dye is made as tough as possible in order to lower the molecular mobility of the dye (the structure of the dye is made not to have a long substituent of high mobility, and the ring in the structure is fixed).

When the yellow ink and the black ink in the ink set of the invention are compared with each other in point of the accelerated fading rate constant thereof, then it is desirable that the accelerated fading rate constant of the yellow ink is smaller than that of the black ink. This is preferred since the image may readily keep the color balance thereof even when it is faded.

The ink set of the invention may contain any other dyes, in addition to the dyes mentioned above, for obtaining full-color images or for controlling the color tone of the images formed with it.

<Third Aspect of the Invention>

The ink composition for inkjet recording of the third aspect of the invention preferably contains a dye (at least an yellow dye or a black dye), a water-miscible organic solvent and a surfactant, in which the surfactant is preferably a betaine-type surfactant.

The betaine-type surfactant is a compound for surface activation, having both a cationic site and an anionic site in the molecule. The cationic site includes an amine-type nitrogen atom, a nitrogen atom of a hetero-aromatic ring, and a boron atom and a phosphorus atom having four bonds to carbon atom. Of those, preferred are an amine-type nitrogen atom, and a nitrogen atom of a hetero-aromatic ring. In particular, more preferred is a quaternary nitrogen atom. The anionic site includes a hydroxyl group, a thio group, a sulfonamido group, a sulfo group, a carboxyl group, an imido group, a phosphoric acid group, a phosphonic acid group. Of those, preferred are a carboxyl group and a sulfo group. The total charge of the surfactant molecule may be cationic, anionic or neutral, but is preferably neutral.

In particular, the betaine surfactant for use in the invention is preferably compounds of formula (6).

In formula (6), R represents a hydrogen atom, an alkyl group, an aryl group, or a heterocyclic group. L represents a divalent linking group. M represents a hydrogen atom, an alkali metal atom, an ammonium group, a protonated organic amine or nitrogen-containing heterocyclic group, or a quaternary ammonium ion group, and when it is a counter ion to the ammonium ion with the N atom in the formula, then it is a group not existing as a cation. q indicates an integer of 1 or more; r indicates an integer of from 1 to 4. p indicates an integer of from 0 to 4; p+r is 3 or 4. When p+r is 4, then the N atom in the formula is a protonated ammonium atom (=N$^+$=). When q is 2 or more, then COOM's may be the same or different. When r is 2 or more, then (L-(COOM)q)'s may be the same or different. When p is 2 or more, then R's may be the same or different.

Of the compounds of formula (6) for the betaine-type surfactant for use in the invention, more preferred are those of the following formula (7) or (8):

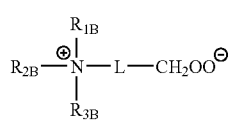

(7)

In the formula, $R_{1B}$ to $R_{3B}$ each represent an alkyl group (optionally substituted and preferably having from 1 to 20 carbon atoms, e.g., methyl, ethyl, propyl, butyl, hexyl, octyl, dodecyl, cetyl, stearyl, oleyl), an aryl group (optionally substituted and preferably having from 6 to 20 carbon atoms, e.g., phenyl, tolyl, xylyl, naphthyl, cumyl, dodecylphenyl), a heterocyclic group (optionally substituted and preferably having from 2 to 20 carbon atoms, e.g., pyridyl, quinolyl); and these may bond to each other to form a cyclic structure. Of those, more preferred is an alkyl group. L represents a divalent linking group. Preferably, it is a divalent linking group that contains an alkylene or arylene group as the basic structural unit thereof. The linking main chain part of the group may contain a hetero atom such as oxygen, sulfur or nitrogen atom. $R_{1B}$ to $R_{3B}$ and L may be substituted with various substituents. Examples of the substituents are an alkyl group (preferably having from 1 to 20, more preferably from 1 to 12, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20, more preferably from 2 to 12, even more preferably from 2 to 8 carbon atoms, e.g., vinyl, allyl, 2-butenyl, 3-pentenyl), an alkynyl group (preferably having from 2 to 20, more preferably from 2 to 12, even more preferably from 2 to 8 carbon atoms, e.g., propargyl, 3-pentynyl), an aryl group (preferably having from 6 to 30, more preferably from 6 to 20, even more preferably from 6 to 12 carbon atoms, e.g., phenyl, p-methylphenyl, naphthyl), an amino group (preferably having from 0 to 20, more preferably from 0 to 12, even more preferably from 0 to 6 carbon atoms, e.g., amino, methylamino, dimethylamino, diethylamino, diphenylamino, dibenzylamino), an alkoxy group (preferably having from 1 to 20, more preferably from 1 to 12, even more preferably from 1 to 8 carbon atoms, e.g., methoxy, ethoxy, butoxy), an aryloxy group (preferably having from 6 to 20, more preferably from 6 to 16, even more preferably from 6 to 12 carbon atoms, e.g., phenyloxy, 2-naphthyloxy), an acyl group (preferably having from 1 to 20, more preferably from 1 to 16, even more preferably from 1 to 12 carbon atoms, e.g., acetyl, benzoyl, formyl, pivaloyl), an alkoxycarbonyl group (preferably having from 2 to 20, more preferably from 2 to 16, even more preferably from 2 to 12 carbon atoms, e.g., methoxycarbonyl, ethoxycarbonyl), an aryloxycarbonyl group (preferably having from 7 to 20, more preferably from 7 to 16, even more preferably from 7 to 10 carbon atoms, e.g., phenyloxycarbonyl), an acyloxy group (preferably having from 2 to 20, more preferably from 2 to 16, even more preferably from 2 to 10 carbon atoms, e.g., acetoxy, benzoyloxy), an acylamino group (preferably having from 2 to 20, more preferably from 2 to 16, even more preferably from 2 to 10 carbon atoms, e.g., acetylamino, benzoylamino), an alkoxycarbonylamino group (preferably having from 2 to 20, more preferably from 2 to 16, even more preferably from 2 to 12 carbon atoms, e.g., methoxycarbonylamino), an aryloxycarbonylamino group (preferably having from 7 to 20, more preferably from 7 to 16, even more preferably from 7 to 12 carbon atoms, e.g., phenyloxycarbonylamino), a sulfonylamino group (preferably having from 1 to 20, more preferably from 1 to 16, even more preferably from 1 to 12 carbon atoms, e.g., methanesulfonylamino, benzenesulfonylamino), a sulfamoyl group (preferably having from 0 to 20, more preferably from 0 to 16, even more preferably from 0 to 12 carbon atoms, e.g., sulfamoyl, methylsulfamoyl, dimethylsulfamoyl, phenylsulfamoyl), a carbamoyl group (preferably having from 1 to 20, more preferably from 1 to 16, even more preferably from 1 to 12 carbon atoms, e.g., carbamoyl, methylcarbamoyl, diethylcarbamoyl, phenylcarbamoyl), an alkylthio group (preferably having from 1 to 20, more preferably from 1 to 16, even more preferably from 1 to 12 carbon atoms, e.g., methylthio, ethylthio), an arylthio group (preferably having from 6 to 20, more preferably from 6 to 16, even more preferably from 6 to 12 carbon atoms, e.g., phenylthio), a sulfonyl group (preferably having from 1 to 20, more preferably from 1 to 16, even more preferably from 1 to 12 carbon atoms, e.g., mesyl, tosyl), a sulfinyl group (preferably having from 1 to 20, more preferably from 1 to 16, even more preferably from 1 to 12 carbon atoms, e.g., methanesulfinyl, benzenesulfinyl), an ureido group (preferably having from 1 to 20, more preferably from 1 to 16, even more preferably from 1 to 12 carbon atoms, e.g., ureido, methylureido, phenylureido), a phosphoramido group (preferably having from 1 to 20, more preferably from 1 to 16, even more preferably from 1 to 12 carbon atoms, e.g., diethylphosphoramido, phenylphosphoramido), a hydroxyl group, a mercapto group, a halogen atom (e.g., fluorine, chlorine, bromine, iodine), a cyano group, a sulfo group, a carboxyl group, a nitro group, a hydroxamic acid group, a sulfino group, a hydrazino group, an imino group, a heterocyclic group (preferably having from 1 to 30, more preferably from 1 to 12 carbon atoms, in which the hetero atom is selected from nitrogen, oxygen and sulfur atoms, concretely such as imidazolyl, pyridyl, quinolyl, furyl, thienyl, piperidyl, morpholino, benzoxazolyl, benzimidazolyl, benzothiazolyl, carbazolyl, azepinyl), a silyl group (preferably having from 3 to 40, more preferably from 3 to 30, even more preferably from 3 to 24 carbon atoms, e.g., trimethylsilyl, triphenylsilyl). These substituents may be further substituted. Two or more substituents, if any, may be the same or different. If possible, the substituents may bond to each other to form a ring. One molecule of the compound may contain plural betaine structures bonding to each other via any of $R_{1B}$ to $R_{3B}$ and L.

In the betaine-type surfactant for use in the invention, at least one of $R_{1B}$ to $R_{3B}$ and L contains a group having at least 8 carbon atoms. In particular, it is desirable that any of $R_{1B}$ to $R_{3B}$ contains a long-chain alkyl group.

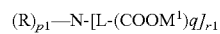

(8)

wherein R, L and q have the same meanings as those in formula (6). p1 indicates an integer of from 0 to 3, and r1 indicates an integer of from 1 to 3. $M^1$ represents an alkali metal ion or a hydrogen atom. p1+r1 is 3. When p is 2 or more, then R's may be the same or different.

Formulae (6) and (8) are described below.

In the formulae, R represents an alkyl group (optionally substituted and preferably having from 1 to 20 carbon atoms, e.g., methyl, ethyl, propyl, butyl, hexyl, octyl, dodecyl, cetyl, stearyl, oleyl), an aryl group (optionally substituted and preferably having from 6 to 20 carbon atoms, e.g., phenyl, tolyl, xylyl, naphthyl, cumyl, dodecylphenyl), a heterocyclic group (optionally substituted and preferably having from 2 to 20 carbon atoms, e.g., pyridyl, quinolyl); and these may bond to each other to form a cyclic structure. Of those, more preferred is an alkyl group.

L represents a divalent linking group. Preferably, it is a divalent linking group that contains an alkylene or arylene group as the basic structural unit thereof. The linking main chain part of the group may contain a hetero atom such as oxygen, sulfur or nitrogen atom.

R and L may be substituted with various substituents. Examples of the substituents are an alkyl group (preferably having from 1 to 20, more preferably from 1 to 12, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20, more preferably from 2 to 12, even more preferably from 2 to 8 carbon atoms, e.g., vinyl, allyl, 2-butenyl, 3-pentenyl), an alkynyl group (preferably having from 2 to 20, more preferably from 2 to 12, even more preferably from 2 to 8 carbon atoms, e.g., propargyl, 3-pentynyl), an aryl group (preferably having from 6 to 30, more preferably from 6 to 20, even more preferably from 6 to 12 carbon atoms, e.g., phenyl, p-methylphenyl, naphthyl), an amino group (preferably having from 0 to 20, more preferably from 0 to 12, even more preferably from 0 to 6 carbon atoms, e.g., amino, methylamino, dimethylamino, diethylamino, diphenylamino, dibenzylamino), an alkoxy group (preferably having from 1 to 20, more preferably from 1 to 12, even more preferably from 1 to 8 carbon atoms, e.g., methoxy, ethoxy, butoxy), an aryloxy group (preferably having from 6 to 20, more preferably from 6 to 16, even more preferably from 6 to 12 carbon atoms, e.g., phenyloxy, 2-naphthyloxy), an acyl group (preferably having from 1 to 20, more preferably from 1 to 16, even more preferably from 1 to 12 carbon atoms, e.g., acetyl, benzoyl, formyl, pivaloyl), an alkoxycarbonyl group (preferably having from 2 to 20, more preferably from 2 to 16, even more preferably from 2 to 12 carbon atoms, e.g., methoxycarbonyl, ethoxycarbonyl), an aryloxycarbonyl group (preferably having from 7 to 20, more preferably from 7 to 16, even more preferably from 7 to 10 carbon atoms, e.g., phenyloxycarbonyl), an acyloxy group (preferably having from 2 to 20, more preferably from 2 to 16, even more preferably from 2 to 10 carbon atoms, e.g., acetoxy, benzoyloxy), an acylamino group (preferably having from 2 to 20, more preferably from 2 to 16, even more preferably from 2 to 10 carbon atoms, e.g., acetylamino, benzoylamino), an alkoxycarbonylamino group (preferably having from 2 to 20, more preferably from 2 to 16, even more preferably from 2 to 12 carbon atoms, e.g., methoxycarbonylamino), an aryloxycarbonylamino group (preferably having from 7 to 20, more preferably from 7 to 16, even more preferably from 7 to 12 carbon atoms, e.g., phenyloxycarbonylamino), a sulfonylamino group (preferably having from 1 to 20, more preferably from 1 to 16, even more preferably from 1 to 12 carbon atoms, e.g., methanesulfonylamino, benzenesulfonylamino), a sulfamoyl group (preferably having from 0 to 20, more preferably from 0 to 16, even more preferably from 0 to 12 carbon atoms, e.g., sulfamoyl, methylsulfamoyl, dimethylsulfamoyl, phenylsulfamoyl), a carbamoyl group (preferably having from 1 to 20, more preferably from 1 to 16, even more preferably from 1 to 12 carbon atoms, e.g., carbamoyl, methylcarbamoyl, diethylcarbamoyl, phenylcarbamoyl), an alkylthio group (preferably having from 1 to 20, more preferably from 1 to 16, even more preferably from 1 to 12 carbon atoms, e.g., methylthio, ethylthio), an arylthio group (preferably having from 6 to 20, more preferably from 6 to 16, even more preferably from 6 to 12 carbon atoms, e.g., phenylthio), a sulfonyl group (preferably having from 1 to 20, more preferably from 1 to 16, even more preferably from 1 to 12 carbon atoms, e.g., mesyl, tosyl), a sulfinyl group (preferably having from 1 to 20, more preferably from 1 to 16, even more preferably from 1 to 12 carbon atoms, e.g., methanesulfinyl, benzenesulfinyl), an ureido group (preferably having from 1 to 20, more preferably from 1 to 16, even more preferably from 1 to 12 carbon atoms, e.g., ureido, methylureido, phenylureido), a phosphoramido group (preferably having from 1 to 20, more preferably from 1 to 16, even more preferably from 1 to 12 carbon atoms, e.g., diethylphosphoramido, phenylphosphoramido), a hydroxyl group, a mercapto group, a halogen atom (e.g., fluorine, chlorine, bromine, iodine), a cyano group, a sulfo group, a carboxyl group, a nitro group, a hydroxamic acid group, a sulfino group, a hydrazino group, an imino group, a heterocyclic group (preferably having from 1 to 30, more preferably from 1 to 12 carbon atoms, in which the hetero atom is selected from nitrogen, oxygen and sulfur atoms, concretely such as imidazolyl, pyridyl, quinolyl, furyl, thienyl, piperidyl, morpholino, benzoxazolyl, benzimidazolyl, benzothiazolyl, carbazolyl, azepinyl), a silyl group (preferably having from 3 to 40, more preferably from 3 to 30, even more preferably from 3 to 24 carbon atoms, e.g., trimethylsilyl, triphenylsilyl). These substituents may be further substituted. Two or more substituents, if any, may be the same or different. If possible, the substituents may bond to each other to form a ring. One molecule of the compound may contain plural betaine structures bonding to each other via R or L.

M represents a hydrogen atom, an alkali metal atom (e.g., sodium ion, potassium ion, lithium ion, cesium ion), an ammonium ion, or an amine-type organic cation (when it is a primary to tertiary amine, it is protonated—for example, it is protonated methylamine, dimethylamine, ethylamine, diethylamine, triethylamine, diazabicycloundecene, diazabicyclooctane, piperidine, pyrrolidine, morpholine, N-methylpiperidine, N-methylmorpholine, pyridine, pyrazine, aniline, N,N-dimethylaniline—when it is a quaternary ammonium salt, it is, for example, tetramethylammonium ion, tetraethylammonium ion, trimethylbenzylammonium ion, methylpyridinium ion, benzylpyridinium ion). In particular, M is preferably an alkali metal ion or a hydrogen atom.

q is an integer of 1 or more (preferably at most 5, more preferably at most 2); r is an integer of from 1 to 4 (preferably 1 or 2). k is an integer of from 0 to 4; m is an integer of 1 or more (preferably at most 4, more preferably 1). p is an integer of from 0 to 4 (preferably 1 or 2), and p+r is 3 or 4. When p+r is 4, then the N atom in the formula is a quaternary ammonium cation, and one M is a dissociated cation. When q is 2 or more, then COOM's may be the same or different. When r is 2 or more, then (L-(COOM)q)'s may be the same or different. When p is 2 or more, then $R^k$'s may be the same or different.

Preferably, R or L contains a hydrocarbon group having 8 or more carbon atoms. Of the compounds of formula (8), most preferred for use in the invention are those of the following formula (9):

R—N-(L-COOM¹)₂ (9)

R, L and M¹ have the same meanings as those in formula (8). Two (L-COOM¹)'s may be the same or different. L's and M¹'s in the two may be the same or different. More preferably, R is an alkyl group, and L is an alkylene group.

Preferred examples of the betaine-type surfactants for use in the invention are mentioned below. Needless-to-say, the invention should not be limited to these.

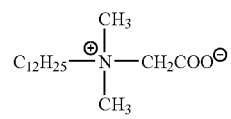
X1-1

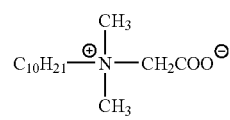
X1-2

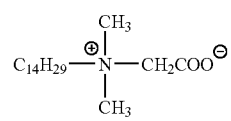
X1-3

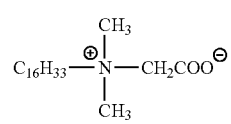
X1-4

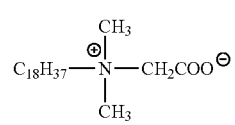
X1-5

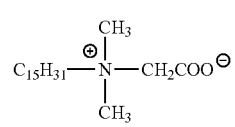
X1-6

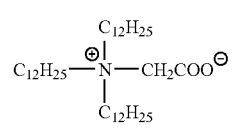
X1-7

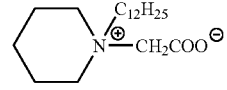
X1-8

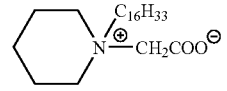
X1-9

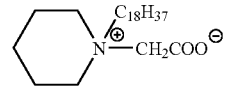
X1-10

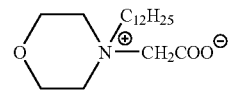
X1-11

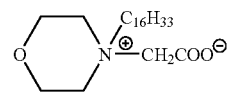
X1-12

-continued

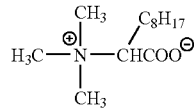
X1-13

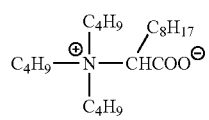
X1-14

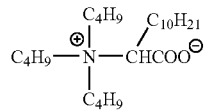
X1-15

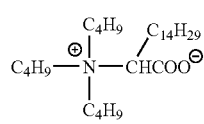
X1-16

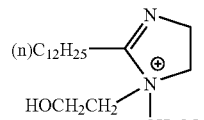
X1-17

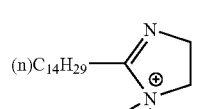
X1-18

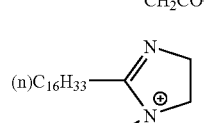
X1-19

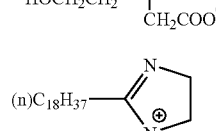
X1-20

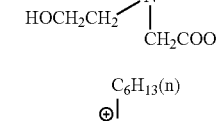
X1-21

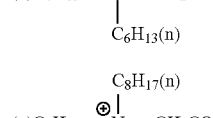
X1-22

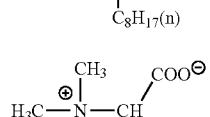
X1-23

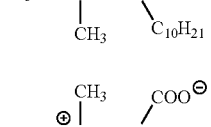
X1-24

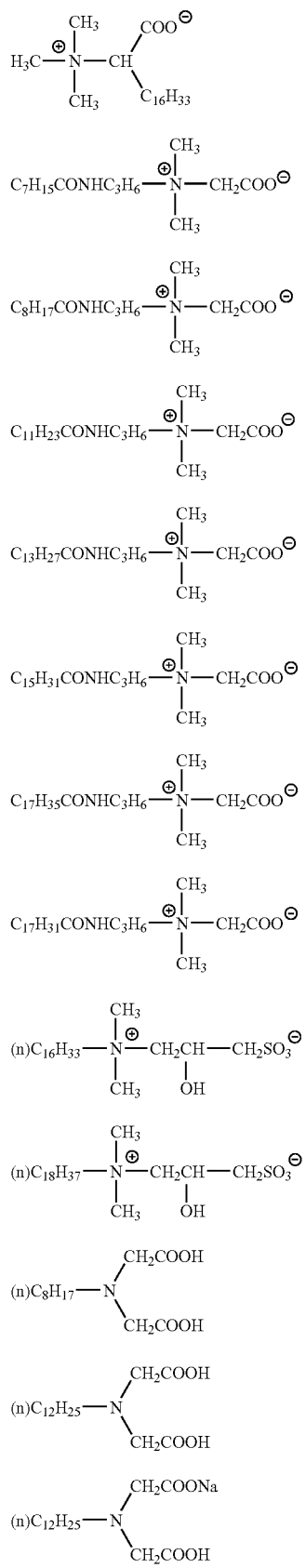
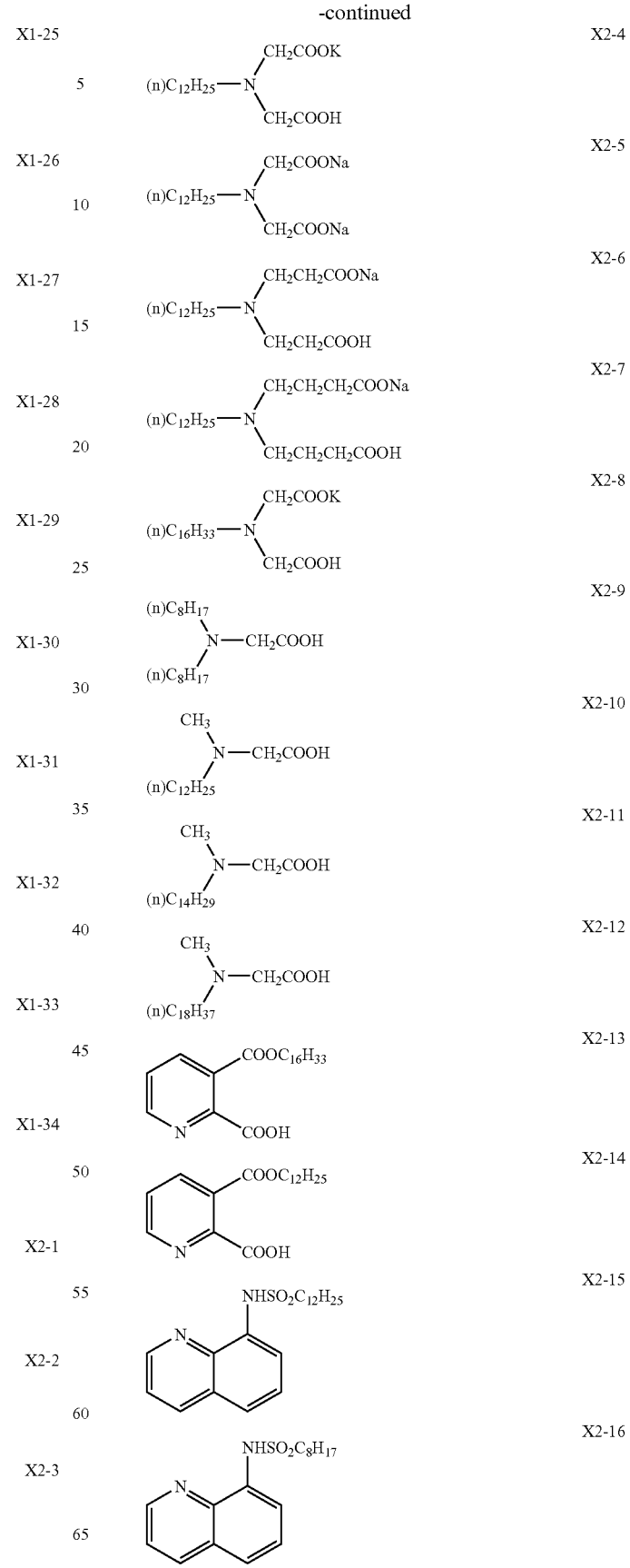

-continued

X2-17 

X2-18 

X2-19 

X2-20 

X2-21 

X2-22 

X2-23 

X2-24 

X2-25 

X2-26

C₁₂H₂₅OOCH₂C—N(CH₂COOK)(CH₂COOH)

X2-27

C₁₂H₂₅OOCH₂C—N(CH₂COONa)(CH₂COOH)

The amount of the betaine surfactant to be in the ink composition may be any one capable of exhibiting the effect of the invention, but preferably it is from 0.001 to 50% by weight, more preferably from 0.01 to 20% by weight of the ink composition. In the ink set that comprises at least two inks having the same color hue but differing in the dye concentration therein, it is desirable that the concentration of the betaine surfactant to be in the ink having the highest dye concentration is higher than that thereof to be in the other ink having the lowest dye concentration. In particular, it is more desirable that the betaine surfactant concentration in the inks is controlled in the order of the dye concentration of the inks so that the betaine surfactant concentration is higher in the inks having a higher dye concentration.

For example, when the dye concentration in two inks A and B are Da and Db (Da>Db) and when the betaine surfactant concentration therein is Va and Vb, respectively, (Va>Vb), then it is desirable that k in Da/Db=k(Va/Vb) falls between 0.1 and 10.

The ink for use in the invention is prepared by dissolving and/or dispersing a dye in water and a water-miscible organic solvent. In particular, the ink is preferably an aqueous ink with a water-soluble dye. In the ink set, inks of different colors may contain a betaine surfactant.

Formulae (1) to (5) are described in detail hereinunder.

[Dyes of Formula (1)]

In view of the fastness, especially the fastness to ozone gas thereof, the dyes of formula (1) are preferably as follows: An ink that contains the dye is printed on a reflection medium, and its reflection density is measured through a status A filter. One point of the sample having a reflection density ($D_B$) of from 0.90 to 1.10 in an yellow region is defined as the initial density of the ink, and the printed sample is forcedly faded by the use of an ozone fading tester where 5 ppm ozone is generated all the time. The period of time (t) in which the reflection density of the faded sample is reduced to 80% (retentiveness) of the initial density of the original sample is counted, and an accelerated fading rate constant (k) is derived from it. Preferably, the rate constant of the dyes for use in the invention is at most $5.0 \times 10^{-2}$ [hour$^{-1}$], more preferably at most $3.0 \times 10^{-2}$ [hour$^{-1}$], even more preferably at most $1.0 \times 10^{-2}$ [hour$^{-1}$].

The reflection density is measured with a reflection densitometer (X-Rite 310TR) through a status A filter (blue). The accelerated fading rate constant (k) is derived from the retentiveness=exp(−kt), or that is, k=(−ln 0.8)/t.

It is desirable that the yellow dyes for use in the invention have a positive oxidation potential over 1.0 V (vs SCE), more preferably over 1.1 V (vs SCE), even more preferably over 1.2 V (vs SCE), in view of their fastness especially to ozone gas. Regarding the type of the dyes, azo dyes having a specific structure that satisfies the above-mentioned physical requirements are preferred.

The oxidation potential (Eox) of dyes may be readily measured by anyone skilled in the art. The method for the measurement is described in, for example, P. Delahay, *New Instrumental Methods in Electrochemistry*, 1954, Interscience Publishers; A. J. Bard et al., *Electrochemical Methods*, 1980, John Wiley & Sons; A. Fujishima et al., *Electrochemical Measurement Methods*, 1984, Gihodo Publishing.

Concretely, the oxidation potential may be measured as follows: A sample to be analyzed is dissolved in a solvent such as dimethylformamide or acetonitrile that contains a supporting electrolyte such as sodium perchlorate or tetrapropylammonium perchlorate to have a concentration of from $1 \times 10^{-6}$ to $1 \times 10^{-2}$ mol/liter, and its value of oxidation potential versus SCE (standard saturated calomel electrode) is measured through cyclic voltammetry. The value of oxidation potential may deviate by tens millivolts or so, owing to the influence of the liquid junction potential or the sample solution resistance thereon, but it may be calibrated with a standard sample (e.g., hydroquinone). In that manner, the reproducibility of the thus-measured potential value is ensured.

In the invention, the oxidation potential of dye is measured in dimethylformamide (in this, the concentration of the dye is 0.001 mol·dm$^{-3}$) that contains 0.1 mol·dm$^{-3}$ of a supporting electrolyte, tetrapropylammonium perchlorate, in order to indiscriminately define the potential.

Eox indicates the electron mobility from sample to electrode. Samples having a larger value of Eox (those having a positive oxidation potential) mean that electrons move more hardly from them to electrode, or that is, the samples are more hardly oxidized. Relative to the structure of compounds, introduction of an electron-attractive group makes the compounds have a positive oxidation potential while introduction of an electron-donating group makes them have a negative oxidation potential. In the invention, it is desirable that an electron-attractive group is introduced into the skeleton of the yellow dyes to thereby make the dyes have a positive oxidation potential, in order to lower the reactivity of the dyes with ozone, a type of electrophilic agent.

In addition to having good fastness, it is further desirable that the dyes for use in the invention give good hue, and more preferably, the long wavelength side of the absorption spectral pattern of the dyes shows a sharply-ending tail profile. Accordingly, it is desirable that the yellow dye has a value of λmax within a range of from 390 nm to 470 mm, and the ratio of the absorbance at (λmax+70 nm), I(λmax+70 nm) to the absorbance at λmax I(λmax), I(λmax+70 nm)/I(λmax) is at most 0.20. More preferably, the ratio is at most 0.15, even more preferably at most 0.10. The absorption wavelength and the absorbance as defined herein are those measured in a solvent (water or ethyl acetate).

In formula (1), A and B each independently represents an optionally-substituted heterocyclic group. The hetero ring is preferably 5-membered or 6-membered, and it may have a monocyclic structure or a polycyclic structure formed through condensation of at least 2 rings, and may be an aromatic hetero ring or a non-aromatic hetero ring. The hetero atom to constitute the hetero ring is preferably any of N, O and S atoms. n is an integer selected from 1 or 2, and is preferably 2. L represents a substituent bonding to A or B at any desired position. When n is 1, L is a hydrogen atom or a monovalent substituent; and when n is 2, L is a chemical bond or a divalent linking group.

In formula (1), the hetero ring for A is preferably any of 5-pyrazolone, pyrazole, triazole, oxazolone, isoxazolone, barbituric acid, pyridone, pyridine, rhodanine, pyrazolidinedione, pyrazolopyridone, Meldrum's acid, and condensed hetero rings formed through condensation of these hetero rings with any additional hydrocarbon aromatic ring or hetero ring. Above all, 5-pyrazolone, 5-aminopyrazole, pyridone, 2,6-diaminopyridine, and pyrazoloazole are preferred; and 5-aminopyrazole, 2-hydroxy-6-pyridone and pyrazolotriazole are more preferred.

For the hetero ring for B, preferred are pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, isoxazole, benzoxazole, thiazole, benzothiazole, isothiazole, benzisothiazole, thiadiazole, benzisoxazole, pyrrolidine, piperidine, piperazine, imidazolidine, thiazoline. Of those, more preferred are pyridine, quinoline, thiophene, benzothiophene, pyrazole, imidazole, benzimidazole, triazole, oxazole, isoxazole, benzoxazole, thiazole, benzothiazole, isothiazole, benzisothiazole, thiadiazole, benzisoxazole; and even more preferred are quinoline, thiophene, pyrazole, thiazole, benzoxazole, benzisoxazole, isothiazole, imidazole, benzothiazole, thiadiazole; and still more preferred are pyrazole, benzothiazole, benzoxazole, imidazole, 1,2,4-thiadiazole, 1,3,4-thiadiazole.

A and B may be substituted, and examples of the substituent for them are a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic-oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic-thio group, a sulfamoyl group, an alkyl or arylsulfinyl group, an alkyl or arylsulfonyl group, an acyl group, an aryloxycarbonyl group, an alkoxycarbonyl group, a carbamoyl group, an imido group, a phosphino group, a phosphinyl group, a phosphinyloxy group, a phosphinylamino group, a silyl group and a ionic hydrophilic group mentioned below.

The monovalent substituent for L includes the substituents substitutable in A and B, and an ionic hydrophilic group mentioned below. The divalent linking group for L includes an alkylene group, an arylene group, a hetero ring residue, —CO—, —SOn- (n is 0, 1 or 2), —NR— (R is a hydrogen atom, an alkyl group or an aryl group), —O—, and other divalent groups of combinations of these linking groups. These groups may have substituents such as those mentioned hereinabove for A and B, and an ionic hydrophilic group mentioned below.

In case where the dyes of formula (1) are used as water-soluble dyes, the dyes preferably have at lease one ionic hydrophilic group in the molecule. The ionic hydrophilic group includes, for example, a sulfo group, a carboxyl group, a phosphono group and a quaternary ammonium group. For the ionic hydrophilic group, preferred are a carboxyl group, a phosphono group and a sulfo group; and more preferred are a carboxyl group and a sulfo group. Most preferably, at least one ionic hydrophilic group is a carboxyl group. The carboxyl group, phosphono group and sulfo group may form salts. Examples of the counter ion to form the salts are ammonium ions, alkali metal ions (e.g., lithium ion, sodium ion, potassium ion), and organic cations (e.g., tetramethylammonium ion, tetramethylguanidium ion, tetramethylphosphonium ion). For the counter ion, preferred are alkali metal ions.

Of the dyes of formula (1), those in which the part of A-N=N—B is represented by the following formula (1-A), (1-B) or (1-C) are preferred.

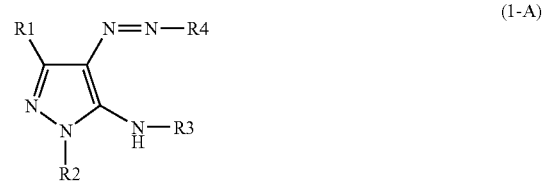

(1-A)

wherein R1 and R3 each represent a hydrogen atom, a cyano group, an alkyl group, a cycloalkyl group, an aralkyl group, an alkoxy group, an alkylthio group, an arylthio group, an aryl group, or an ionic hydrophilic group; R2 represents a hydrogen atom, an alkyl group, a cycloalkyl group, an aralkyl group, a carbamoyl group, an acyl group, an aryl group, or a heterocyclic group; and R4 represents a heterocyclic group.

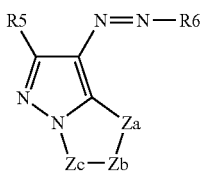

(1-B)

wherein R5 represents a hydrogen atom, a cyano group, an alkyl group, a cycloalkyl group, an aralkyl group, an alkoxy group, an alkylthio group, an arylthio group, an aryl group, or an ionic hydrophilic group; Za represents —N=, —NH—, or —C(R11)=; Zb and Zc each independently represents —N= or —C(R11)=; R11 represents a hydrogen atom or a nonmetallic substituent; R6 represents a heterocyclic group.

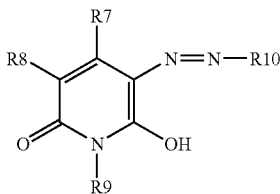

(1-C)

wherein R7 and r9 each independently represents a hydrogen atom, a cyano group, an alkyl group, a cycloalkyl group, an aralkyl group, an aryl group, an alkylthio group, an arylthio group, an alkoxycarbonyl group, a carbamoyl group, or an ionic hydrophilic group; R8 represents a hydrogen atom, a halogen atom, an alkyl group, an alkoxy group, an aryl group, an aryloxy group, a cyano group, an acylamino group, a sulfonylamino group, an alkoxycarbonylamino group, an ureido group, an alkylthio group, an arylthio group, an alkoxycarbonyl group, a carbamoyl group, a sulfamoyl group, a sulfonyl group, an acyl group, an alkylamino group, an arylamino group, a hydroxyl group, or an ionic hydrophilic group; R10 represents a heterocyclic group.

The alkyl group for R1, R2, R3, R5, R7, R8 and R9 in formulae (1-A), (1-B) and (1-C) includes a substituted alkyl group and an unsubstituted alkyl group. Preferably, the alkyl group has from 1 to 20 carbon atoms. Examples of the substituent for the alkyl group are a hydroxyl group, an alkoxy group, a cyano group, a halogen atom, and an ionic hydrophilic group. Examples of the alkyl group are methyl, ethyl, butyl, isopropyl, t-butyl, hydroxyethyl, methoxyethyl, cyanoethyl, trifluoromethyl, 3-sulfopropyl and 4-sulfobutyl groups.

The cycloalkyl group for R1, R2, R3, R5, R7, R8 and R9 includes a substituted cycloalkyl group and an unsubstituted cycloalkyl group. Preferably, the cycloalkyl group has from 5 to 12 carbon atoms. An example of the substituent for the cycloalkyl group is an ionic hydrophilic group. An example of the cycloalkyl group is a cyclohexyl group. The aralkyl group for R1, R2, R3, R5, R7, R8 and R9 includes a substituted aralkyl group and an unsubstituted aralkyl group. Preferably, the cycloalkyl group has from 7 to 20 carbon atoms. An example of the substituent for the aralkyl group is an ionic hydrophilic group. Examples of the aralkyl group are benzyl and 2-phenethyl groups.

The aryl group for R1, R2, R3, R5, R7, R8 and R9 includes a substituted aryl group and an unsubstituted aryl group. Preferably, the aryl group has from 6 to 20 carbon atoms. Examples of the substituent for the aryl group are a hydroxyl group, an alkyl group, an alkoxy group, a halogen atom, a cyano group, a carbamoyl group, a sulfamoyl group, an alkylamino group, an acylamino group, and an ionic hydrophilic group. Examples of the aryl group are phenyl, p-tolyl, p-methoxyphenyl, o-chlorophenyl, and m-(3-sulfopropylamino)phenyl groups.

The alkylthio group for R1, R2, R3, R5, R7, R8 and R9 includes a substituted alkylthio group and an unsubstituted alkylthio group. Preferably, the alkylthio group has from 1 to 20 carbon atoms. An example of the substituent for the alkylthio group is an ionic hydrophilic group. Examples of the alkylthio group are methylthio and ethylthio groups. The arylthio group for R1, R2, R3, R5, R7, R8 and R9 includes a substituted arylthio group and an unsubstituted arylthio group. Preferably, the arylthio group has from 6 to 20 carbon atoms. Examples of the substituent for the arylthio group may be the same as those mentioned hereinabove for the aryl group. Examples of the arylthio group are phenylthio and p-tolylthio groups.

The heterocyclic group for R2 is preferably 5-membered or 6-membered, and it may be condensed with any other ring. For the hetero atom to constitute the hetero ring, preferred are N, S and O. The hetero ring for the group may be an aromatic hetero ring or a non-aromatic hetero ring. The hetero ring may be further substituted. For the substituent for the ring, referred to are those mentioned hereinabove for the aryl group. Preferably, the hetero ring is a 6-membered, nitrogen-containing aromatic hetero ring, and its preferred examples are triazine, pyrimidine and phthalazine.

The halogen atom for R8 includes fluorine atom, chlorine atom and bromine atom. The alkoxy group for R1, R3, R5 and R8 includes a substituted alkoxy group and an unsubstituted alkoxy group. Preferably, the alkoxy group has from 1 to 20 carbon atoms. Examples of the substituent for the alkoxy group are a hydroxyl group and an ionic hydrophilic group. Examples of the alkoxy group are methoxy, ethoxy, isopropoxy, methoxyethoxy, hydroxyethoxy and 3-carboxypropoxy groups.

The aryloxy group for R8 includes a substituted alkoxy group and an unsubstituted alkoxy group. Preferably, the aryloxy group has from 6 to 20 carbon atoms. Examples of the substituent for the aryloxy group may be the same as those mentioned hereinabove for the aryl group. Examples of the aryloxy group are phenoxy, p-methoxyphenoxy and o-methoxyphenoxy groups. The acylamino group for R8 includes a substituted acylamino group and an unsubstituted acylamino group. Preferably, the acylamino group has from 2 to 20 carbon atoms. Examples of the substituent for the acylamino group may be the same as those mentioned hereinabove for the aryl group. Examples of the acylamino group are acetamido, propionamido, benzamido and 3,5-disulfobenzamido groups.

The sulfonylamino group for R8 includes an alkylsulfonylamino group, an arylsulfonylamino group, and a heterocyclic sulfonylamino group, in which the alkyl group moiety, the aryl group moiety and the hetero ring moiety may be substituted. Examples of the substituents for these may be the same as those mentioned hereinabove for the aryl group. Preferably, the sulfonylamino group has from 1 to 20 carbon atoms. Examples of the sulfonylamino group are methylsulfonylamino and ethylsulfonylamino groups. The alkoxycarbonylamino group for R8 includes a substituted alkoxycarbonylamino group and an unsubstituted alkoxycarbonylamino group. Preferably, the alkoxycarbonylamino group has from 2 to 20 carbon atoms. An example of the substituent for the alkoxycarbonylamino group is an ionic hydrophilic group. An example of the alkoxycarbonylamino group is an ethoxycarbonylamino group.

The ureido group for R8 includes a substituted ureido group and an unsubstituted ureido group. Preferably, the ureido group has from 1 to 20 carbon atoms. Examples of the substituent for the ureido group are an alkyl group and an aryl group. Examples of the ureido group are 3-methylureido, 3,3-dimethylureido and 3-phenylureido groups.

The alkoxycarbonyl group for R7, R8 and R8 includes a substituted alkoxycarbonyl group and an unsubstituted alkoxycarbonyl group. Preferably, the alkoxycarbonyl group has from 2 to 20 carbon atoms. An example of the substituent for the alkoxycarbonyl group is an ionic hydrophilic group. Examples of the alkoxycarbonyl group are methoxycarbonyl and ethoxycarbonyl groups.

The carbamoyl group for R2, R7, R8 and R9 includes a substituted carbamoyl group and an unsubstituted carbamoyl group. An example of the substituent for the carbamoyl group is an alkyl group. Examples of the carbamoyl group are methylcarbamoyl and dimethylcarbamoyl groups.

The sulfamoyl group for R8 includes a substituted sulfamoyl group and an unsubstituted sulfamoyl group. An example of the substituent for the sulfamoyl group is an alkyl group. Examples of the sulfamoyl group are dimethylsulfamoyl and di-(2-hydroxyethyl)sulfamoyl groups.

The sulfonyl group for R8 includes an alkylsulfonyl group, an arylsulfonyl group and a heterocyclic sulfonyl group, and these may be further substituted. An example of the substituent is an ionic hydrophilic group. Examples of the sulfonyl group are methylsulfonyl and phenylsulfonyl groups.

The acyl group for R2 and R8 includes a substituted acyl group and an unsubstituted acyl group. Preferably, the acyl group has from 1 to 20 carbon atoms. An example of the substituent for the acyl group is an ionic hydrophilic group. Examples of the acyl group are acetyl and benzoyl groups.

The amino group for R8 includes a substituted amino group and an unsubstituted amino group. Examples of the substituent for the amino group are an alkyl group, an aryl group, and a heterocyclic group. Examples of the amino group are methylamino, diethylamino, anilino and 2-chloroanilino groups.

The heterocyclic group for R4, R6 and R10 may be the same as the optionally-substituted heterocyclic group for B in formula (1). For its preferred examples, more preferred examples and even more preferred examples, referred to are those mentioned hereinabove for the group for B. Concretely, the substituent for the heterocyclic group includes, for example, an ionic hydrophilic group, an alkyl group having from 1 to 12 carbon atoms, an aryl group, an alkyl or arylthio group, a halogen atom, a cyano group, a sulfamoyl group, a sulfonamino group, a carbamoyl group, and an acylamino group. The alkyl group and the aryl group may be further substituted.

In formula (1-B), Za represents —N=, —NH— or —C(R11)=; Zb and Zc each independently represents —N= or —C(R11)=; and R11 represents a hydrogen atom or a non-metallic substituent. For the non-metallic substituent for R11, preferred are a cyano group, a cycloalkyl group, an aralkyl group, an aryl group, an alkylthio group, an arylthio group, and an ionic hydrophilic group. These substituents may have the same meanings as those of the substituents for R1, and their preferred examples may also be the same as those for R1. Examples of the skeleton of the hetero ring that comprises two 5-membered rings in formula (1-B) are mentioned below.

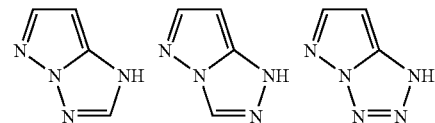

For examples of the substituent for the optionally-substituted groups mentioned above, referred to are those mentioned hereinabove for the optionally-substituted groups for the hetero rings A and B in formula (1).

Of the dyes of formulae (1-A), (1-B) and (1-C), preferred are those of formula (1-A), and more preferred are those of the following formula (1-A1):

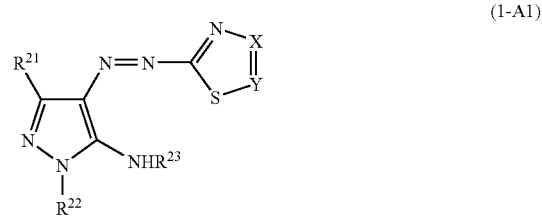

(1-A1)

wherein $R^{21}$ and $R^{23}$ each represents a hydrogen atom, an alkyl group, a cycloalkyl group, an aralkyl group, an alkoxy group or an aryl group; $R^{22}$ represents a hydrogen atom, an aryl group or a heterocyclic group; one of X and Y represents a nitrogen atom and the other represents —$CR^{24}$; $R^{24}$ represents a hydrogen atom, a halogen atom, a cyano group, an alkyl group, an alkylthio group, an alkylsulfonyl group, an alkylsulfinyl group, an alkyloxycarbonyl group, a carbamoyl group, an alkoxy group, an aryl group, an arylthio group, an arylsulfonyl group, an arylsulfinyl group, an aryloxy group or an acylamino group. Of those, preferred are a hydrogen atom, an alkyl group, an alkyl or arylthio group, and an aryl group; and more preferred are a hydrogen atom, an alkylthio group, and an aryl group. These substituents may be further substituted.

Preferred examples of the dyes for use in the invention are described in Japanese Patent Application No. 2003-286844, and JP-A 2003-277662, 2003-277661, 2003-128953, and 2003-41160. However, the dyes for use in the invention should not be limited to these. These compounds may be produced with reference to the above-mentioned patent references and to JP-A 2-24191 and 2001-279145.

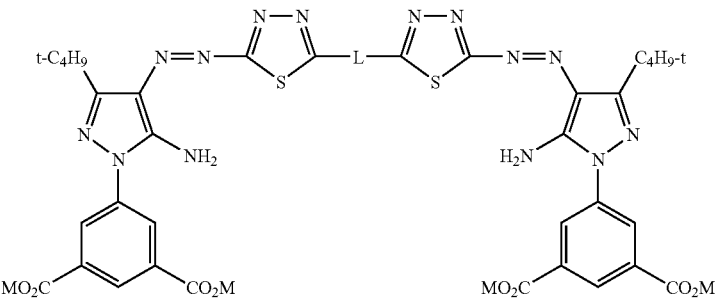
| Dye | L | M |
|---|---|---|
| 1 | —SCH$_2$CH$_2$S— | Na |
| 2 | —SCH$_2$CH$_2$S— | Li |
| 3 | —SCH$_2$CH$_2$CH$_2$S— | Na |
| 4 | —SCH$_2$CH$_2$CH$_2$S— | K |
| 5 | —SCH$_2$CH$_2$CH$_2$S— | Li |
| 6 | —SCH$_2$CH$_2$CH$_2$S— | NH$_4$ |
| 7 | —SCH$_2$CH$_2$CH$_2$S— | HN(Et)$_3$ |
| 8 | —SCH$_2$CH(CH$_3$)S— | Na |
| 9 | —SCH$_2$CH$_2$OCH$_2$CH$_2$S— | Na |
| 10 | —SCH$_2$CH(OH)CH$_2$S— | Na |
| 11 | —SCH$_2$CH(CH$_2$OH)S— | Na |
| 12 | —SCH$_2$CH(CO$_2$Na)S— | Na |
| 13 | *m*-phenylene | Na |
| 14 | —(p-C$_6$H$_4$)NHCONH(p-C$_6$H$_4$)— | Na |
| Dye | Ar | L | R |
|---|---|---|---|
| 15 | 4-methyl-1,2-bis(CO$_2$Na)phenyl | —SCH$_2$CH$_2$CH$_2$S— | t-C$_4$H$_9$— |

-continued
| | | | |
|---|---|---|---|
| 16 | 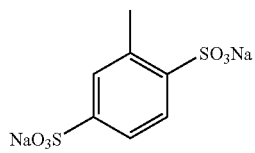 | —SCH₂CH₂CH₂S— | t-C₄H₉— |
| 17 | 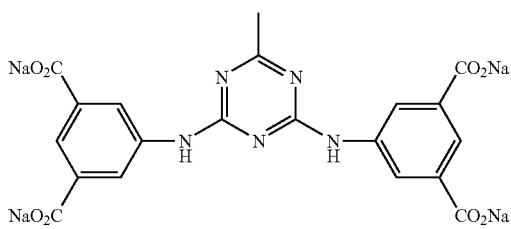 | —SCH₂CH₂CH₂S— | t-C₄H₉— |
| 18 | 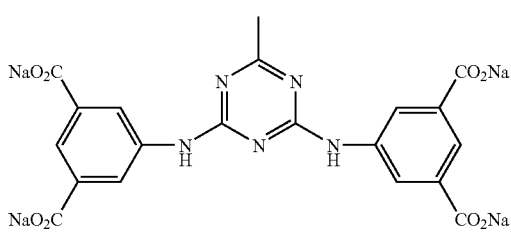 | —SCH₂CH₂S— | t-C₄H₉— |
| 19 | 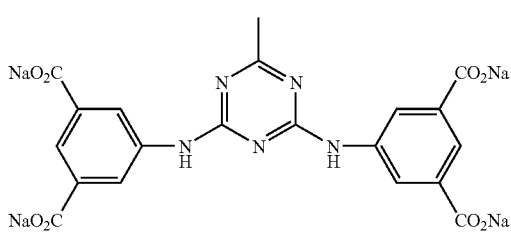 | —CH₂CH₂CH₂CH₂— | t-C₄H₉— |
| 20 | 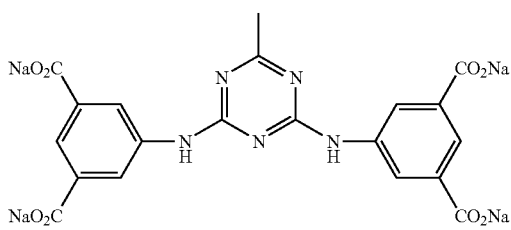 | 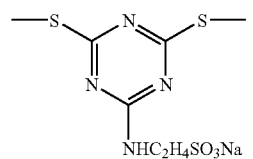 | t-C₄H₉— |
| 21 | 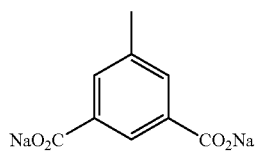 | —SCH₂CH₂CH₂S— | Ph |
| 22 | 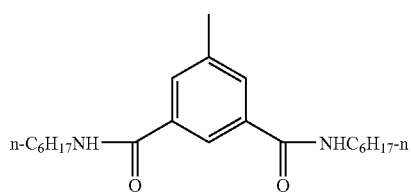 | —SCH₂CH₂CH₂S— | t-C₄H₉— |
| 23 | 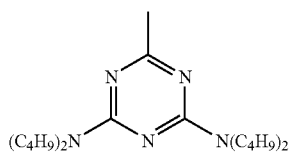 | —SCH₂CH₂S— | t-C₄H₉— |

-continued
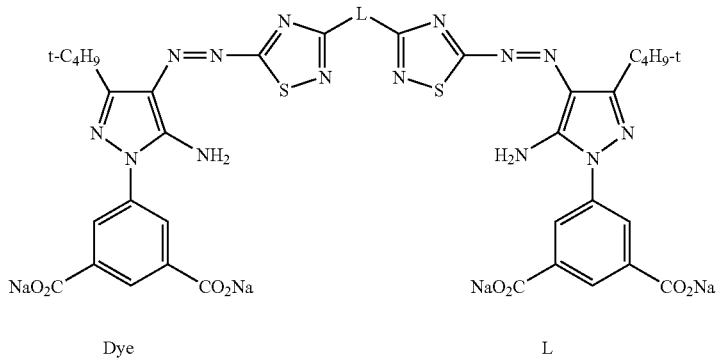
| Dye | L |
|---|---|
| 24 | —SCH$_2$CH$_2$CH$_2$S— |
| 25 | 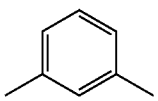 |
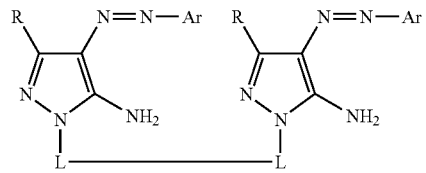
| Dye | Ar | L | R |
|---|---|---|---|
| 26 | 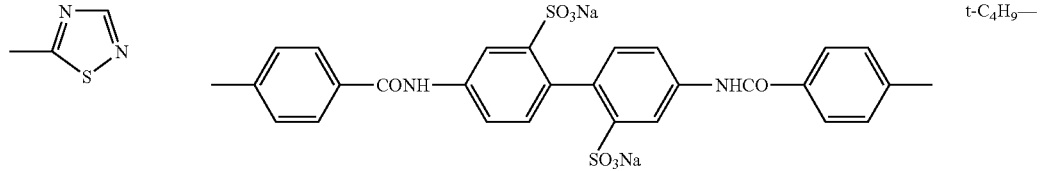 | | t-C$_4$H$_9$— |
| 27 | 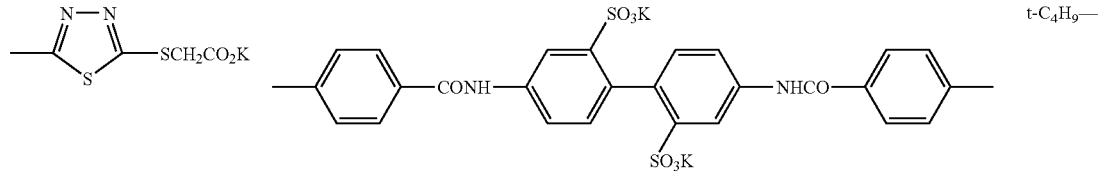 | | t-C$_4$H$_9$— |
| 28 | 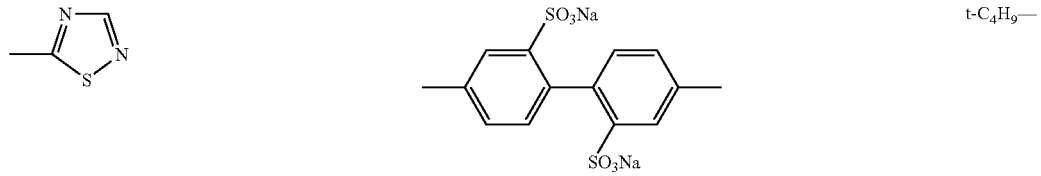 | | t-C$_4$H$_9$— |
| 29 | 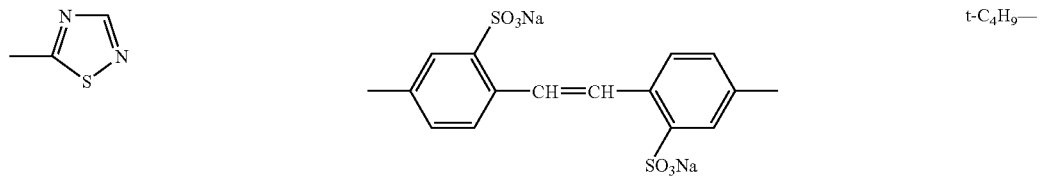 | | t-C$_4$H$_9$— |

-continued
| 30 | 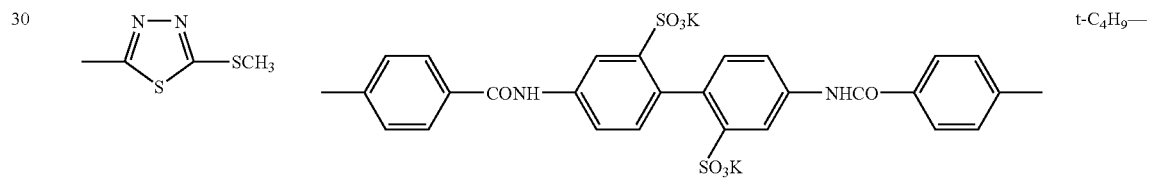 | t-C$_4$H$_9$— |
| 31 | | t-C$_4$H$_9$— |
| 32 | 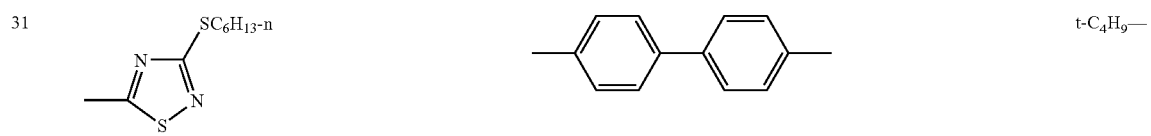 | t-C$_4$H$_9$— |
| 33 | 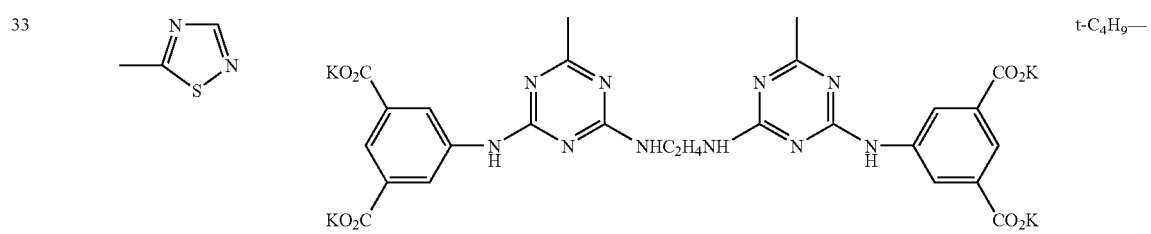 | t-C$_4$H$_9$— |
| 34 | 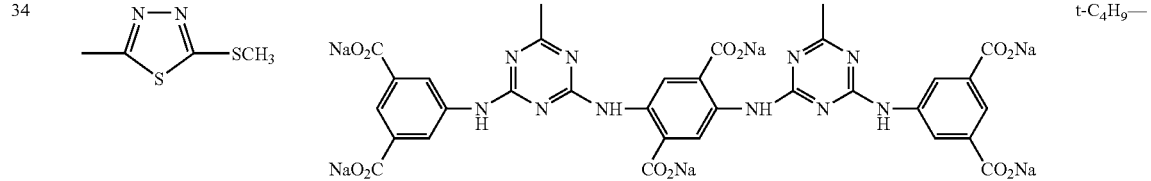 | t-C$_4$H$_9$— |
| 35 | | t-C$_4$H$_9$— |

-continued
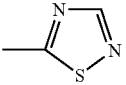
| Dye | Ar | R1 | R2 |
|---|---|---|---|
| 36 | 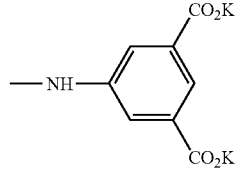 | t-C$_4$H$_9$— | 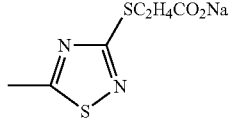 |
| 37 | 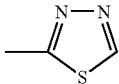 | t-C$_4$H$_9$— | —NHC$_2$H$_4$SO$_3$Na |
| 38 | 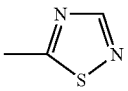 | Ph | —NHC$_{12}$H$_{25}$-n |
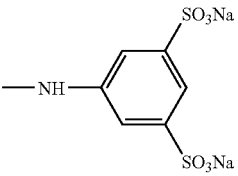
| Dye | Ar | R |
|---|---|---|
| 39 | 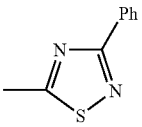 | 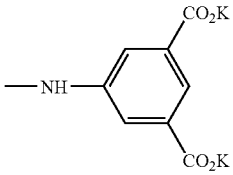 |
| 40 | | |

-continued
| | | |
|---|---|---|
| 41 | 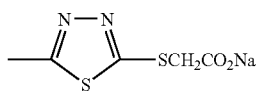 | —NHC$_2$H$_4$SO$_3$Na |
| 42 | 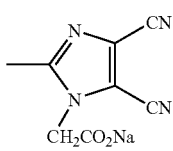 | —NHC$_2$H$_4$SO$_3$Na |
| 43 | 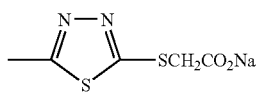 | 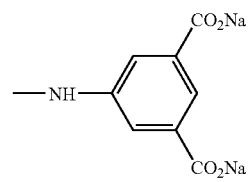 |
| 44 | 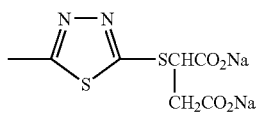 | 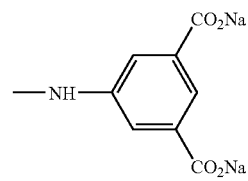 |
| 45 | 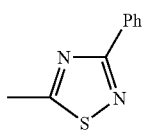 | 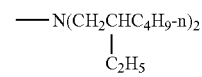 |
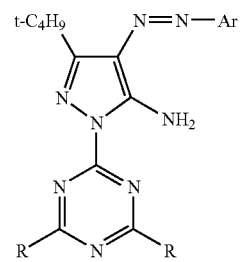
| Dye | Ar | R |
|---|---|---|
| 46 | 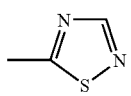 | —NHC$_2$H$_4$SO$_3$Na |
| 47 | 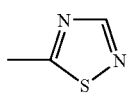 | 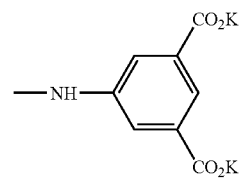 |
| 48 | 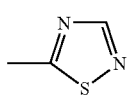 | 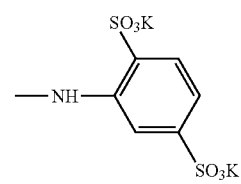 |

-continued
| | | |
|---|---|---|
| 49 | 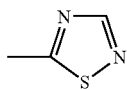 | —N(CH₂CO₂Na)₂ |
| 50 | 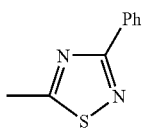 | 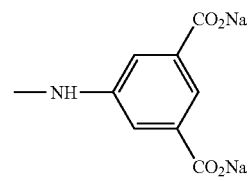 |
| 51 | 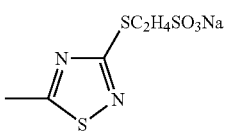 | 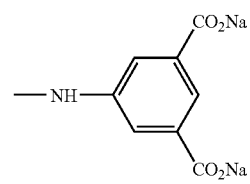 |
| 52 | 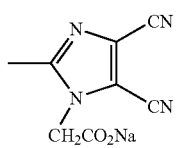 | 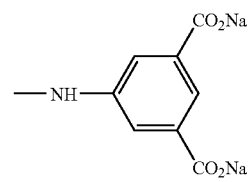 |
| 53 | 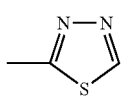 | 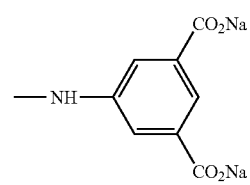 |
| 54 | 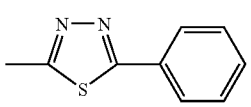 | 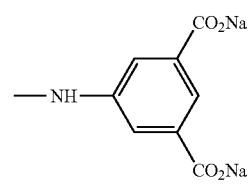 |
| 55 | 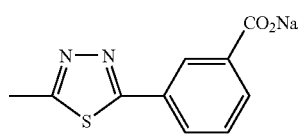 | 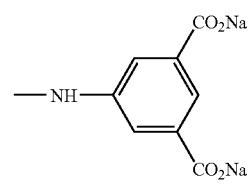 |
| 56 | 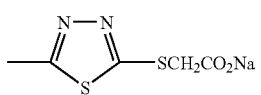 | 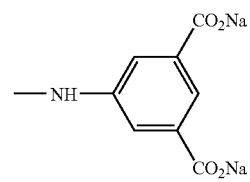 |
| 57 | 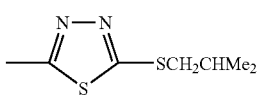 | 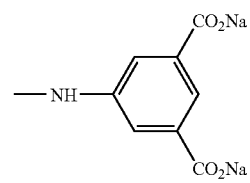 |

-continued

| | | |
|---|---|---|
| 58 | 5-methyl-1,3,4-thiadiazol-2-yl with -SC$_2$H$_4$OC$_2$H$_5$ | -NH-(phenyl with 3,5-CO$_2$Na, CO$_2$Na) |
| 59 | 5-methyl-1,3,4-thiadiazol-2-yl with -SCH$_2$CHMe$_2$ | -NH-(phenyl with 3,5-SO$_3$Li, SO$_3$Li) |
| 60 | 5-methyl-1,3,4-thiadiazol-2-yl with -SCH$_2$CHMe$_2$ | -NH-(phenyl with 3,5-CO$_2^-$NH$_4^+$, CO$_2^-$NH$_4^+$) |
| 61 | 5-methyl-1,3,4-thiadiazol-2-yl with -SCH$_2$CHMe$_2$ | —NHC$_8$H$_{17}$-n |
| 62 | 5-methyl-1,2,4-thiadiazol-3-yl | —N(CH$_2$CHC$_4$H$_9$-n)$_2$ with C$_2$H$_5$ |
| 63 | 5-methyl-1,3,4-thiadiazol-2-yl with phenyl-CO$_2$C$_6$H$_{13}$-n | —NHC$_6$H$_{13}$-n |

$$\underset{R2}{\underset{|}{N}}\!\!-\!\!\underset{}{\overset{R1}{\underset{}{C}}}\!\!=\!\!\underset{NH_2}{\overset{N=N-Ar}{C}}$$

(pyrazole with R1 at 3-position, N=N-Ar at 4-position, NH$_2$ at 5-position, R2 at N1)

| Dye | Ar | R1 | R2 |
|---|---|---|---|
| 64 | 5-methyl-1,2,4-thiadiazol-3-yl | t-C$_4$H$_9$— | phenyl with 3,5-CO$_2$K, CO$_2$K |
| 65 | 5-methyl-1,2,4-thiadiazol-3-yl with -SC$_2$H$_4$SO$_3$Na | phenyl | phenyl with SO$_3$Na, SO$_3$Na |

-continued
| | | | |
|---|---|---|---|
| 66 | 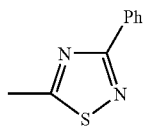 | t-C$_4$H$_9$— | 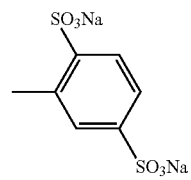 |
| 67 | 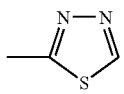 | t-C$_4$H$_9$— | 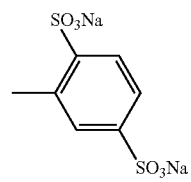 |
| 68 | 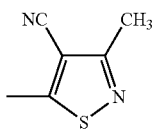 | t-C$_4$H$_9$— | 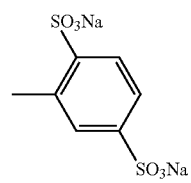 |
| 69 | 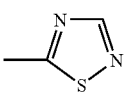 | t-C$_4$H$_9$— | 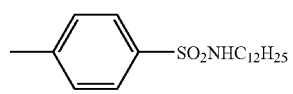 |
| 70 | 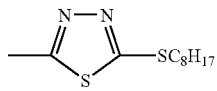 | t-C$_4$H$_9$— | 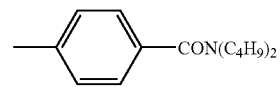 |
| 71 | 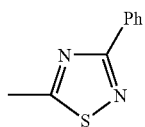 | t-C$_4$H$_9$— | 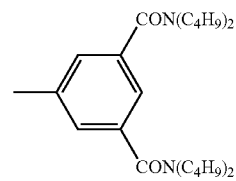 |
| 72 | 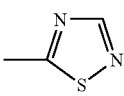 | t-C$_4$H$_9$— | 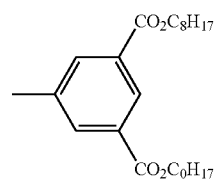 |
73
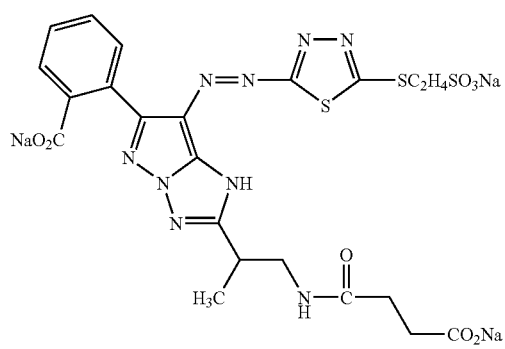

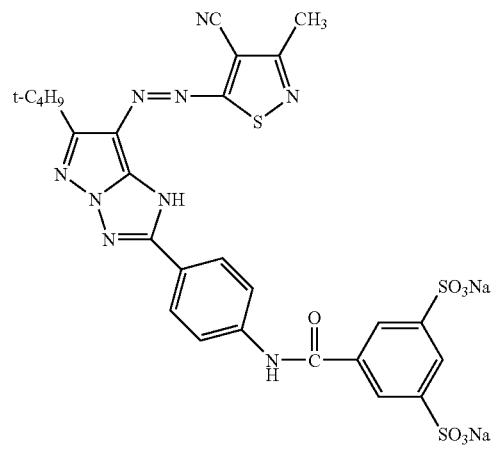
74
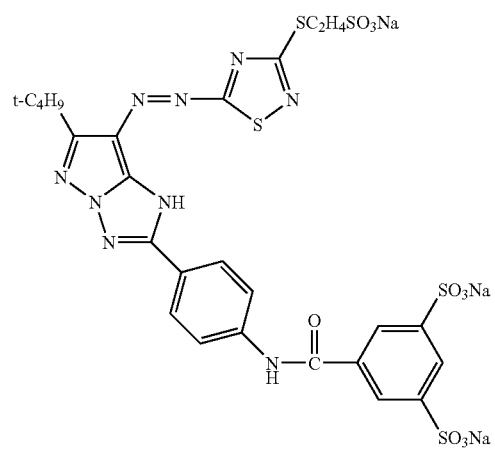
75
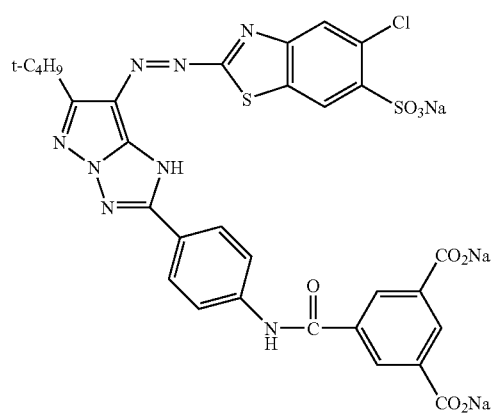
76

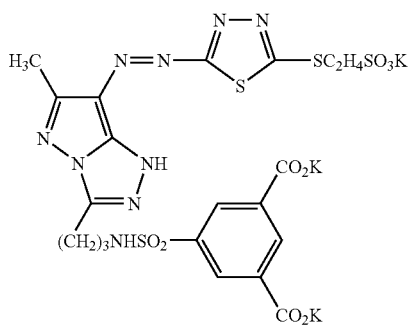
77
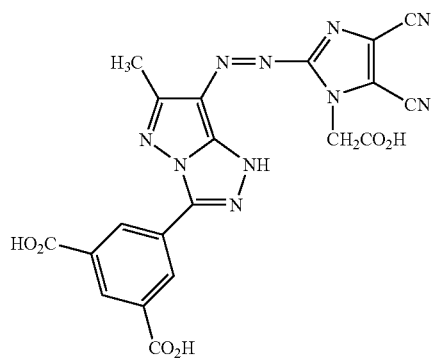
78
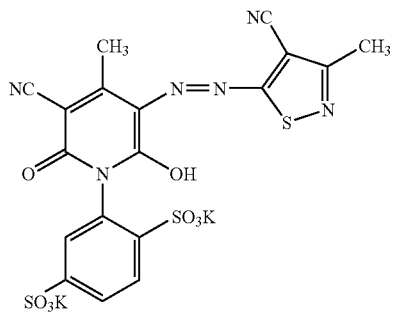
79
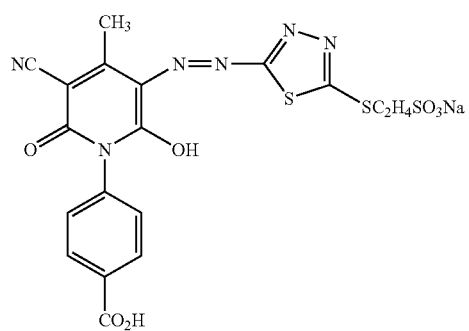
80

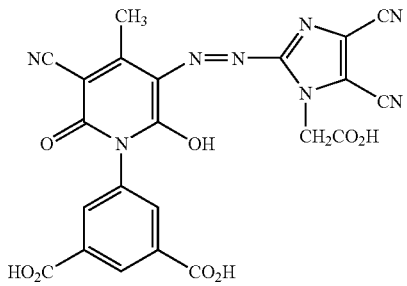

81

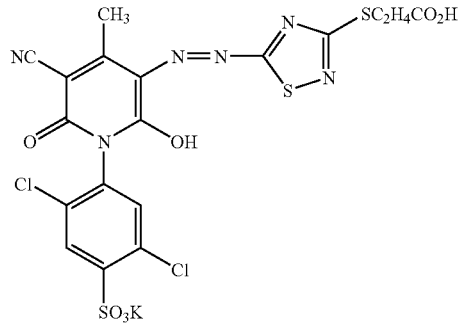

82

In the invention, the yellow ink contains the dye of formula (1) preferably in an amount of from 0.2 to 20% by weight, more preferably from 0.5 to 15% by weight.

[Dyes of Formula (2)]

The dyes of formula (2) are characterized in that the number and the position of the substituents therein can be specifically defined, though phthalocyanine dyes used in ordinary inkjet inks are derived from sulfonation of unsubstituted phthalocyanine and are therefore mixtures in which the number and the position of the substituents of the mixed compounds could not be specifically defined.

Preferred embodiments of the cyan ink that contains the dye of this type are mentioned below.

1) The cyan ink is printed on Epson PM photographic image-receiving paper to form an image thereon, a part of the image having a reflection density OD of 1.0 is exposed to xenon light (Xe 1.1 W/m, intermittent exposure) via a TAC filter for 3 days, and the color retentiveness is at least 90%.

2) The cyan ink is printed to form an image, and a part of the image having a cyan reflection density via a status A filter of from 0.9 to 1.1 is kept in a 5-ppm ozone environment for 24 hours. The color retentiveness (faded density/initial density× 100) is at least 60%, preferably at least 80%.

3) After the image formed of the cyan ink has been faded by ozone under the condition of 2), the amount of Cu ion that flows into water is at most 20% of all the dye.

4) The cyan ink is penetrable into at least 30% of the upper part of the ink-receiving layer of specific image-receiving paper.

In formula (2), $X_{21}$, $X_{22}$, $X_{23}$ and $X_{24}$ each independently represents —SO-$Z_2$, —SO$_2$-$Z_2$, —SO$_2$NR$_{21}$R$_{22}$, a sulfo group, —CONR$_{21}$R$_{22}$, or —CO$_2$R$_{21}$. Of these substituents, preferred are —SO-$Z_2$, —SO$_2$-$Z_2$, —SO$_2$NR$_{21}$R$_{22}$ and —CONR$_{21}$R$_{22}$; more preferred are —SO$_2$-$Z_2$ and —SO$_2$NR$_{21}$R$_{22}$; and most preferred is —SO$_2$-$Z_2$. When any of $a_{21}$ to $a_{24}$ each indicating the number of the substituents is a number of 2 or more, then plural $X_{21}$'s to $X_{24}$'s, if any, may be the same or different and each independently represents any of the above-mentioned groups. All of $X_{21}$, $X_{22}$, $X_{23}$ and $X_{24}$ may be the same substituents; or, they may be the same type of substituent but differ in a part of the substituent, for example, all of $X_{21}$, $X_{22}$, $X_{23}$ and $X_{24}$ are the same —SO$_2$-$Z_2$, but $Z_2$ in the substituent differs between them; or they may differ from each other, for example, they contain —SO$_2$-$Z_2$ and —SO$_2$NR$_{21}$R$_{22}$ that differ from each other.

$Z_2$ independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. Preferably, it is a substituted or unsubstituted alkyl group, a substituted or unsubstituted aryl group, or a substituted or unsubstituted heterocyclic group. Most preferably, it is a substituted alkyl group, a substituted aryl group, or a substituted heterocyclic group.

$R_{21}$ and $R_{22}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. Preferably, they are any of a hydrogen atom, a substituted or unsubstituted alkyl group, a substituted or unsubstituted aryl group, or a substituted or unsubstituted heterocyclic group. More preferably, they are any of a hydrogen atom, a substituted alkyl group, a substituted aryl group, or a substituted heterocyclic group. However, it is undesirable that both $R_{21}$ and $R_{22}$ are hydrogen atoms.

For the substituted or unsubstituted alkyl group for $R_{21}$, $R_{22}$ and $Z_2$, the alkyl group preferably has from 1 to 30 carbon atoms. Especially for increasing the dye solubility and the ink stability, a branched alkyl group is more preferred for them.

Even more preferably, the group has an asymmetric carbon atom (and the dye is used as a racemic form). For the substituent for the group, referred to are those mentioned hereinafter for the substitutable groups for $Z_2$, $R_{21}$, $R_{22}$, $Y_{21}$, $Y_{22}$, $Y_{23}$ and $Y_{24}$. Above all, especially preferred are a hydroxyl group, an ether group, an ester group, a cyano group, an amido group and a sulfonamide group, as they increase the dye association and improve the dye fastness. Apart from these, the group may be substituted with a halogen atom or an ionic hydrophilic group. The number of the carbon atoms of the alkyl group does not include the number of the carbon atoms of the substituent of the group, and the same shall apply to the other groups.

The substituted or unsubstituted cycloalkyl group for $R_{21}$, $R_{22}$ and $Z_2$ preferably has from 5 to 30 carbon atoms. Especially for increasing the dye solubility and the ink stability, the group preferably has an asymmetric carbon atom (and the dye is used as a racemic form). For the substituent for the group, referred to are those mentioned hereinafter for the substitutable groups for $Z_2$, $R_{21}$, $R_{22}$, $Y_{21}$, $Y_{22}$, $Y_{23}$ and $Y_{24}$. Above all, especially preferred are a hydroxyl group, an ether group, an ester group, a cyano group, an amido group and a sulfonamide group, as they increase the dye association and improve the dye fastness. Apart from these, the group may be substituted with a halogen atom or an ionic hydrophilic group.

The substituted or unsubstituted alkenyl group for $R_{21}$, $R_{22}$ and $Z_2$ preferably has from 2 to 30 carbon atoms. Especially for increasing the dye solubility and the ink stability, a branched alkenyl group is more preferred for them. Even more preferably, the group has an asymmetric carbon atom (and the dye is used as a racemic form). For the substituent for the group, referred to are those mentioned hereinafter for the substitutable groups for $Z_2$, $R_{21}$, $R_{22}$, $Y_{21}$, $Y_{22}$, $Y_{23}$ and $Y_{24}$. Above all, especially preferred are a hydroxyl group, an ether group, an ester group, a cyano group, an amido group and a sulfonamide group, as they increase the dye association and improve the dye fastness. Apart from these, the group may be substituted with a halogen atom or an ionic hydrophilic group.

The substituted or unsubstituted aralkyl group for $R_{21}$, $R_{22}$ and $Z_2$ preferably has from 7 to 30 carbon atoms. Especially for increasing the dye solubility and the ink stability, a branched aralkyl group is more preferred for them. Even more preferably, the group has an asymmetric carbon atom (and the dye is used as a racemic form). For the substituent for the group, referred to are those mentioned hereinafter for the substitutable groups for $Z_2$, $R_{21}$, $R_{22}$, $Y_{21}$, $Y_{22}$, $Y_{23}$ and $Y_{24}$. Above all, especially preferred are a hydroxyl group, an ether group, an ester group, a cyano group, an amido group and a sulfonamide group, as they increase the dye association and improve the dye fastness. Apart from these, the group may be substituted with a halogen atom or an ionic hydrophilic group.

The substituted or unsubstituted aryl group for $R_{21}$, $R_{22}$ and $Z_2$ preferably has from 6 to 30 carbon atoms. For the substituent for the group, referred to are those mentioned hereinafter for the substitutable groups for $Z_2$, $R_{21}$, $R_{22}$, $Y_{21}$, $Y_{22}$, $Y_{23}$ and $Y_{24}$. Especially preferred is an electron-attractive group, as it makes the dyes have a positive oxidation potential and improves the fastness of the dyes. The electron-attractive group has a positive σp value, Hammett's substituent constant. Above all, preferred are a halogen atom, a heterocyclic group, a cyano group, a carboxyl group, an acylamino group, a sulfonamido group, a sulfamoyl group, a carbamoyl group, a sulfonyl group, an imido group, an acyl group, a sulfo group, a quaternary ammonium group; and more preferred are a cyano group, a carboxyl group, a sulfamoyl group, a carbamoyl group, a sulfonyl group, an imido group, an acyl group, a sulfo group, and a quaternary ammonium group.

The heterocyclic group for $R_{21}$, $R_{22}$ and $Z_2$ is preferably 5-membered or 6-membered, and it may be condensed with any other ring. It may be an aromatic heterocyclic group or a non-aromatic heterocyclic group. Examples of the heterocyclic group for $R_{21}$, $R_{22}$ and $Z_2$ are mentioned below in the form of hetero rings in which the substituting position is omitted. In these groups, the substituting position is not limited. For example, pyridine may be substituted at any of 2-, 3- or 4-position. Examples of the hetero ring are pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline. Of those, preferred are aromatic heterocyclic groups. Mentioned in the same manner as above, their examples are pyridine, pyrazine, pyrimidine, pyridazine, triazine, pyrazole, imidazole, benzimidazole, triazole, thiazole, benzothiazole, isothiazole, benzisothiazole, and thiadiazole. These may be further substituted. For examples of the substituent for them, referred to are those to be mentioned hereinunder for the substitutable groups for $Z_2$, $R_{21}$, $R_{22}$, $Y_{21}$, $Y_{22}$, $Y_{23}$ and $Y_{24}$. Preferred substituents for these may be the same as those mentioned hereinabove for the aryl group; and more preferred substituents for these may also be the same as those mentioned hereinabove for the aryl group.

$Y_{21}$, $Y_{22}$, $Y_{23}$ and $Y_{24}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an acylamino group, an arylamino group, an ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic-oxy group, an azo group, an acyloxy group, a carbamoyloxy group, a silyloxy group, an aryloxycarbonyl group, an aryloxycarbonylamino group, an imido group, a heterocyclic-thio group, a phosphoryl group, an acyl group, a carboxyl group, or a sulfo group. These groups may be further substituted.

Above all, preferred for them are a hydrogen atom, a halogen atom, an alkyl group, an aryl group, a cyano group, an alkoxy group, an amido group, an ureido group, a sulfonamido group, a carbamoyl group, a sulfamoyl group, an alkoxycarbonyl group, a carboxyl group, and a sulfo group; more preferred are a hydrogen atom, a halogen atom, a cyano group, a carboxyl group, and a phospho group; and most preferred is a hydrogen atom.

Examples of the substituents for the substitutable groups for $Z_2$, $R_{21}$, $R_{22}$, $Y_{21}$, $Y_{22}$, $Y_{23}$ and $Y_{24}$ are mentioned below.

A linear or branched alkyl group having from 1 to 12 carbon atoms, a linear or branched aralkyl group having from 7 to 18 carbon atoms, a linear or branched alkenyl group having from 2 to 12 carbon atoms, a linear or branched alkynyl group having from 2 to 12 carbon atoms, a linear or branched cycloalkyl group having from 3 to 12 carbon atoms, a linear or branched cycloalkenyl group having from 3 to 12 carbon atoms (preferably, these groups are branched, as they improve the dye solubility and ink stability, and more preferably, they have an asymmetric carbon. Specific examples of these groups are: methyl, ethyl, propyl, isopropyl, sec-butyl, t-butyl, 2-ethylhexyl, 2-methylsulfonylethyl, 3-phenoxypropyl, trifluoromethyl, cyclopentyl); a halogen atom (e.g., chlorine, bromine), an aryl group (e.g., phenyl, 4-t-butylphenyl, 2,4-di-t-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxyl group, an amino group, an alkyloxy group (e.g., methoxy, ethoxy, 2-methoxyethoxy, 2-methanesulfonylethoxy), an aryloxy group (e.g., phenoxy, 2-methylphenoxy, 4-t-butylphenoxy, 3-nitrophenoxy, 3-t-butyloxycarbamoylphenoxy, 3-methoxycarbamoylphenoxy), an acylamino group (e.g., acetamido, benzamido, 4-(3-t-butyl-4-hydroxyphenoxy)butanamido), an alkylamino group (e.g., methylamino, butylamino, diethylamino, methylbutylamino), an anilino group (e.g., phenylamino, 2-chloroanilino), an ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-t-octylphenylthio, 2-carboxyphenylthio), an alkyloxycarbonylamino group (e.g., methoxycarbonylamino), a sulfonamido group (e.g., methanesulfonamido, benzenesulfonamido, p-toluenesulfonamido), a carbamoyl group (e.g., N-ethylcarbamoyl, N,N-dibutylcarbamoyl), a sulfamoyl group (e.g., N-ethylsulfamoyl, N,N-dipropylsulfamoyl, N-phenylsulfamoyl), a sulfonyl group (e.g., methanesulfonyl, octanesulfonyl, benzenesulfonyl, toluenesulfonyl), an alkyloxycarbonyl group (e.g., methoxycarbonyl, butyloxycarbonyl), a heterocyclic-oxy group (e.g., 1-phenyltetrazol-5-oxy, 2-tetrahydropyranyloxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic-thio group (e.g., 2-benzothiazolylthio, 2,4-di-phenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), an ionic hydrophilic group (e.g., carboxy, sulfo, phosphono, quaternary ammonium).

In case where the phthalocyanine dyes of formula (2) are soluble in water, the dyes preferably have an ionic hydrophilic group. The ionic hydrophilic group includes, for example, a sulfo group, a carboxyl group, a phosphono group, and a quaternary ammonium group. For the ionic hydrophilic group, preferred are a carboxyl group, a phosphono group and a sulfo group; and more preferred are a carboxyl group and a sulfo group. The carboxyl group, the phosphono group and the sulfo group may form salts, and examples of the counter ion to form the salts are ammonium ions, alkali metal ions (e.g., lithium ion, sodium ion, potassium ion), and organic cations (e.g., tetramethylammonium ion, tetramethylguanidium ion, tetramethylphosphonium ion). For the counter ion, preferred are alkali metal salts. More preferred are lithium salts, since they increase the dye solubility and the ink stability.

Regarding the number of the ionic hydrophilic groups to be in the phthalocyanine dye, it is desirable that the dye has at least two ionic hydrophilic groups per one molecule of the dye, more preferably at least two sulfo and/or carboxyl groups.

In formula (2), $a_{21}$ to $a_{24}$, and $b_{21}$ to $b_{24}$ indicate the number of the substituents of $X_{21}$ to $X_{24}$ and $Y_{21}$ to $Y_{24}$, respectively. $a_{21}$ to $a_{24}$ each independently represents a number of from 0 to 4, but all of these are not 0 at the same time. $b_{21}$ to $b_{24}$ each independently represents a number of from 0 to 4. When $a_{21}$ to $a_{24}$, and $b_{21}$ to $b_{24}$ are a number of 2 or more, then plural $X_{21}$'s to $X_{24}$'s and $Y_{21}$'s to $Y_{24}$'s exist in the formula, and they may be the same or different.

$a_{21}$ and $b_{21}$ satisfy the relation of $a_{21}+b_{21}=4$. More preferably, $a_{21}$ and $b_{21}$ are so combined that $a_{21}$ is 1 or 2 while $b_{21}$ is 3 or 2, respectively. Most preferably, $a_{21}$ and $b_{21}$ are so combined that $a_{21}$ is 1 and $b_{21}$ is 3.

The same as that of $a_{21}$ and $b_{21}$ shall apply to the other combinations, $a_{22}$ and $b_{22}$, $a_{23}$ and $b_{23}$, and $a_{24}$ and $b_{24}$. Regarding the preferred embodiments of the other combinations, referred to are the same as those mentioned hereinabove for the combination of $a_{21}$ and $b_{21}$.

M represents a hydrogen atom, a metal atom or its oxide, hydroxide or halide.

M is preferably a hydrogen atom, or a metal element such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, Bi. Its oxide is preferably VO or GeO. The hydroxide is preferably $Si(OH)_2$, $Cr(OH)_2$ or $Sn(OH)_2$. The halide is preferably AlCl, $SiCl_2$, VCl, $VCl_2$, VOCl, FeCl, GaCl or ZrCl. Above all, more preferred are Cu, Ni, Zn and Al; and most preferred is Cu.

The phthalocyanine dye of formula (2) may form a dimer (e.g., Pc-M-L-M-Pc) or a trimer in which two or three Pc (phthalocyanine ring) molecules bond to each other via L (divalent linking group). In these, M's may be the same or different.

The divalent linking group for L is preferably an oxy group —O—, a thio group —S—, a carbonyl group —CO—, a sulfonyl group —SO$_2$—, an imino group —NH—, a methylene group —CH$_2$—, or a group of their combination.

Regarding the preferred combinations of the substituents of the compounds of formula (2), it is desirable that at least one of the substituents is the above-mentioned preferred group. More preferably, a larger number of the substituents are the preferred groups. Most preferably, all the substituents are the preferred groups.

Of the phthalocyanine dyes of formula (2), more preferred are those having a structure of the above-mentioned formula (5). The phthalocyanine dyes of formula (5) are described in detail hereinunder.

In formula (5), $X_{51}$ to $X_{54}$, and $Y_{51}$ to $Y_{58}$ have the same meanings as $X_{21}$ to $X_{24}$, and $Y_{21}$ to $Y_{24}$ in formula (2). Their preferred examples are also the same as those of the latter. $M_1$ has the same meaning as M in formula (2), and its preferred examples are also the same as those of the latter.

In formula (5), $a_{51}$ to $a_{54}$ each independently indicate an integer of 1 or 2, preferably $4 \leq a_{51}+a_{52}+a_{53}+a_{54} \leq 6$, more preferably $a_{51}=a_{52}=a_{53}=a_{54}=1$.

All of $X_{51}$, $X_{52}$, $X_{53}$ and $X_{54}$ may be the same substituents; or, they are the same type of substituent but differ in a part of the substituent, for example, all of $X_{51}$, $X_{52}$, $X_{53}$ and $X_{54}$ are the same —SO$_2$-Z$_2$, but $Z_2$ in the substituent differs between them; or they differ from each other, for example, they contain —SO$_2$-Z$_2$ and —SO$_2$NR$_{21}$R$_{22}$.

Especially preferred combinations of the substituents in the phthalocyanine dyes of formula (5) are mentioned below.

$X_{51}$ to $X_{54}$ are independently —SO-$Z_5$, —SO$_2$-$Z_5$, —SO$_2$NR$_{51}$R$_{52}$, or —CONR$_{51}$R$_{52}$, more preferably —SO$_2$-$Z_5$ or —SO$_2$NR$_{51}$R$_{52}$, most preferably —SO$_2$-$Z_5$.

Preferably, $Z_5$ is independently a substituted or unsubstituted alkyl group, a substituted or unsubstituted aryl group, or a substituted or unsubstituted heterocyclic group. Most preferably, it is a substituted alkyl group, a substituted aryl group, or a substituted heterocyclic group. Also preferably, the substituent has an asymmetric carbon atom (and the dye is used as a racemic form) for further improving the dye solubility and the ink stability. In addition, for improving the dye association and the dye fastness, the substituent preferably has any of a hydroxyl group, an ether group, an ester group, a cyano group, an amido group and a sulfonamide group.

Preferably, $R_{51}$ and $R_{52}$ are independently a hydrogen atom, a substituted or unsubstituted alkyl group, a substituted or unsubstituted aryl group, or a substituted or unsubstituted heterocyclic group. More preferably, they are any of a hydrogen atom, a substituted alkyl group, a substituted aryl group, or a substituted heterocyclic group. However, it is undesirable that both $R_{51}$ and $R_{52}$ are hydrogen atoms. Also preferably, the substituent has an asymmetric carbon atom (and the dye is used as a racemic form) for further improving the dye solubility and the ink stability. In addition, for improving the dye association and the dye fastness, the substituent preferably has any of a hydroxyl group, an ether group, an ester group, a cyano group, an amido group and a sulfonamide group.

Preferably, $Y_{51}$ to $Y_{58}$ are independently a hydrogen atom, a halogen atom, an alkyl group, an aryl group, a cyano group, an alkoxy group, an amido group, an ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, most preferably a hydrogen atom.

Preferably, $a_{51}$ to $a_{54}$ are independently 1 or 2, more preferably all one.

$M_1$ is a hydrogen atom, or a metal element or its oxide, hydroxide or halide, preferably Cu, Ni, Zn or Al, most preferably Cu.

In case where the phthalocyanine dyes of formula (5) are soluble in water, the dyes preferably have an ionic hydrophilic group. The ionic hydrophilic group includes, for example, a sulfo group, a carboxyl group, a phosphono group, and a quaternary ammonium group. For the ionic hydrophilic group, preferred are a carboxyl group, a phosphono group and a sulfo group; and more preferred are a carboxyl group and a sulfo group. The carboxyl group, the phosphono group and the sulfo group may form salts, and examples of the counter ion to form the salts are ammonium ions, alkali metal ions (e.g., lithium ion, sodium ion, potassium ion), and organic cations (e.g., tetramethylammonium ion, tetramethylguanidium ion, tetramethylphosphonium ion). For the counter ion, preferred are alkali metal salts. More preferred are lithium salts, since they increase the dye solubility and the ink stability.

Regarding the number of the ionic hydrophilic groups to be in the phthalocyanine dye, it is desirable that the dye has at least two ionic hydrophilic groups per one molecule of the dye, more preferably at least two sulfo and/or carboxyl groups.

Regarding the preferred combinations of the substituents of the compounds of formula (5), it is desirable that at least one of the substituents is the above-mentioned preferred group. More preferably, a larger number of the substituents are the preferred groups. Most preferably, all the substituents are the preferred groups.

Regarding the chemical structure of the phthalocyanine dyes of formula (5), it is desirable that each of the four benzene rings of the phthalocyanine skeleton has at least one electron-attractive group such as a sulfinyl group, a sulfonyl group or a sulfamoyl group in such a manner that the sum total of the σp value of all the substituents on the phthalocyanine skeleton could be at least 1.6.

The Hammett's substituent constant σp is described briefly. The Hammett's rule is a rule of thumb proposed by L. P. Hammett in 1935 for quantitatively discussing the influence of substituents on the reaction or equilibrium of benzene derivatives, and its reasonableness is now widely admitted in the art. The substituent constant to be obtained by the Hammett's rule includes two values σp and σm, and these are seen in many ordinary documents. For example, their details are in J. A. Dean, *Lange's Handbook of Chemistry*, Ed. 12, 1979 (McGraw-Hill); and extra issue of *Chemical Region*, No. 122, pp. 96-103, 1979 (Nanko-do).

In the phthalocyanine dyes of formula (2), in general, the position and the number of the substituent s×n (n falls between 1 and 4) and Ym (m falls between 1 and 4) inevitably differ depending on the method for their production, or that is, the dyes are generally in the form of a mixture of their analogues. Accordingly, the general formula for the dyes shall indicate a mixture of such analogues that are statistically averaged. We, the present inventors have grouped the analogue mixtures into three types mentioned below, and have found that a specific type of the mixture is especially preferred. Specifically, the phthalocyanine dye analogue mixtures of formulae (2) and (5) are grouped into the following three types, based on the position of the substituents therein. In formula (5), $Y_{51}, Y_{52}, Y_{53}, Y_{54}, Y_{55}, Y_{56}, Y_{57}$ and $Y_{58}$ are 1-, 4-, 5-, 8-, 9-, 12-, 13- or 16-positioned, respectively.

(1) β-substituted phthalocyanine dyes having a specific substituent at 2- and/or 3-position, 6- and/or 7-position, 10- and/or 11-position, 14- and/or 15-position.

(2) α-substituted phthalocyanine dyes having a specific substituent at 1- and/or 4-position, 5- and/or 8-position, 9- and/or 12-position, 13- and/or 16-position.

(3) α,β-substituted phthalocyanine dyes having a specific substituent at any of 1 to 16-positions with no regularity.

In this description, when phthalocyanine dye derivatives having different structures (especially in point of the substituent position) are described, the above-mentioned expressions of β-substituted, α-substituted, and α,β-substituted phthalocyanine dyes are employed.

The phthalocyanine dyes for use in the invention may be produced, for example, according to the methods described or referred to in Shirai & Kobayashi, *Phthalocyanines—Chemistry and Function*, pp. 1-62 (by IPC), and C. C. Lenznoff & A. B. P. Lever, *Phthalocyanines—Properties and Applications*, pp. 1-54 (by VCH), or according to methods similar to those methods.

The phthalocyanine compounds of formula (2) for use in the invention may be produced, for example, through sulfonation, sulfonylchloridation or amidation of unsubstituted phthalocyanine compounds, as in WO 00/17275, 00/08103, 00/08101, 98/41853, and JP-A 10-36471. In this case, sulfonation occurs at any position of the phthalocyanine nucleus and the number of the positions for sulfonation is difficult to control. Accordingly, in case where the sulfo group is introduced under the reaction condition of the process, the position and the number of the sulfo groups introduced could not be specifically controlled, and the process inevitably gives a mixture of analogues that differ in point of the position and the number of the substituents. Therefore, if the compounds for use in the invention are produced from the products produced according to the process, then the number and the position of the heterocyclic substituted sulfamoyl groups introduced in the compound could not be specifically controlled, and the phthalocyanine dyes thus produced for use in the invention shall be in the form of a mixture of some α,β-substituted types that differ in point of the number and the position of the substituents therein.

For example, when a large number of electron-attractive groups such as sulfamoyl group are introduced into the phthalocyanine nucleus, then the resulting dye may have a more positive oxidation potential and the ozone resistance thereof therefore increases, as so mentioned hereinabove. However, according to the production process mentioned above, it is inevitable that the products contain phthalocyanine dyes which have fewer electron-attractive groups introduced therein and therefore have a more negative oxidation potential. Accordingly, for improving the ozone resistance of the dyes, it is desirable to employ a production process in which the production of the compounds having a more negative oxidation potential is retarded.

The phthalocyanine compounds of formula (5) may be derived from tetrasulfophthalocyanine compounds that are obtained, for example, through reaction of a phthalonitrile derivative (compound P) and/or a diiminoisoindoline derivative (compound Q) with a metal derivative of formula (6) mentioned below, or through reaction of a 4-sulfophthalic acid derivative (compound R) with the metal derivative of formula (6), according to the reaction scheme mentioned below.

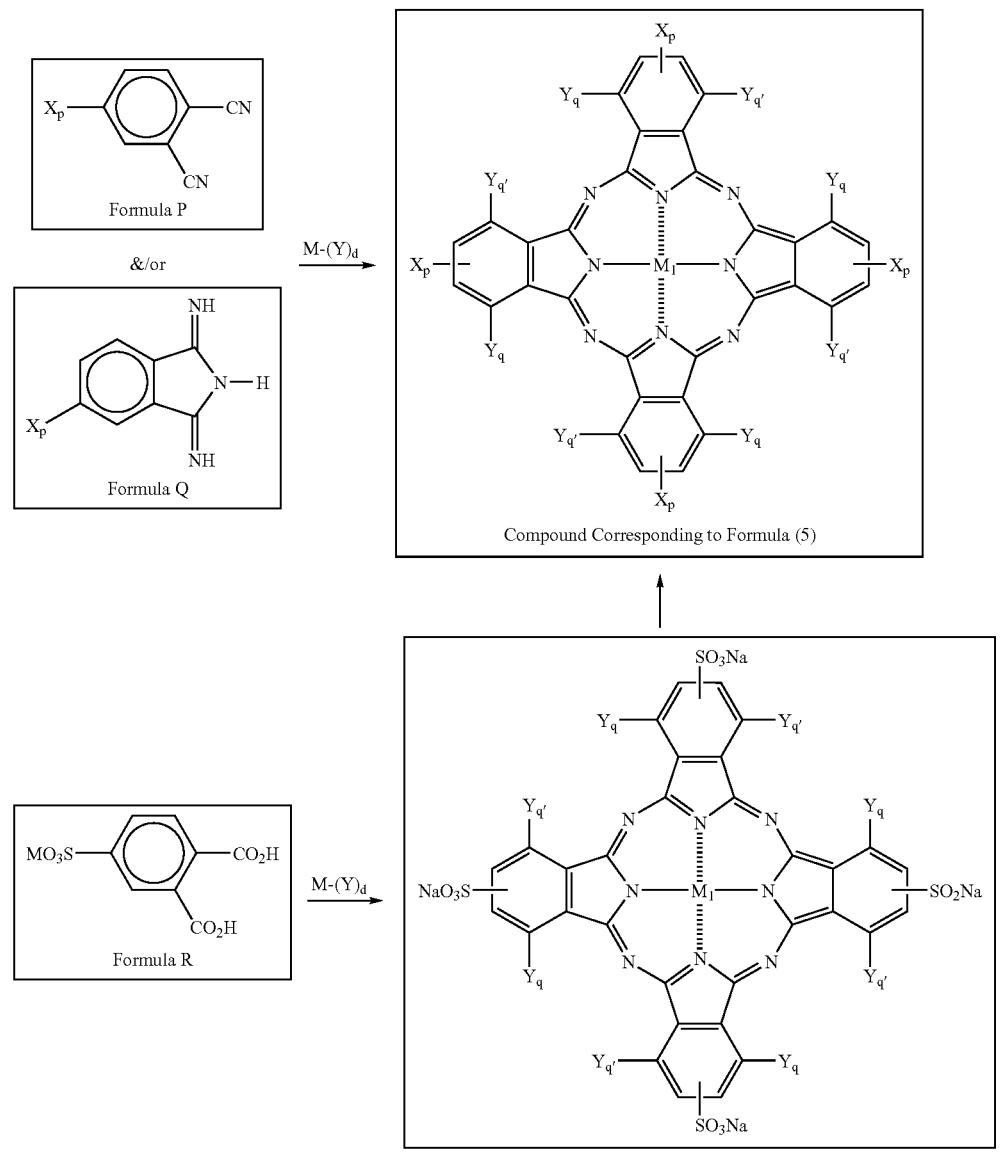

In the above formulae, Xp corresponds to $X_{51}, X_{52}, X_{53}$ or $X_{54}$ in formula (5); Yq and Yq' each correspond to any of $Y_{51}, Y_{52}, Y_{53}, Y_{54}, Y_{55}, Y_{56}, Y_{57}$ or $Y_{58}$. In compound R, M' represents a cation.

The cation for M' includes an alkali metal cation such as Li, Na, K; and an organic cation such as triethylammonium ion, pyridinium ion.

M-(Y)$_d$ (6)

In formula (6), M has the same meaning as M in formula (2) and $M_1$ in formula (5); Y represents a monovalent or divalent ligand such as a halogen atom, an acetate anion, an acetylacetonate group or an oxygen atom; and d indicates an integer of from 1 to 4.

According to the production process mentioned above, therefore, it is possible to introduce a desired number of desired substituents into the dyes. In particular, when a large number of electron-attractive groups are desired to be introduced into the dyes so that the dyes may have a positive oxidation potential as in the invention, then the above-mentioned production process is far superior to the production process of producing the phthalocyanine compounds of formula (2) previously described hereinabove.

Thus obtained, the phthalocyanine compounds of formula (5) are generally in the form of a mixture of compounds of formulae (a)-1 to (a)-4 mentioned below which are isomers in point of the substitution position of Xp therein, or that is, in the form of the β-substituted compounds.

(a-1)

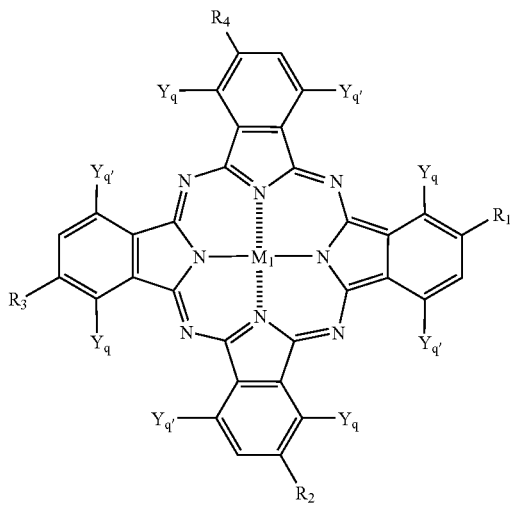

(a-2)

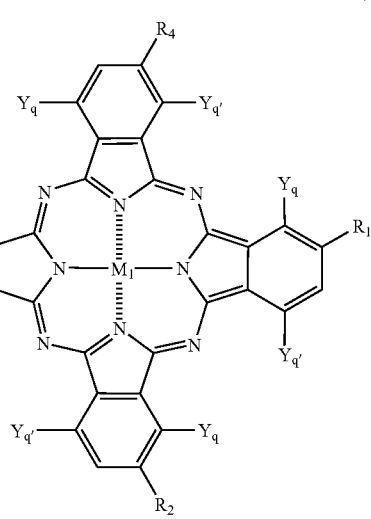

(a-3)

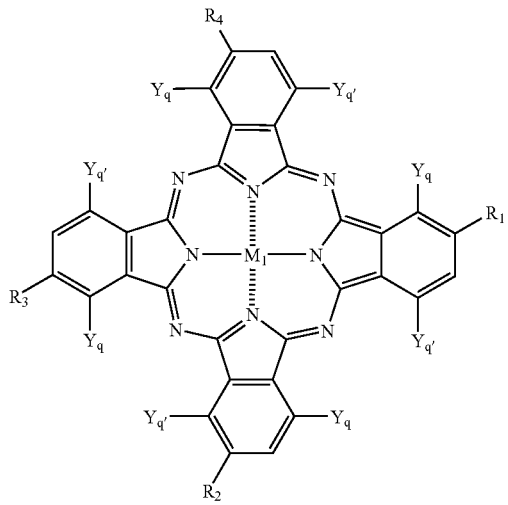

(a-4)

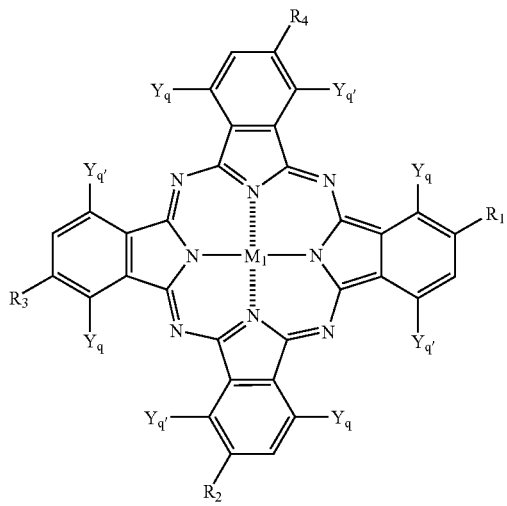

When Xp's in the starting compounds in the above-mentioned process are all the same, then β-substituted phthalocyanine dyes are obtained in which $X_{51}$, $X_{52}$, $X_{53}$ and $X_{54}$ are all the same substituents. On the other hand, when starting compounds that differ in point of Xp are combined and used in the process, dyes in which the substituents are of the same type but partially differ or dyes having different substituents can be obtained. Of the dyes of formula (5), those having different electron-attractive groups are especially preferred as their solubility and associability and even the storage stability of ink containing the dye can be controlled in any desired manner.

Though the detailed reason is not clear, the dyes of the β-substituted type obviously tend to be superior to the dyes of the α,β-substituted type in point of the hue, the light fastness and the ozone gas resistance thereof.

Specific examples (Compounds I-1 to I-12, and 101 to 190) of the phthalocyanine dyes of formulae (2) and (5) are mentioned below, but the phthalocyanine dyes for use in the invention should not be limited to these.

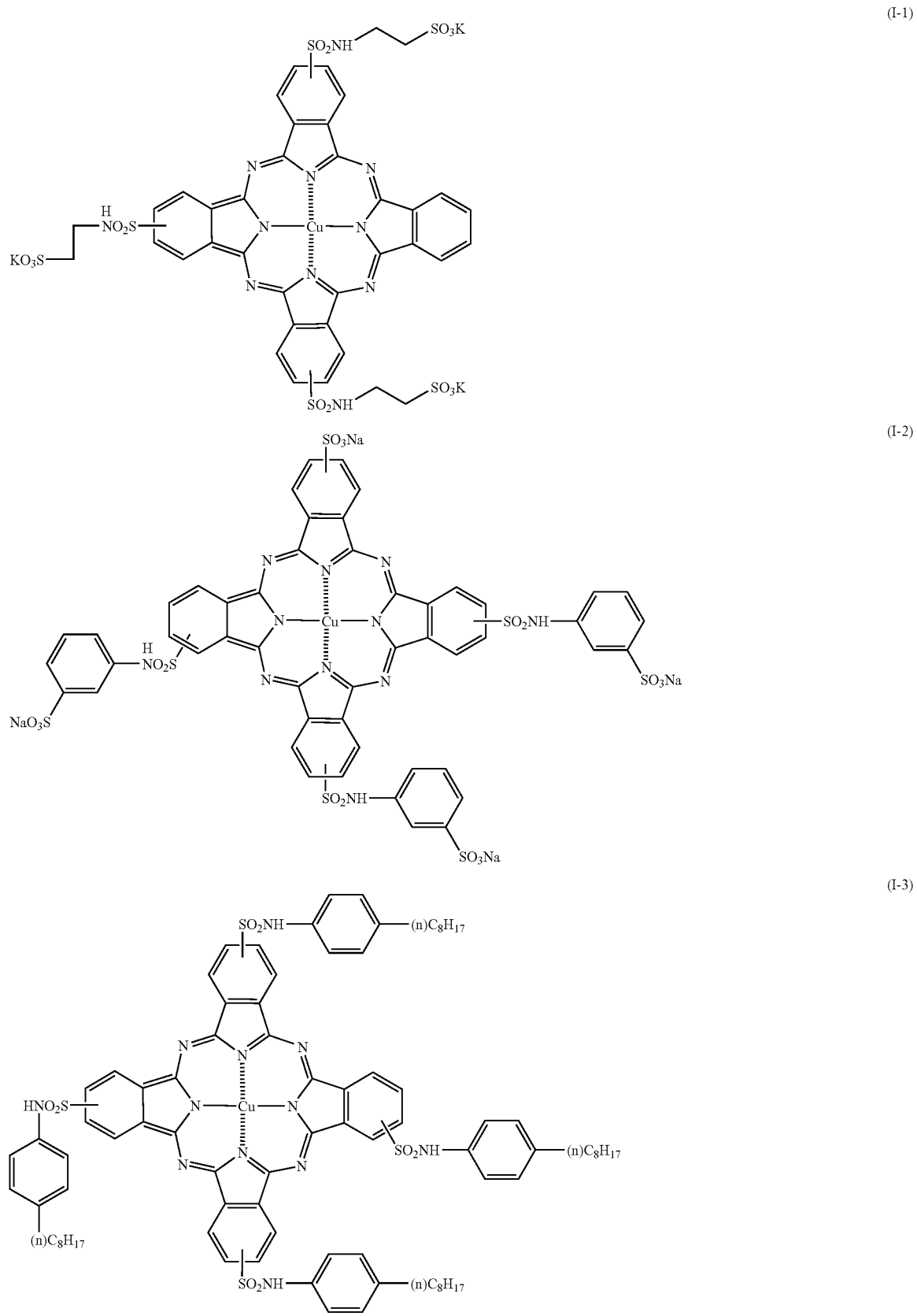
(I-1)
(I-2)
(I-3)

(I-4)
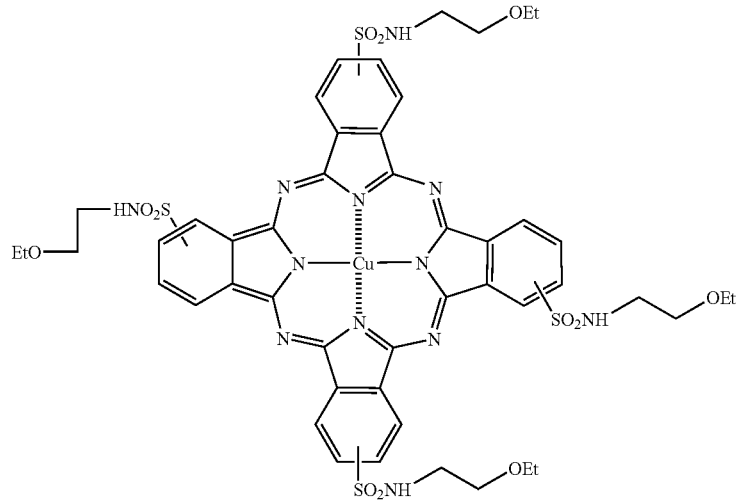
(I-5)
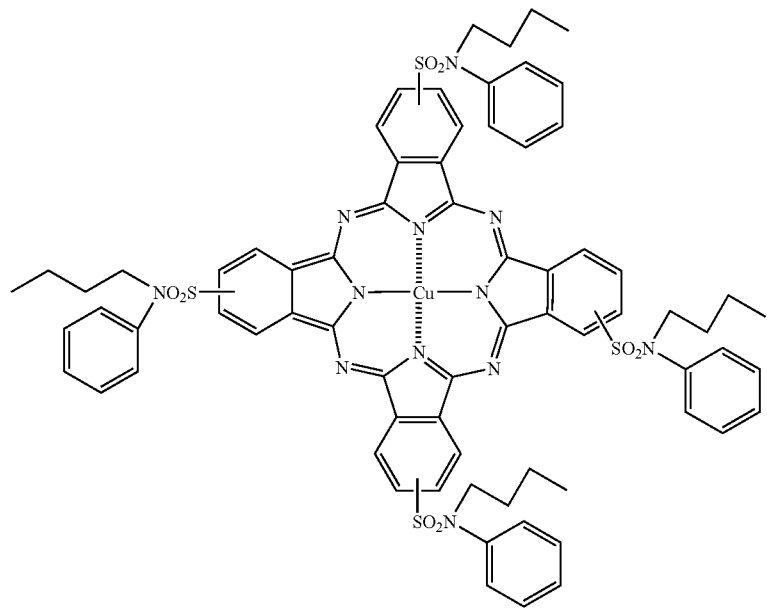

-continued
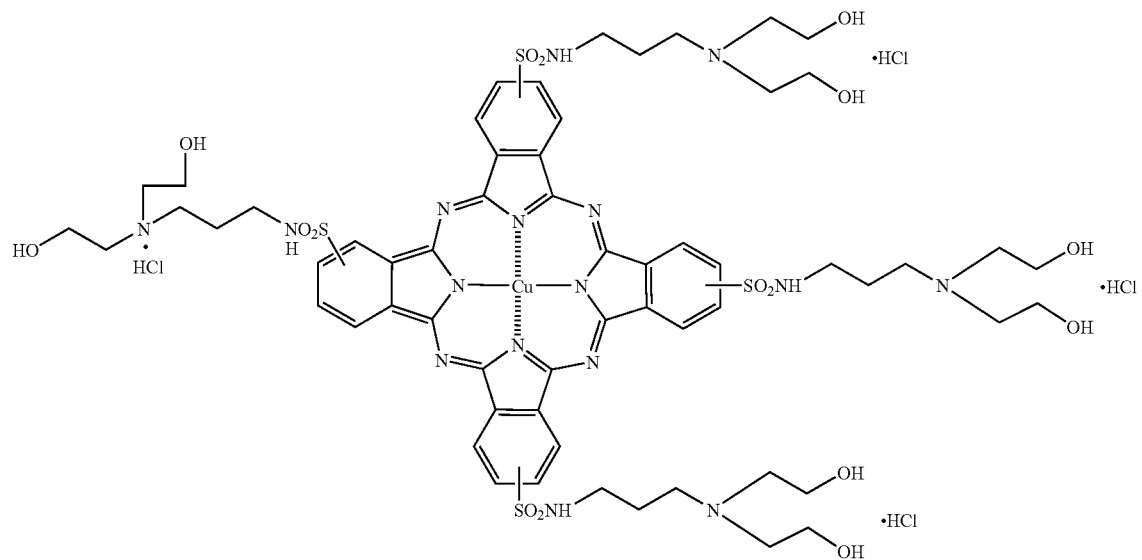
(I-6)
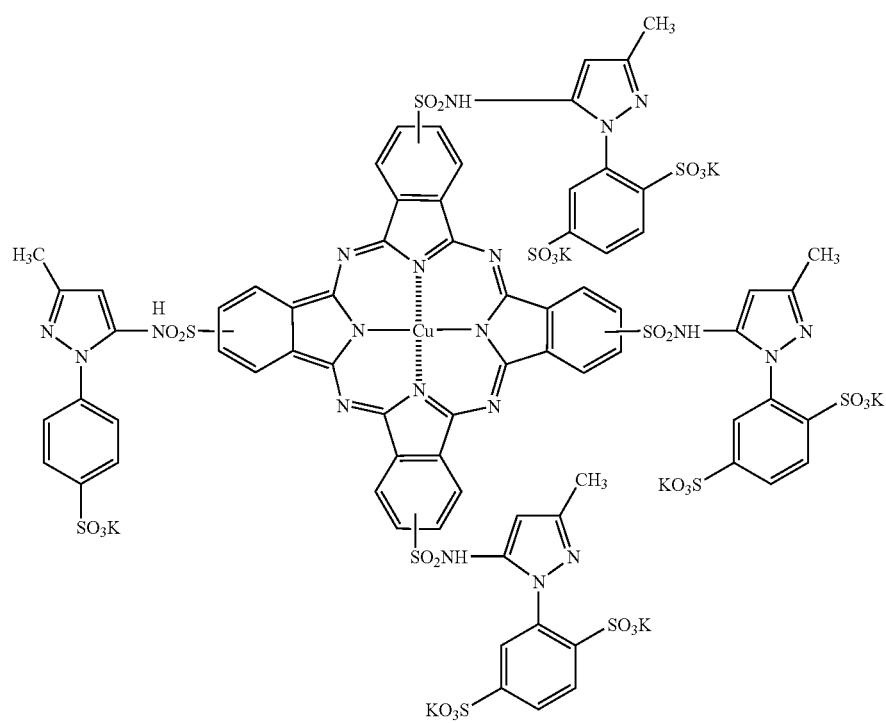
(I-7)

-continued
(I-8)
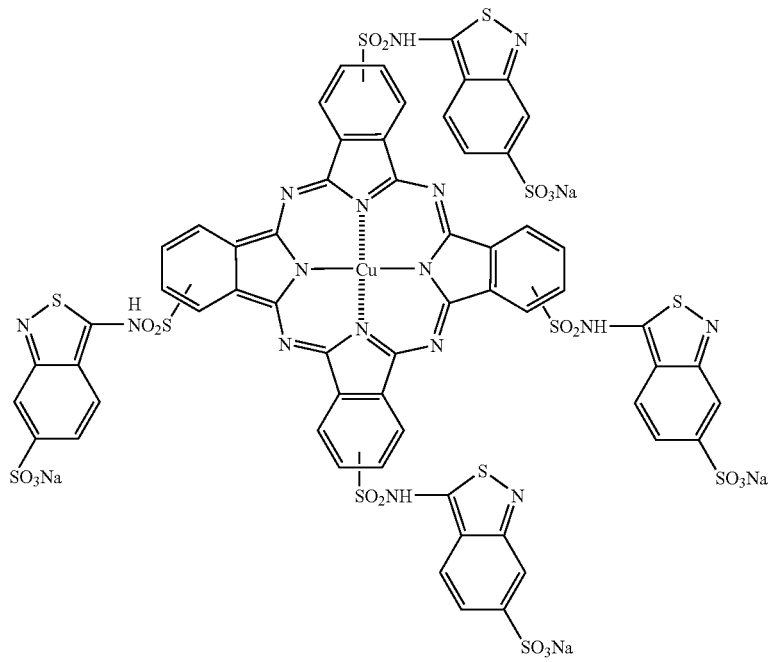
(I-9)
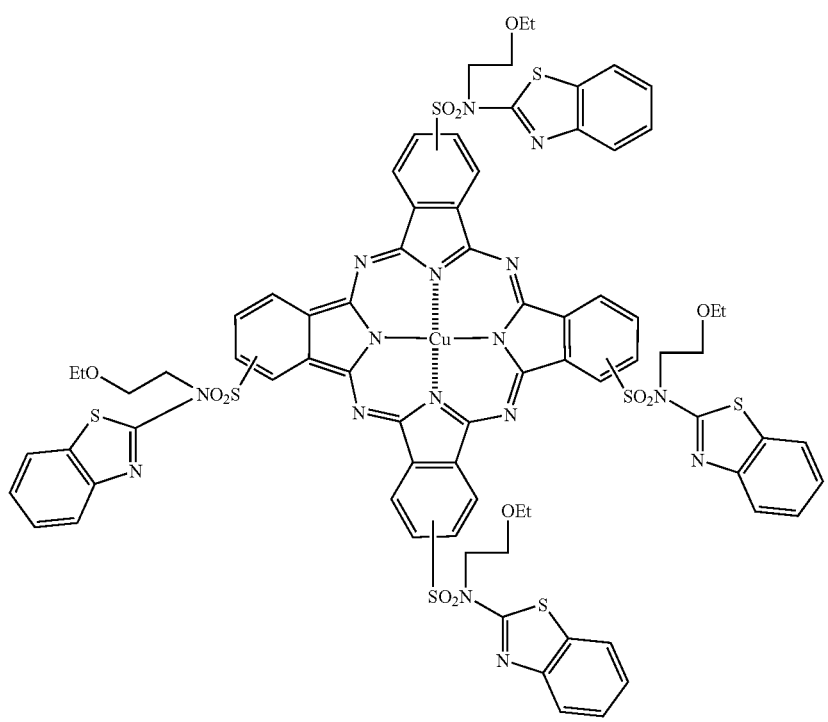

-continued
(I-10)
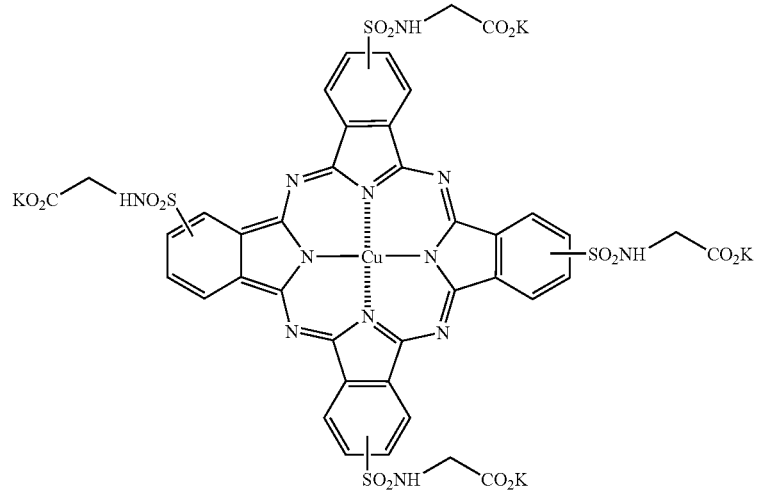
(I-11)
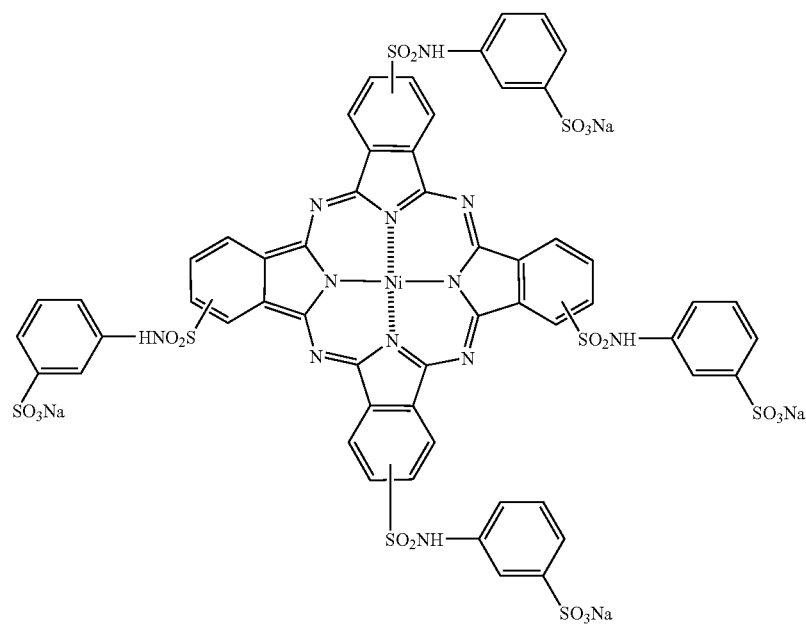

(I-12)
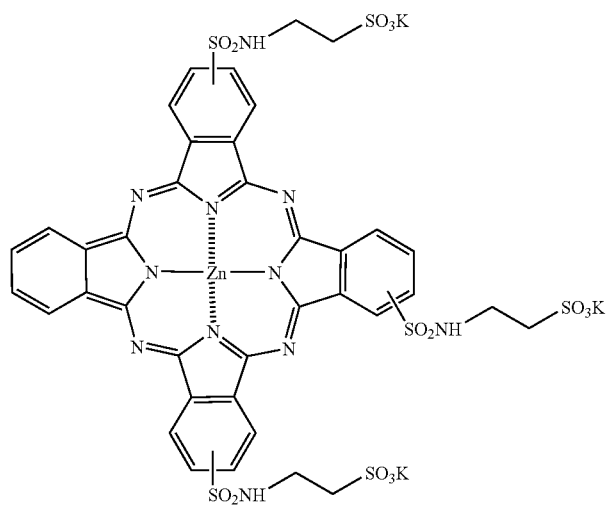
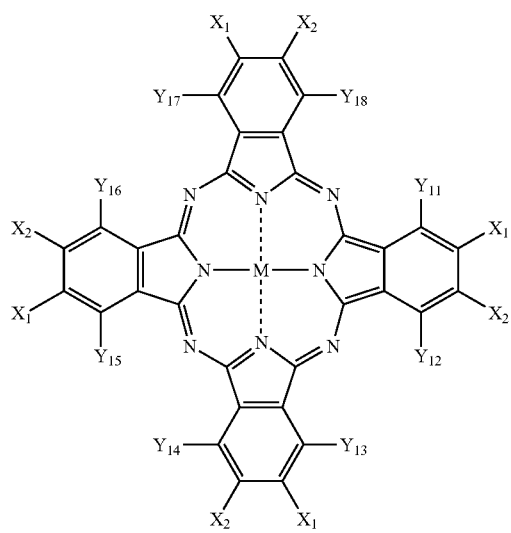
In the Table, no special order is defined independently for the specific examples of the combinations of $(X_1, X_2)$, $(Y_{11}, Y_{12})$, $(Y_{13}, Y_{14})$, $(Y_{15}, Y_{16})$, $(Y_{17}, Y_{18})$.
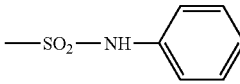

-continued

| | | | | | | | | |
|---|---|---|---|---|---|---|---|---|
| 105 | Ni | —SO$_2$—NH—CH$_2$—CH$_2$—CO—NH—CH(CH$_2$—COONa)—COONa | —H | —Cl, —H | —Cl, —H | —Cl, —H | —Cl, —H |
| 106 | Cu | —SO$_2$—NH—CH$_2$—CH$_2$—SO$_2$—NH—CH$_2$—COONa | —CN | —H, —H | —H, —H | —H, —H | —H, —H |
| 107 | Cu | —SO$_2$—CH$_2$—CH$_2$—CH$_2$—SO$_2$—NH—CH(CH$_2$—OH)—COOLi | —H | —H, —H | —H, —H | —H, —H | —H, —H |
| 108 | Cu | —SO$_2$—CH$_2$—CH$_2$—CH$_2$—SO$_3$Li | —H | —H, —H | —H, —H | —H, —H | —H, —H |
| 109 | Cu | —SO$_2$—CH$_2$—CH$_2$—CH$_2$—SO$_3$K | —H | —H, —H | —H, —H | —H, —H | —H, —H |
| 110 | Cu | —SO$_2$—(CH$_2$)$_5$—CO$_2$K | —H | —H, —H | —H, —H | —H, —H | —H, —H |
| 111 | Cu | —SO$_2$—NH—CH$_2$—CH$_2$—CH$_2$—SO$_2$—NH—CH$_2$CH(OH)—CH$_2$—SO$_3$Li | —H | —H, —H | —H, —H | —H, —H | —H, —H |
| 112 | Cu | —SO$_2$—NH—CH$_2$—CH$_2$—CH$_2$—SO$_2$NH—CH$_2$—CH(OH)—CH$_3$ | —SO$_3$Li | —H, —H | —H, —H | —H, —H | —H, —H |
| 113 | Cu | —SO$_2$—CH$_2$—CH(OH)—CH$_2$SO$_3$K | —H | —H, —H | —H, —H | —H, —H | —H, —H |
| 114 | Cu | —SO$_2$—CH$_2$—CH(OH)—CH$_3$ | —SO$_3$Li | —H, —H | —H, —H | —H, —H | —H, —H |
| 115 | Cu | —SO$_2$NH(CH$_2$)$_3$N$^⊕$(CH$_3$)(CH$_2$CH$_2$OH)$_2$·CH$_3$—C$_6$H$_4$—SO$_3^⊖$ | —H | —H, —H | —H, —H | —H, —H | —H, —H |
| 116 | Cu | —CO—NH—CH$_2$—CH(OH)—CH$_2$SO$_3$K | —H | —H, —H | —H, —H | —H, —H | —H, —H |
| 117 | Cu | —CO—NH—CH(COOLi)—CH$_2$CH$_2$SO$_3$Li | —H | —H, —H | —H, —H | —H, —H | —H, —H |
| 118 | Cu | —SO$_2$CH$_2$CH$_2$CH(CH$_3$)(SO$_3$Li) | —H | —H, —H | —H, —H | —H, —H | —H, —H |
| 119 | Cu | —SO$_2$—CH$_2$—CH(OH)—CH$_2$—SO$_3$Na | —H | —H, —H | —H, —H | —H, —H | —H, —H |
| 120 | Cu | —SO$_2$—CH$_2$—CH$_2$—CH(CH$_3$)—COOLi | —H | —H, —H | —H, —H | —H, —H | —H, —H |
| 121 | Cu | —SO$_2$(CH$_2$)$_3$SO$_2$NHCH$_2$—CH(OH)—CH$_2$—SO$_3$Li | —H | —H, —H | —H, —H | —H, —H | —H, —H |
| 122 | Cu | —CO$_2$CH$_2$CH$_2$CH$_2$SO$_2$—NH—CH$_2$—CH(OH)—CH$_2$—SO$_3$Li | —H | —H, —H | —H, —H | —H, —H | —H, —H |
| 123 | Cu | —SO$_2$NH—C$_8$H$_{17}$(t) | —H | —H, —H | —H, —H | —H, —H | —H, —H |

-continued

| | | | | | | | | |
|---|---|---|---|---|---|---|---|---|
| 124 | Cu | —SO₂—NH—CH₂—CH(CH₂CH₃)—CH₂CH₂—CH₃ | —H | —H, —H | —H, —H | —H, —H | —H, —H |
| 125 | Cu | —SO₂CH₂CH₂CH₂SO₂—NH—CH₂—CH(CH₃)—CH₂—CH₃ | —H | —H, —H | —H, —H | —H, —H | —H, —H |
| 126 | Cu | —SO₂—CH₂—CH₂—CH₂—CO₂—CH(CH₃)—CH₂—O—CH₃ | —H | —H, —H | —H, —H | —H, —H | —H, —H |
| 127 | Cu | —SO₂CH₂CH₂CH₂SO₂NHCH₂CH₂CH₂O—CH(CH₃)₂ | —H | —H, —H | —H, —H | —H, —H | —H, —H |
| 128 | Zn | —SO₂—CH₂—CH(OCH₃)—CH₂—O—CH₂ | —CN | —H, —H | —H, —H | —H, —H | —H, —H |
| 129 | Cu | —CO—NH—CH₂—CH(CH₂CH₃)—CH₂—CH₂—CH₂CH₃ | —H | —Cl, —H | —Cl, —H | —Cl, —H | —Cl, —H |
| 130 | Cu | —CO₂—CH(CH₃)—CH₂—O—C₄H₉(t) | —H | —H, —H | —H, —H | —H, —H | —H, —H |
| 131 | Cu | —SO₂—CH₂—CH₂—CH(CH₃)—SO₂—NH-(2,5-(SO₃Li)₂-C₆H₃) | —H | —H, —H | —H, —H | —H, —H | —H, —H |
| 132 | Cu | —SO₂NH-(3,5-(CO₂C₆H₁₃(n))₂-C₆H₃) | —H | —H, —H | —H, —H | —H, —H | —H, —H |
| 133 | Cu | —SO₂NH-(4-OCH₂CH₂OCH₃-3-(SO₂NHCH₂CH(C₂H₅)C₄H₉)-C₆H₃) | —H | —H, —H | —H, —H | —H, —H | —H, —H |
| 134 | Cu | —SO₂NH-C₆H₄-SO₂—NH—CH₂—CH(CH₂CH₃)—CH₂—CH₂-CH₂—CH₃ | —H | —H, —H | —H, —H | —H, —H | —H, —H |
| 135 | Cu | —SO₂-(3-CO₂Na-C₆H₄) | —H | —H, —H | —H, —H | —H, —H | —H, —H |
| 136 | Cu | —SO₂N(C₄H₉(n))(C₆H₅) | —H | —H, —H | —H, —H | —H, —H | —H, —H |

-continued

| comp. No. | M | (structure/R) | | | | | | |
|---|---|---|---|---|---|---|---|---|
| 137 | Cu | —SO₂-(benzothiazole-2-yl)-6-SO₃Li | —H | —H,—H | —H,—H | —H,—H | —H,—H |
| 138 | Cu | —SO₂NH-(3-methyl-pyrazol-5-yl)-N1-(2,5-bis(SO₃Li)phenyl) | —H | —H,—H | —H,—H | —H,—H | —H,—H |
| 139 | Cu | —SO₂(CH₂)₃—NH—C(O)—(3,4-bis(CO₂Li)phenyl) | —Cl | —H,—H | —H,—H | —H,—H | —H,—H |
| 140 | Cu | —CO₂—CH₂CH₂CH₂—NH-(triazine-2,4-bis(NH—CH₂—CH₂—CH(CH₃)—SO₃Li)) | —H | —H,—H | —H,—H | —H,—H | —H,—H |
| 141 | Cu | —SO₂NH—CH(COONa)—CH₂—CO—N(CH₂CH₂OH)₂ | —H | —H,—H | —H,—H | —H,—H | —H,—H |
| 142 | Cu | —SO₂NH-(3-(NHC(O)-(3-SO₃Li-phenyl))phenyl) | —H | —H,—H | —H,—H | —H,—H | —H,—H |
| 143 | Cu | —CO—NH—CH₂—CH(OH)—CO—NH—CH(COOK)—CH₂CH₂—SO₃K | —H | —H,—H | —H,—H | —H,—H | —H,—H |
| 144 | Cu | —SO₂—CH₂CH₂CH₂—NH—CO—(4-(CO—NH—CH(COOLi)—CH₂—COOLi)phenyl) | —H | —H,—H | —H,—H | —H,—H | —H,—H |
| 145 | Cu | —SO₂CH₂CH₂OCH₂CH₂OCH₂CH₂SO₃Li | —H | —H,—H | —H,—H | —H,—H | —H,—H |

| comp. No. | M | R₁₁ |
|---|---|---|
| 146 | Cu | —SO₂—NH—CH₂—CH(CH₃)—SO₃Li |
| 147 | Cu | —SO₂—NH—CH₂—CH₂SO₃Li |
| 148 | Cu | —SO₂—NH—CH₂—CH(CH₃)—SO₃Li |
| 149 | Cu | —SO₂—NH—CH₂—CH(CH₃)—SO₃Li |
| 150 | Cu | —SO₂—NH—CH₂—CH₂—SO₂—NH—CH₂CH₂—COONa |

-continued

| | | |
|---|---|---|
| 151 | Cu | —SO₂—NH—⟨C₆H₄⟩—SO₂NH—CH₂—CH(OH)—SO₃Li |
| 152 | Cu | —SO₂—CH₂—CH₂—CH(CH₃)—SO₃Li |
| 153 | Cu | —SO₂—CH₂—CH₂—CH(CH₃)—SO₃Na |
| 154 | Cu | —SO₂—CH₂—CH₂—CH₂—SO₃Li |
| 155 | Cu | —SO₂—CH₂—CH₂—CH₂—COOK |
| 156 | Cu | —SO₂—CH₂—CH₂—CH₂—SO₃Li |
| 157 | Cu | —SO₂—CH₂—CH₂—O—CH₂—CH₂—SO₃Li |
| 158 | Cu | —SO₂—CH₂—CH(OH)—CH₂—SO₃Li |
| 159 | Cu | —SO₂NHCH₂CH₂—SO₃Li |
| 160 | Cu | —SO₂—CH₂—CH₂—O—CH₂—CH₂—O—CH₂—CH₂—SO₃Na |
| 161 | Cu | —SO₂CH₂CH₂CH₂SO₃Li |
| 162 | Cu | —SO₂CH₂CH₂CH₂SO₃Li |
| 163 | Cu | —SO₂CH₂CH₂CH₂SO₃K |
| 164 | Cu | —SO₂CH₂CH₂CH₂SO₃Li |
| 165 | Cu | —CO—NH—CH₂—CH₂—SO₃K |
| 166 | Cu | —CO—NH—CH₂—CH₂—SO₂—NH—CH₂—CH₂—COONa |
| 167 | Cu | —SO₂(CH₂)₃SO₂NHCH₂—CH(OH)—CH₂CO₂Li |
| 168 | Cu | —CO₂—CH₂—CH₂—CH(CH₃)—SO₃Na |
| 169 | Cu | —CO₂—CH₂—CH₂—CH₂—SO₃Li |
| 170 | Cu | —CO₂—CH₂—CH₂—CH₂COOK |
| 171 | Cu | —CO₂—CH₂—CH₂—O—CH₂—CH₂—O—CH₂—CH₂—SO₃Na |
| 172 | Cu | —SO₂CH₂CH₂OCH₂CH₂O—CH₂CH₂SO₃K |
| 173 | Cu | —SO₂(CH₂)₃SO₂NHCH₂CH(OH)CH₂OH |

-continued

| | | |
|---|---|---|
| 174 | Cu | —SO$_2$(CH$_2$)$_3$SO$_2$NHCH$_2$—CH(OH)—CH$_2$SO$_3$K |
| 175 | Cu | —SO$_2$(CH$_2$)$_3$SO$_2$NH(CH$_2$)$_3$N(CH$_2$CH$_2$OH)$_2$ |
| 176 | Cu | —SO$_2$—CH$_2$—CH$_2$—CH$_2$—SO$_2$—NH—CH$_2$—CH(OH)—CH$_3$ |
| 177 | Cu | —SO$_2$—CH$_2$—CH$_2$—O—CH$_2$—CH$_2$—O—CH$_3$ |
| 178 | Cu | —SO$_2$—CH$_2$—CH$_2$—O—CH$_2$—CH$_2$—O—CH$_2$—CH$_2$—OH |
| 179 | Cu | —SO$_2$—CH$_2$—CH(CH$_2$CH$_3$)—CH$_2$CH$_2$—CH$_2$CH$_3$ |
| 180 | Cu | —SO$_2$—CH$_2$—CH$_2$—CH$_2$—SO$_2$—NH—CH$_2$—CH(O—CH$_3$)—CH$_3$ |
| 181 | Cu | —SO$_2$—CH$_2$—CH$_2$—CH$_2$—SO$_2$—NH—CH(CH$_3$)—CH$_2$—CH$_3$ |
| 182 | Cu | —SO$_2$—CH$_2$—CH$_2$—CH$_2$—SO$_2$NH—CH$_2$—CH(OH)—CH$_3$ |
| 183 | Cu | —SO$_2$—CH$_2$—CH$_2$—CH$_2$—CO$_2$—NH—CH(CH$_3$)—CH$_2$—CH$_3$ |
| 184 | Cu | —SO$_2$—CH$_2$—CH$_2$—CH$_2$—SO$_2$—NH—CH$_2$—CH(OH)—CH$_3$ |
| 185 | Cu | —SO$_2$—CH$_2$—CH$_2$—CH$_2$—SO$_2$—NH—CH$_2$—CH(OH)—CH$_3$ |
| 186 | Cu | —SO$_2$—CH$_2$—CH$_2$—CH$_2$—CO$_2$—NH—CH(CH$_3$)—CH$_2$—CH$_3$ |
| 187 | Cu | —SO$_2$—CH$_2$—CH$_2$—CH$_2$—SO$_2$—NH—CH—(CH$_3$)$_2$ |
| 188 | Cu | —CO$_2$—CH$_2$—CH$_2$—CH$_2$—CO$_2$—NH—CH(CH$_3$)—CH$_2$—CH$_3$ |
| 189 | Cu | —CO—NH—CH$_2$—CH$_2$—SO$_2$—NH—CH—(CH$_3$)$_2$ |
| 190 | Cu | —CO—NH—CH$_2$—CH(CH$_2$CH$_3$)—CH$_2$—CH$_2$—CH$_2$CH$_3$ |

| comp. No. | m | R$_{12}$ | n |
|---|---|---|---|
| 146 | 3 | —SO$_2$—NH—CH$_2$—CH(OH)—CH$_3$ | 1 |
| 147 | 3 | —SO$_2$—NH—CH$_2$—CH$_2$—CH$_2$—SO$_2$—NH—CH$_2$—CH(OH)—CH$_3$ | 1 |
| 148 | 3 | —SO$_2$NH—CH$_2$—CH$_2$—CH$_2$—SO$_2$—NH—CH$_2$—CH$_2$—O—CH$_2$—CH$_2$—OH | 1 |

-continued

| | | | |
|---|---|---|---|
| 149 | 2 | —SO₂—NH—CH₂—CH₂—CH₂—CO—N(CH₂—CH₂—OH)₂ | 2 |
| 150 | 3 | —SO₂NH—CH(CH₃)—CH₂OH | 1 |
| 151 | 3 | —SO₂NH—CH₂—CH₂—O—CH₂—CH₂—OH | 1 |
| 152 | 2.5 | —SO₂—CH₂—CH₂—O—CH₂—CH₂—OH | 1.5 |
| 153 | 2 | —SO₂—CH₂—CH₂—CH₂—CO—N(CH₂—CH₂—OH)₂ | 2 |
| 154 | 3 | —SO₂—CH₂—CH₂—CH₂—SO₂—NH—CH₂—CH(CH₃)—CH₃ | 1 |
| 155 | 2 | —SO₂—CH₂—CH₂—CH₂—SO₂—NH—CH₂—CH(OH)—CH₂—COOK | 2 |
| 156 | 3 | —SO₂—CH₂—CH(OH)—CH₂—SO₃Li | 1 |
| 157 | 2 | —SO₂—CH₂—CH₂—CH₂—CO₂—CH₂—CH₂—CH(OH)—CH₂—COOK | 2 |
| 158 | 3 | —SO₂—CH₂—C₆H₄—SO₂NH—CH₂—CH(OH)—CH₂—OH | 1 |
| 159 | 3 | —SO₂—CH₂—CH₂—CH₂—SO₂—NH—CH₂—CH(OH)—CH₃ | 1 |
| 160 | 3 | —SO₂—CH₂—CH₂—CH₂—CO—N(CH₂—CH₂—COONa)(CH₂—COONa) | 1 |
| 161 | 3 | —SO₂CH₂CH₂CH₂SO₂NHCH₂—CH(OH)—CH₂SO₃Li | 1 |
| 162 | 2 | —SO₂CH₂CH₂OCH₂CH₂OCH₂CH₂OH | 2 |
| 163 | 3 | —SO₂CH₂CH₂CH₂SO₂NH—CH(CH₃)—CH₂—OH | 1 |
| 164 | 2 | —SO₂CH₂CH₂CH₂SO₂N(CH₂CH₂OH)₂ | 2 |
| 165 | 3 | —CO—NH—CH₂—CH₂—O—CH₂—CH₂—OH | 1 |
| 166 | 3 | —CO—NH—CH₂—CH(OH)—CH₃ | 1 |
| 167 | 2.5 | —CO—NH—CH₂—CH₂—CH₂—CO—N(CH₂—CH₂—OH)₂ | 1.5 |
| 168 | 2 | —CO—CH₂—CH₂—CH₂—CO—N(CH₂—CH₂—OH)₂ | 2 |
| 169 | 3 | —CO₂—CH₂—CH₂—CH₂—SO₂—NH—CH₂—CH(OH)—CH₃ | 1 |

-continued

| # | | Structure | |
|---|---|---|---|
| 170 | 2 | —CO$_2$—CH$_2$—CH$_2$—CH$_2$—SO$_2$—NH—CH$_2$—CH(OH)—CH$_2$—COOK | 2 |
| 171 | 3 | —CO$_2$—CH$_2$—C$_6$H$_4$—SO$_2$NH—CH$_2$—CH(OH)—CH$_2$—OH | 1 |
| 172 | 2 | —CO$_2$—CH$_2$—CH$_2$—CH$_2$—CO$_2$—CH$_2$—CH$_2$—CH(OH)—CH$_2$—COOK | 2 |
| 173 | 2 | —CO$_2$—CH$_2$—CH(OH)—CH$_2$—SO$_3$Li | 2 |
| 174 | 3 | —CO$_2$—CH$_2$—CH$_2$—CH$_2$—SO$_2$—NH—CH$_2$—CH(OH)—CH$_3$ | 1 |
| 175 | 2 | —CO$_2$—CH$_2$—CH$_2$—CH$_2$—CO—N(CH$_2$—CH$_2$—COOLi)—CH$_2$—COOLi | 2 |
| 176 | 3 | —SO$_2$—CH$_2$—CH$_2$—CH$_2$—SO$_2$—NH—CH$_2$—CH(CH$_2$CH$_3$)—CH$_2$CH$_2$—CH$_2$CH$_3$ | 1 |
| 177 | 2 | —SO$_2$—CH$_2$—CH$_2$—CH$_2$—SO$_2$—NH—CH$_2$—CH(OH)—CH$_3$ | 1 |
| 178 | 3 | —SO$_2$—CH$_2$—CH$_2$—CH$_2$—CO$_2$—CH$_2$—CH(CH$_2$CH$_3$)—CH$_2$CH$_2$—CH$_2$CH$_3$ | 1 |
| 179 | 2 | —SO$_2$—CH$_2$—CH$_2$—CH$_2$—SO$_2$—NH—CH$_2$—CH(O—CH$_3$)—CH$_3$ | 2 |
| 180 | 3 | —SO$_2$NH—CH$_2$—CH$_2$—SO$_2$NH—CH$_2$—CH$_2$—O—CH$_2$—CH$_2$—OH | 1 |
| 181 | 3 | —SO$_2$—CH$_2$—CH$_2$—CH$_2$—SO$_2$—NH—CH—(CH$_3$)$_2$ | 1 |
| 182 | 2.5 | —SO$_2$—CH$_2$—CH$_2$—CH$_2$—CO$_2$—NH—CH(CH$_3$)—CH$_2$—CH$_3$ | 1.5 |
| 183 | 2 | —SO$_2$—CH$_2$—CH$_2$—CH$_2$—SO$_2$—NH—(CH$_2$)$_3$—CH$_2$—O—CH$_2$CH$_2$—OH | 2 |
| 184 | 3 | —SO$_2$—CH$_2$—CH$_2$—O—CH$_2$—CH$_2$—O—CH$_3$ | 1 |
| 185 | 3 | —SO$_2$—CH$_2$—CH$_2$—O—CH$_2$—CH$_2$—O—CH$_2$—CH$_2$—O—CH$_3$ | 1 |
| 186 | 3 | —SO$_2$—CH$_2$—CH$_2$—O—CH$_2$—CH$_2$—O—CH$_2$—CH$_2$—OH | 1 |
| 187 | 3 | —CO$_2$—CH$_2$—CH(CH$_2$CH$_3$)—CH$_2$—CH$_2$—CH$_2$CH$_3$ | 1 |
| 188 | 3 | —CO$_2$—CH$_2$—CH$_2$—O—CH$_2$—CH$_2$—O—CH$_3$ | 1 |

| 189 | 3 | —SO₂—NH—CH₂—CH(CH₂CH₃)—CH₂—CH₂—CH₂—CH₃ | 1 |
| 190 | 3 | —CO—NH—CH₂—CH₂—O—CH₂—CH₂—O—CH₃ | 1 |

The structure of the phthalocyanine compounds of Nos. 146 to 190 is mentioned below. m and n each indicate the number of the substituents.

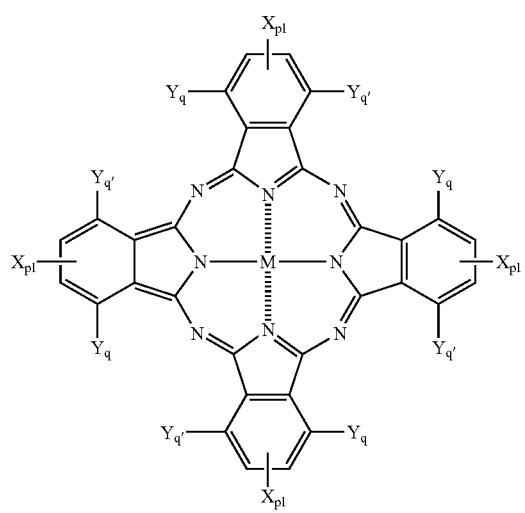

($X_{pl}$ is independently $R_{11}$ or $R_{12}$.)

The phthalocyanine dyes of formula (2) may be produced according to the description of the above-mentioned patent references. The phthalocyanine dyes of formula (5) may be produced according to the methods mentioned above, or according to the methods described in JP-A 2001-226275, 2001-96610, 2001-47013, 2001-193638. The starting substances, the dye intermediates and the production routes are not limited to those referred to herein.

In the ink set for inkjet of the invention, the content of the dye of formula (2) in cyan the ink is preferably from 0.2 to 20% by weight, more preferably from 0.5 to 15% by weight.

[Dyes of Formula (3)]

The dyes of formula (3) for use in the invention have a dye structure of a type having a chromophoric group of (hetero ring A) —N=N— (hetero ring B), in which at least one bond of the azo group directly links to the coupling component of an aromatic nitrogen-containing 6-membered hetero ring. Preferably, the dyes have a structure that contains an aromatic amino group or a heterocyclic amino group as the auxochrome thereof. Also preferably, α-hydrogen is removed from the azo dyes whereby the azo dyes may have an increased oxidation potential. Regarding the method for increasing the oxidation potential of the azo dyes, concretely referred to is the description of JP-A 2001-254878.

The accelerated fading rate constant to ozone gas of the dyes is preferably at most $5.0 \times 10^{-2}$ [hour$^{-1}$], more preferably at most $3.0 \times 10^{-2}$ [hour$^{-1}$], even more preferably at most $1.5 \times 10^{-2}$ [hour$^{-1}$].

The accelerated fading rate constant to ozone gas of the dyes is determined as follows: The dye alone is printed on a reflection-type image-receiving medium, and a part of the colored area of the thus-formed image having a color of the main spectral absorption region of the dye and having a reflection density, measured through a status A filter, of from 0.90 to 1.10 is specifically selected as an initial density point. The initial density is the start density (=100%). The image is faded in an ozone fading tester in which the ozone concentration is all the time 5 mg/liter. The period of time in which the density of the faded sample is reduced to 80% of the initial density of the original sample is counted, and its reciprocal [hour$^{-1}$] is obtained. On the presumption that the faded density and the fading time will follow the rate formula of primary reaction, the value is defined as the fading reaction rate constant. Accordingly, the fading rate constant thus obtained in the manner as above is the fading rate constant of the region colored with the dye or, that is, the ink containing the dye tested, and this is referred to as the fading rate constant of ink, in this description.

The print patch for the test may be any of JIS code 2223 black square symbol-printed patch, Macbeth chart stepwise color patch, or any other gradation density patch that enables area measurement.

The reflection density of the reflection image (stepwise color patch) printed for the test is measured by the use of a densitometer that satisfies the International Standard ISO5-4 (geometric condition for reflection density), via a status A filter.

The test chamber for the accelerated fading rate constant test to ozone gas is equipped with an ozone generator capable of all the time maintaining the internal ozone density at 5 mg/liter (e.g., high-pressure discharging system for applying AC voltage to dry air), and the temperature to which the samples are exposed in the generator is controlled at 25° C.

The accelerated fading rate constant is an index of the oxidizability of the samples in an oxidizing atmosphere, for example, in an environment with photochemical smog, vehicle exhaust gas, organic vapor from painted furniture or carpets, or gas generated from frames in light rooms. Concretely, the ozone gas is the representative of these oxidizing atmospheres.

The magenta ink containing the dye as above preferably has λmas of from 500 to 580 nm for its good color hue. Also preferably, the half-value width both on the long wave side of the maximum absorption wavelength of the ink and on the short wave side thereof is small, or that is, the ink has a sharp absorption. Concretely, this is described in JP-A 2002-309133. Introducing a methyl group into the α-position (e.g., $R_{32}$ in formula (3-A)) of the dye also realizes sharp light absorption of the dye.

In formula (3), $A_3$, represents a 5-membered hetero ring.

$B_{31}$ and $B_{32}$ each represent =CR$_{31}$— or —CR$_{32}$=, or either one of them is a nitrogen atom and the other is =CR$_{31}$— or —CR$_{32}$=. $R_{35}$ and $R_{36}$ each independently represents a hydrogen atom, or a substituent. The substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and the hydrogen atom in each group may be substituted.

$G_3$, $R_{31}$ and $R_{32}$ each independently represents a hydrogen atom, or a substituent. The substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic-thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sulfo group, and the hydrogen atom in each group may be substituted.

$R_{31}$ and $R_{35}$, or $R_{35}$ and $R_{36}$ may bond to each other to form a 5- or 6-membered ring.

The dyes of formula (3) are described in more detail.

In formula (3), $A_{31}$ represents a 5-membered heterocyclic group. Examples of the hetero atom of the hetero ring are N, O and S. Preferably, the hetero ring is a nitrogen-containing 5-membered hetero ring. The hetero ring may be condensed with an aliphatic ring, an aromatic ring or any other hetero ring. Preferred examples of the hetero ring for $A_{31}$ are pyrazole, imidazole, thiazole, isothiazole, thiadiazole, benzothiazole, benzoxazole and benzisothiazole rings. These hetero rings may be further substituted. Above all, pyrazole, imidazole, isothiazole, thiadiazole and benzothiazole rings of the following formulae (a) to (f) are preferred.

In formulae (a) to (f), $R_{307}$ to $R_{320}$ represent the same substituents as those described for $G_3$, $R_{31}$ and $R_{32}$ in formula (3).

Of formulae (a) to (f), preferred are pyrazole and isothiazole rings of formulae (a) and (b); and most preferred is the pyrazole ring of formula (a).

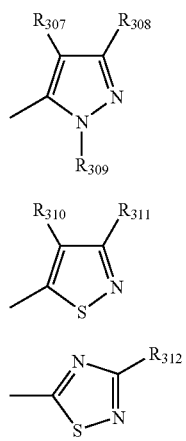

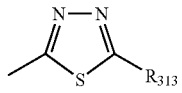

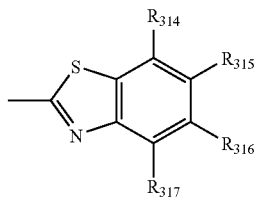

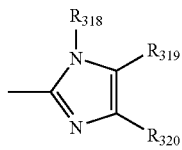

In formula (3), $B_{31}$ and $B_{32}$ represent $=CR_{31}-$ and $-CR_{32}=$, respectively, or any one of them represents a nitrogen atom and the other represents $=CR_{31}-$ or $-CR_{32}=$. Preferably, they represent $=CR_{31}-$ and $-CR_{32}=$.

$R_{35}$ and $R_{36}$ are independently a hydrogen atom or a substituent. The substituent includes an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. The hydrogen atom in the groups may be substituted.

Preferably, $R_{35}$ and $R_{36}$ each are any of a hydrogen atom, an aliphatic group, an aromatic group, a heterocyclic group, an acyl group, or an alkyl or arylsulfonyl group; more preferably, any of a hydrogen atom, an aromatic group, a heterocyclic group, an acyl group, or an alkyl or arylsulfonyl group; most preferably, any of a hydrogen atom, an aryl group or a heterocyclic group. The hydrogen atom in the groups may be substituted. However, $R_{35}$ and $R_{36}$ are not hydrogen atoms at the same time.

$G_3$, $R_{31}$ and $R_{32}$ each independently represents a hydrogen atom, or a substituent. The substituent includes a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic-thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, an a sulfo group. The hydrogen atom in the groups may be substituted.

Preferably, $G_3$ is any of a hydrogen atom, a halogen atom, an aliphatic group, an aromatic group, a hydroxyl group, an alkoxy group, an aryloxy group, an acyloxy group, a heterocyclic-oxy group, an amino group, an acylamino group, an ureido group, a sulfamoylamino group, an alkoxycarbonylamino group, an aryloxycarbonylamino group, an alkyl or arylthio group or a heterocyclic-thio group; more preferably any of a hydrogen atom, a halogen atom, an alkyl group, a hydroxyl group, an alkoxy group, an aryloxy group, an acyloxy group, an amino group or an acylamino group; most preferably any of a hydrogen atom, an amino group (preferably an anilino group) or an acylamino group. The hydrogen atom in the groups may be substituted.

Also preferably, $R_{31}$ and $R_{32}$ each are any of a hydrogen atom, an alkyl group, a halogen atom, an alkoxycarbonyl group, a carboxyl group, a carbamoyl group, a hydroxyl group, an alkoxy group or a cyano group. The hydrogen atom in these groups may be substituted.

$R_{31}$ and $R_{35}$, or $R_{35}$ and $R_{36}$ may bond to each other to form a 5- or 6-membered ring.

In case where $A_{31}$ is substituted, or the substituents of $R_{31}$, $R_{32}$, $R_{35}$, $R_{36}$ and $G_3$ are further substituted, the substituents mentioned hereinabove for $G_3$, $R_{31}$ and $R_{32}$ are referred to for the substituents of the substituted groups.

In case where the dyes of formula (3) for use in the invention are soluble in water, it is desirable that any of $A_{31}$, $R_{31}$, $R_{32}$, $R_{35}$, $R_{36}$ and $G_3$ has an additional substituent of an ionic hydrophilic group. The ionic hydrophilic group for the substituent includes a sulfo group, a carboxyl group, a phosphono group and a quaternary ammonium group. For the ionic hydrophilic group, preferred are a carboxyl group, a phosphono group and a sulfo group; and more preferred are a carboxyl group and a sulfo group. The carboxyl, phosphono and sulfo groups may be in the form of salts. Examples of the counter ion to form the salts are ammonium ions, alkali metal ions (e.g., lithium, sodium and potassium ions), and organic cations (e.g., tetramethylammonium, tetramethylguanidium and tetramethylphosphonium ions).

The terms to indicate the substituents as referred to herein are described. These terms are common to both formula (3) and to formula (3-A) to be mentioned hereinunder.

The halogen atom includes fluorine, chlorine and bromine atoms.

The aliphatic group means to include an alkyl group, a substituted alkyl group, an alkenyl group, a substituted alkenyl group, an alkynyl group, a substituted alkynyl group, an aralkyl group and a substituted aralkyl group. The wording "substituted" for the "substituted alkyl group" and others means that the hydrogen atom existing in the "alkyl group" and others is substituted with any of the substituents mentioned hereinabove for $G_3$, $R_{31}$ and $R_{32}$.

The aliphatic group may be branched or may be cyclic. Preferably, the aliphatic group has from 1 to 20 carbon atoms, more preferably from 1 to 16 carbon atoms. The aryl moiety of the aralkyl group and the substituted aralkyl group is preferably a phenyl or naphthyl group, more preferably a phenyl group. Examples of the aliphatic group are methyl, ethyl, butyl, isopropyl, t-butyl, hydroxyethyl, methoxyethyl, cyanoethyl, trifluoromethyl, 3-sulfopropyl, 4-sulfobutyl, cyclohexyl, benzyl, 2-phenethyl, vinyl and allyl groups.

The aromatic group means to include an aryl group and a substitute aryl group. The aryl group is preferably a phenyl or naphthyl group, more preferably a phenyl group. The aromatic group preferably has from 6 to 20 carbon atoms, more preferably from 6 to 16 carbon atoms.

Examples of the aromatic group are phenyl, p-tolyl, p-methoxyphenyl, o-chlorophenyl and m-(3-sulfopropylamino)phenyl groups.

The heterocyclic group means to include a substituted heterocyclic group and an unsubstituted heterocyclic group. The hetero ring may be condensed with an aliphatic ring, an aromatic or any other hetero ring. The heterocyclic group is preferably a 5- or 6-membered heterocyclic group. Examples of the substituent of the substituted heterocyclic group are an aliphatic group, a halogen atom, an alkylsulfonyl group, an arylsulfonyl group, an acyl group, an acylamino group, a sulfamoyl group, a carbamoyl group, and an ionic hydrophilic group. Examples of the heterocyclic group are 2-pyridyl, 2-thienyl, 2-thiazolyl, 2-benzothiazolyl, 2-benzoxazolyl and 2-furyl groups.

The carbamoyl group means to include a substituted carbamoyl group and an unsubstituted carbamoyl group. One example of the substituent of the substituted carbamoyl group is an alkyl group. Examples of the carbamoyl group are methylcarbamoyl and dimethylcarbamoyl groups.

The alkoxycarbonyl group means to include a substituted alkoxycarbonyl group and an unsubstituted alkoxycarbonyl group. The alkoxycarbonyl group preferably has from 2 to 20 carbon atoms. One example of the substituent of the substituted group is an ionic hydrophilic group. Examples of the alkoxycarbonyl group are methoxycarbonyl and ethoxycarbonyl groups.

The aryloxycarbonyl group means to include a substituted aryloxycarbonyl group and an unsubstituted aryloxycarbonyl group. The aryloxycarbonyl group preferably has from 7 to 20 carbon atoms. One example of the substituent of the substituted group is an ionic hydrophilic group. One example of the alkoxycarbonyl group is a phenoxycarbonyl group.

The heterocyclic-oxycarbonyl group means to include a substituted heterocyclic-oxycarbonyl group and an unsubstituted heterocyclic-oxycarbonyl group. For the hetero ring moiety of the group, referred to are those mentioned hereinabove for the hetero ring of the above-mentioned heterocyclic group. The heterocyclic-oxycarbonyl group preferably has from 2 to 20 carbon atoms. One example of the substituent of the substituted group is an ionic hydrophilic group. One example of the heterocyclic-oxycarbonyl group is a 2-pyridyloxycarbonyl group.

The acyl group means to include a substituted acyl group and an unsubstituted acyl group. The acyl group preferably has from 1 to 20 carbon atoms. One example of the substituent of the substituted acyl group is an ionic hydrophilic group. Examples of the acyl group are acetyl and benzoyl groups.

The alkoxy group means to include a substituted alkoxy group and an unsubstituted alkoxy group. The alkoxy group preferably has from 1 to 20 carbon atoms. Examples of the substituent of the substituted alkoxy group are an alkoxy group, a hydroxyl group, and a ionic hydrophilic group. Examples of the alkoxy group are methoxy, ethoxy, isopropoxy, methoxyethoxy, hydroxyethoxy and 3-carboxypropoxy groups.

The aryloxy group means to include a substituted aryloxy group and an unsubstituted aryloxy group. The aryloxy group preferably has from 6 to 20 carbon atoms. Examples of the substituent for the substituted aryloxy group are an alkoxy group and an ionic hydrophilic group. Examples of the aryloxy group are phenoxy, p-methoxyphenoxy and o-methoxyphenoxy groups.

The heterocyclic-oxy group means to include a substituted heterocyclic-oxy group and an unsubstituted heterocyclic-oxy group. The heterocyclic-oxy group preferably has from 2 to 20 carbon atoms. Examples of the substituent of the substituted group are an alkyl group, an alkoxy group, and an ionic hydrophilic group. Examples of the heterocyclic-oxy group are 3-pyridyloxy and 3-thienyloxy groups.

The silyloxy group is preferably substituted with an aliphatic and/or aromatic group having from 1 to 20 carbon atoms. Examples of the silyloxy group are trimethylsilyloxy and diphenylmethylsilyloxy groups.

The acyloxy group means to include a substituted acyloxy group and an unsubstituted acyloxy group. The acyloxy group preferably has from 1 to 20 carbon atoms. One example of the substituent of the substituted acyloxy group is an ionic hydrophilic group. Examples of the acyloxy group are acetoxy and benzoyloxy groups.

The carbamoyloxy group means to include a substituted carbamoyloxy group and an unsubstituted carbamoyloxy group. One example of the substituent of the substituted carbamoyloxy group is an alkyl group. One example of the carbamoyloxy group is an N-methylcarbamoyloxy group.

The alkoxycarbonyloxy group means to include a substituted alkoxycarbonyloxy group and an unsubstituted alkoxycarbonyloxy group. The alkoxycarbonyloxy group preferably has from 2 to 20 carbon atoms. Examples of the alkoxycarbonyloxy group are methoxycarbonyloxy and isopropoxycarbonyloxy groups.

The aryloxycarbonyloxy group means to include a substituted aryloxycarbonyloxy group and an unsubstituted aryloxycarbonyloxy group. The aryloxycarbonyloxy group preferably has from 7 to 20 carbon atoms. One example of the aryloxycarbonyloxy group is a phenoxycarbonyloxy group.

The amino group means to include a substituted amino group and an unsubstituted amino group. Examples of the substituent of the substituted amino group are an alkyl group, an aryl group, and a heterocyclic group. The alkyl, aryl and heterocyclic groups may be further substituted. The alkylamino group includes a substituted alkylamino group and an unsubstituted alkylamino group. The alkylamino group preferably has from 1 to 20 carbon atoms. One example of the substituent of the substituted groups is an ionic hydrophilic group. Examples of the alkylamino group are methylamino and diethylamino groups.

The arylamino group means to include a substituted arylamino group and an unsubstituted arylamino group. The arylamino group preferably has from 6 to 20 carbon atoms. Examples of the substituent of the substituted arylamino group are a halogen atom and an ionic hydrophilic group. Examples of the arylamino group are phenylamino and 2-chlorophenylamino groups.

The heterocyclic amino group means to include a substituted heterocyclic amino group and an unsubstituted heterocyclic amino group. For the hetero ring moiety of the group, referred to are those mentioned hereinabove for the hetero ring of the above-mentioned heterocyclic group. The heterocyclic amino group preferably has from 2 to 20 carbon atoms. Examples of the substituent of the substituted group are an alkyl group, a halogen atom and an ionic hydrophilic group.

The acylamino group means to include a substituted acylamino group and an unsubstituted acylamino group. The acylamino group preferably has from 2 to 20 carbon atoms. One example of the substituent of the substituted acylamino group is an ionic hydrophilic group. Examples of the acylamino group are acetylamino, propionylamino, benzoylamino, N-phenylacetylamino and 3,5-disulfobenzoylamino groups.

The ureido group means to include a substituted ureido group and an unsubstituted ureido group. The ureido group preferably has from 1 to 20 carbon atoms. Examples of the substituent of the substituted ureido group are an alkyl group and an aryl group. Examples of the ureido group are 3-methylureido, 3,3-dimethylureido and 3-phenylureido groups.

The sulfamoylamino group means to include a substituted sulfamoylamino group and an unsubstituted sulfamoylamino group. One example of the substituent of the substituted sulfamoylamino group is an alkyl group. One example of the sulfamoylamino group is an N,N-dipropylsulfamoylamino group.

The alkoxycarbonylamino group means to include a substituted alkoxycarbonylamino group and an unsubstituted alkoxycarbonylamino group. The alkoxycarbonylamino group preferably has from 2 to 20 carbon atoms. One example of the substituent of the substituted alkoxycarbonylamino group is an ionic hydrophilic group. One example of the alkoxycarbonylamino group is an ethoxycarbonylamino group.

The aryloxycarbonylamino group means to include a substituted aryloxycarbonylamino group and an unsubstituted aryloxycarbonylamino group. The aryloxycarbonylamino group preferably has from 7 to 20 carbon atoms. One example of the substituent of the substituted group is an ionic hydrophilic group. One example of the aryloxycarbonylamino group is a phenoxycarbonylamino group.

The alkylsulfonylamino and arylsulfonylamino group means to include substituted alkylsulfonylamino and arylsulfonylamino groups and unsubstituted alkylsulfonylamino and arylsulfonylamino groups. The alkylsulfonylamino and arylsulfonylamino group preferably has from 1 to 20 carbon atoms. One example of the substituent of the substituted group is an ionic hydrophilic group. Examples of the alkylsulfonylamino and arylsulfonylamino groups are methylsulfonylamino, N-phenyl-methylsulfonylamino, phenylsulfonylamino and 3-carboxyphenylsulfonylamino groups.

The heterocyclic sulfonylamino group means to include a substituted heterocyclic sulfonylamino group and an unsubstituted heterocyclic sulfonylamino group. For the hetero ring moiety of the group, referred to are those mentioned hereinabove for the hetero ring of the above-mentioned heterocyclic group. The heterocyclic sulfonylamino group preferably has from 1 to 12 carbon atoms. One example of the substituent of the substituted group is an ionic hydrophilic group. Examples of the heterocyclic sulfonylamino group are 2-thiophenesulfonylamino and 3-pyridinesulfonylamino groups.

The alkylthio, arylthio and heterocyclic-thio group means to include substituted alkylthio, arylthio and heterocyclic-thio groups and unsubstituted alkylthio, arylthio and heterocyclic-thio groups. For the hetero ring moiety of the group, referred to are those mentioned hereinabove for the hetero ring of the above-mentioned heterocyclic group. The alkylthio, arylthio and heterocyclic-thio group preferably has from 1 to 20 carbon atoms. One example of the substituent of the substituted group is an ionic hydrophilic group. Examples of the alkylthio, arylthio and heterocyclic-thio groups are methylthio, phenylthio and 2-pyridylthio groups.

The alkylsulfonyl and arylsulfonyl group means to include substituted alkylsulfonyl and arylsulfonyl groups, and unsubstituted alkylsulfonyl and arylsulfonyl groups. Examples of the alkylsulfonyl and arylsulfonyl groups are methylsulfonyl and phenylsulfonyl groups.

The heterocyclic sulfonyl group means to include a substituted heterocyclic sulfonyl group and an unsubstituted heterocyclic sulfonyl group. For the hetero ring moiety of the group, referred to are those mentioned hereinabove for the hetero ring of the above-mentioned heterocyclic group. The heterocyclic sulfonyl group preferably has from 1 to 20 carbon atoms. One example of the substituent of the substituted group is an ionic hydrophilic group. Examples of the heterocyclic sulfonyl group are 2-thienylsulfonyl and 3-pyridylsulfonyl groups.

The alkylsulfinyl and arylsulfinyl group means to include substituted alkylsulfinyl and arylsulfinyl groups, and unsubstituted alkylsulfinyl and arylsulfinyl groups. Examples of the alkylsulfinyl and arylsulfinyl groups are methylsulfinyl and phenylsulfinyl groups.

The heterocyclic sulfinyl group means to include a substituted heterocyclic sulfinyl group and an unsubstituted heterocyclic sulfinyl group. For the hetero ring moiety of the group, referred to are those mentioned hereinabove for the hetero ring of the above-mentioned heterocyclic group. The heterocyclic sulfinyl group preferably has from 1 to 20 carbon atoms. One example of the substituent of the substituted group is an ionic hydrophilic group. One example of the heterocyclic sulfinyl group is a 4-pyridylsulfinyl group.

The sulfamoyl group means to include a substituted sulfamoyl group and an unsubstituted sulfamoyl group. One example of the substituent of the substituted sulfamoyl group is an alkyl group. Examples of the sulfamoyl group are dimethylsulfamoyl and di(2-hydroxyethyl)sulfamoyl groups.

Of the dyes of formula (3), more preferred are those of the following formula (3-A):

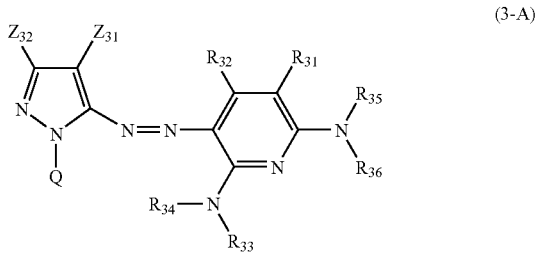

In the formula, $R_{31}$, $R_{32}$, $R_{35}$ and $R_{36}$ have the same meanings as in formula (3).

$R_{33}$ and $R_{34}$ each independently represents a hydrogen atom or a substituent. The substituent includes an aliphatic group, an aromatic group, a heterocyclic group, an acyl group, an alkoxycarbonyl group, an aryloxycarbonyl group, a carbamoyl group, an alkylsulfonyl group, an arylsulfonyl group and a sulfamoyl group. Of those, preferred are a hydrogen atom, an aromatic group, a heterocyclic group, an acyl group, an alkylsulfonyl group and an arylsulfonyl group; and more preferred are a hydrogen atom, an aromatic group and a heterocyclic group.

$Z_{31}$ represents an electron-attractive group having a Hammett's substituent constant σp of at least 0.20. Preferably, $Z_{31}$ is an electron-attractive group having σp of at least 0.30, more preferably at least 0.45, even more preferably at least 0.60, but not exceeding 1.0. Preferred examples of the electron-attractive group are mentioned below. Above all, $Z_{31}$ is preferably any of an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms, or a halogenoalkyl group having from 1 to 20 carbon atoms; more preferably any of a cyano group, an alkylsulfonyl group having from 1 to 20 carbon atoms, or an arylsulfonyl group having from 6 to 20 carbon atoms; most preferably a cyano group.

$Z_{32}$ represents a hydrogen atom, or a substituent. The substituent includes an aliphatic group, an aromatic group and a heterocyclic group. Preferably, $Z_{32}$ is an aliphatic group, more preferably an alkyl group having from 1 to 6 carbon atoms.

Q represents a hydrogen atom, or a substituent. The substituent includes an aliphatic group, an aromatic group and a heterocyclic group. Above all, Q is preferably a group that comprises non-metallic atoms necessary for forming a 5- to 8-membered ring. The 5- to 8-membered ring may be substituted, and may be a saturated ring or may have an unsaturated bond. Above all, it is more preferably an aromatic group or a heterocyclic group. Preferred non-metallic atoms for it are nitrogen, oxygen, sulfur and carbon atoms. Examples of the cyclic structure are benzene, cyclopentane, cyclohexane, cycloheptane, cyclooctane, cyclohexene, pyridine, pyrimidine, pyrazine, pyridazine, triazine, imidazole, benzimidazole, oxazole, benzoxazole, thiazole, benzothiazole, oxane, sulforane and thian rings.

The hydrogen atom of each group in formula (3-A) may be substituted. For the substituents, referred to are those mentioned hereinabove for the groups $G_3$, $R_3$, and $R_{32}$ in formula (3), and ionic hydrophilic groups.

The Hammett's substituent constant σp as referred to herein is described briefly. The Hammett's rule is a rule of thumb proposed by L. P. Hammett in 1935 for quantitatively discussing the influence of substituents on the reaction or equilibrium of benzene derivatives, and its reasonableness is now widely admitted in the art. The substituent constant to be obtained by the Hammett's rule includes two values σp and σm, and these are seen in many ordinary documents. For example, their details are in J. A. Dean, *Lange's Handbook of Chemistry*, Ed. 12, 1979 (McGraw-Hill); and extra issue of *Chemical Region*, No. 122, pp. 96-103, 1979 (Nanko-do). In the invention, the substituent will be defined or described with reference to the Hammett's substituent constant σp. This does not mean that the substituents are limited to those of which the value σp is known in the references as above. Even though the value σp thereof is unknown, it is needless to say that the substituents of which the substituent constant measured according to the Hammett's rule falls within the defined range are all within the scope intended herein. Some dyes of formula (3-A) for use in the invention are not benzene derivatives. However, as the criterion to indicate the electron effect of substituents, the value σp is referred to for the substituents of the dyes, irrespective of the substituting position of the substituents. To that effect, the value σp is referred to in the invention.

The electron-attractive group of which the Hammett's substituent constant σp is at least 0.60 includes a cyano group, a nitro group, an alkylsulfonyl group (e.g., methylsulfonyl), and an arylsulfonyl group (e.g., phenylsulfonyl).

Examples of the electron-attractive group having a Hammett's substituent constant σp of at least 0.45 are, in addition to the groups mentioned above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl), and a halogenoalkyl group (e.g., trifluoromethyl).

Examples of the electron-attractive group having a Hammett's substituent constant σp of at least 0.30 are, in addition to the groups mentioned above, an acyloxy group (e.g., acetoxy), a carbamoyl group (e.g., N-ethylcarbamoyl, N,N-diethylcarbamoyl), a halogenoalkoxy group (e.g., trifluoromethoxy), a halogenoaryloxy group (e.g., pentafluorophenyloxy), a sulfonyloxy group (e.g., methylsulfonyloxy), a halogenoalkylthio group (e.g., difluoromethylthio), an aryl group substituted with at least two electron-attractive groups each having σp of at least 0.15 (e.g., 2,4-dinitrophenyl, pentachlorophenyl), and a heterocyclic group (e.g., 2-benzoxazolyl, 2-benzothiazolyl, 1-phenyl-2-benzimidazolyl).

Examples of the electron-attractive group having σp of at least 0.20 are, in addition to the groups mentioned above, a halogen atom.

Especially preferred combinations of the substituents of the azo dyes of formula (3) are mentioned below. $R_{35}$ and $R_{36}$ are preferably any of a hydrogen atom, an alkyl group, an aryl group, a heterocyclic group, a sulfonyl group or an acyl group; more preferably any of a hydrogen atom, an aryl group, a heterocyclic group or a sulfonyl group; most preferably any of a hydrogen atom, an aryl group or a heterocyclic group. However, $R_{35}$ and $R_{36}$ must not be hydrogen atoms at the same time.

$G_3$ is preferably a hydrogen atom, a halogen atom, an alkyl group, a hydroxyl group, an amino group or an acylamino group, more preferably a hydrogen atom, a halogen atom, an amino group or an acylamino group, most preferably a hydrogen atom, an amino group or an acylamino group.

$A_{31}$ is preferably a pyrazole ring, an imidazole ring, an isothiazole ring, a thiadiazole ring or a benzothiazole ring, more preferably a pyrazole ring or an isothiazole ring, most preferably a pyrazole ring.

Also preferably, $B_{31}$ and $B_{32}$ are $=CR_{31}-$ and $-CR_{32}=$, respectively; and $R_{31}$ and $R_{32}$ are preferably any of a hydrogen atom, an alkyl group, a halogen atom, a cyano group, a carbamoyl group, a carboxyl group, a hydroxyl group, an alkoxy group or an alkoxycarbonyl group, more preferably any of a hydrogen atom, an alkyl group, a carboxyl group, a cyano group or a carbamoyl group.

Regarding the preferred combinations of the substituents of the compounds of formula (3), it is desirable that at least one of the substituents is the above-mentioned preferred group. More preferably, a larger number of the substituents are the preferred groups. Most preferably, all the substituents are the preferred groups.

Specific examples of the azo dyes of formula (3) are mentioned below, Table 1 to Table 13, and chemical formulae (f-1) and (f-2), to which, however, the invention should not be limited.

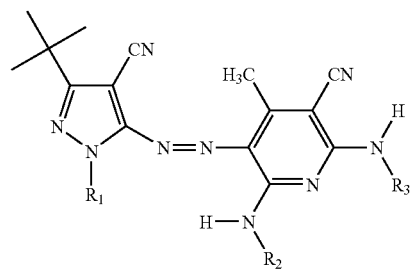

-continued
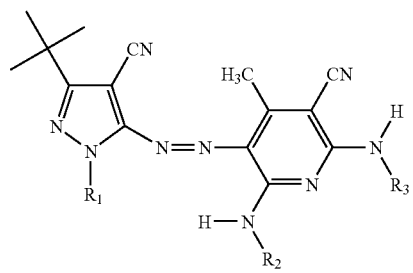
| Dye | R₁ | R₂ | R₃ |
|---|---|---|---|
| a-5 | | 2,4,6-trimethylphenyl | 2,4,6-trimethylphenyl |
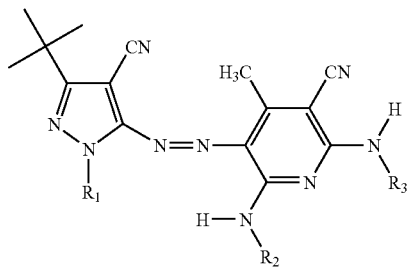
| Dye | R₁ | R₂ | R₃ |
|---|---|---|---|
| ca-6 | 2-methylbenzothiazol-6-yl-SO$_2$NH-(CH$_2$)$_3$-O-(2,4-di-tert-pentylphenyl) | 4-methylphenyl | 4-methylphenyl |
| a-7 | 2-methylbenzothiazol-6-yl-SO$_2$NH-(CH$_2$)$_3$-OCH$_2$CH(C$_8$H$_{17}$)(C$_6$H$_{13}$) | 2,4,6-trimethylphenyl | 4-methylphenyl |
| a-8 | 2-methylbenzothiazol-6-yl-NHCOCH(Et)-O-(2,4-di-tert-pentylphenyl) | 4-C$_8$H$_{17}$-phenyl | 4-C$_8$H$_{17}$-phenyl |

-continued

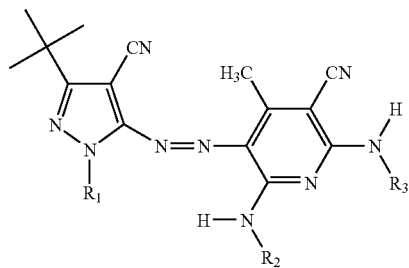

| Dye | $R_1$ | $R_2$ | $R_3$ |
|---|---|---|---|
| a-9 | 2-methylbenzothiazol-6-yl-NHSO$_2$-(2-(n)C$_8$H$_{17}$O-5-C$_8$H$_{17}$(t))phenyl | 2,4,6-trimethylphenyl | C$_8$H$_{17}$(t) |
| a-10 | 2-methyl-5-chlorobenzothiazolyl | 2-methyl-6-OC$_{12}$H$_{25}$-phenyl | 2-methyl-6-OC$_{12}$H$_{25}$-phenyl |

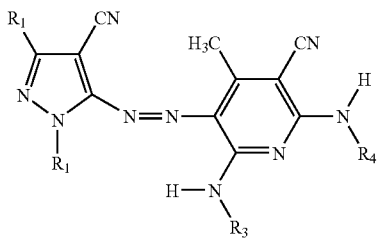

| Dye | $R_1$ | $R_2$ | $R_3$ | $R_4$ |
|---|---|---|---|---|
| a-11 | t-Bu | 2-methylbenzothiazol-6-yl-SO$_3$Na | 4-methylphenyl | 4-SO$_3$Na-phenyl |
| a-12 | phenyl | 2-methylbenzothiazol-6-yl-COOH | 4-SO$_3$K-phenyl | 3-COOH-phenyl |
| a-13 | 2-chlorophenyl | 2-methylbenzothiazolyl-SO$_3$K (4,5-mix) | 4-SO$_3$K-phenyl | 3-COOH-phenyl |
| a-14 | t-Bu | 2-methylbenzothiazol-6-yl-SO$_3$Na | 2,4,6-trimethyl-3-SO$_3$Na-phenyl | 2,4,6-trimethyl-3-SO$_3$Na-phenyl |

-continued
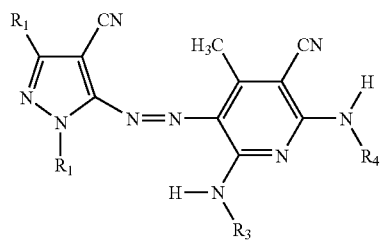
| Dye | R₁ | R₂ | R₃ | R₄ |
|---|---|---|---|---|
| a-15 | *t*-Bu | 2-methylbenzothiazole-5/6-SO₃K (4,5-mix) | 2,3,4,6-tetramethyl-5-SO₃K-phenyl | 2,3,4,6-tetramethyl-5-SO₃K-phenyl |
| a-16 | *t*-Bu | 6-chloro-2-methylbenzothiazole | 3,4,5-trimethyl-CH₂N(CH₂CO₂H)₂-phenyl | 3,4,5-trimethyl-CH₂N(CH₂CO₂H)₂-phenyl |
| a-17 | *t*-Bu | 2-methylbenzothiazole-6-SO₃Na | 3,5-dimethyl-4-SO₃Na-phenyl | 3,5-dimethyl-4-SO₃Na-phenyl |
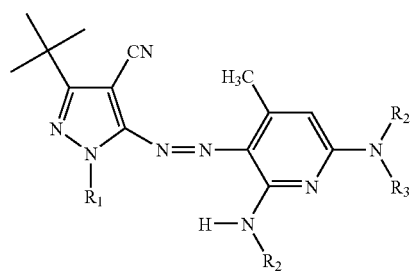
| Dye | R₁ | R₂ | R₃ | R₄ |
|---|---|---|---|---|
| a-18 | 2-benzothiazolyl | 2-benzothiazolyl | mesityl | mesityl |

-continued

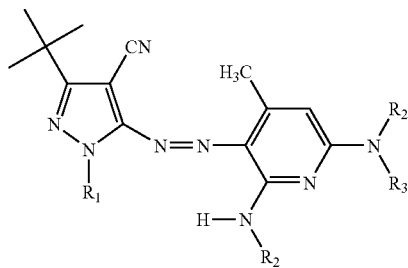

| Dye | R₁ | R₂ | R₃ | R₄ |
|---|---|---|---|---|
| a-19 | 2-(5-chlorobenzothiazolyl) | —SO₂CH₃ | 2,4,5-trimethylphenyl | 4-methylphenyl |
| a-20 | 2-benzothiazolyl | —COCH₃ | $C_8H_{17}(t)$ | $C_8H_{17}(t)$ |
| a-21 | 2-(6-chlorobenzothiazolyl) | —SO₂CH₃ | 2,4-dimethylphenyl | $C_8H_{17}(t)$ |
| a-22 | 2-benzothiazolyl | H | 2,4,5-trimethylphenyl | 2,4,5-trimethylphenyl |
| a-23 | 2-benzothiazolyl | H | 2,3-dimethylphenyl | 2,3-dimethylphenyl |
| a-24 | 2-benzothiazolyl | H | 2,3-dimethylphenyl | 2,3-dimethylphenyl |
| a-25 | 2-benzoxazolyl | 2-benzoxazolyl | 2,4,5-trimethylphenyl | 2,4,5-trimethylphenyl |

| Dye | R₁ |
|---|---|
| a-26 | 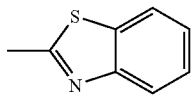 |
| a-27 | 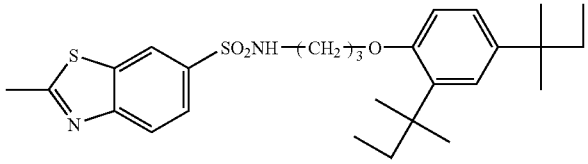 |
| a-28 | 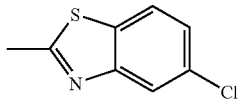 |
| a-29 | 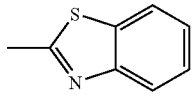 |
| a-30 | 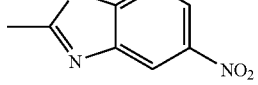 |
| a-31 | 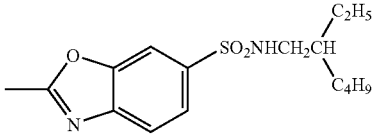 |
| Dye | R₂ | R₃ | R₄ |
|---|---|---|---|
| a-26 | 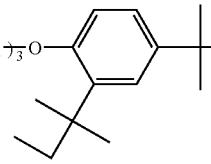 | 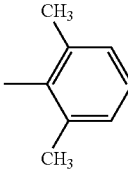 | 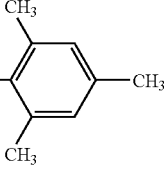 |
| a-27 | 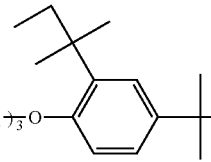 | 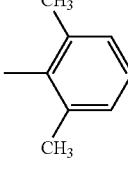 | 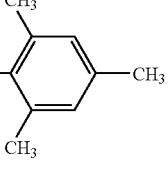 |

-continued
| | | | |
|---|---|---|---|
| a-28 | 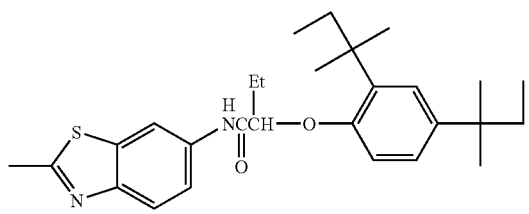 | 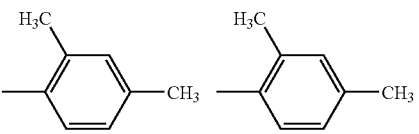 | |
| a-29 | 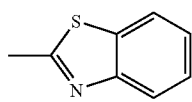 | 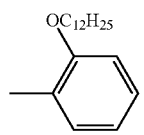 | 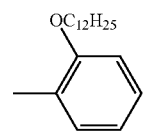 |
| a-30 | 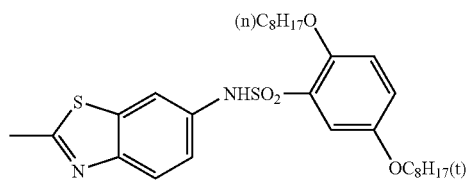 | 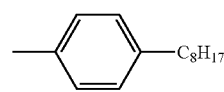 | |
| a-31 | 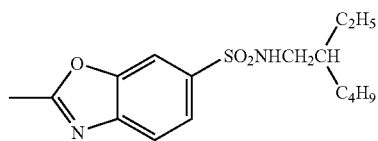 | 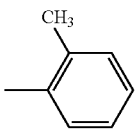 | 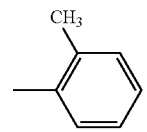 |
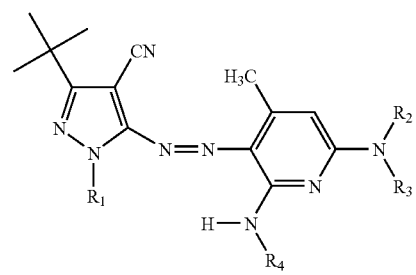
| Dye | $R_1$ | $R_2$ | $R_3$ |
|---|---|---|---|
| a-32 | 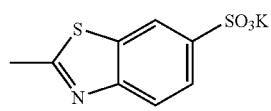 | 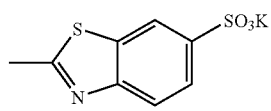 | 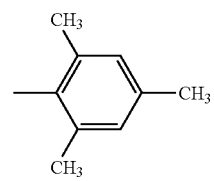 | a-33 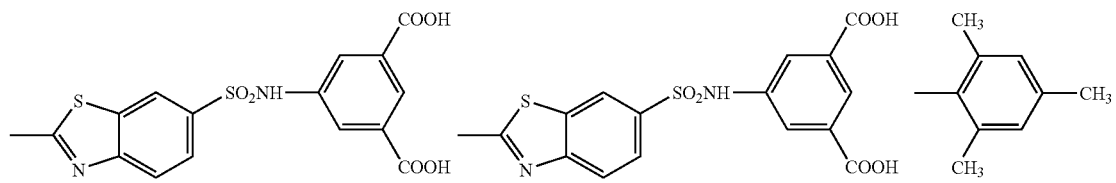
a-34 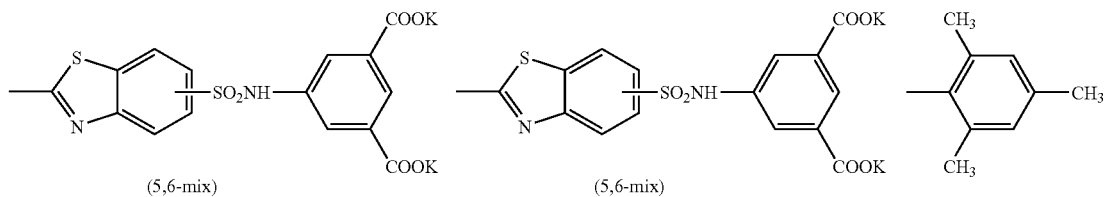
(5,6-mix) (5,6-mix)
a-35 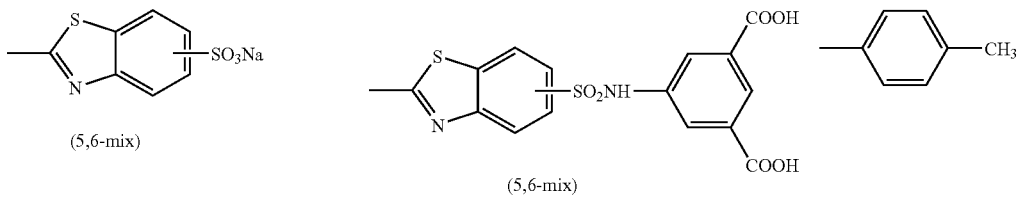
(5,6-mix) (5,6-mix)
| Dye | R₄ |
|---|---|
| a-32 | 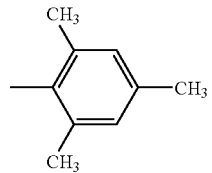 |
| a-33 | 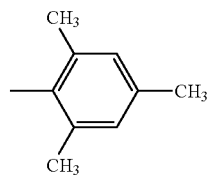 |
| a-34 | 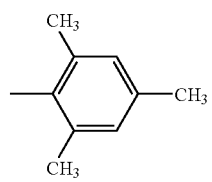 |
| a-35 | 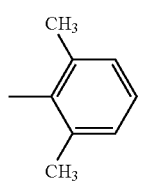 |

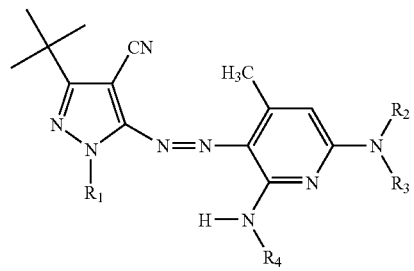
| Dye | R₁ | R₂ | R₃ |
|---|---|---|---|
| a-36 | 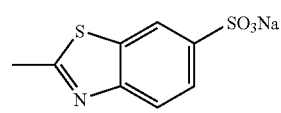 | 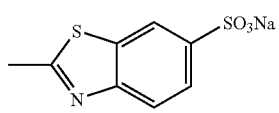 | 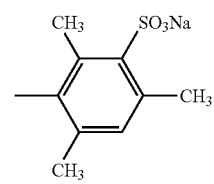 |
| a-37 | 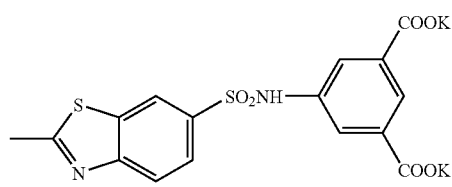 | 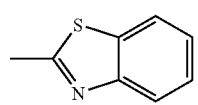 | 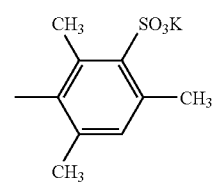 |
| a-38 | 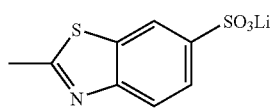 | 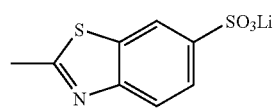 | 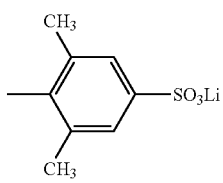 |
| a-39 | 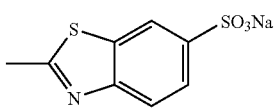 | 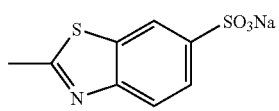 | 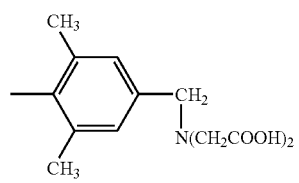 |
| a-40 | 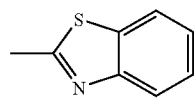 | 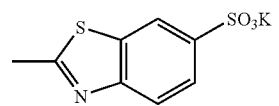 | 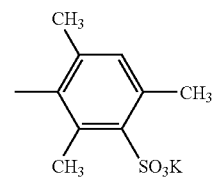 |
| Dye | R₄ |
|---|---|
| a-36 | 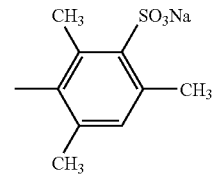 |

-continued
a-37 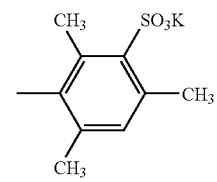
a-38 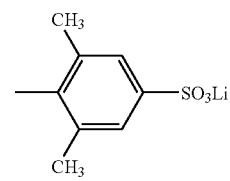
a-39 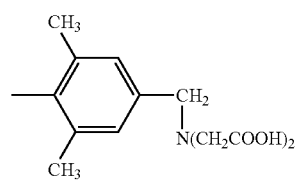
a-40 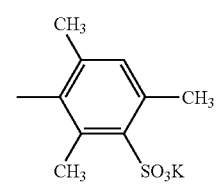
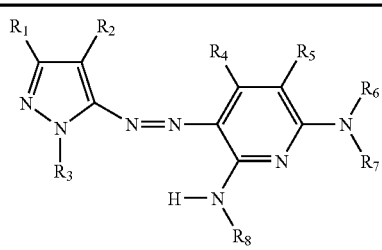
| Dye | R₁ | R₂ | R₃ | R₄ | R₅ |
|---|---|---|---|---|---|
| a-41 | 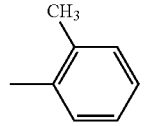 | CN | 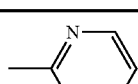 | H | CONH₂ |
| a-42 |  | Br | 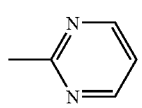 | COOEt | H |
| a-43 | 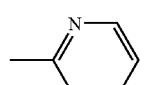 | SO₂CH₃ | 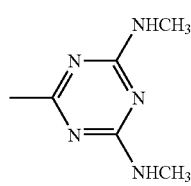 | CONH₂ | H |

-continued
| Dye | | | | | |
|---|---|---|---|---|---|
| a-44 | 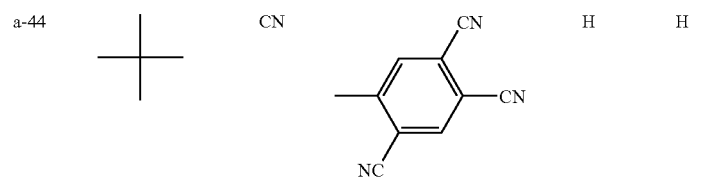 | CN | | H | H |
| a-45 | 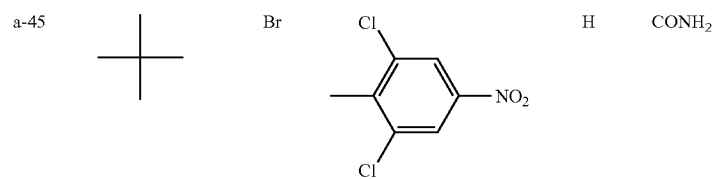 | Br | | H | CONH₂ |
| a-46 | 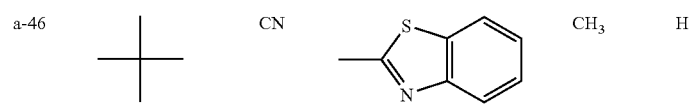 | CN | | CH₃ | H |
| Dye | R₆ | R₇ | R₈ |
|---|---|---|---|
| a-41 | SO₂CH₃ | 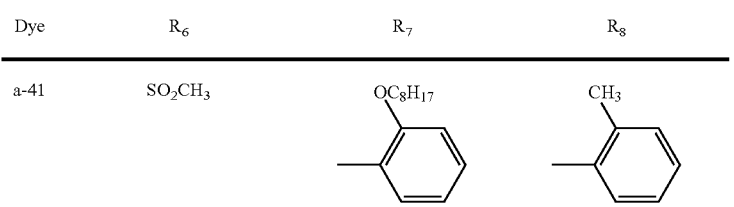 | |
| a-42 | 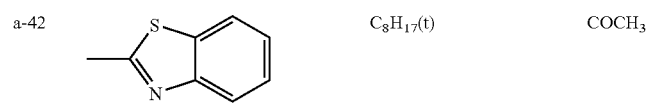 | C₈H₁₇(t) | COCH₃ |
| a-43 | 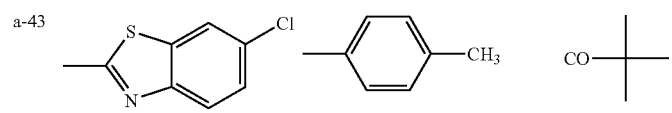 | | 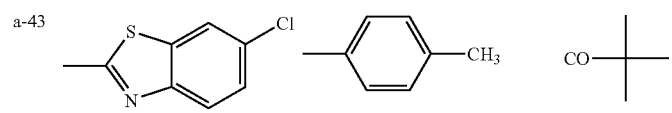 |
| a-44 | 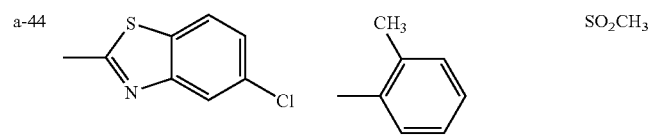 | | SO₂CH₃ |
| a-45 | 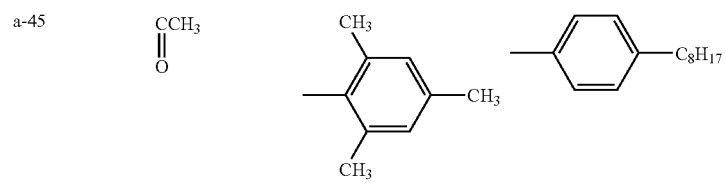 | | |
| a-46 | 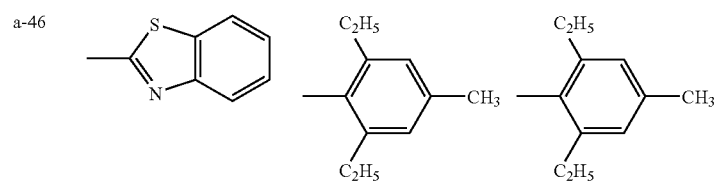 | | |

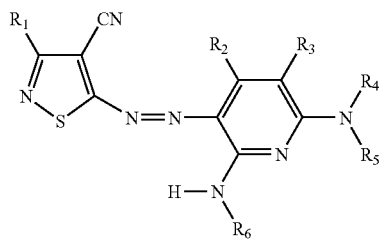
| Dye | R₁ | R₂ | R₃ | R₄ | R₅ | R₆ |
|---|---|---|---|---|---|---|
| b-1 | CH₃ | CH₃ | CN | H | —⟨C₆H₄⟩—C₈H₁₇ | —⟨C₆H₄⟩—C₈H₁₇ |
| b-2 | CH₃ | CH₃ | CN | H | 2,4,5-trimethylphenyl | 2,4,5-trimethylphenyl |
| b-3 | CH₃ | CH₃ | CONH₂ | H | —⟨C₆H₄⟩—C₈H₁₇ | 2,4,5-trimethylphenyl |
| b-4 | CH₃ | CH₃ | H | H | 2,4,5-trimethyl-6-SO₃Li-phenyl | 2,4,5-trimethyl-6-SO₃Li-phenyl |
| b-5 | CH₃ | H | CN | H | —⟨C₆H₄⟩—SO₃Na | —⟨C₆H₄⟩—SO₃Na |
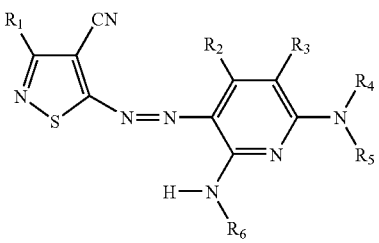
| Dye | R₁ | R₂ | R₃ | R₄ | R₅ | R₆ |
|---|---|---|---|---|---|---|
| b-6 | CH₃ | CH₃ | H | 2-benzothiazolyl | 2,4,5-trimethyl-3-CH₂N(CH₂CO₂K)₂-phenyl | 2,4,5-trimethyl-3-CH₂N(CH₂CO₂K)₂-phenyl |

-continued
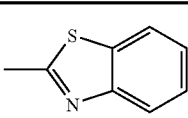
| Dye | R₁ | R₂ | R₃ | R₄ | R₅ | R₆ |
|---|---|---|---|---|---|---|
| b-7 | $CH_3$ | $CH_3$ | H | 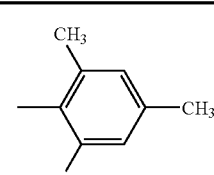 | 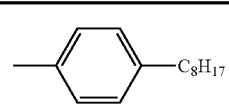 | 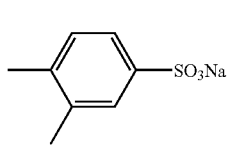 |
| b-8 | $CH_3$ | H | H | $SO_2CH_3$ | 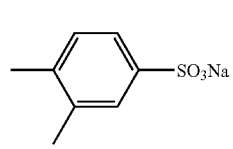 | 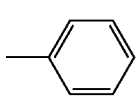 |
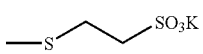
| Dye | R₁ | R₂ | R₃ | R₄ |
|---|---|---|---|---|
| c-1 | —$SCH_3$ | $CH_3$ | CN | H |
| c-2 | 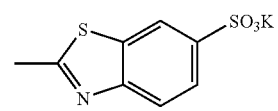 | H | $CONH_2$ | H |
| c-3 | $CH_3$—S—$CH_2CH_2$—$SO_3K$ | $CH_3$ | H | 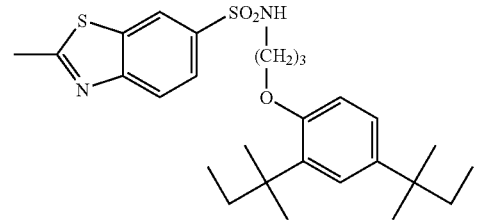 |
| c-4 | —$CH_3$ | $CH_3$ | H | (see structure) |

-continued
| | | | | |
|---|---|---|---|---|
| c-5 | ![phenyl] | H | H | ![benzothiazole-NHSO2-aryl structure with OC8H17(n) and C8H17(t)] |
| Dye | R$_5$ | R$_6$ |
|---|---|---|
| c-1 | C$_8$H$_{17}$(t) | ![phenyl-C8H17] |
| c-2 | ![phenyl-SO3K] | ![phenyl-SO3K] |
| c-3 | ![phenyl-SO3K] | ![phenyl-SO3K] |
| c-4 | ![trimethylphenyl with 3 CH3] | ![phenyl-C8H17] |
| c-5 | ![trimethylphenyl with 3 CH3] | C$_8$H$_{17}$(t) |
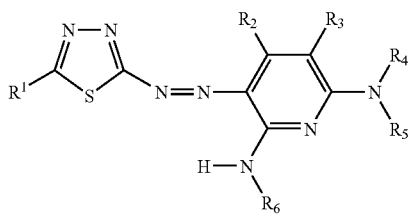
| Dye | R$_1$ | R$_2$ | R$_3$ | R$_4$ | R$_5$ | R$_6$ |
|---|---|---|---|---|---|---|
| d-1 | Me | CH$_3$ | CN | H | ![phenyl-SO3K] | ![phenyl-SO3K] |
| d-2 | Me | CH$_3$ | CN | H | ![2,6-diethyl-4-methylphenyl] | ![2,6-diethyl-4-methylphenyl] |

-continued

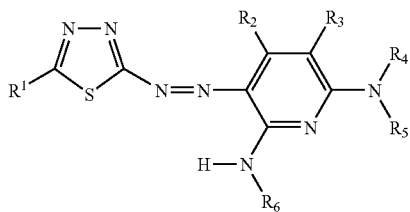

| Dye | R₁ | R₂ | R₃ | R₄ | R₅ | R₆ |
|---|---|---|---|---|---|---|
| d-3 | Me | H | H | 2-methylbenzothiazolyl | 2,3,5,6-tetramethyl-4-SO₃K-phenyl | 2,3,5,6-tetramethyl-4-SO₃K-phenyl |
| d-4 | Ph | $CH_3$ | $CONH_2$ | H | 4-$C_8H_{17}$-phenyl | 4-$C_8H_{17}$-phenyl |
| d-5 | Ph | $CH_3$ | H | 2-methylbenzothiazol-6-yl-SO₂NH-(CH₂)₃-O-(2,4-di-tert-pentylphenyl) | 4-OC₄H₉(n)-phenyl | 2,6-diethyl-4-methyl-phenyl |

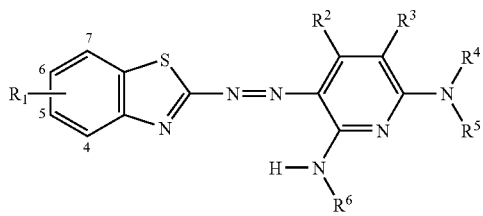

| Dye | R₁ | R₂ | R₃ | R₄ | R₅ | R₆ |
|---|---|---|---|---|---|---|
| e-1 | 5-Cl | $CH_3$ | $CONH_2$ | H | $C_8H_{17}(t)$ | $C_8H_{17}(t)$ |
| e-2 | 5,6-diCl | H | H | 2-methylbenzothiazolyl | 4-(4-$C_8H_{17}$-phenyl)-phenyl | 4-$C_8H_{17}$-phenyl |
| e-3 | 5,6-diCl | $CH_3$ | H | 2-methylbenzothiazolyl | 2,4,6-trimethylphenyl | $COCH_3$ |

-continued

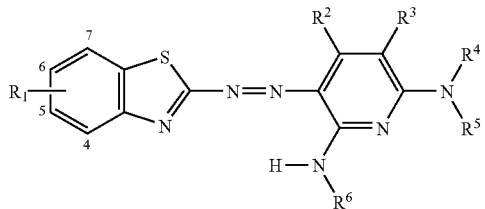

| Dye | R₁ | R₂ | R₃ | R₄ | R₅ | R₆ |
|---|---|---|---|---|---|---|
| e-4 | 5-CH₃ | H | CN | H | -C₆H₄-SO₃K | -C₆H₄-SO₃K |
| e-5 | 5-NO₂ | CH₃ | H | SO₂CH₃ | o-tolyl | mesityl | f-1

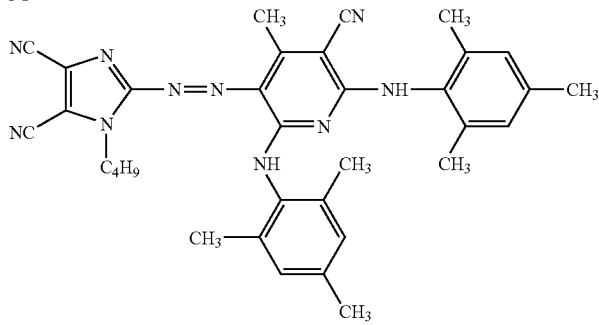

f-2

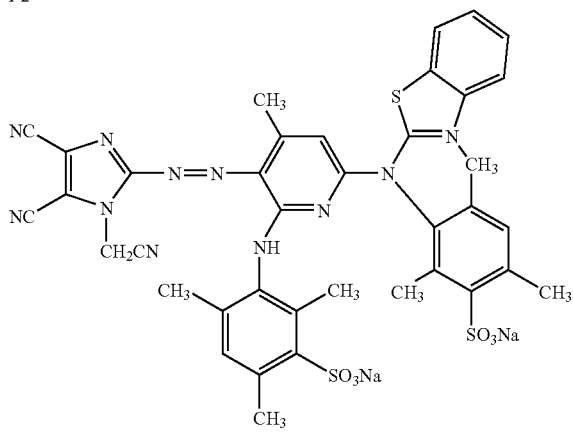

In the ink set for inkjet of the invention, the content of the dye of formula (3) in the magenta ink is preferably from 0.2 to 20% by weight, more preferably from 0.5 to 15% by weight. Also preferably, the solubility of the dye in water at 20° C. (or the dispersibility thereof in a stable condition) is at least 5% by weight, more preferably at least 10% by weight.

[Dyes of Formula (4)]

Preferably, the dyes of formula (4) have a wavelength λmax falling between 500 nm and 700 nm, and the half-value width of the absorption spectrum of the diluted solution of the dye that is standardized to have an absorbance of 1.0, (Wλ,$_{1/2}$) is at least 100 nm, but preferably from 120 nm to 500 nm, more preferably from 120 nm to 350 nm. The dyes (L) of the type are described.

The dye (L) may be used alone for black ink, so far as it may realize a "tight" black image of high quality (in which none of B, G and R color tones are highlighted irrespective of the viewing light source) by itself. In general, however, the dye is combined with any other dye capable of covering the region that is poorly absorbed by the dye (L). Concretely, it is desirable that the dye (L) is combined with a dye (S) having a main absorption in an yellow region (and having λmax of from 350 to 500 nm). As the case may be, the dye (L) may also be combined with any other dye to form black ink.

In the invention, it is desirable that the dye is, either alone or as combined with any other dye, used to prepare black ink. The preferred properties of the black ink are that 1) its weather resistance is good and/or 2) the image does not lose the black balance even after faded. In order to have the preferred properties, it is desirable that the black ink satisfies the following conditions.

Using the black ink, 48-point size, black square symbols of JIS code 2223 are printed, and their reflection density ($D_{vis}$) is measured via a status A filter (visual filter). This is an initial density of the sample. One example of the reflection densitometer equipped with a status A filter is an X-Rite densitometer. To measure the density of "black" herein, the measured data $D_{vis}$ are referred to as the standard observation reflection density. The printed matter is forcedly faded by the use of an ozone fading tester where 5 ppm ozone is generated all the time. The period of time (t) in which the reflection density ($D_{vis}$) of the faded sample is reduced to 80% of the initial density of the original sample is counted, and an accelerated fading rate constant ($k_{vis}$) is derived from a relational formula, $0.8 = \exp(-k_{vis} \cdot t)$.

Preferably, the rate constant ($k_{vis}$) of the black ink in the invention is at most $5.0 \times 10^{-2}$ [hour$^{-1}$], more preferably at most $3.0 \times 10^{-2}$ [hour$^{-1}$], even more preferably at most $1.0 \times 10^{-2}$ [hour$^{-1}$].

Using the black ink, 48-point size, black square symbols of JIS code 2223 are printed, and the reflection density of three colors C (cyan), M (magenta) and Y (yellow), except $D_{vis}$, is measured via a status A filter. Thus measured, the data are initial density $D_R$, $D_G$ and $D_B$. These data $D_R$, $D_G$ and $D_B$ indicate the C reflection density through red filter, the M reflection density through green filter, and the Y reflection density through blue filter, respectively. The printed matter is forcedly faded by the use of an ozone fading tester where 5 ppm ozone is generated all the time, in the same manner as above. From the period of time in which the reflection density $D_R$, $D_G$ and $D_B$ of the faded sample is reduced to 80% of the initial density of the original sample, the accelerated fading rate constant ($k_R$, $k_G$, $k_B$) is derived in the same manner as above. The ratio (R) of the maximum value to the minimum value of the three rate constants (for example, when $k_R$ is the maximum value and the $k_G$ is the minimum value, $R=k_R/k_G$) is preferably at most 1.2, more preferably at most 1.1, even more preferably at most 1.05.

In the "printed matter with 48-point size, black square symbols of JIS code 2223 thereon" used in the above, the image is printed to a size that fully covers the aperture of the tester in order that it may be enough for the density measurement.

Dyes (S) having λmax of from 350 nm to 500 nm may be used along with the dye (L) of formula (4) for preparing black ink. The dyes (S) also correspond to the dyes of formula (4). In the black ink of the invention, it is desirable that at least one dye (L) is the dye of formula (4), but more preferably, at least one of the dyes (L) and (S) is the dye of formula (4), even more preferably at least 90% by weight of all the dyes in the ink is the dye of formula (4).

In formula (4), $A_{41}$, $B_{41}$ and $C_{41}$ each independently represents an optionally-substituted aromatic or heterocyclic group, $A_{41}$ and $C_{41}$ are monovalent groups, and $B_{41}$ is a divalent group.

m is 1 or 2, and n is an integer of 0 or more; preferably m=n=1.

Of the azo dyes of formula (4) (the dyes will be hereinafter referred to as "azo dyes"), preferred are those of the following formula (4-A):

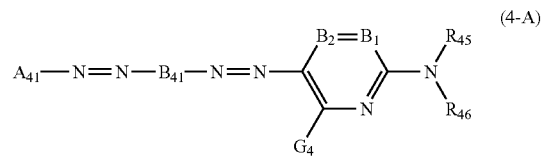

(4-A)

In formula (4-A), $A_4$, and $B_{41}$ have the same meanings as in formula (4). $B_1$ and $B_2$ each represent =CR$_{41}$— and —CR$_{42}$=, or any one of them is a nitrogen atom and the other is =CR$_{41}$— or —CR$_{42}$=.

$G_4$, $R_{41}$ and $R_{42}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group (including alkylamino, arylamino, heterocyclic-amino), an acylamino group, an ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, a heterocyclic-thio group, an alkyl or arylsulfonyl group, a heterocyclic sulfonyl group, an alkyl or arylsulfinyl group, a heterocyclic sulfinyl group, a sulfamoyl group, or a sulfo group. These groups may be substituted.

$R_{45}$ and $R_{46}$ each independently represents a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group. These groups may be further substituted. However, $R_{45}$ and $R_{46}$ are not hydrogen atoms at the same time.

$R_{41}$ and $R_{45}$, or $R_{45}$ and $R_{46}$ may bond to each other to form a 5- or 6-membered ring.

Of the azo dyes of formula (4-A), more preferred are those of the following formula (4-B):

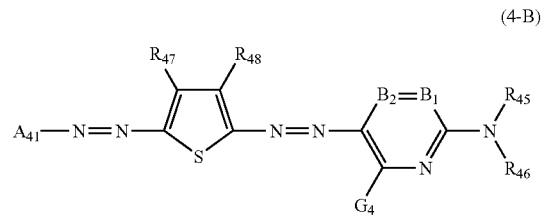

(4-B)

In formula (4-B), $R_{47}$ and $R_{48}$ have the same meaning as that of $R_{41}$ in formula (4-A).

The halogen atom includes fluorine, chlorine and bromine atoms. The aliphatic group means to include an alkyl group, a substituted alkyl group, an alkenyl group, a substituted alkenyl group, an alkynyl group, a substituted alkynyl group, an aralkyl group and a substituted aralkyl group. The aliphatic group may be branched or may be cyclic. Preferably, the aliphatic group has from 1 to 20 carbon atoms, more preferably from 1 to 16 carbon atoms. The aryl moiety of the aralkyl group and the substituted aralkyl group is preferably a phenyl or naphthyl group, more preferably a phenyl group. Examples of the aliphatic group are methyl, ethyl, butyl, isopropyl, t-butyl, hydroxyethyl, methoxyethyl, cyanoethyl, trifluoromethyl, 3-sulfopropyl, 4-sulfobutyl, cyclohexyl, benzyl, 2-phenethyl, vinyl and allyl groups.

The monovalent aromatic group means to include an aryl group and a substitute aryl group. The aryl group is preferably a phenyl or naphthyl group, more preferably a phenyl group. The monovalent aromatic group preferably has from 6 to 20 carbon atoms, more preferably from 6 to 16 carbon atoms. Examples of the monovalent aromatic group are phenyl, p-tolyl, p-methoxyphenyl, o-chlorophenyl and m-(3-sulfopropylamino)phenyl groups. The divalent aromatic group corresponds to but differs from the monovalent aromatic group in that it is a divalent group. Its examples are phenylene, p-tolylene, p-methoxyphenylene, o-chlorophenylene, m-(3-sulfopropylamino)phenylene and naphthylene groups.

The heterocyclic group means to include a substituted heterocyclic group and an unsubstituted heterocyclic group. The hetero ring may be condensed with an aliphatic ring, an aromatic or any other hetero ring. The heterocyclic group is preferably a 5- or 6-membered heterocyclic group. The hetero atom to form the hetero ring includes N, O and S. Examples of the substituent of the substituted heterocyclic group are an aliphatic group, a halogen atom, an alkylsulfonyl group, an arylsulfonyl group, an acyl group, an acylamino group, a sulfamoyl group, a carbamoyl group, and an ionic hydrophilic group. Examples of the hetero ring for the monovalent and divalent heterocyclic groups are pyridine, thiophene, thiazole, benzothiazole, benzoxazole and furan rings.

The carbamoyl group means to include a substituted carbamoyl group and an unsubstituted carbamoyl group. One example of the substituent of the substituted carbamoyl group is an alkyl group. Examples of the carbamoyl group are methylcarbamoyl and dimethylcarbamoyl groups.

The alkoxycarbonyl group means to include a substituted alkoxycarbonyl group and an unsubstituted alkoxycarbonyl group. The alkoxycarbonyl group preferably has from 2 to 20 carbon atoms. One example of the substituent of the substituted group is an ionic hydrophilic group. Examples of the alkoxycarbonyl group are methoxycarbonyl and ethoxycarbonyl groups.

The aryloxycarbonyl group means to include a substituted aryloxycarbonyl group and an unsubstituted aryloxycarbonyl group. The aryloxycarbonyl group preferably has from 7 to 20 carbon atoms. One example of the substituent of the substituted group is an ionic hydrophilic group. One example of the alkoxycarbonyl group is a phenoxycarbonyl group.

The heterocyclic-oxycarbonyl group means to include a substituted heterocyclic-oxycarbonyl group and an unsubstituted heterocyclic-oxycarbonyl group. The heterocyclic-oxycarbonyl group preferably has from 2 to 20 carbon atoms. One example of the substituent of the substituted group is an ionic hydrophilic group. One example of the heterocyclic-oxycarbonyl group is a 2-pyridyloxycarbonyl group.

The acyl group means to include a substituted acyl group and an unsubstituted acyl group. The acyl group preferably has from 1 to 20 carbon atoms. One example of the substituent of the substituted acyl group is an ionic hydrophilic group. Examples of the acyl group are acetyl and benzoyl groups.

The alkoxy group means to include a substituted alkoxy group and an unsubstituted alkoxy group. The alkoxy group preferably has from 1 to 20 carbon atoms. Examples of the substituent of the substituted alkoxy group are an alkoxy group, a hydroxyl group, and a ionic hydrophilic group.

Examples of the alkoxy group are methoxy, ethoxy, isopropoxy, methoxyethoxy, hydroxyethoxy and 3-carboxypropoxy groups.

The aryloxy group means to include a substituted aryloxy group and an unsubstituted aryloxy group. The aryloxy group preferably has from 6 to 20 carbon atoms. Examples of the substituent for the substituted aryloxy group are an alkoxy group and an ionic hydrophilic group. Examples of the aryloxy group are phenoxy, p-methoxyphenoxy and o-methoxyphenoxy groups.

The heterocyclic-oxy group means to include a substituted heterocyclic-oxy group and an unsubstituted heterocyclic-oxy group. The heterocyclic-oxy group preferably has from 2 to 20 carbon atoms. Examples of the substituent of the substituted group are an alkyl group, an alkoxy group, and an ionic hydrophilic group. Examples of the heterocyclic-oxy group are 3-pyridyloxy and 3-thienyloxy groups.

The silyloxy group is preferably substituted with an aliphatic and/or aromatic group having from 1 to 20 carbon atoms. Examples of the silyloxy group are trimethylsilyloxy and diphenylmethylsilyloxy groups.

The acyloxy group means to include a substituted acyloxy group and an unsubstituted acyloxy group. The acyloxy group preferably has from 1 to 20 carbon atoms. One example of the substituent of the substituted acyloxy group is an ionic hydrophilic group. Examples of the acyloxy group are acetoxy and benzoyloxy groups.

The carbamoyloxy group means to include a substituted carbamoyloxy group and an unsubstituted carbamoyloxy group. One example of the substituent of the substituted carbamoyloxy group is an alkyl group. One example of the carbamoyloxy group is an N-methylcarbamoyloxy group.

The alkoxycarbonyloxy group means to include a substituted alkoxycarbonyloxy group and an unsubstituted alkoxycarbonyloxy group. The alkoxycarbonyloxy group preferably has from 2 to 20 carbon atoms. Examples of the alkoxycarbonyloxy group are methoxycarbonyloxy and isopropoxycarbonyloxy groups.

The aryloxycarbonyloxy group means to include a substituted aryloxycarbonyloxy group and an unsubstituted aryloxycarbonyloxy group. The aryloxycarbonyloxy group preferably has from 7 to 20 carbon atoms. One example of the aryloxycarbonyloxy group is a phenoxycarbonyloxy group.

The amino group means to include an unsubstituted amino group and an amino group substituted with any of an alkyl group, an aryl group or a heterocyclic group. The substituents, alkyl group, aryl group and heterocyclic group may be further substituted. The alkylamino group preferably has from 1 to 20 carbon atoms. One example of the substituent of the substituted groups is an ionic hydrophilic group. Examples of the alkylamino group are methylamino and diethylamino groups.

The arylamino group means to include a substituted arylamino group and an unsubstituted arylamino group. The arylamino group preferably has from 6 to 20 carbon atoms. Examples of the substituent of the substituted arylamino group are a halogen atom and an ionic hydrophilic group. Examples of the arylamino group are anilino and 2-chlorophenylamino groups.

The heterocyclic amino group means to include a substituted heterocyclic amino group and an unsubstituted heterocyclic amino group. The heterocyclic amino group preferably has from 2 to 20 carbon atoms. Examples of the substituent of the substituted group are an alkyl group, a halogen atom and an ionic hydrophilic group.

The acylamino group means to include a substituted acylamino group and an unsubstituted acylamino group. The acylamino group preferably has from 2 to 20 carbon atoms. One example of the substituent of the substituted acylamino group is an ionic hydrophilic group. Examples of the acylamino group are acetylamino, propionylamino, benzoylamino, N-phenylacetylamino and 3,5-disulfobenzoylamino groups.

The ureido group means to include a substituted ureido group and an unsubstituted ureido group. The ureido group preferably has from 1 to 20 carbon atoms. Examples of the substituent of the substituted ureido group are an alkyl group and an aryl group. Examples of the ureido group are 3-methylureido, 3,3-dimethylureido and 3-phenylureido groups.

The sulfamoylamino group means to include a substituted sulfamoylamino group and an unsubstituted sulfamoylamino group. One example of the substituent of the substituted sulfamoylamino group is an alkyl group. One example of the sulfamoylamino group is an N,N-dipropylsulfamoylamino group.

The alkoxycarbonylamino group means to include a substituted alkoxycarbonylamino group and an unsubstituted alkoxycarbonylamino group. The alkoxycarbonylamino group preferably has from 2 to 20 carbon atoms. One example of the substituent of the substituted alkoxycarbonylamino group is an ionic hydrophilic group. One example of the alkoxycarbonylamino group is an ethoxycarbonylamino group.

The aryloxycarbonylamino group means to include a substituted aryloxycarbonylamino group and an unsubstituted aryloxycarbonylamino group. The aryloxycarbonylamino group preferably has from 7 to 20 carbon atoms. One example of the substituent of the substituted group is an ionic hydrophilic group. One example of the aryloxycarbonylamino group is a phenoxycarbonylamino group.

The alkylsulfonylamino and arylsulfonylamino group means to include substituted alkylsulfonylamino and arylsulfonylamino groups and unsubstituted alkylsulfonylamino and arylsulfonylamino groups. The sulfonylamino group preferably has from 1 to 20 carbon atoms. One example of the substituent of the substituted group is an ionic hydrophilic group. Examples of the sulfonylamino groups are methylsulfonylamino, N-phenyl-methylsulfonylamino, phenylsulfonylamino and 3-carboxyphenylsulfonylamino groups.

The heterocyclic sulfonylamino group means to include a substituted heterocyclic sulfonylamino group and an unsubstituted heterocyclic sulfonylamino group. The heterocyclic sulfonylamino group preferably has from 1 to 12 carbon atoms. One example of the substituent of the substituted group is an ionic hydrophilic group. Examples of the heterocyclic sulfonylamino group are 2-thiophenesulfonylamino and 3-pyridinesulfonylamino groups.

The heterocyclic sulfonyl group means to include a substituted heterocyclic sulfonyl group and an unsubstituted heterocyclic sulfonyl group. The heterocyclic sulfonyl group preferably has from 1 to 20 carbon atoms. One example of the substituent of the substituted group is an ionic hydrophilic group. Examples of the heterocyclic sulfonyl group are 2-thiophenesulfonyl and 3-pyridinesulfonyl groups.

The heterocyclic sulfinyl group means to include a substituted heterocyclic sulfinyl group and an unsubstituted heterocyclic sulfinyl group. The heterocyclic sulfinyl group preferably has from 1 to 20 carbon atoms. One example of the substituent of the substituted group is an ionic hydrophilic group. One example of the heterocyclic sulfinyl group is a 4-pyridinesulfinyl group.

The alkylthio, arylthio and heterocyclic-thio group means to include substituted alkylthio, arylthio and heterocyclic-thio groups and unsubstituted alkylthio, arylthio and heterocyclic-thio groups. The alkylthio, arylthio and heterocyclic-thio group preferably has from 1 to 20 carbon atoms. One example of the substituent of the substituted group is an ionic hydrophilic group. Examples of the alkylthio, arylthio and heterocyclic-thio group are methylthio, phenylthio and 2-pyridylthio groups.

The alkylsulfonyl and arylsulfonyl group means to include substituted alkylsulfonyl and arylsulfonyl groups, and unsubstituted alkylsulfonyl and arylsulfonyl groups. Examples of the alkylsulfonyl and arylsulfonyl group are methylsulfonyl and phenylsulfonyl groups.

The alkylsulfinyl and arylsulfinyl group means to include substituted alkylsulfinyl and arylsulfinyl groups, and unsubstituted alkylsulfinyl and arylsulfinyl groups. Examples of the alkylsulfinyl and arylsulfinyl group are methylsulfinyl and phenylsulfinyl groups.

The sulfamoyl group means to include a substituted sulfamoyl group and an unsubstituted sulfamoyl group. One example of the substituent of the substituted sulfamoyl group is an alkyl group. Examples of the sulfamoyl group are dimethylsulfamoyl and di(2-hydroxyethyl)sulfamoyl groups.

Formulae (4), (4-A) and (4-B) are further described.

In the following description, those described hereinabove shall apply to the groups and the substituents.

In formula (4), $A_{41}$, $B_{41}$ and $C_{41}$ each independently represents an optionally-substituted aromatic group ($A_{41}$ and $C_{41}$ each are a monovalent aromatic group such as an aryl group; $B_{41}$ is a divalent aromatic group such as an arylene group), or an optionally substituted heterocyclic group ($A_{41}$ and $C_{41}$ each are a monovalent heterocyclic group; $B_{41}$ is a divalent heterocyclic group). Examples of the aromatic ring are benzene and naphthalene rings; and the hetero atom to form the hetero ring includes N, O and S. The hetero ring may be condensed with an aliphatic ring, an aromatic ring or any other hetero ring.

The substituent may be an arylazo group or a heterocyclic azo group.

Preferably, at least one of $A_{41}$, $B_{41}$, and $C_{41}$ is a heterocyclic group, more preferably at least two of $A_{41}$, $B_{41}$ and $C_{41}$ are heterocyclic groups. All of $A_{41}$, $B_{41}$ and $C_{41}$ may be heterocyclic groups.

Preferably, the heterocyclic group for $C_{41}$ is an aromatic, nitrogen-containing 6-membered heterocyclic group of the following formula (4-C). When $C_{41}$ is an aromatic, nitrogen-containing 6-membered heterocyclic group of formula (4-C), then formula (4) corresponds to formula (4-A)

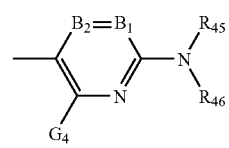

(4-C)

In formula (4-C), $B_1$ and $B_2$ each represent =$CR_{41}$— and —$CR_{42}$=, or any one of them represents a nitrogen atom and the other represents =$CR_{41}$— or —$CR_{42}$=. Preferably, they represent =$CR_{41}$— and —$CR_{42}$=.

$R_{45}$ and $R_{46}$ each independently represents a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group. These groups may be further substituted. Preferably, $R_{45}$ and $R_{46}$ each are a hydrogen atom, an aliphatic group, an aromatic group, a heterocyclic group, an acyl group, or an alkyl or arylsulfonyl group. More preferably, they are any of a hydrogen atom, an aromatic group, a heterocyclic group, an acyl group, or an alkyl or arylsulfonyl group; most preferably, any of a hydrogen atom, an aryl group or a heterocyclic group. The groups may be further substituted. However, $R_{45}$ and $R_{46}$ are not hydrogen atoms at the same time.

$G_4$, $R_{41}$ and $R_{42}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group (including alkylamino, arylamino, heterocyclic amino), an acylamino group, an ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, a heterocyclic-thio group, an alkyl or arylsulfonyl group, a heterocyclic sulfonyl group, an alkyl or arylsulfinyl group, a heterocyclic sulfinyl group, a sulfamoyl group, or a sulfo group, and each group may further be substituted.

The substituent for $G_4$ is preferably a hydrogen atom, a halogen atom, an aliphatic group, an aromatic group, a hydroxyl group, an alkoxy group, an aryloxy group, an acyloxy group, a heterocyclic-oxy group, an amino group (including alkylamino, arylamino, heterocyclic amino), an acylamino group, an ureido group, a sulfamoylamino group, an alkoxycarbonylamino group, an aryloxycarbonylamino group, an alkyl or arylthio group, or a heterocyclic-thio group; more preferably a hydrogen atom, a halogen atom, an alkyl group, a hydroxyl group, an alkoxy group, an aryloxy group, an acyloxy group, an amino group (including alkylamino, arylamino, heterocyclic amino), or an acylamino group; most preferably a hydrogen atom, an anilino group, or an acylamino group. These groups may be further substituted.

The substituent for $R_{41}$ and $R_{42}$ is preferably a hydrogen atom, an alkyl group, a halogen atom, an alkoxycarbonyl group, a carboxyl group, a carbamoyl group, a hydroxyl group, an alkoxy group, or a cyano group. These groups may be further substituted.

$R_{41}$ and $R_{45}$, or $R_{45}$ and $R_{46}$ may bond to each other to form a 5- or 6-membered ring.

For the substituents for the substituted groups for $A_{41}$, $R_{41}$, $R_{42}$, $R_{45}$, $R_{46}$ and $G_4$, referred to are those mentioned hereinabove for the groups for $G_4$, $R_{41}$ and $R_{42}$. Preferably, the dyes have an ionic hydrophilic group at any position of $A_{41}$, $R_{41}$, $R_{42}$, $R_{45}$, $R_{46}$ and $G_4$ therein.

The substituent, ionic hydrophilic group includes, for example, a sulfo group, a carboxyl group, a phosphono group and a quaternary ammonium group. Preferably, it is a carboxyl group, a phosphono group or a sulfo group, more preferably a carboxyl group or a sulfo group. The carboxyl group, phosphono group and sulfo group may form salts. Examples of the counter ion to form the salts are ammonium ions, alkali metal ions (e.g., lithium ion, sodium ion, potassium ion), and organic cations (e.g., tetramethylammonium ion, tetramethylguanidium ion, tetramethylphosphonium ion). For the counter ion, preferred is lithium ion.

When $B_{41}$ has a cyclic structure, preferred hetero rings are thiophene, thiazole, imidazole, benzimidazole and thienothiazole rings. These heterocyclic groups may be further substituted. Above all, especially preferred are thiophene, thiazole, imidazole, benzimidazole and thienothiazole rings of the following formulae (a) to (e). When $B_{41}$ is a thiophene ring (a) and when $C_{41}$ has the structure of formula (4-C), then formula (4) corresponds to formula (4-B).

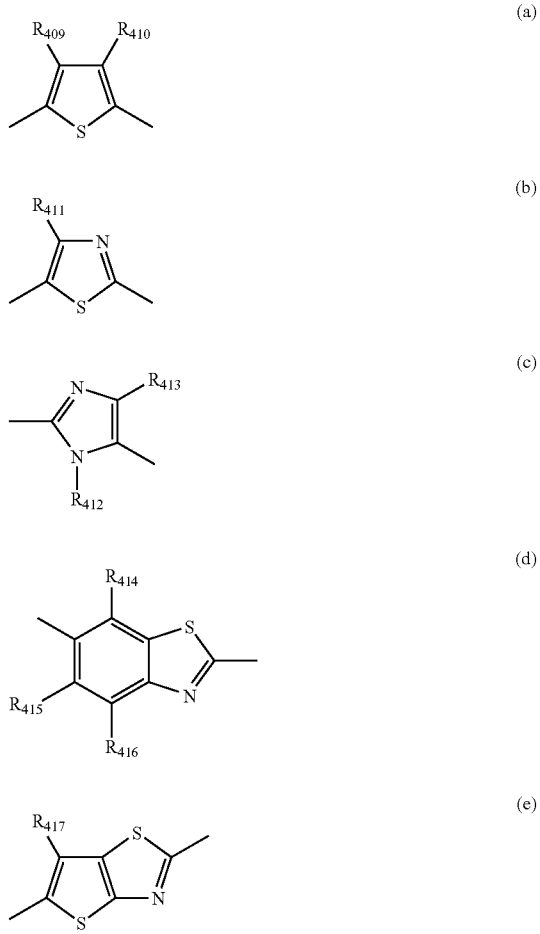

In formulae (a) to (e), $R_{409}$ to $R_{417}$ have the same meanings as those of the substituents of $G_4$, $R_{41}$ and $R_{42}$ in formula (4-A).

For use in the invention, more preferred are those having a structure of the following formula (4-D):

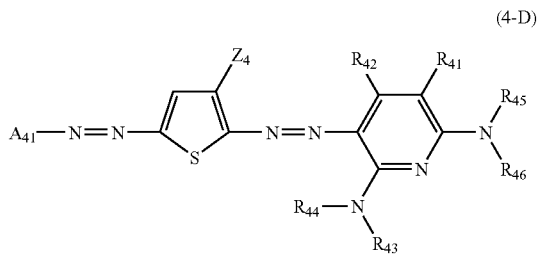

In formula (4-D), $Z_4$ represents an electron-attractive group having a Hammett's substituent constant σp of at least 0.20. Preferably, $Z_4$ is an electron-attractive group having σp of at least 0.30, more preferably at least 0.45, even more preferably at least 0.60, but not exceeding 1.0. Preferred examples of the electron-attractive group will be mentioned hereinunder. Above all, $Z_4$ is preferably any of an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms, or a halogenoalkyl group having from 1 to 20 carbon atoms; more preferably any of a cyano group, an alkylsulfonyl group having from 1 to 20 carbon atoms, or an arylsulfonyl group having from 6 to 20 carbon atoms; most preferably a cyano group.

$R_{41}$, $R_{42}$, $R_{45}$ and $R_{46}$ in formula (4-D) have the same meanings as in formula (4-A). $R_{43}$ and $R_{44}$ each independently represents a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group; preferably a hydrogen atom, an aromatic group, a heterocyclic group, an acyl group, or an alkyl or arylsulfonyl group; more preferably a hydrogen atom, an aromatic group or a heterocyclic group.

The groups in formula (4-D) may be further substituted. For the substituents, referred to are those mentioned hereinabove for the groups $G_4$, $R_{41}$ and $R_{42}$ in formula (4-A), and ionic hydrophilic groups.

In the invention, the substituent will be defined or described with reference to the Hammett's substituent constant σp. This does not mean that the substituents are limited to those of which the value σp is known in the references as above. Even though the value σp thereof is unknown, it is needless to say that the substituents of which the substituent constant measured according to the Hammett's rule falls within the defined range are all within the scope intended herein. Some dyes of formula (4), (4-A), (4-B), (4-C) and (4-D) for use in the invention are not benzene derivatives. However, as the criterion to indicate the electron effect of substituents, the value σp is referred to for the substituents of the dyes, irrespective of the substituting position of the substituents. To that effect, the value σp is referred to in the invention.

The electron-attractive group of which the Hammett's substituent constant σp is at least 0.60 includes a cyano group, a nitro group, an alkylsulfonyl group (e.g., methylsulfonyl), and an arylsulfonyl group (e.g., phenylsulfonyl).

Examples of the electron-attractive group having a Hammett's substituent constant σp of at least 0.45 are, in addition to the groups mentioned above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl), and a halogenoalkyl group (e.g., trifluoromethyl).

Examples of the electron-attractive group having a Hammett's substituent constant σp of at least 0.30 are, in addition to the groups mentioned above, an acyloxy group (e.g., acetoxy), a carbamoyl group (e.g., N-ethylcarbamoyl, N,N-diethylcarbamoyl), a halogenoalkoxy group (e.g., trifluoromethoxy), a halogenoaryloxy group (e.g., pentafluorophenyloxy), a sulfonyloxy group (e.g., methylsulfonyloxy), a halogenoalkylthio group (e.g., difluoromethylthio), an aryl group substituted with at least two electron-attractive groups each having σp of at least 0.15 (e.g., 2,4-dinitrophenyl, pentachlorophenyl), and a heterocyclic group (e.g., 2-benzoxazolyl, 2-benzothiazolyl, 1-phenyl-2-benzimidazolyl).

Examples of the electron-attractive group having σp of at least 0.20 are, in addition to the groups mentioned above, a halogen atom.

Especially preferred combinations of the substituents of the azo dyes of formula (4-B) are mentioned below. $R_{45}$ and $R_{46}$ are preferably any of a hydrogen atom, an alkyl group, an aryl group, a heterocyclic group, a sulfonyl group or an acyl group; more preferably any of a hydrogen atom, an aryl group, a heterocyclic group or a sulfonyl group; most preferably any of a hydrogen atom, an aryl group or a heterocyclic group. However, $R_{45}$ and $R_{46}$ must not be hydrogen atoms at the same time.

$G_4$ is preferably a hydrogen atom, a halogen atom, an alkyl group, a hydroxyl group, an amino group or an acylamino group, more preferably a hydrogen atom, a halogen atom, an amino group or an acylamino group, most preferably a hydrogen atom, an amino group or an acylamino group.

$A_{41}$ is preferably a pyrazole ring, an imidazole ring, an isothiazole ring, a thiadiazole ring or a benzothiazole ring, more preferably a pyrazole ring or an isothiazole ring, most preferably a pyrazole ring.

Also preferably, $B_1$ and $B_2$ are =$CR_{41}$— and —$CR_{42}$=, respectively; and $R_{41}$ and $R_{42}$ are preferably any of a hydrogen atom, an alkyl group, a halogen atom, a cyano group, a carbamoyl group, a carboxyl group, a hydroxyl group, an alkoxy group or an alkoxycarbonyl group, more preferably any of a hydrogen atom, an alkyl group, a carboxyl group, a cyano group or a carbamoyl group.

Regarding the preferred combinations of the substituents of the azo dyes, it is desirable that at least one of the substituents is the above-mentioned preferred group. More preferably, a larger number of the substituents are the preferred groups. Most preferably, all the substituents are the preferred groups.

Specific examples of the azo dyes usable in the invention are mentioned below, to which, however, the invention should not be limited. In the following examples, the carboxyl group, the phosphono group and the sulfo group may form salts. Examples of the counter ion to form the salts are ammonium ions, alkali metal ions (e.g., lithium ion, sodium ion, potassium ion), and organic cations (e.g., tetramethylammonium ion, tetramethylguanidium ion, tetramethylphosphonium ion). For the counter ion, preferred is lithium ion.

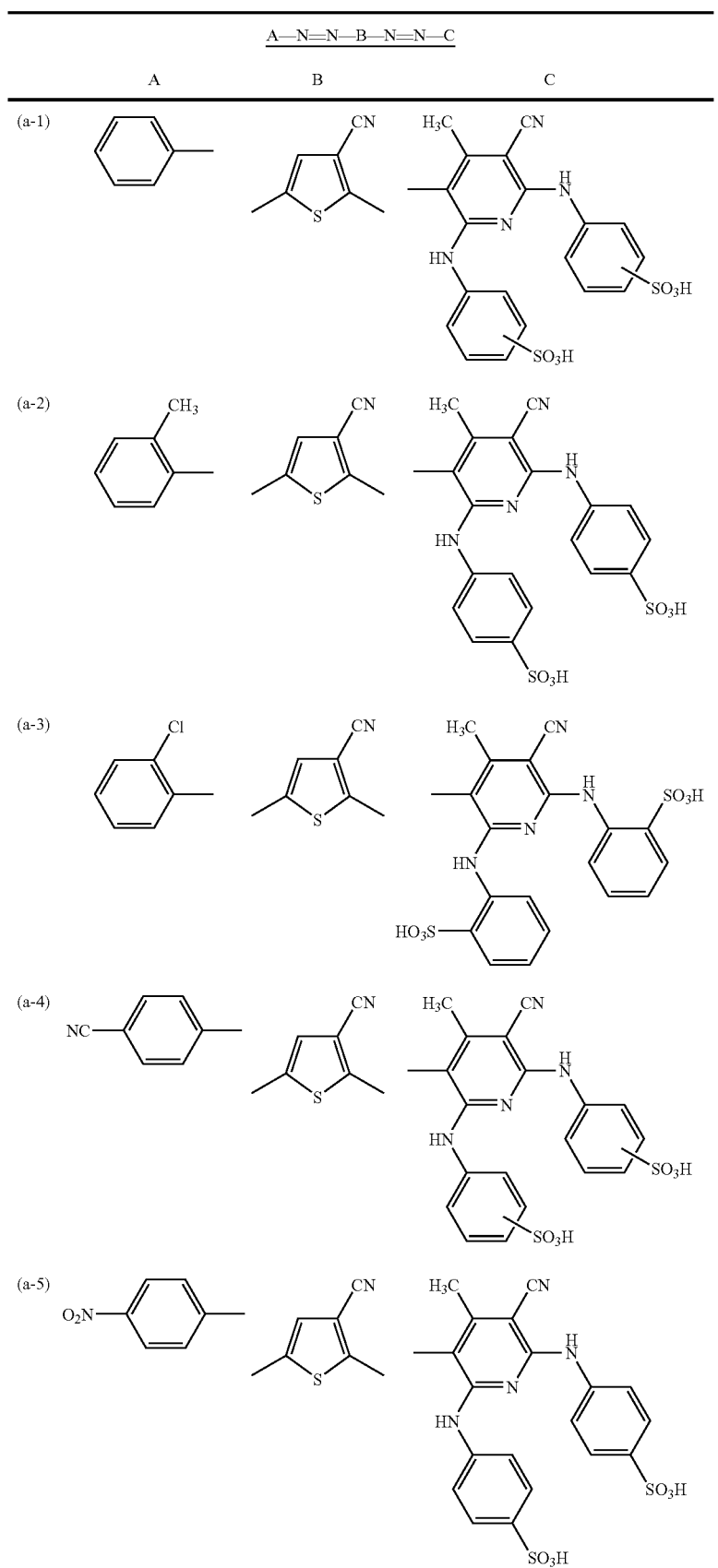

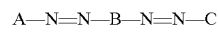
| | A | B | C |
|---|---|---|---|
| (a-6) | | | |
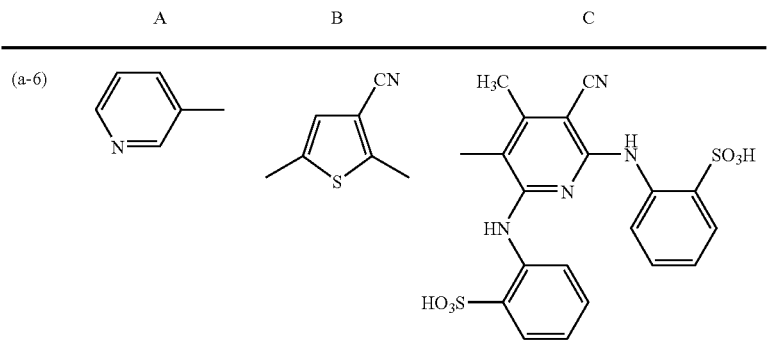
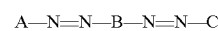
| | A | B | C |
|---|---|---|---|
| (b-1) | | | |
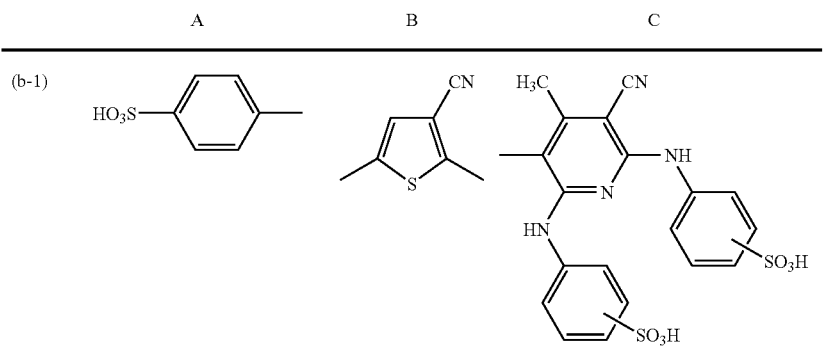
(b-2)
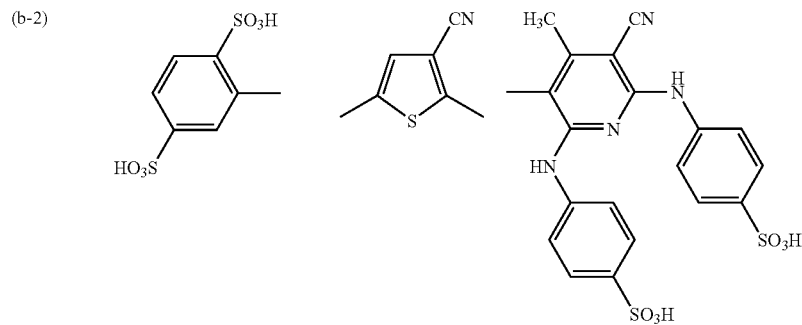
(b-3)
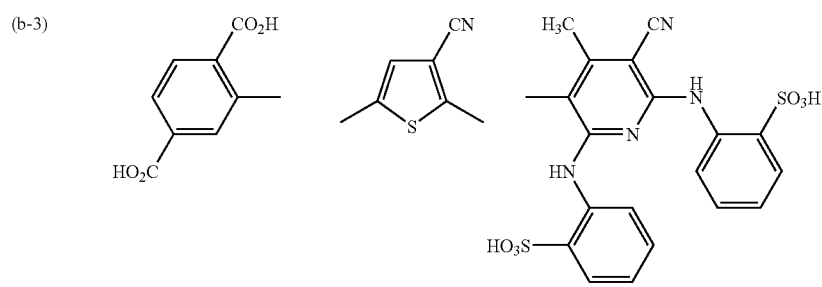

-continued
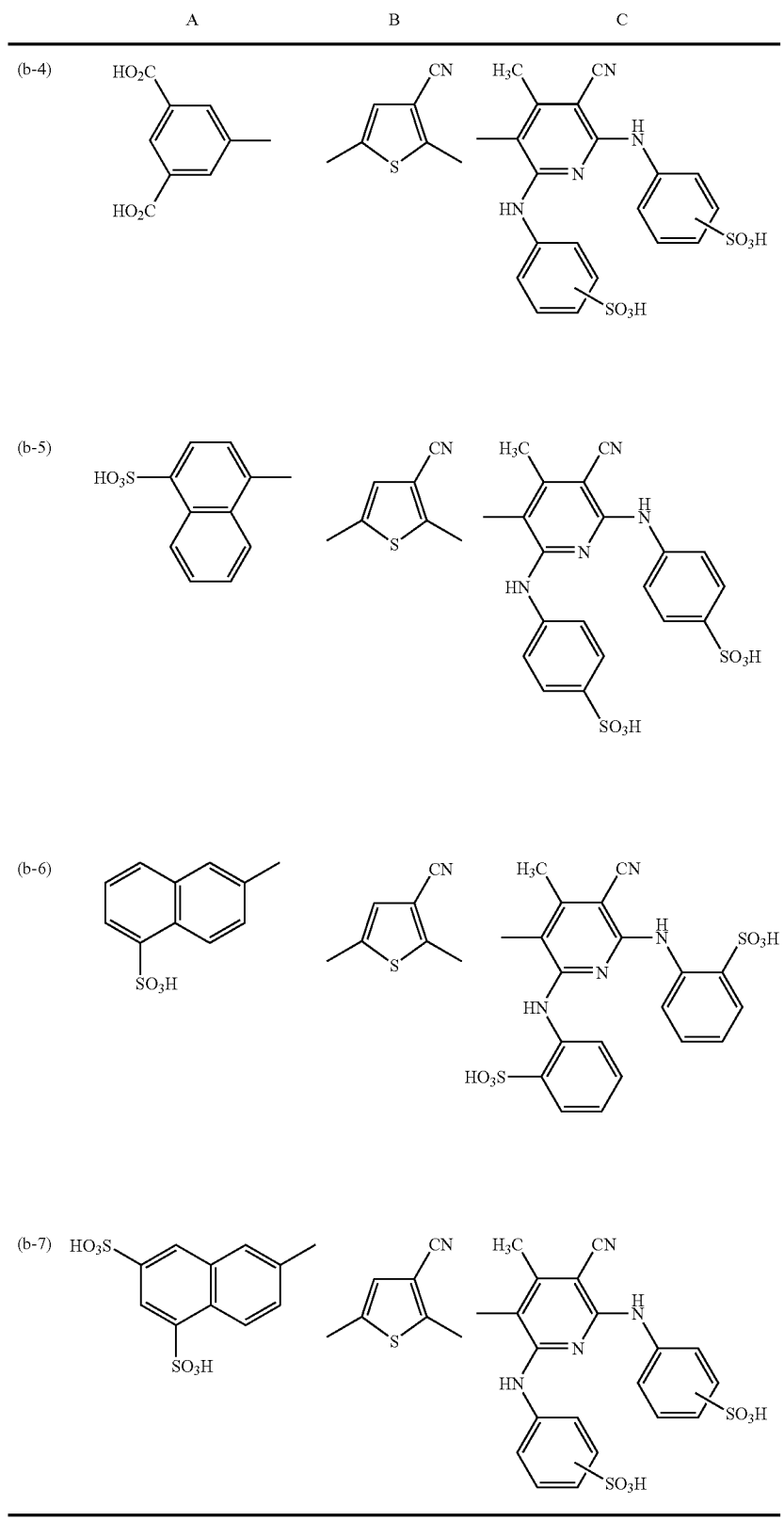

| | A—N=N—B—N=N—C | | |
|---|---|---|---|
| | A | B | C |
| (c-1) | 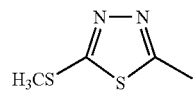 | 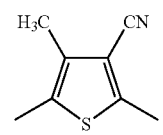 | 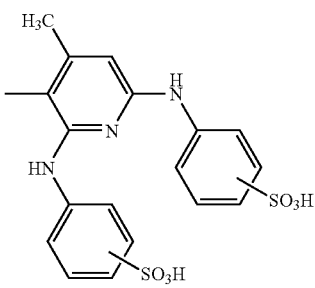 |
| (c-2) | 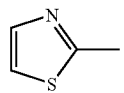 | 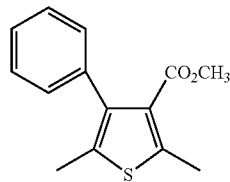 | 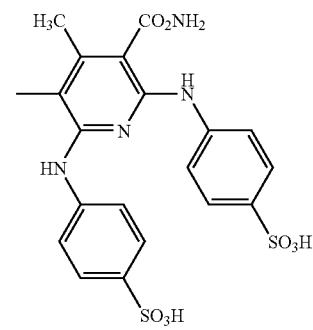 |
| (c-3) | 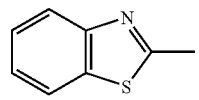 | 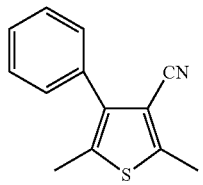 | 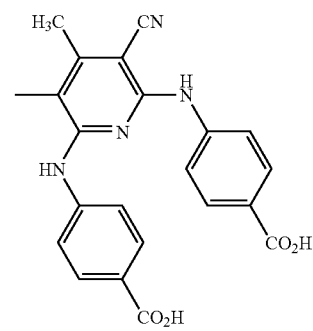 |
| (c-4) | 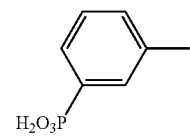 | 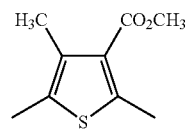 | 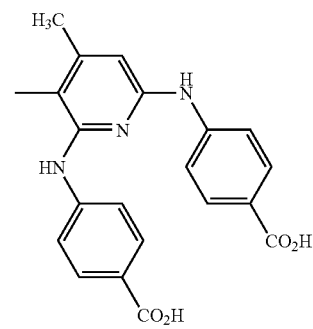 |

-continued
| | A—N=N—B—N=N—C | | |
|---|---|---|---|
| | A | B | C |
| (c-5) | 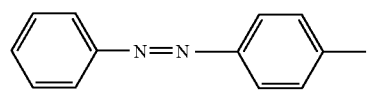 | 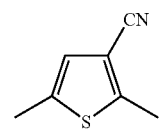 | 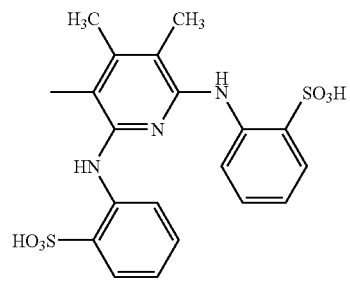 |
| | A—N=N—B—N=N—C | | |
|---|---|---|---|
| | A | B | C |
| (d-1) | 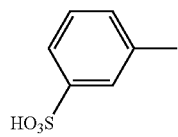 | 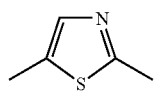 | 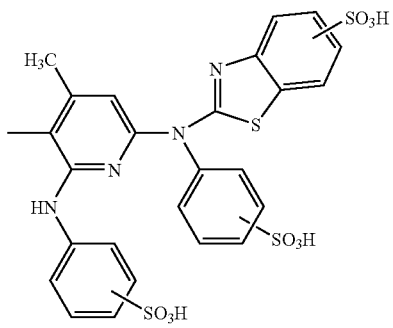 |
| (d-2) | 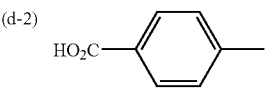 | 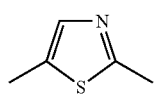 | 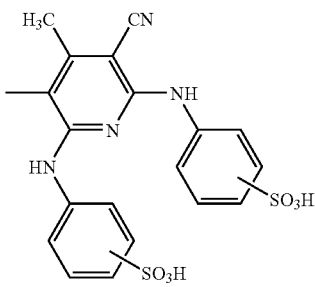 |
| (d-3) | 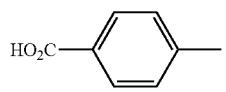 | 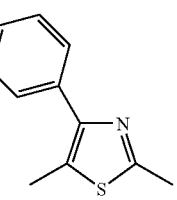 | 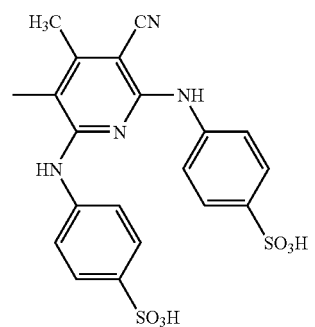 |

-continued
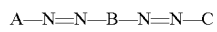
| | A | B | C |
|---|---|---|---|
| (d-4) | | | |
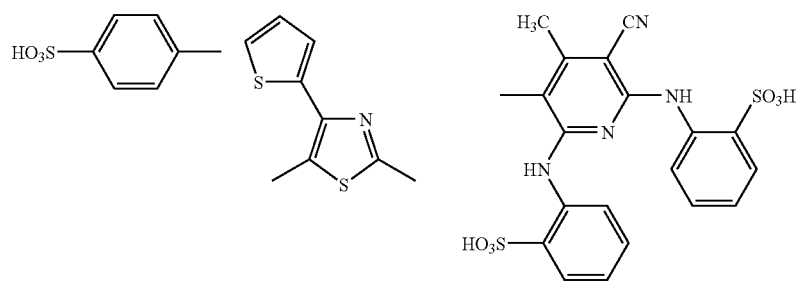
| (d-5) | | | |
|---|---|---|---|
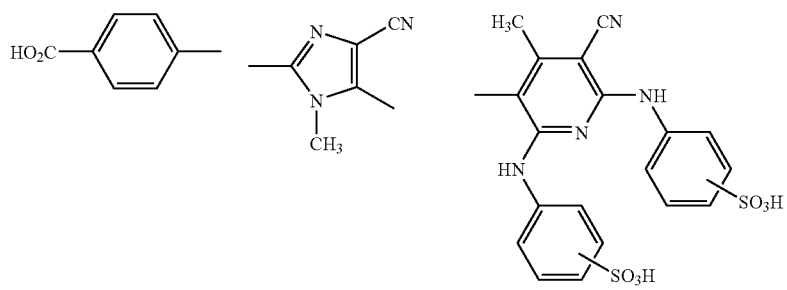
| (d-6) | | | |
|---|---|---|---|
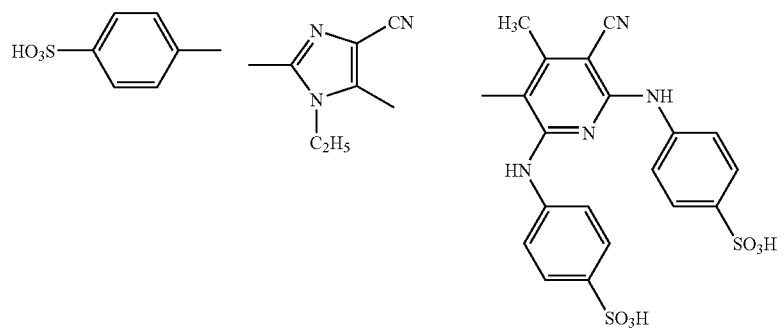
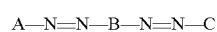
| | A | B | C |
|---|---|---|---|
| (e-1) | | | |
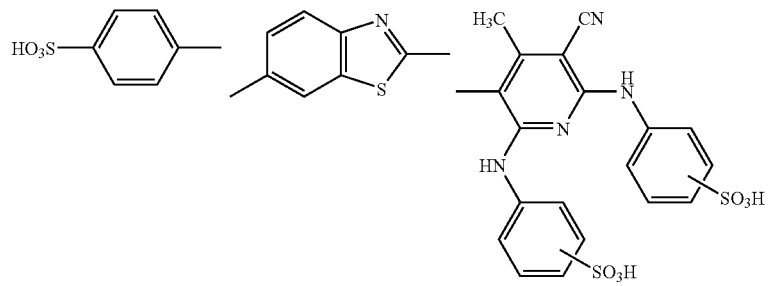

-continued
A—N=N—B—N=N—C
| | A | B | C |
|---|---|---|---|
| (e-2) | | | 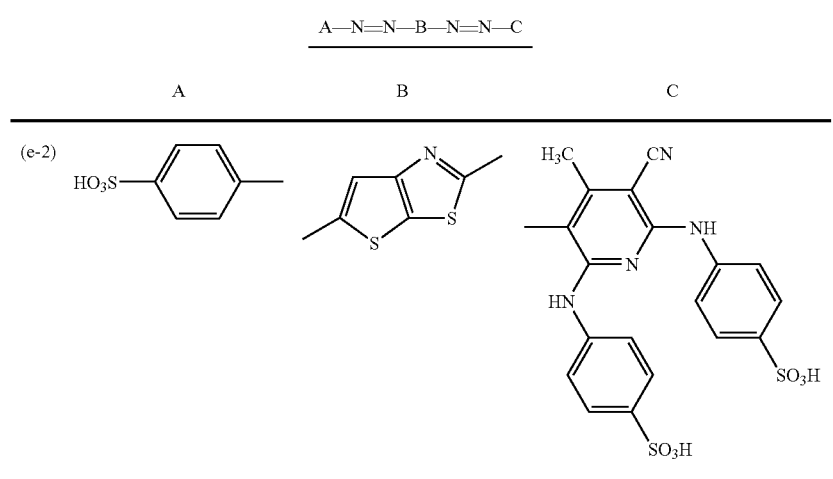 |
A—N=N—B—N=N—C
| | A | B | C |
|---|---|---|---|
| (f-1) | | | |
| (f-2) | | | |
| (f-3) | | | |
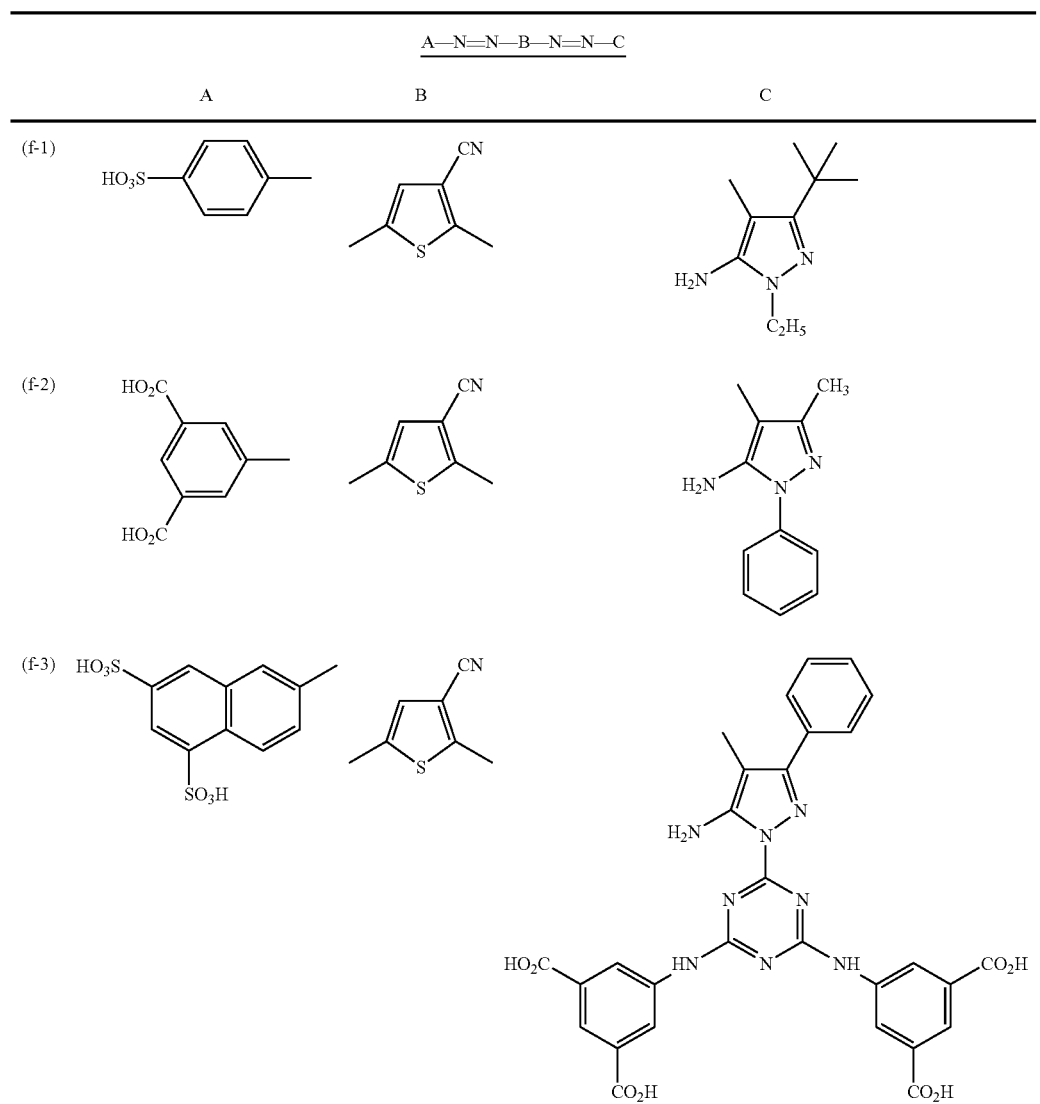

-continued

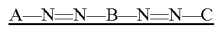
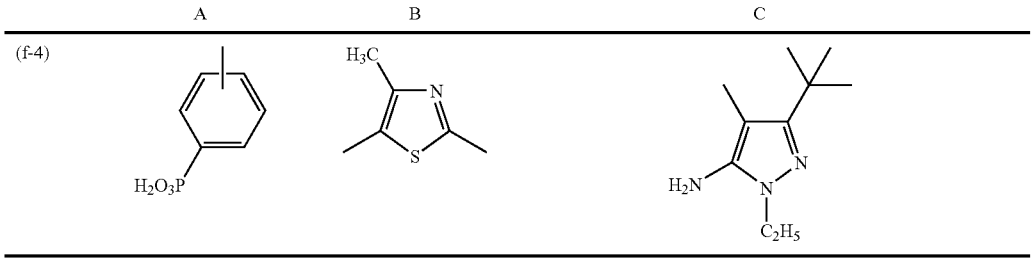

The azo dyes of formulae (4), (4-A), (4-B) and (4-D) may be produced through coupling reaction of a diazo component with a coupler. For it, for example, the method described in Japanese Patent Application No. 2002-113460 is referred to.

In the black ink, the dyes (S) having λmax of from 350 nm to 500 nm are preferably yellow dyes and yellow pigments that are mentioned hereinunder, in addition to the above-mentioned dyes of formulae (1) and (4). In the black ink, these dyes and pigments may be used together, or may be independently in different systems.

The content of the dye of formula (4) in the black ink in the invention is preferably from 0.2 to 20% by weight, more preferably from 0.5 to 15% by weight.

Apart from those mentioned hereinabove, still other examples of the dyes usable in the invention are mentioned hereinunder. The dyes may be used alone or in combination with any others for color tone control. In the invention, plural inks with plural dyes may be combined into an ink set for full-color image formation.

Yellow dyes are, for example, aryl or heterylazo dyes having, as the coupling component thereof, phenols, naphthols, anilines, pyrazolones, pyridones or open-chain active methylene compounds; azomethine dyes having, as the coupling component thereof, open-chain active methylene compounds; methine dyes such as benzylidene dyes, monomethine-oxonole dyes; quinone dyes such as naphthoquinone dyes, anthraquinone dyes. Other dye species than these are quinophthalone dyes, nitro-nitroso dyes, acridine dyes, and acridinone dyes. These dyes may present yellow only after a part of the chromophore thereof has been dissociated. In such a case, the counter cation may be an inorganic cation such as alkali metal or ammonium ion, or an organic cation such as pyridinium or quaternary ammonium cation, or may also be a polymer cation having any of these as a partial structure thereof.

Magenta dyes are, for example, aryl or heterylazo dyes having, as the coupling component thereof, phenols, naphthols or anilines; azomethine dyes having, as the coupling component thereof, pyrazolones or pyrazolotriazoles; methine dyes such as arylidene dyes, styryl dyes, merocyanine dyes, oxonole dyes; carbonium dyes such as diphenylmethane dyes, triphenylmethane dyes, xanthene dyes; quinone dyes such as naphthoquinone dyes, anthraquinone dyes, anthrapyridone dyes; and condensed polycyclic dyes such as dioxazine dyes. These dyes may present magenta only after a part of the chromophore thereof has been dissociated. In such a case, the counter cation may be an inorganic cation such as alkali metal or ammonium ion, or an organic cation such as pyridinium or quaternary ammonium cation, or may also be a polymer cation having any of these as a partial structure thereof.

Cyan dyes are, for example, azomethine dyes such as indaniline dyes, indophenol dyes; polymethine dyes such as cyanine dyes, oxonole dyes, merocyanine dyes; carbonium dyes such as diphenylmethane dyes, triphenylmethane dyes, xanthene dyes; phthalocyanine dyes; anthraquinone dyes; aryl or heterylazo dyes having, as the coupling component thereof, phenols, naphthols or anilines; and indigo and thioindigo dyes. These dyes may present cyan only after a part of the chromophore thereof has been dissociated. In such a case, the countercation may be an inorganic cation such as alkali metal or ammonium ion, or an organic cation such as pyridinium or quaternary ammonium cation, or may also be a polymer cation having any of these as a partial structure thereof.

In addition, water-soluble dyes such as direct dyes, acid dyes, edible dyes, basic dyes and reactive dyes may also be used herein. Above all, especially preferred are the following:

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, 247;

C.I. Direct Violet 7, 9, 47, 48, 51, 66, 90, 93, 94, 95, 98, 100, 101;

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, 163;

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291;

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199;

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397;

C.I. Acid Violet 5, 34, 43, 47, 48, 90, 103, 126;

C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227;

C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326;

C.I. Acid Black 7, 24, 29, 48, 52:1, 172;

C.I. Reactive Red 3, 13, 17, 19, 21, 22, 23, 24, 29, 35, 37, 40, 41, 43, 45, 49, 55;

C.I. Reactive Violet 1, 3, 4, 5, 6, 7, 8, 9, 16, 17, 22, 23, 24, 26, 27, 33, 34;

C.I. Reactive Yellow 2, 3, 13, 14, 15, 17, 18, 23, 24, 25, 26, 27, 29, 35, 37, 41, 42;

C.I. Reactive Blue 2, 3, 5, 8, 10, 13, 14, 15, 17, 18, 19, 21, 25, 26, 27, 28, 29, 38;
C.I. Reactive Black 4, 5, 8, 14, 21, 23, 26, 31, 32, 34;
C.I. Basic Red 12, 13, 14, 15, 18, 22, 23, 24, 25, 27, 29, 35, 36, 38, 39, 45, 46;
C.I. Basic Violet 1, 2, 3, 7, 10, 15, 16, 20, 21, 25, 27, 28, 35, 37, 39, 40, 48;
C.I. Basic Yellow 1, 2, 4, 11, 13, 14, 15, 19, 21, 23, 24, 25, 28, 29, 32, 36, 39, 40;
C.I. Basic Blue 1, 3, 5, 7, 9, 22, 26, 41, 45, 46, 47, 54, 57, 60, 62, 65, 66, 69, 71;
C.I. Basic Black 8.

Pigments and dyes may be combined in the ink of the invention.

The pigments usable in the ink of the invention are commercially-available ones and any other known ones described in various references. The references are, for example, *Color Index* (by the Society of Dyers and Colorists); *Revised New Version, Pigment Handbook* (by Nippon Pigment Technology Association, 1989); *Latest Pigment Application Technology* (by CMC Publishing, 1986); *Printing Ink Technology* (by CMC Publishing, 1984); W. Herbst & K. Hunger, *Industrial Organic Pigments* (by VCH Verlagsgesellshaft, 1993). Concretely, organic pigments are azo pigments (azo-lake pigments, insoluble azo pigments, condensed azo pigments, chelate-azo pigments), polycyclic pigments (phthalocyanine pigments, anthraquinone pigments, perylene and perinone pigments, indigo pigments, quinacridone pigments, dioxazine pigments, isoindolinone pigments, quinophthalone pigments, diketopyrrolopyrrole pigments), dyeing lake pigments (lake pigments of acid or basic dyes), and azine pigments; and inorganic pigments are yellow pigments such as C.I. Pigment Yellow 34, 37, 42, 53; red pigments such as C.I. Pigment Red 101, 108; blue pigments such as C.I. Pigment Blue 27, 29, 17:1; Black pigments such as C.I. Pigment Black 7, magnetite; and white pigments such as C.I. Pigment White 4,6,18, 21.

Pigments preferred for color image formation are blue or cyan pigments such as phthalocyanine pigments, anthraquinone-based indanthrone pigments (e.g., C.I. Pigment Blue 60), and dyeing lake pigments such as triarylcarbonium pigments. Especially preferred are phthalocyanine pigments, and their preferred examples are copper phthalocyanines such as C.I. Pigment Blue 15:1, 15:2, 15:3, 15:4, 15:6; monochloro or low-chloro-copper phthalocyanines, aluminium phthalocyanines such as those in EP 860475; nonmetal phthalocyanine, C.I. Pigment Blue 16; and phthalocyanines with a center metal atom of Zn, Ni or Ti. Most preferred are C.I. Pigment Blue 15:3, 15:4, and aluminium phthalocyanines.

Red to violet pigments are azo dyes (preferably C.I. Pigment Red 3, 5, 11, 22, 38, 48:1, 48:2, 48:3, 48:4, 49:1, 52:1, 53:1, 57:1, 63:2, 144, 146, 184; more preferably C.I. Pigment Red 57:1, 146, 184); quinacridone pigments (preferably C.I. Pigment Red 122, 192, 202, 207, 209, C.I. Pigment Violet 19, 42; more preferably C.I. Pigment Red 122); dyeing lake pigments such as triaryl carbonium pigments (preferably xanthene-type C.I. Pigment Red 81:1, C.I. Pigment Violet 1, 2, 3, 27, 39); dioxazine pigments (e.g., C.I. Pigment Violet 23, 37); diketopyrrolopyrrole pigments (e.g., C.I. Pigment Red 254); perylene pigments (e.g., C.I. Pigment Violet 29); anthraquinone pigments (e.g., C.I. Pigment Violet 5:1, 31, 33); thioindigo pigments (e.g., C.I. Pigment Red 38, 88).

Yellow pigments are azo pigments (preferably monoazo pigments such as C.I. Pigment Yellow 1, 3, 74, 98; disazo pigments such as C.I. Pigment Yellow 12, 13, 14, 16, 17, 83; general azo pigments such as C.I. Pigment Yellow 93, 94, 95, 128, 155; benzimidazolone pigments such as C.I. Pigment Yellow 120, 151, 154, 156, 180; more preferably those not using benzidine compounds for their starting material); isoindoline or isoindolinone pigments (preferably C.I. Pigment Yellow 109, 110, 137, 139); quinophthalone pigments (preferably C.I. Pigment Yellow 138); flavanthrone pigments (e.g., C.I. Pigment Yellow 24).

Black pigments are inorganic pigments (preferably carbon black, magnetite) and aniline black.

In addition to the above, orange pigments (e.g., C.I. Pigment Orange 13, 16) and green pigments (e.g., C.I. Pigment Green 7) are also usable herein.

The pigments usable in the ink of the invention may be the above-mentioned nude pigments or may be surface-treated ones. For their surface treatment, the pigments may be coated with resin or wax, or surfactant may be applied to the pigments, or a reactive substance (e.g., radical from silane coupling agent, epoxy compound, polyisocyanate, diazonium salt) may be bound to the pigment surface. These are described, for example, in the following references and patent publications.

<1> *Properties and Applications of Metal Soap* (by Miyuki Publishing),
<2> *Printing Ink* (by CMC Publishing, 1984),
<3> *Latest Pigment Application Technology* (by CMC Publishing, 1986),
<4> U.S. Pat. Nos. 5,554,739, 5,571,311,
<5> JP-A 9-151342, 10-140065, 10-292143, 11-166145.

In particular, self-dispersible pigments prepared by reacting a diazonium salt with carbon black as in the US patents of above <4>, and capsulated pigments prepared according to the methods in the Japanese patent publications of above <5> are effective, since they are stably dispersed in ink not requiring any superfluous dispersant.

In the invention, the pigments may be dispersed by the use of a dispersant. Depending on the pigments to be used, various known dispersants may be used. For example, surfactant-type low-molecular dispersants or polymer-type dispersants may be used. Examples of the dispersants usable herein are described in, for example, JP-A 3-69949, and EP 549486. When the dispersant is used, a pigment derivative that is referred to as a synergist may be added thereto for promoting the dispersant adsorption by pigment.

The particle size of the pigment usable in the ink of the invention is preferably from 0.01 to 10 μm, more preferably from 0.05 to 1 μm, in terms of the size of the dispersed particles.

For pigment dispersion, employable is any known technology generally used in ink production or toner production. The dispersing machine may be any of horizontal or vertical agitator mills, attritors, colloid mills, ball mills, three-roll mills, pearl mills, super mills, impellers, dispersers, KD mills, dynatrons, pressure kneaders. They are described in detail in *Latest Pigment Application Technology* (by CMC Publishing, 1986).

The water-soluble dyes for use in the invention are preferably the magenta dyes described in JP-A 2002-371214; the phthalocyanine dyes described in JP-A 2002-309118; and the water-soluble dyes described in JP-A 2003-12952 and 2003-12956.

The ink of the invention may be produced by dissolving or dispersing at least a dye such as that mentioned above, and water and/or a water-miscible organic solvent, and preferably a surfactant in a medium. The ink of the invention means to contain a dye, water and/or a water-miscible organic solvent, and optionally additives such as moisturizer, stabilizer, preservative.

The water-miscible organic solvent for use in the invention is a material that has the function as a drying inhibitor, a penetration promoter and a moisturizer for ink for inkjet recording in the art, and it is especially a high-boiling-point, water-miscible organic solvent. It includes, for example, alcohols (e.g., methanol, ethanol, propanol, isopropanol, butanol, isobutanol, sec-butanol, t-butanol, pentanol, hexanol, cyclohexanol, benzyl alcohol), polyalcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethylenimine, tetramethylpropylenediamine), and other polar solvents (e.g., formamide, N,N-dimethylformamide, N,N-dimethylacetamide, dimethylsulfoxide, sulforane, 2-pyrrolidone, N-methyl-2-pyrrolidone, N-vinyl-2-pyrrolidone, 2-oxazolidone, 1,3-dimethyl-2-imidazolidinone, acetonitrile, acetone). Two or more of these water-miscible organic solvents may be used as combined.

Of those, alcohol solvents are especially preferred.

Preferably, the total amount of the water-miscible organic solvent to be in the ink is from 5 to 60% by weight, more preferably from 10 to 45% by weight.

In case where the dye is soluble in water, then it is preferably first dissolved in water in preparing the ink of the invention. Next, various solvent and additive are added to it, dissolved and mixed to give a uniform ink composition.

For dissolving the components, for example, various methods of stirring, ultrasonic irradiation or shaking may be employed. Especially preferred is a method of stirring the components. When the components are stirred, various methods known in the art are employable. For example, they may be stirred in a mode of fluidization, reversed agitation, shear force stirring with dissolver, etc. Also preferably employed herein is a magnetic stirring method in which a magnetic stirrer is used for utilizing the shear force to the container bottom.

The ink of the invention may contain a surfactant, which is effective for controlling the liquid properties of the ink, for improving the jet-out stability of the ink, for improving the waterproofness of the images formed of the ink, and for preventing ink bleeding on prints.

The surfactant includes anionic surfactants such as sodium dodecylsulfate, sodium dodecyloxysulfonate, sodium alkylbenzenesulfonate; cationic surfactants such as cetylpyridinium chloride, trimethylcetylammonium chloride, tetrabutylammonium chloride; and nonionic surfactants such as polyoxyethylene nonylphenyl ether, polyoxyethylene naphthyl ether, polyoxyethylene octylphenyl ether. Especially preferred are nonionic surfactants.

The surfactant content of the ink may be from 0.001 to 20% by weight, preferably from 0.005 to 10% by weight, more preferably from 0.01 to 5% by weight.

In case where the above-mentioned dyes are oil-soluble dyes, then they may be dissolved in a high-boiling-point organic solvent, and then emulsified and dispersed in an aqueous medium to prepare the ink of the invention.

The boiling point of the high-boiling-point organic solvent for use in the invention is 150° C. or higher, but preferably 170° C. or higher.

For example, the solvent includes phthalate (e.g., dibutyl phthalate, dioctyl phthalate, dicyclohexyl phthalate, di-2-ethylhexyl phthalate, decyl phthalate, bis(2,4-di-tert-amylphenyl) isophthalate, bis(1,1-diethylpropyl) phthalate), phosphoric acid or phosphone esters (e.g., diphenylphosphate, triphenylphosphate, tricresyl phosphate, 2-ethylhexyldiphenyl phosphate, dioctylbutyl phosphate, tricyclohexyl phosphate, tri-2-ethylhexyl phosphate, tridecyl phosphate, di-2-ethylhexylphenyl phosphate), benzoates (e.g., 2-ethylhexylbenzoate, 2,4-dichlorobenzoate, dodecylbenzoate, 2-ethylhexyl p-hydroxybenzoate), amides (e.g., N,N-diethyldodecanamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chloroparaffins (e.g., paraffins having a chlorine content of from 10% to 80%), trimesates (e.g., tributyl trimesate), dodecylbenzene, diisopropylnaphthalane, phenols (e.g., 2,4-di-tert-amylphenol, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxybutyric acid, 2-ethoxyoctane-decanoic acid), alkyl phosphates (e.g., di-2(ethylhexyl) phosphate, diphenyl phosphate). The amount of the high-boiling-point organic solvent to be used may be from 0.01 to 3 times, preferably from 0.01 to 1.0 time the oil-soluble dye in terms of the ratio by weight of the two.

The high-boiling-point organic solvents may be used either singly or as combined (for example, tricresyl phosphate and dibutyl phthalate; trioctyl phosphate and di(2-ethylhexyl) sebacate; dibutyl phthalate and poly(N-t-butylacrylamide)).

Other examples than those mentioned hereinabove for the high-boiling-point organic solvent usable in the invention and/or methods for producing these high-boiling-point organic solvents are described, for example, in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,837, 4,430,421, 4,430,422, 4,464,464, 4,483,918, 4,540,657, 4,684,606, 4,728,599, 4,745,049, 4,935,321, 5,013,639; EP 276,319A, 286,253A, 289,820A, 309,158A, 309,159A, 309,160A, 509,311A, 510, 576A; East German Patents 147,009, 157, 147, 159, 573, 225,240A; British Patent 2,091,124A; JP-A 48-47335, 50-26530, 51-25133, 51-6036, 51-27921, 51-27922, 51-149028, 52-46816, 53-1520, 53-1521, 53-15127, 53-146622, 54-91325, 54-106228, 54-118246, 55-59464, 56-64333, 56-81836, 59-204041, 61-84641, 62-118345, 62-247364, 63-167357, 63-214744, 63-301941, 64-9452, 64-6454, 64-68745, 1-101543, 1-102454, 2-792, 2-4239, 2-43541, 4-29237, 4-30165, 4-232946, 4-346338.

The amount of the high-boiling-point organic solvent to be used may be from 0.01 to 3 times, preferably from 0.01 to 1.0 time the oil-soluble dye in terms of the ratio by weight of the two.

In the invention, the oil-soluble dye and the high-boiling-point organic solvent are emulsified and dispersed in an aqueous medium. For their better emulsification, a low-boiling-point organic solvent may be used. The low-boiling-point organic solvent has a boiling point at normal pressure of from about 30° C. to 150° C. Its preferred examples are esters (e.g., ethyl acetate, butyl acetate, ethylpropionate, β-ethoxyethyl acetate, methyl cellosolve acetate), alcohols (e.g., isopropyl alcohol, n-butyl alcohol, sec-butyl alcohol), ketones (e.g., methyl isobutyl ketone, methyl ethyl ketone, cyclohexanone), amides (e.g., dimethylformamide, N-methylpyrrolidone), ethers (e.g., tetrahydrofuran, dioxane), which, however, are not limitative.

The emulsifying dispersion is as follows: A dye is dissolved in a high-boiling-point organic solvent alone, or its mixture with a low-boiling-point organic solvent to prepare an oil phase, and this is dispersed in an aqueous phase essentially comprising water to thereby form fine oily droplets of the oily phase. In this process, additives such as surfactant, moisturizer, dye stabilizer, emulsion stabilizer, preservative and antifungal may be added to any one or both of the aqueous phase and the oily phase, if desired.

For the emulsification, in general, the oily phase is added to the aqueous phase. Contrary to this, however, the aqueous phase may be dropwise added to the oily phase in a mode of phase-conversion emulsification. This is also preferable in the invention. When the dye for use in the invention is a water-soluble one and the additives are oil-soluble ones, then the emulsification method may also be employed.

Various surfactants may be used in the emulsification. For example, preferred are anionic surfactants such as fatty acid salts, alkyl sulfate salts, alkylbenzenesulfonate salts, alkylnaphthalene sulfonate salts, dialkylsulfosuccinate salts, alkylphosphate salts, naphthalenesulfonate-formalin condensates, polyoxyethylene alkylsulfate salts; and nonionic surfactants such as polyoxyethylene alkyl ethers, polyoxyethylene alkylaryl ethers, polyoxyethylene fatty acid esters, sorbitan fatty acid esters, polyoxyethylene sorbitan fatty acid esters, polyoxyethylene alkylamines, glycerin fatty acid esters, oxyethylene-oxypropylene block copolymers. Also preferred are acetylene-based polyoxyethylene oxide surfactant, Surfynols (by Air Products & Chemicals). Also preferred are amine oxide-type ampholytic surfactants such as N,N-dimethyl-N-alkylamine oxides. In addition, the surfactants described in JP-A 59-157636, pp. 37-38; and *Research Disclosure* No. 308119 (1989) are also usable herein.

For stabilizing the emulsion immediately after its preparation, a water-soluble polymer may be added thereto along with the above-mentioned surfactant. Preferred examples of the water-soluble polymer are polyvinyl alcohol, polyvinylpyrrolidone, polyethylene oxide, polyacrylic acid, polyacrylamide and their copolymers. Also preferably used are natural water-soluble polymers such as polysaccharides, casein, gelatin. For stabilizing the dye dispersion, further usable are polymers not substantially dissolving in aqueous media, for example, polyvinyl compounds, polyurethanes, polyesters, polyamides, polyureas, polycarbonates and others that are obtained through polymerization of acrylates, methacrylates, vinyl esters, acrylamides, methacrylamides, olefins, styrenes, vinyl ethers, acrylonitriles, etc. Preferably, these polymers have $-SO_3^-$ or $-COO^-$. When such polymers not substantially dissolving in aqueous media are used herein, their amount is preferably at most 20% by weight, more preferably at most 10% by weight of the high-boiling-point organic solvent.

When the oil-soluble dye and the high-boiling-point organic solvent are emulsified and dispersed to prepare aqueous ink, it is a matter of great importance to control the particle size of the dye dispersion. In order to increase the color purity and the density of the image formed in a mode of inkjet, it is indispensable to reduce the mean particle size of the dye particles in the inkjet ink. Preferably, the volume-average particle size of the dye particles is at most 1 μm, more preferably from 5 to 100 nm.

The volume-average particle size and the particle size distribution of the dispersed dye particles may be readily determined in any known method. For it, for example, employable is a static light scattering method, a dynamic light scattering method, a centrifugal precipitation method, as well as the methods described in *Lecture of Experimental Chemistry*, 4th Ed., pp. 417-418. Concretely, an ink sample is diluted with distilled water to have a dye particle concentration of from 0.1 to 1% by weight, and then analyzed with a commercially-available, volume-average particle sizer (e.g., Microtrack UPA, by Nikkiso) to determine the particle size of the dye particles. A dynamic light scattering method based on a laser Doppler effect is especially preferred for the measurement, in which even small particles can be measured.

The volume-average particle size is a mean particle size that is weighted by the volume of the particles. This is obtained by dividing the sum total of the products that are obtained by multiplying the diameter of each aggregated particle by the volume thereof, by the overall volume of all the particles. The volume-average particle size is described, for example, in S. Muroi, *Chemistry of Polymer Latex* (by Polymer Publishing), page 119.

It has become obvious that coarse particles have a significant influence on the printability of ink. Concretely, coarse particles clog heads, or even though not clogging, they soil heads and, as a result, ink could not be jetted out at all or is jetted unevenly. To that effect, coarse particles have a significant influence on the printability of ink. To evade the trouble, it is important that 1 μl of ink contains at most 10 particles having a particle size of 5 μm or more and at most 1000 particles having a particle size of 1 μm or more.

To remove such coarse particles, for example, employable is any known centrifugation or precision filtration. The treatment for removing the coarse particles may be effected just after an emulsified dispersion for ink has been prepared, or after various additives such as moisturizer, surfactant and others have been added to the emulsified dispersion and just before the resulting ink is charged into an ink cartridge.

For effectively reducing the mean particle size and for removing coarse particles, employable is a mechanical emulsifier.

The emulsifier may be any known one, including, for example, simple stirrers, impeller-assisted stirrers, in-line stirrers, mills such as colloid mills, ultrasonic stirrers. Above all, high-pressure homogenizers are especially preferred.

The mechanism of high-pressure homogenizers is described in detail, for example, in U.S. Pat. No. 4,533,254 and JP-A 6-47264. Gaulin Homogenizer (by A. P. V. Gaulin), Microfluidizer (by Microfluidex) and Ultimizer (by Sugino Machine) are commercially available.

Recently, high-pressure homogenizers as in U.S. Pat. No. 5,720,551 have been developed, which are equipped with a mechanism of finely pulverizing particles in an ultra-high pressure jet flow, and these are preferred for the treatment of emulsification and dispersion in the invention. One example of the emulsifier with such an ultra-high pressure jet flow mechanism is DeBEE2000 (by Bee International).

The pressure in emulsification in such a high-pressure emulsifying disperser is at least 50 MPa, preferably at least 60 MPa, more preferably at least 180 MPa.

Using at least two different types of emulsifiers is especially preferred in the invention. For example, the constituent components are first emulsified in a stirring emulsifier and then further emulsified in a high-pressure homogenizer. Also preferred is a method that comprises once emulsifying and dispersing the constituent components in the emulsifier as above, then adding additives such as moisturizer, surfactant and others to the resulting emulsion, and further emulsifying it in a high-pressure homogenizer before the resulting ink is charged into a cartridge.

In case where a low-boiling-point organic solvent is used along with the high-boiling-point organic solvent as above, it is desirable to remove the low-boiling-point solvent from the emulsion for ensuring the stability, the safety and the sanitation of the emulsion. For removing the low-boiling-point solvent, various methods may be employed depending on the type of the solvent to be removed. For example, employable is evaporation, vacuum evaporation or ultrafiltration. It is desirable that the low-boiling-point organic solvent is removed as soon as possible immediately after the preparation of the emulsion.

Methods of preparing inkjet ink are described in detail, for example, in JP-A 5-148436, 5-295312, 7-97541, 7-82515, 7-118584, and the description may apply to the preparation of the ink of the invention.

The ink of the invention may contain various functional components for imparting various functions to the ink. For example, the functional components are various solvents such as those mentioned above, as well as a drying inhibitor for preventing the ink from drying at the inkjet nozzle orifice and for preventing the nozzle from being clogged, a penetration promoter for promoting the penetration of the ink into paper, and other various additives such as UV absorbent, antioxidant, viscosity improver, surface tension improver, dispersant, dispersion stabilizer, antifungal, rust-proofing agent, pH-controlling agent, defoaming agent, chelating agent. The ink of the invention may contain any of these suitably selected for it. Some functional components may exhibit one or more functions by themselves. Accordingly, regarding the blend ratio of the functional components to be in the ink of the invention mentioned below, the functional components having multiple functions by themselves are independently calculated for the respective functions thereof.

For the drying inhibitor, preferred is a water-soluble organic solvent having a lower vapor pressure than water. Its concrete examples are polyalcohols such as typically ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, trimethylolpropane; polyalcohol lower alkyl ethers such as ethylene glycolmonomethyl (or ethyl) ether, diethylene glycol monomethyl (or ethyl) ether, triethylene glycol monoethyl (or butyl) ether; heterocyclic compounds such as 2-pyrrolidone, N-methyl-2-pyrrolidone, 1,3-dimethyl-2-imidazolidinone, N-ethylmorpholine; sulfur-containing compounds such as sulforane, dimethyl sulfoxide, 3-sulforene; polyfunctional compounds such as diacetone alcohol, diethanolamine; and urea derivatives. Of those, more preferred are polyalcohols such as glycerin and diethylene glycol. One or more of these drying inhibitors may be used either singly or as combined. Preferably, the drying inhibitor content of the ink is from 10 to 50% by weight.

For the penetration promoter, for example, herein usable are alcohols such as ethanol, isopropanol, butanol, di(tri) ethylene glycol monobutyl ether, 1,2-hexanediol; and non-ionic surfactants such as sodium laurylsulfate, sodium oleate. In general, the penetration promoter is enough when its amount in the ink is from 10 to 30% by weight. However, its amount is preferably so controlled that the ink does not cause bleeding and print-through.

The UV absorbent is for improving the image stability. For the UV absorbent, herein usable are benzotriazole compounds as in JP-A 58-185677, 61-190537, 2-782, 5-197075, 9-34057; benzophenone compounds as in JP-A 46-2784, 5-194483, and U.S. Pat. No. 3,214,463; cinnamate compounds as in JP-B 48-30492, 56-21141, and JP-A 10-88106; triazine compounds as in JP-A 4-298503, 8-53427, 8-239368, 10-182621, and JP-T 8-501291; compounds as in Research Disclosure No. 24239; and other compounds capable of absorbing U rays to emit fluorescence, or that is, fluorescent brighteners such as typically stilbene compounds and benzoxazole compounds.

The antioxidant is for improving the image stability. For it, herein usable are various organic or metal complex-type fading inhibitors. The organic fading inhibitors include hydroquinones, alkoxyphenols, dialkoxyphenols, phenols, anilines, amines, indanes, chromans, alkoxyanilines, and heterocyclic compounds; and the metal complexes include nickel complexes and zinc complexes. More concretely, herein usable are the compounds described in the patent publications that are referred to in Research Disclosure No. 17643, Items VII-I to J, No. 15162, No. 18716, page 650, left column, No. 36544, page 527, No. 307105, page 872, and No. 15162, aswell as the compounds that fall within the range of the general formula to indicate the typical compounds and the examples of the compounds described in pp. 127-137 of JP-A 62-215272.

The antifungal agent includes sodium dehydroacetate, sodium benzoate, sodium pyridinethione-1-oxide, ethyl p-hydroxybenzoate, 1,2-benzisothiazolin-3-one and its salts. Preferably, its amount in the ink is from 0.02 to 5.00% by weight.

Its details are described in, for example, Dictionary of *Antibacterials and Antifungals* (by the Dictionary Section of the Antibacterial and Antifungal Society of Japan).

The rust-proofing agent includes, for example, acidic sulfites, sodium thiosulfate, ammonium thioglycolate, diisopropylammonium nitrite, pentaerythritol tetranitrate, dicyclohexylammonium nitrite, benzotriazole. Preferably, its amount in the ink is from 0.02 to 5.00% by weight.

The pH-controlling agent is preferably used for pH control and for dispersion stabilization. Preferably, the pH of the ink is controlled to fall between 8 and 11 at 25° C. If the pH is lower than 8, then the dye solubility will lower and nozzles will be readily clogged. However, if the pH is higher than 11, the waterproofness of the ink will be poor. The pH-controlling agent may be a basic compound such as organic bases and inorganic alkalis, or an acidic compound such as organic acids and inorganic acids.

The basic compound includes, for example, sodium hydroxide, potassium hydroxide, sodium carbonate, potassium carbonate, sodium hydrogencarbonate, potassium hydrogencarbonate, sodium acetate, potassium acetate, sodium phosphate, sodium monohydrogen phosphate and other inorganic compounds, as well as aqueous ammonia, methylamine, ethylamine, diethylamine, triethylamine, ethanolamine, diethanolamine, triethanolamine, ethylenediamine, piperidine, diazabicyclooctane, diazabicycloundecene, pyridine, quinoline, picoline, lutidine, collidine and other organic bases.

The acidic compound includes, for example, inorganic compounds such as hydrochloric acid, sulfuric acid, phosphoric acid, boric acid, sodium hydrogensulfate, potassium hydrogensulfate, potassium dihydrogenphosphate, sodium dihydrogenphosphate; and organic compounds such as acetic acid, tartaric acid, benzoic acid, trifluoroacetic acid, methanesulfonic acid, ethanesulfonic acid, benzenesulfonic acid, p-toluenesulfonic acid, saccharinic acid, phthalic acid, picolinic acid, quinolinic acid.

The conductivity of the ink of the invention may fall between 0.01 and 10 S/m, preferably between 0.05 and 5 S/m.

The conductivity may be measured according to an electrode method using a commercially-available saturated potassium chloride.

The conductivity may be controlled essentially by the ion concentration of the aqueous solution. When the salt concentration thereof is high, the solution may be de-salted through ultrafiltration. When a salt or the like is added to control the conductivity of the solution, various organic salts or inorganic salts may be used for the purpose.

The inorganic and organic salts are, for example, inorganic compounds such as potassium halides, sodium halides, sodium sulfate, potassium sulfate, sodium hydrogensulfate, potassium hydrogensulfate, sodium nitrate, potassium nitrate, sodium hydrogencarbonate, potassium hydrogencarbonate, sodium phosphate, sodium monohydrogenphosphate, borates, potassium dihydrogenphosphate, sodium dihydrogenphosphate; and organic compounds such as sodium acetate, potassium acetate, potassium tartrate, sodium tartrate, sodium benzoate, potassium benzoate, sodium p-toluenesulfonate, potassium saccharinate, potassium phthalate, sodium picolinate.

The conductivity of the ink may also be controlled by specifically selecting the components of the aqueous medium for it, which will be described hereinunder.

The viscosity of the ink of the invention is preferably from 1 to 30 mPa·s at 25° C., more preferably from 2 to 15 mPa·s, even more preferably from 2 to 10 mPa·s. If the viscosity is higher than 30 mPa·s, the fixation of the recorded image may be retarded and the ink jet-out potency may lower. If the viscosity is lower than 1 mPa·s, the recorded image may be blurred and its quality is therefore lowered.

The viscosity may be controlled in any desired manner by controlling the amount of the ink solvent. The ink solvent includes, for example, glycerin, diethylene glycol, triethanolamine, 2-pyrrolidone, diethylene glycol monobutyl ether, triethylene glycol monobutyl ether.

If desired, a viscosity improver may be used. The viscosity improver includes, for example, celluloses, water soluble polymers such as polyvinyl alcohol, and nonionic surfactants. Its details are described in, for example, *Viscosity Control Technology* (by the Technology Information Association, 1999), Chap. 9; *Chemicals for Inkjet Printers* (extra ed., '98)—Investigation of Trends and Views in Development of Materials (by CMC, 1997), pp. 162-174.

Methods of measuring the viscosity of liquid are described in detail in JIS Z8803. In the invention, the viscosity of the ink may be readily measured in a simple manner by the use of commercially-available viscometers. For example, there are known Tokyo Instrument's rotary viscometers, B-type Viscometer and E-type Viscometer. In the invention, Yamaichi Electric's shaking viscometer, VM-100A-L Model was used to measure the viscosity at 25° C. The viscosity unit is Pascal-second (Pa·s), but generally milli-Pascal-second (mPa·s).

Preferably, the surface tension of the ink of the invention is from 20 to 50 mN/m at 25° C., both in terms of the dynamic surface tension and the static surface tension. More preferably, it is from 20 to 40 mN/m. If the surface tension is higher than 50 mN/m, then the jet-out stability of the ink will be poor. If so, in addition, the print formed through multi-color superimposition will be blurred and whiskered and the print quality will be significantly lowered. On the other hand, if the surface tension thereof is lower than 20 mN/m, the ink may adhere to the surfaces of printer tools to worsen the print quality.

For controlling the surface tension of the ink, various cationic, anionic, nonionic or betaine-type surfactants such as those mentioned hereinabove may be added to the ink. If desired, two or more different types of surfactants may be combined for use in the ink.

For measuring the static surface tension of ink, known are a capillary ascending method, a dropping method, and a ring hanging method. In the invention, the static surface tension of the ink is measured according to a vertical plate method.

Briefly, when a thin plate of glass or platinum is hung vertically while a part of it is dipped in a liquid, then the surface tension of the liquid acts in the downward direction along the part at which the liquid is in contact with the plate. The force of surface tension is balanced with a force acting in the upward direction to thereby determine the surface tension of the liquid.

For measuring the dynamic surface tension of ink, known are a vibration jetting method, a meniscus dropping method, and a maximum bubble pressure method, for example, as in *Lecture of New Experimental Chemistry*, Vol. 18, "Interface and Colloid" (by Maruzen), pp. 69-90 (1977). Also known is a liquid membrane breaking method, for example, as in JP-A 3-2064. In the invention, the dynamic surface tension of the ink is measured according to a bubble pressure differential method. The principle and the mechanism of the method are described below.

When an uniform solution prepared by stirring it is bubbled, then new vapor-liquid interfaces are formed, and surfactant molecules in the solution gather around the surface of water at a constant rate. In that condition, the bubble rate (bubble-forming rate) is varied. When the bubble rate is slow, then a larger number of surfactant molecules gather around the surfaces of the bubbles formed, and the maximum bubble pressure just before the bubbles crack is low. The maximum bubble pressure (surface tension) to the bubble rate is detected. One preferred embodiment of measuring the dynamic surface tension of the ink is as follows: One large probe and one small probe, totaling two, are used, and bubbles are formed in the ink. In the maximum bubble pressure condition of the two probes, the differential pressure is measured, and the dynamic surface tension of the ink is calculated from it.

Preferably, the nonvolatile content of the ink of the invention is from 10 to 70% by weight of the ink for ensuring jet-out stability of the ink and ensuring good print quality thereof in point of the image fastness, the image blurring resistance and the non-stickiness of the printed matter. More preferably, it is from 20 to 60% by weight for more favorably ensuring the jet-out stability of the ink and ensuring the good print quality thereof especially in point of the image blurring resistance of the printed matter.

The nonvolatile content includes liquid and solid components and polymer component having a boiling point not lower than 150° C. under one atmosphere. The nonvolatile components of ink for inkjet recording are dye, high-boiling-point solvent, and other optional polymer latex, surfactant, dye stabilizer, antifungal and buffer. Most of these nonvolatile components except dye stabilizer lower the dispersion stability of ink, and remain on the printed paper to interfere with dye association and stabilization thereon, and, as a result, the image fastness is thereby worsened and the printed image is often blurred under high-humidity condition.

The ink of the invention may contain a polymer compound. The polymer compound is meant to indicate any and every polymer compound having a number-average molecular weight of at least 5000 in the ink. The polymer compound includes water-soluble polymer compounds that are substantially soluble in aqueous media, water-dispersible polymer compounds such as polymer latex and polymer emulsion, as well as alcohol-soluble polymer compounds that are soluble in polyalcohols serving as auxiliary solvent. So far as they substantially uniformly dissolve or disperse in ink, any polymer compounds may be in the ink of the invention.

Examples of the water-soluble polymer compounds are polyvinyl alcohol, silanol-modified polyvinyl alcohol, carboxymethyl cellulose, hydroxyethyl cellulose, polyvinylpyrrolidone, polyalkylene oxides such as polyethylene oxide, polypropylene oxide, polyalkylene oxide derivatives and other water-soluble polymers; as well as natural water-soluble polymers such as polysaccharides, starch, cationated starch, casein, gelatin; aqueous acrylic resins such as polyacrylic acid, polyacrylamide and their copolymers; aqueous alkyd resins, and other water-soluble polymer compounds having $—SO_3^-$ or $—COO^-$ in the molecule and substantially soluble in aqueous media.

The polymer latex includes, for example, styrene-butadiene latex, styrene-acryl latex, polyurethane latex. The polymer emulsion is acrylic emulsion, etc.

These water-soluble polymer compounds may be used either singly or as combined.

The water-soluble polymer compound is used as a viscosity improver, as so mentioned hereinabove, for controlling the ink viscosity to fall within a suitable viscosity region for ensuring good jet-out potency of the ink. However, if the ink contains the compound too much, then the ink viscosity may increase and the jet-out stability of the ink will be poor. If so, in addition, the ink may form precipitates when stored, and may therefore clog nozzles.

The amount of the polymer compound to be added to the ink for viscosity control may be from 0 to 5% by weight of the ink, though depending on the molecular weight of the compound (the amount of the compound having a higher molecular weight may be smaller). Preferably, it is from 0 to 3% by weight, more preferably from 0 to 1% by weight.

In the invention, various cationic, anionic, nonionic and betaine-type surfactants such as those mentioned hereinabove may be used as a dispersant and a dispersion stabilizer, and fluorine-containing compounds, silicone compounds and chelating agents such as EDTA may be used as a defoaming agent, if desired.

Reflection media are preferred for the printing media for use in the invention. Reflection media include, for example, recording paper and recording films. The support for recording paper and recording films may be formed of chemical pulp such as LBKP, NBKP; mechanical pulp such as GP, PGW, RMP, TMP, CTMP, CMP, CGP; or recycled paper pulp such as DIP. If desired, any known additives such as pigment, binder, sizing agent, fixer, cationating agent and paper strength enhancer may be added thereto. Various paper-making machines such as Fourdrinier paper machine and cylinder paper machine may be used for producing the support. Apart from these supports, also usable herein are synthetic paper and plastic film sheets. Preferably, the thickness of the support is from 10 to 250 μm, and the unit weight thereof is from 10 to 250 g/m².

An image-receiving layer and a back coat layer may be directly formed on the support to prepare the image-receiving material for the ink and the ink set of the invention. If desired, size pressing or anchor coating with starch, polyvinyl alcohol or the like may be applied to the support, and then the support is coated with an image-receiving layer and a back coat layer to be the image-receiving material for use in the invention.

Further if desired, the support may be leveled through machine calendering, TG calendering, soft calendering or the like.

For the support for use in the invention, more preferred are paper and plastic films, both surfaces of which are laminated with polyolefin (e.g., polyethylene, polystyrene, polybutene or their copolymer) or polyethylene terephthalate. Also preferably, white pigment (e.g., titanium oxide, zinc oxide) or tinting dye (e.g., cobalt blue, ultramarine, neodymium oxide) is added to polyolefin.

The image-receiving layer formed on the support contains a porous material and an aqueous binder. Preferably, the image-receiving layer contains a pigment. For the pigment, preferred is white pigment. The white pigment includes inorganic white pigment such as calcium carbonate, kaolin, talc, clay, diatomaceous earth, synthetic amorphous silica, aluminium silicate, magnesium silicate, calcium silicate, aluminium hydroxide, alumina, lithopone, zeolite, barium sulfate, calcium sulfate, titanium dioxide, zinc sulfide, lead carbonate; and organic white pigment such as styrenic pigment, acrylic pigment, urea resin, melamine resin. Porous, inorganic white pigment is especially preferred, and synthetic amorphous silica having a large pore area is more preferred. Synthetic amorphous silica may be any of anhydrous silica obtained in a dry process (vapor phase process) or a hydrous silica obtained in a wet process.

Examples of the recording paper that contains the above-mentioned pigment in its image-receiving layer are concretely disclosed in JP-A 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777, 2001-301314, and any of these may be used herein.

The aqueous binder to be in the image-receiving layer includes water-soluble polymers such as polyvinyl alcohol, silanol-modified polyvinyl alcohol, starch, cationated starch, casein, gelatin, carboxymethyl cellulose, hydroxyethyl cellulose, polyvinylpyrrolidone, polyalkylene oxide, polyalkylene oxide derivatives; and water-dispersive polymers such as styrene-butadiene latex, acrylic emulsion. One or more of these aqueous binders may be used herein either singly or as combined. Of those, especially preferred are polyvinyl alcohol and silanol-modified polyvinyl alcohol in point of their adhesiveness to pigment and of the peeling resistance of the ink-receiving layer.

In addition to the pigment and the aqueous binder therein, the image-receiving layer may contain any other additives such as mordant, water-proofing agent, light fastness improver, vapor resistance improver, surfactant and hardener.

Preferably, the mordant to be in the ink-receiving layer is passivated. Concretely, a polymer mordant is preferred.

The polymer mordant is described, for example, in JP-A 48-23825, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, 1-161236; U.S. Pat. Nos. 2,484,430, 2,548,564, 3,148,061, 3,309,690, 4,115,124, 4,124,386, 4,193,800, 4,273,853, 4,282,305, 4,450,224. The polymer mordant described in JP-A 1-161236, pp. 212-215 is especially preferred for use in the image-receiving material in the invention. It gives images of good quality and good light fastness.

The water-proofing agent is effective for making images resistant to water. For the water-proofing agent, especially preferred are cationic resins. The cationic resins are, for example, polyamide-polyamine-epichlorohydrin, polyethylene-imine, polyamine-sulfone, dimethyldiallylammonium chloride polymer, cationic polyacrylamide. The cationic resin content of the ink-receiving layer is preferably from 1 to 15% by weight, more preferably from 3 to 10% by weight of the overall solid content of the layer.

The light fastness improver and the vapor resistance improver include, for example, phenol compounds, hindered phenol compounds, thioether compounds, thiourea compounds, thiocyanate compounds, amine compounds, hindered amine compounds, TEMPO compounds, hydrazine compounds, hydrazide compounds, amidine compounds, vinyl-containing compounds, ester compounds, amide compounds, ether compounds, alcohol compounds, sulfinate compounds, saccharides, water-soluble reducible compounds, organic acids, inorganic acids, hydroxyl-containing organic acids, benzotriazole compounds, benzophenone compounds, triazine compounds, heterocyclic compounds, water-soluble metal salts, organic metal compounds, metal complexes.

Specific examples of these compounds are described in JP-A 10-182621, 2001-260519, 2000-260519; JP-B 4-34953, 4-34513, 4-34512; JP-A 11-170686, 60-67190, 7-276808, 2000-94829; JP-T 8-512258; JP-A 11-321090.

The surfactant serves as a coating aid, a release improver, a slide improver or an antistatic agent. It is described in, for example, JP-A 62-173463, 62-183457.

In place of surfactant, organic fluorine-containing compounds may be used. Preferably, the organic fluorine-containing compounds for use herein are hydrophobic. Examples of the organic fluorine-containing compounds are fluorine-containing surfactants, oily fluorine-containing compounds (e.g., fluorine oil), and solid fluorine-containing compound resins (e.g., tetrafluoroethylene resin). The organic fluorine-containing compounds are described in JP-B 57-9053 (columns 8-17); JP-A 61-20994, 62-135826.

For the hardener, herein usable are those described in JP-A 1-161236 (page 222), 9-263036, 10-119423, 2001-310547.

Other additives that may be in the image-receiving layer are pigment dispersant, tackifier, defoaming agent, dye, fluorescent brightener, preservative, pH-controlling agent, mat agent, and hardener. The image-receiving material may have one or more ink-receiving layers.

The recording paper and the recording films may have a back coat layer. The layer may contain white pigment, aqueous binder and other components.

The white pigment that may be in the back coat layer includes, for example, inorganic white pigments such as light calcium carbonate, heavy calcium carbonate, kaolin, talc, calcium sulfate, barium sulfate, titanium dioxide, zinc oxide, zinc sulfide, zinc carbonate, satin white, aluminium silicate, diatomaceous earth, calcium silicate, magnesium silicate, synthetic amorphous silica, colloidal silica, colloidal alumina, pseudo-boehmite, aluminium hydroxide, alumina, lithopone, zeolite, hydrated halloysite, magnesium carbonate, magnesium hydroxide; and organic white pigments such as styrenic plastic pigment, acrylic plastic pigment, polyethylene microcapsules, urea resin, melamine resin.

The aqueous binder that may be in the back coat layer includes, for example, water-soluble polymers such as styrene/maleic acid salt copolymer, styrene/acrylic acid salt copolymer, polyvinyl alcohol, silanol-modified polyvinyl alcohol, starch, cationated starch, casein, gelatin, carboxymethyl cellulose, hydroxyethyl cellulose, polyvinylpyrrolidone; and water-dispersive polymers such as styrene-butadiene latex, acrylic emulsion. The other components that may be in the back coat layer are defoaming agent, antifoaming agent, dye, fluorescent brightener, preservative, waterproofing agent, etc.

A dispersion of polymer particles may be added to the constitutive layers (including back layer) of the inkjet recording paper and films in the invention. The dispersion of polymer particles is for improving the physical properties of the coating layers, for example, for improving the dimensional stability of the layers and for preventing the layers from curling, blocking and cracking. The dispersion of polymer particles is described in, for example, JP-A 62-245258, 62-1316648, 62-110066.

When a dispersion of polymer particles having a low glass transition temperature (not higher than 40° C.) is added to the mordant-containing layer, then it is effective for preventing the layer from cracking and curling. When a dispersion of polymer particles having a high glass transition point is added to the back layer, it is also effective for preventing the layer from curling.

The invention may be utilized for any other applications than those for inkjet recording. For example, it may be utilized for display image formation, indoor decorative image formation, and outdoor decorative image formation.

The applications for display image formation are meant to indicate images formed on posters, wallpapers, decorative small articles (e.g., ornaments, figures), advertising leaflets, wrapping paper, wrapping materials, paper bags, polyvinyl bags, packaging materials, signboards, transport facilities (e.g., cars, buses, trains), as well as logotype-having clothes, etc. When the dye of the invention is used to form such display images, then the images include not only those in the narrow sense of the word but also all color patterns that may be recognized by people such as abstract designs, letters, geometric patterns, etc.

The indoor decorative material for image formation thereon is meant to include various articles such as wallpapers, decorative small articles (e.g., ornaments, figures), lighting instruments, furniture parts, design parts of floors and ceilings, etc. When the dye of the invention is used to form images on such materials, then the images include not only those in the narrow sense of the word but also all color patterns that may be recognized by people such as abstract designs, letters, geometric patterns, etc.

The outdoor decorative material for image formation thereon is meant to include various articles such as wall materials, roofing materials, signboards, gardening materials, outdoor decorative small articles (e.g., ornaments, figures), parts of outdoor lighting instruments, etc. When the dye of the invention is used to form images on such materials, then the images include not only those in the narrow sense of the word but also all color patterns that may be recognized by people such as abstract designs, letters, geometric patterns, etc.

In the above-mentioned applications, the media on which patterns are formed include paper, fibers, cloths (including nonwoven cloths), plastics, metals, ceramics and other various matters. Regarding the dyeing mode on them, the dye may be applied and fixed thereon in any mode of mordanting, printing or chemical reaction for reactive dye with reactive group introduced thereinto. Above all, especially preferred is the mordanting mode of fixing the dye on the media.

In preparing the ink of the invention, ultrasonic waves may be given to the system where dyes and additives are dissolved in a medium.

The ultrasonic vibration in the ink preparation is for removing bubbles from the ink. This is because, when ink receives pressure from a recording head, it may produce bubbles. To prevent this, ultrasonic energy which is equal to or higher than the energy that the ink may receive from a recording head is previously applied to the ink so as to remove the bubbles.

The ultrasonic vibration is generally at a frequency of at least 20 kHz, preferably at least 40 kHz, more preferably at least 50 kHz. The energy to be applied to the ink by the ultrasonic vibration is generally at least $2\times10^{-7}$ J/m$^3$, preferably at least $5\times10^{-7}$ J/m$^3$, more preferably at least $1\times10^{-8}$ J/m$^3$. The time for the ultrasonic vibration is generally from 10 minutes to 1 hour or so.

The ultrasonic vibration may be effectively attained at anytime after the dye has been put into a medium. After the finished ink has been stored, it may be exposed to ultrasonic waves, and this is also effective. However, it is more desirable that ultrasonic waves are applied to the dye while the dye is dissolved and/or dispersed in a medium, since their effect to remove bubbles is larger and since they promote the dissolution and/or dispersion of the dye in the medium.

Accordingly, the ultrasonic treatment may be effected in any stage while or after the dye is dissolved and/or dispersed in a medium. In other words, the ultrasonic treatment may be effected at least once at anytime after the ink has been prepared and before it is finished to be a commercial product.

In one preferred embodiment of the invention, the process of dissolving and/or dispersing the dye in a medium comprises a step of dissolving it in a part of a medium and a step of mixing the remaining medium with the resulting dye solution. Preferably, ultrasonic waves are applied to the system in at least anyone of these steps. More preferably, ultrasonic waves are applied to the system in the former step of dissolving the dye in a part of a medium.

The latter step of mixing the remaining medium with the resulting dye solution may be effected in one stage or in plural stages.

In preparing the ink of the invention, it is desirable that the system is degassed under heat or under reduced pressure. This is preferable for more effectively removing bubbles from the ink. The step of degassing the system under heat or under reduced pressure is preferably effected simultaneously with or after the step of mixing the remaining medium with the previously-prepared dye solution.

Ultrasonic waves to be applied to the system of ink preparation may be generated by the use of any known ultrasonicator.

In preparing the ink of the invention, it is also important to filter the prepared ink composition so as to remove impurities from it. In this treatment, a filter is used. The filter has an effective pore size of at most 1 µm, preferably from 0.05 µm to 0.3 µm, more preferably from 0.25 µm to 0.3 µm. Various materials may be used for forming the filter. Especially for the ink of water-soluble dye, the filter is preferably one that is specifically designed for aqueous solvents. More preferably, the filer is formed of a polymer material that may well trap impurities. For the filtration, the ink composition may be passed through the filter in a mode of ordinary liquid feeding. Apart from it, any other mode of pressure filtration or reduced pressure filtration may also be employed herein.

After the filtration, the ink may often take air therein. Bubbles from the air may often cause disturbed images in inkjet recording. Therefore, it is desirable that the ink is further processed for additional degassing as in the above. For degassing it, for example, the ink may be kept static for a while after filtered, or it may be degassed ultrasonically or under reduced pressure by the use of commercially-available devices. Preferably, the ultrasonic degassing is effected for 30 seconds to 2 hours, more preferably for 5 minutes to 1 hour or so.

These treatments are preferably effected in a space of clean room or clean bench in order to prevent the ink from being contaminated with impurities during the treatments. In the invention, it is desirable that the treatments are effected in a space having a degree of cleanness of at most class 1000. The "degree of cleanness" indicates the value measured with a dust counter.

The dot volume of the ink on the recording material in the invention is preferably from 0.1 pl to 100 pl, more preferably from 0.5 pl to 50 pl, even more preferably from 2 pl to 50 pl.

The system for the inkjet recording method with the ink or the ink set of the invention by the use of an inkjet printer is not specifically defined, for which any known system is employable. For example, employable is any of a charge control system of jetting out ink through electrostatic attractive force; a drop-on-demand system (pressure pulse system) of using the oscillation pressure of a piezoelectric device; an acoustic inkjet system of converting an electric signal into an acoustic beam, applying it to ink, and jetting out the ink under radiation pressure; or a thermal inkjet (bubble jet) system of heating ink to form bubbles and utilizing the resulting pressure.

The inkjet recording system includes a system of jetting a large number of small-volume drops of photoink of low concentration, a system of using multiple inks of substantially the same color which, however, differ in concentration to improve the image quality, and a system of using colorless transparent ink. The dot volume on the recording material is controlled mainly by print head.

For example, in a thermal inkjet system, the dot volume may be controlled depending on the structure of the print head. Concretely, the ink chamber, the heating zone and the nozzle size are varied, and the dot volume may be thereby varied in any desired manner. When multiple print heads that differ in point of the heating zone and the nozzle size are used in a thermal inkjet system, then ink drops of different sizes may be realized.

In a drop-on-demand system using a piezoelectric device, the dot volume may also be varied depending on the structure of the print head, like in the thermal inkjet system as above. In this, however, the waveform of the driving signals of the piezoelectric device may be controlled, as will be mentioned hereinunder, and ink drops of different sizes may be thereby realized through the print head of one and the same structure.

When the ink of the invention is dropwise jetted onto a recording material, the jet-out frequency is preferably at least 1 kHz.

For obtaining high-quality images like photographs, small ink drops must be used for reproducing sharp and high-quality images. For it, the dot density must be at least 600 dpi (dots per inch).

On the other hand, in a recording system where ink is jetted out through heads each having multiple nozzles and where the recording paper moves vertically to the heads, the number of the heads that may be driven at the same time therein may be from tens to 200 or so. Even in a line-head system where plural heads are fixed, the number of the heads that may be driven at the same time therein is limited to hundreds. This is because the driving power is limited, and the heat of the heads may have some influences on the images formed, and therefore a larger number of head nozzles could not be driven at the same time.

When the driving frequency is increased, then the recording speed may be increased.

For controlling the inkjet frequency in a thermal inkjet system, the frequency of the head-driving signal to heat the head is controlled.

In a piezoelectric system, the frequency of the signal to drive the piezoelectric device is controlled.

The driving mechanism of piezoelectric head is described. The image signal for printing is controlled in a printer control zone in point of the dot size, the dot speed, and the dot frequency, and a signal to drive the print head is formed. Thus formed, the driving signal is led to the print head. The piezo-driving signal controls the dot size, the dot speed and the dot frequency. The dot size and the dot speed may be determined by the form and the amplitude of the driving waves, and the frequency is determined by the signal repetitive cycle.

When the dot frequency is set as 10 kHz, then the head is driven in every 100 microseconds, and one line recording will finish for 400 microseconds. When the recording paper traveling speed is so set that the recording paper may travel by 1/600 inches, or that is, by about 42 microns per 400 microseconds, then one sheet may be printed in every 1.2 seconds.

Regarding the constitution of the printing device and the constitution of the printer for use in the invention, for example, the embodiments as in JP-A 11-170527 are preferably referred to. For the ink cartridge, for example, preferred are those illustrated in JP-A 5-229133. Regarding the constitution of the suction mechanism in printing and the constitution of the cap to cover the printing head, for example, preferably referred to are those illustrated in JP-A 7-276671. Also preferably, a filter for bubble removal is provided near the head, for example, as in JP-A 9-277552.

Also preferably, the nozzle surface is processed for water repellency, for example, as in JP-A 2002-292878. Regarding its applications, the ink of the invention may be used in printers that are to be connected with computers, or may be used in printers that are specifically designed exclusively for photographs.

It is desirable that, in the inkjet recording method of the invention, the ink is jetted out onto a recording material at a mean dot rate of at least 2 m/sec, more preferably at least 5 m/sec.

For controlling the dot speed, the form and the amplitude of the head-driving waves may be controlled.

When plural driving waves of different forms are selectively used in one printer, then ink dots of different sizes may be jetted out through one and the same head in the printer.

EXAMPLES

The invention is described with reference to the following Examples, to which, however, the invention should not be limited.

Example 1

Ultrapure water (resistance, at least 18 MΩ) was added to the components shown below to make one liter, and then stirred under heat at 30 to 40° C. for 1 hour. Next, the resulting mixture was filtered under reduced pressure through a microfilter having a mean pore size of 0.25 μm. Inks of different colors were thus prepared.

[Formulation of Light Cyan Ink, LC-101]

(Solid Components)

| | |
|---|---|
| Cyan Dye (C-1) | 20 g/liter |
| Urea (UR) | 15 g/liter |
| Benzotriazole (BTZ) | 0.08 g/liter |
| Proxel XL2 (PXL) | 3.5 g/liter |

(Liquid Components)

| | |
|---|---|
| Triethylene Glycol (TEG) | 110 g/liter |
| Glycerin (GR) | 130 g/liter |
| Triethylene Glycol Monobutyl Ether (TGB) | 110 g/liter |
| 2-Pyrrolidone (PRD) | 60 g/liter |
| Triethanolamine (TEA) | 7 g/liter |
| Surfynol STG (SW) | 10 g/liter |

[Formulation of Cyan Ink, C-101]

(Solid Components)

| | |
|---|---|
| Cyan Dye (C-1) | 60 g/liter |
| Urea (UR) | 30 g/liter |
| Benzotriazole (BTZ) | 0.08 g/liter |
| Proxel XL2 (PXL) | 3.5 g/liter |

(Liquid Components)

| | |
|---|---|
| Triethylene Glycol (TEG) | 110 g/liter |
| Glycerin (GR) | 130 g/liter |
| Triethylene Glycol Monobutyl Ether (TGB) | 130 g/liter |
| 2-Pyrrolidone (PRD) | 60 g/liter |
| Triethanolamine (TEA) | 7 g/liter |
| Surfynol STG (SW) | 10 g/liter |

(Formulation of Light Magenta Ink, LM-101)

(Solid Components)

| | |
|---|---|
| Magenta Dye (M-1) | 7.5 g/liter |
| Urea (UR) | 10 g/liter |
| Proxel | 5 g/liter |

(Liquid Components)

| | |
|---|---|
| Diethylene Glycol (DEG) | 90 g/liter |
| Glycerin (GR) | 70 g/liter |
| Triethylene Glycol Monobutyl Ether (TGB) | 70 g/liter |
| Triethanolamine (TEA) | 6.9 g/liter |
| Surfynol STG (SW) | 10 g/liter |

(Formulation of Magenta Ink, M-101)

(Solid Components)

| | |
|---|---|
| Magenta Dye (M-1) | 23 g/liter |
| Urea (UR) | 15 g/liter |
| Proxel | 5 g/liter |

(Liquid Components)

| | |
|---|---|
| Diethylene Glycol (DEG) | 90 g/liter |
| Glycerin (GR) | 70 g/liter |
| Triethylene Glycol Monobutyl Ether | 70 g/liter |
| Triethanolamine | 6.9 g/liter |
| Surfynol STG | 10 g/liter |

(Formulation of Yellow Ink, Y-101)

(Solid Components)

| | |
|---|---|
| Yellow Dye (Y-1) | 35 g/liter |
| Proxel | 3.5 g/liter |
| Benzotriazole (BTZ) | 0.08 g/liter |
| Urea | 10 g/liter |

(Liquid Components)

| | |
|---|---|
| Triethylene Glycol Monobutyl Ether (TGB) | 130 g/liter |
| Glycerin (GR) | 115 g/liter |
| Diethylene Glycol (DEG) | 120 g/liter |
| 2-Pyrrolidone | 35 g/liter |
| Triethanolamine (TEA) | 8 g/liter |
| Surfynol STG (SW) | 10 g/liter |

(Formulation of Dark Yellow Ink, DY-101)

(Solid Components)

| | |
|---|---|
| Yellow Dye (Y-1) | 35 g/liter |
| Magenta Dye (M-1) | 2 g/liter |
| Cyan Dye (C-1) | 2 g/liter |
| Proxel | 5 g/liter |
| Benzotriazole (BTZ) | 0.08 g/liter |
| Urea | 10 g/liter |

(Liquid Components)

| | |
|---|---|
| Triethylene Glycol Monobutyl Ether (TGB) | 140 g/liter |
| Glycerin (GR) | 125 g/liter |
| Diethylene Glycol (DEG) | 120 g/liter |
| 2-Pyrrolidone | 35 g/liter |

| -continued | |
|---|---|
| Triethanolamine (TEA) | 8 g/liter |
| Surfynol STG (SW) | 10 g/liter |
| (Formulation of Black Ink, Bk-101) | |
| (Solid Components) | |
| Black Dye (Bk-1) | 75 g/liter |
| Black Dye (Bk-2) | 30 g/liter |
| Proxel | 5 g/liter |
| Urea | 10 g/liter |
| Benzotriazole | 3 g/liter |
| (Liquid Components) | |
| Diethylene Glycol Monobutyl Ether (DGB) | 120 g/liter |
| Glycerin (GR) | 125 g/liter |
| Diethylene Glycol (DEG) | 100 g/liter |
| 2-Pyrrolidone | 35 g/liter |
| Triethanolamine (TEA) | 8 g/liter |
| Surfynol STG (SW) | 10 g/liter |

The structures of the dyes mentioned above are shown below.

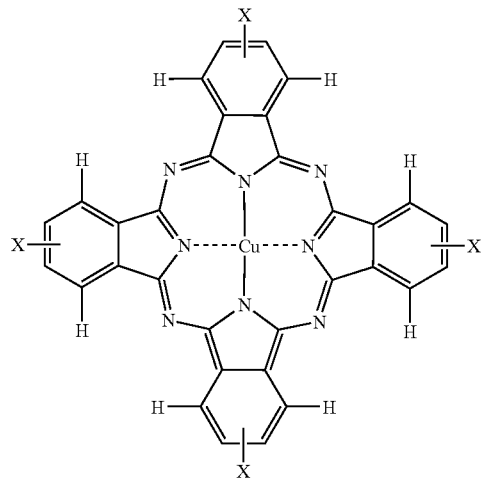

X = A or B
A: $SO_2(CH_2)_3SO_3Li$
B: $SO_2(CH_2)_3SO_2NHCH_2CH(CH_3)OH$
C-1: A/B = 75/25

M-1

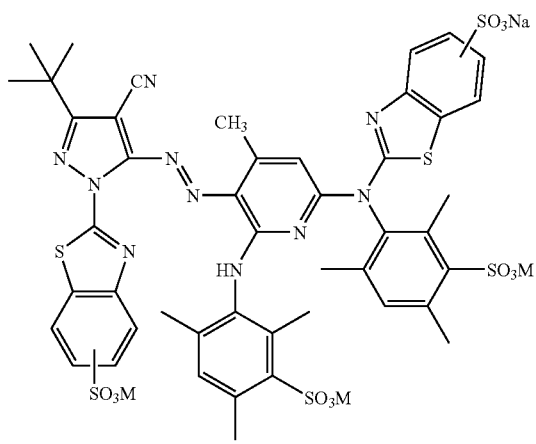

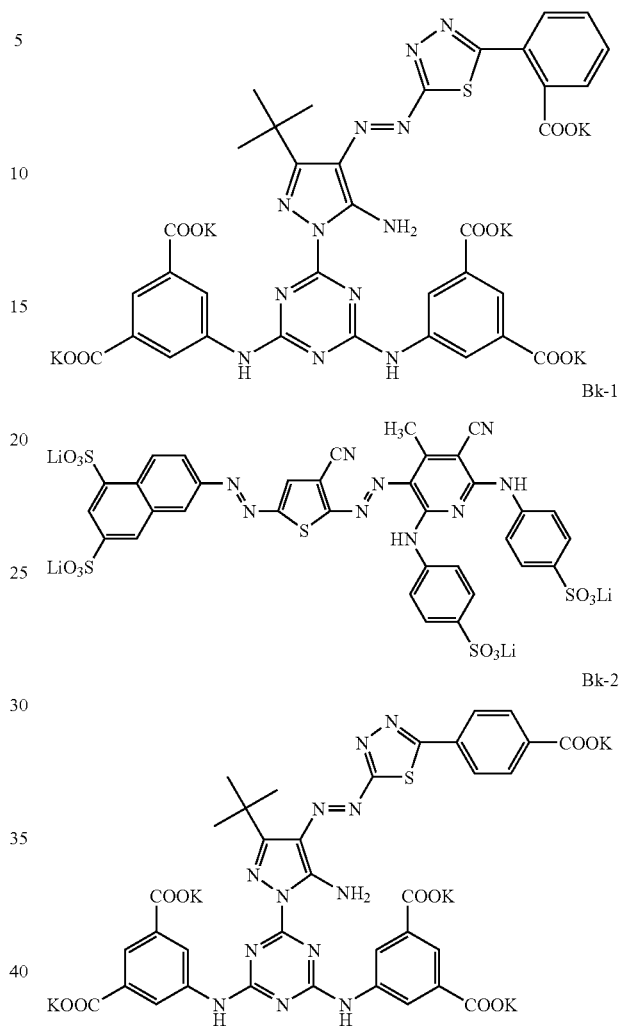

An ink set of these inks was prepared. In addition, yellow inks 102 to 107 were prepared by adding an additive mentioned below to the yellow ink 101. The additives (AC-1, 3, 7, 9, 13) are compounds capable of chemically interacting with the dye in the ink. Thus prepared, the yellow inks were separately combined with the other inks to prepare other ink sets.

TABLE 20

| | Additive |
|---|---|
| Y-101 (comparative sample) | no |
| Y-102 (comparative sample) | relative to Y-101, 1 weight % ethylene carbonate added |
| Y-103 (comparative sample) | relative to Y-101, 1 weight % N,N-dimethylacetamide added |
| Y-104 (sample of the invention) | relative to Y-101, 1 weight % AC-1 added |
| Y-105 (sample of the invention) | relative to Y-101, 1 weight % AC-3 added |
| Y-106 (sample of the invention) | relative to Y-101, 1 weight % AC-7 added |
| Y-107 (sample of the invention) | relative to Y-101, 1 weight % AC-9 added |
| Y-108 (sample of the invention) | relative to Y-101, 1 weight % AC-13 added |

These inks were charged in ink cartridges of Epson's inkjet printer PM-980C, and the printer was driven to print a stepwise density-varying image pattern of 6 colors C, M, Y, B, G and R and gray on an image-receiving sheet.

The image-receiving sheet used herein is Fuji Photo Film's inkjet paper, photo-glossy paper "Gasai".

The samples were tested and evaluated for the image storability.

(1) The light fastness is evaluated as follows: The image density Ci of the fresh sample just after printed is measured with a reflection densitometer (X-Rite 310TR). Then, the printed image is exposed to xenon light (85,000 lux) from Atlas' weather meter for 21 days, and then its image density Cf is measured. The dye retentiveness is obtained from {(Cf/Ci)×100}, and this indicates the light fastness of the ink tested. Regarding the dye retentiveness, three points having an yellow reflection density of 1, 1.5 and 2 are analyzed in every sample. The samples having a dye retentiveness of at least 80% at every point are good (○); those having a dye retentiveness of less than 80% at two points are average (Δ); and those having a dye retentiveness of less than 80% at all three points are not good (X).

(2) The ozone resistance is evaluated as follows: The printed samples are kept in a box having a constant ozone gas concentration of 5 ppm, for 7 days. Before and after exposure to ozone gas, the image density of each sample is measured with a reflection densitometer (X-Rite 310TR), and the dye retentiveness in every sample is determined. Regarding the dye retentiveness, three points having an yellow reflection density of 1, 1.5 and 2 are analyzed in every sample. The ozone gas concentration in the box is kept constant by the use of an ozone gas monitor (Applics' Model OZG-EM-01).

Thus tested, the samples are grouped into three ranks: Those having a dye retentiveness of at least 80% at every point are good (○); those having a dye retentiveness of less than 80% at one or two points are average (Δ); and those having a dye retentiveness of less than 80% at all three points are not good (X).

The results obtained are shown in Table below. The control sample is a commercial product ink set for PM-980C.

TABLE 21

| Ink No. | Light Fastness Evaluation | Ozone Resistance Evaluation |
| --- | --- | --- |
| PM-980C (control) | x | x |
| Y-101 (comparative sample) | x | Δ |
| Y-102 (comparative sample) | x | Δ |
| Y-103 (comparative sample) | x | Δ |
| Y-104 (sample of the invention) | ○ | ○ |
| Y-105 (sample of the invention) | ○ | ○ |
| Y-106 (sample of the invention) | ○ | ○ |
| Y-107 (sample of the invention) | ○ | ○ |
| Y-108 (sample of the invention) | ○ | ○ |

The results as above clearly support the effect of the invention.

Example 2

Ultrapure water (resistance, at least 18 MΩ) was added to the components shown below to make one liter, and then stirred under heat at 30 to 40° C. for 1 hour. Next, the resulting mixture was filtered under reduced pressure through a microfilter having a mean pore size of 0.25 μm. Inks of different colors were thus prepared.

[Formulation of Photo Cyan Ink, LC-201]

(Solid Components)

| | |
| --- | --- |
| Cyan Dye (C-1) | 10 g/liter |
| Urea (UR) | 15 g/liter |
| Benzotriazole (BTZ) | 0.08 g/liter |
| Proxel XL2 (PXL) | 3.5 g/liter |

(Liquid Components)

| | |
| --- | --- |
| Triethylene Glycol (TEG) | 50 g/liter |
| Glycerin (GR) | 100 g/liter |
| Triethylene Glycol Monobutyl Ether (TGB) | 60 g/liter |
| 1,5-pentanediol (PTD) | 40 g/liter |
| Isopropanol (IPA) | 20 g/liter |
| Triethanolamine (TEA) | 7 g/liter |
| Surfynol STG (SW) | 10 g/liter |

[Formulation of Cyan Ink, C-201]

(Solid Components)

| | |
| --- | --- |
| Cyan Dye (C-1) | 30 g/liter |
| Urea (UR) | 40 g/liter |
| Benzotriazole (BTZ) | 0.08 g/liter |
| Proxel XL2 (PXL) | 3.5 g/liter |

(Liquid Components)

| | |
| --- | --- |
| Triethylene Glycol (TEG) | 40 g/liter |
| Glycerin (GR) | 100 g/liter |
| Triethylene Glycol Monobutyl Ether (TGB) | 70 g/liter |
| 1,5-Pentanediol (PTD) | 50 g/liter |
| Isopropanol (IPA) | 20 g/liter |
| Triethanolamine (TEA) | 7 g/liter |
| Surfynol STG (SW) | 10 g/liter |

(Formulation of Photo Magenta Ink, LM-201)

(Solid Components)

| | |
| --- | --- |
| Magenta Dye (M-1) | 7.5 g/liter |
| Urea (UR) | 10 g/liter |
| Proxel | 5 g/liter |

(Liquid Components)

| | |
| --- | --- |
| Triethylene Glycol (TEG) | 40 g/liter |
| Glycerin (GR) | 100 g/liter |
| Triethylene Glycol Monobutyl Ether (TGB) | 60 g/liter |
| 1,5-Pentanediol (PTD) | 40 g/liter |
| Isopropanol (IPA) | 20 g/liter |
| Triethanolamine (TEA) | 6.9 g/liter |
| Surfynol STG (SW) | 10 g/liter |

(Formulation of Magenta Ink, M-201)

(Solid Components)

| | |
| --- | --- |
| Magenta Dye (M-1) | 23 g/liter |
| Urea (UR) | 15 g/liter |
| Proxel | 5 g/liter |

(Liquid Components)

| | |
| --- | --- |
| Triethylene Glycol (TEG) | 50 g/liter |
| Glycerin (GR) | 100 g/liter |
| Triethylene Glycol Monobutyl Ether (TGB) | 50 g/liter |
| 1,5-Pentanediol (PTD) | 40 g/liter |
| Isopropanol (IPA) | 20 g/liter |
| Triethanolamine | 6.9 g/liter |
| Surfynol STG | 10 g/liter |

(Formulation of Yellow Ink, Y-201)

(Solid Components)

| | |
| --- | --- |
| Yellow Dye (Y-1) | 35 g/liter |
| Proxel | 3.5 g/liter |
| Benzotriazole (BTZ) | 0.08 g/liter |
| Urea | 10 g/liter |

-continued

| (Liquid Components) | |
|---|---|
| Triethylene Glycol (TEG) | 40 g/liter |
| Glycerin (GR) | 100 g/liter |
| Triethylene Glycol Monobutyl Ether (TGB) | 70 g/liter |
| 1,5-Pentanediol (PTD) | 60 g/liter |
| Isopropanol (IPA) | 20 g/liter |
| Triethanolamine (TEA) | 8 g/liter |
| Surfynol STG (SW) | 10 g/liter |
| (Formulation of Black Ink, Bk-201) | |
| (Solid Components) | |
| Black Dye (Bk-1) | 75 g/liter |
| Black Dye (Bk-2) | 30 g/liter |
| Proxel | 5 g/liter |
| Urea | 10 g/liter |
| Benzotriazole | 3 g/liter |
| (Liquid Components) | |
| Triethylene Glycol (TEG) | 60 g/liter |
| Glycerin (GR) | 100 g/liter |
| Triethylene Glycol Monobutyl Ether (TGB) | 70 g/liter |
| 1,5-Pentanediol (PTD) | 60 g/liter |
| Isopropanol (IPA) | 20 g/liter |
| Triethanolamine (TEA) | 8 g/liter |
| Surfynol STG (SW) | 10 g/liter |

An ink set of these inks was prepared. In addition, black inks 202 to 207 were prepared by adding an additive mentioned below to the black ink 201. Thus prepared, the black inks were separately combined with the other inks to prepare other ink sets.

TABLE 22

| | Additive |
|---|---|
| Bk-201 (comparative sample) | no |
| Bk-202 (comparative sample) | relative to Bk-201, 1 weight % diethyl carbonate added |
| Bk-203 (comparative sample) | relative to Bk-201, 1 weight % N,N-dimethylacetamide added |
| Bk-204 (sample of the invention) | relative to Bk-201, 1 weight % AC-2 added |
| Bk-205 (sample of the invention) | relative to Bk-201, 1 weight % AC-4 added |
| Bk-206 (sample of the invention) | relative to Bk-201, 1 weight % AC-9 added |
| Bk-207 (sample of the invention) | relative to Bk-201, 1 weight % AC-13 added |

These inks were charged in ink cartridges of Canon's inkjet printer PIXUS950i, and the printer was driven to print a stepwise density-varying image pattern of 6 colors C, M, Y, B, G and R and gray on an image-receiving sheet.

The image-receiving sheet used herein is copying wood-free paper, and Fuji Photo Film's inkjet paper, photo-glossy paper "Gasai".

The image fastness was evaluated in the same manner as in Example 1, but for the gray part of each sample herein. Via a visual filter, the image density was determined in terms of the reflection density (Dvis) of each sample.

The results are shown below.

TABLE 23

| Ink No. | Light Fastness Evaluation | Ozone Resistance Evaluation |
|---|---|---|
| PM-980C (control) | x | x |
| Bk-201 (comparative sample) | Δ | Δ |
| Bk-202 (comparative sample) | Δ | Δ |
| Bk-203 (comparative sample) | Δ | Δ |
| Bk-204 (sample of the invention) | ○ | ○ |
| Bk-205 (sample of the invention) | ○ | ○ |
| Bk-206 (sample of the invention) | ○ | ○ |
| Bk-207 (sample of the invention) | ○ | ○ |

The results as above clearly support the effect of the first aspect of the invention.

Example 3

Ultrapure water (resistance, at least 18 MΩ) was added to the components shown below to make one liter, and then stirred under heat at 30 to 40° C. for 1 hour. Next, the resulting mixture was filtered under reduced pressure through a micro-filter having a mean pore size of 0.25 μm. Inks of different colors were thus prepared.

[Formulation of Light Cyan Ink]

| (Solid Components) | |
|---|---|
| Cyan Dye (C-1) | 20 g/liter |
| Urea (UR) | 15 g/liter |
| Benzotriazole (BTZ) | 0.08 g/liter |
| Proxel XL2 (PXL) | 3.5 g/liter |
| (Liquid Components) | |
| Triethylene Glycol (TEG) | 110 g/liter |
| Glycerin (GR) | 130 g/liter |
| Triethylene Glycol Monobutyl Ether (TGB) | 110 g/liter |
| 2-Pyrrolidone (PRD) | 60 g/liter |
| Triethanolamine (TEA) | 7 g/liter |
| Surfynol STG (SW) | 10 g/liter |

[0157]

-continued

[Formulation of Cyan Ink]

(Solid Components)

| | |
|---|---|
| Cyan Dye (C-1) | 60 g/liter |
| Urea (UR) | 30 g/liter |
| Benzotriazole (BTZ) | 0.08 g/liter |
| Proxel XL2 (PXL) | 3.5 g/liter |

(Liquid Components)

| | |
|---|---|
| Triethylene Glycol (TEG) | 110 g/liter |
| Glycerin (GR) | 130 g/liter |
| Triethylene Glycol Monobutyl Ether (TGB) | 130 g/liter |
| 2-Pyrrolidone (PRD) | 60 g/liter |
| Triethanolamine (TEA) | 7 g/liter |
| Surfynol STG (SW) | 10 g/liter |

X = A or B
A: $SO_2(CH_2)_3SO_3Li$
B: $SO_2(CH_2)_3SO_2NHCH_2CH(CH_3)OH$

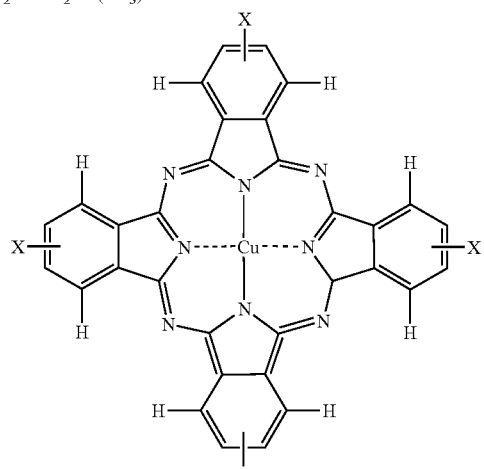

Dye C-1: A/B = 75/25

(Formulation of Light Magenta Ink)

(Solid Components)

| | |
|---|---|
| Magenta Dye (M-1) | 7.5 g/liter |
| Urea (UR) | 10 g/liter |
| Proxel | 5 g/liter |

(Liquid Components)

| | |
|---|---|
| Diethylene Glycol (DEG) | 90 g/liter |
| Glycerin (GR) | 70 g/liter |
| Triethylene Glycol Monobutyl Ether (TGB) | 70 g/liter |
| Triethanolamine (TEA) | 6.9 g/liter |
| Surfynol STG (SW) | 10 g/liter |

[0160]

(Formulation of Magenta Ink)

(Solid Components)

| | |
|---|---|
| Magenta Dye (M-1) | 23 g/liter |
| Urea (UR) | 15 g/liter |
| Proxel | 5 g/liter |

(Liquid Components)

| | |
|---|---|
| Diethylene Glycol (DEG) | 90 g/liter |
| Glycerin (GR) | 70 g/liter |
| Triethylene Glycol Monobutyl Ether | 70 g/liter |
| Triethanolamine | 6.9 g/liter |
| Surfynol STG | 10 g/liter |

-continued

M-1:

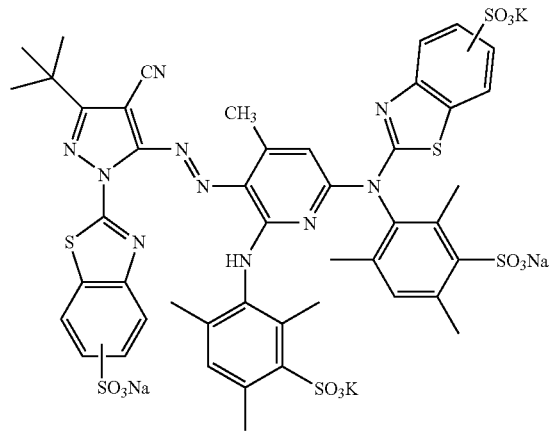

(Formulation of Yellow Ink)

(Solid Components)

| | |
|---|---|
| Yellow Dye (Y-1) | 35 g/liter |
| Proxel XL2 (PXL) | 3.5 g/liter |
| Benzotriazole (BTZ) | 0.08 g/liter |
| Urea (UR) | 10 g/liter |

(Liquid Components)

| | |
|---|---|
| Triethylene Glycol Monobutyl Ether (TGB) | 130 g/liter |
| Glycerin (GR) | 115 g/liter |
| Diethylene Glycol (DEG) | 120 g/liter |
| 2-Pyrrolidone (PRD) | 35 g/liter |
| Triethanolamine (TEA) | 8 g/liter |
| Surfynol STG (SW) | 10 g/liter |

Y-1

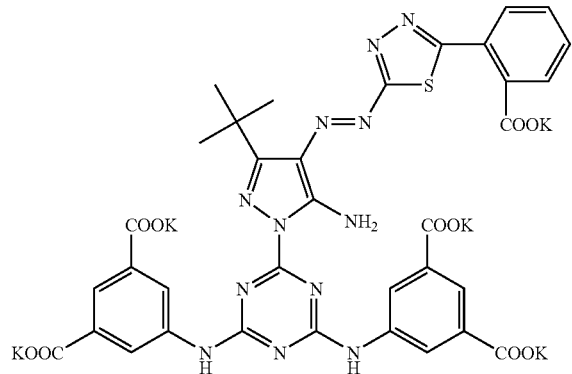

(Formulation of Black Ink)

(Solid Components)

| | |
|---|---|
| Black Dye (Bk-1) | 75 g/liter |
| Yellow Dye (Y-1) | 30 g/liter |
| Proxel XL2 (PXL) | 5 g/liter |
| Urea (UR) | 10 g/liter |
| Benzotriazole (BZT) | 3 g/liter |

(Liquid Components)

| | |
|---|---|
| Diethylene Glycol Monobutyl Ether (DGB) | 120 g/liter |
| Glycerin (GR) | 105 g/liter |
| Diethylene Glycol (DEG) | 100 g/liter |
| 2-Pyrrolidone (PRD) | 35 g/liter |
| Triethanolamine (TEA) | 8 g/liter |
| Surfynol STG (SW) | 10 g/liter |

-continued

Bk-1

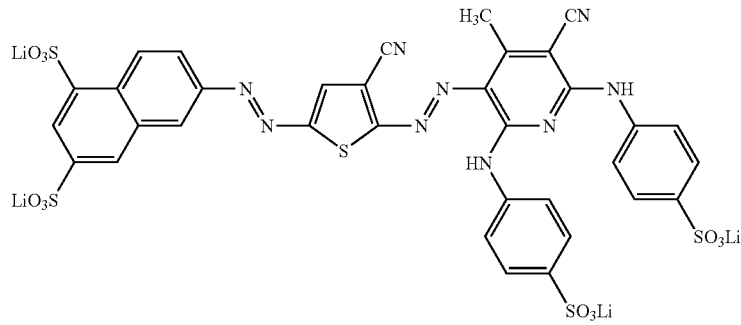

An ink set of these inks was prepared. This is IS-101.

The yellow dye (Y-1) has an oxidation potential of 1.22 V, and λmax of 445 nm, and has an absorbance ratio I(λmax+70 nm)/I(λmax) of 0.17.

Like the ink set IS-101, other ink sets IS-102 to IS-105 were prepared in which, however, the solvent amount in the yellow ink and the black ink was varied as in Table 24 below.

TABLE 24

| | Yellow Ink | | Black Ink | |
|---|---|---|---|---|
| | Solvent | g/liter | Solvent | g/liter |
| IS-101 | TGB | 130 | TGB | 120 |
| (comparative | GR | 115 | GR | 105 |
| sample) | DEG | 120 | DEG | 100 |
| | PR | 35 | PR | 25 |
| IS-102 | TGB | 130 | TGB | 120 |
| (comparative | GR | 145 | GR | 125 |
| sample) | DEG | 110 | DEG | 100 |
| IS-103 | TGB | 110 | TGB | 120 |
| (sample of the | GR | 115 | GR | 135 |
| invention) | DEG | 100 | DEG | 100 |
| | PR | 15 | PR | 35 |
| IS-104 | TGB | 100 | TGB | 120 |
| (sample of the | GR | 125 | GR | 135 |
| invention) | DEG | 100 | DEG | 110 |
| IS-105 | TGB | 100 | TGB | 120 |
| (sample of the | GR | 125 | GR | 135 |
| invention) | TEG | 110 | TEG | 120 |

These inks were charged in ink cartridges of Epson's inkjet printer PM-980C. The printer was set in a mode of 6-color printing, and driven to print a stepwise density-varying image pattern of 6 colors C, M, Y, B, G and R and gray on an image-receiving sheet. The image-receiving sheet used herein is Fuji Photo Film's inkjet paper, photo-glossy paper "Gasai".

The printed images were tested and evaluated in the manner mentioned below.

The light fastness is evaluated as follows: The image density of the fresh sample just after printed is measured with X-Rite310. The printed images are exposed to xenon light (85,000 lux) from Atlas' weather meter for 20 days, and then visually checked.

The ozone resistance is evaluated as follows: The printed samples are kept in a box having a constant ozone gas concentration of 5 ppm, for 96 hours, and then the images are visually checked.

In the two tests for image fastness, the samples that were naturally faded with good color balance in the gray gradation area are good (○); those where the gray gradation became unbalanced and underwent discontinuous color change are not good (X).

The results are given in Table 25 below. The control sample is a commercial product ink set for PM-980C.

TABLE 25

| Ink Set No. | Ozone Resistance Evaluation | Light Fastness Evaluation |
|---|---|---|
| PM-980C (control) | x | x |
| IS-101 (comparative Sample) | x | x |
| IS-102 (comparative Sample) | x | x |
| IS-103 (sample of the invention) | ○ | ○ |
| IS-104 (sample of the invention) | ○ | ○ |
| IS-105 (sample of the invention) | ○ | ○ |

The results in Table 25 confirm that the ink sets of the invention, in which the water-soluble organic solvent concentration in the yellow ink is lower than that in the black ink, or the total solvent concentration in the yellow ink is lower than that in the black ink, give good images that have good weather resistance and may keep good color balance even after faded, therefore clearly supporting the effect of the invention.

Example 4

Ultrapure water (resistance, at least 18 MΩ) was added to the components shown below to make one liter, and then stirred under heat at 30 to 40° C. for 1 hour. Next, the resulting mixture was filtered under reduced pressure through a microfilter having a mean pore size of 0.25 μm. Inks of different colors were thus prepared.

[Formulation of Photo Cyan Ink]

(Solid Components)

| | |
|---|---|
| Cyan Dye (C-1) | 10 g/liter |
| Urea (UR) | 15 g/liter |
| Benzotriazole (BTZ) | 0.08 g/liter |
| Proxel XL2 (PXL) | 3.5 g/liter |

-continued (Liquid Components)

| | | |
|---|---|---|
| Triethylene Glycol (TEG) | 50 | g/liter |
| Glycerin (GR) | 100 | g/liter |
| Triethylene Glycol Monobutyl Ether (TGB) | 60 | g/liter |
| 1,5-pentanediol (PTD) | 40 | g/liter |
| Isopropanol (IPA) | 20 | g/liter |
| Triethanolamine (TEA) | 7 | g/liter |
| Surfynol STG (SW) | 10 | g/liter |

[Formulation of Cyan Ink]

(Solid Components)

| | | |
|---|---|---|
| Cyan Dye (C-1) | 30 | g/liter |
| Urea (UR) | 40 | g/liter |
| Benzotriazole (BTZ) | 0.08 | g/liter |
| Proxel XL2 (PXL) | 3.5 | g/liter |

(Liquid Components)

| | | |
|---|---|---|
| Triethylene Glycol (TEG) | 40 | g/liter |
| Glycerin (GR) | 100 | g/liter |
| Triethylene Glycol Monobutyl Ether (TGB) | 70 | g/liter |
| 1,5-Pentanediol (PTD) | 50 | g/liter |
| Isopropanol (IPA) | 20 | g/liter |
| Triethanolamine (TEA) | 7 | g/liter |
| Surfynol STG (SW) | 10 | g/liter |

(Formulation of Photo Magenta Ink)

(Solid Components)

| | | |
|---|---|---|
| Magenta Dye (M-1) | 7.5 | g/liter |
| Urea (UR) | 10 | g/liter |
| Proxel XL2 (PXL) | 5 | g/liter |

(Liquid Components)

| | | |
|---|---|---|
| Triethylene Glycol (TEG) | 40 | g/liter |
| Glycerin (GR) | 100 | g/liter |
| Triethylene Glycol Monobutyl Ether (TGB) | 60 | g/liter |
| 1,5-Pentanediol (PTD) | 40 | g/liter |
| Isopropanol (IPA) | 20 | g/liter |
| Triethanolamine (TEA) | 6.9 | g/liter |
| Surfynol STG (SW) | 10 | g/liter |

(Formulation of Magenta Ink)

(Solid Components)

| | | |
|---|---|---|
| Magenta Dye (M-1) | 23 | g/liter |
| Urea (UR) | 15 | g/liter |
| Proxel XL2 (PXL) | 5 | g/liter |

(Liquid Components)

| | | |
|---|---|---|
| Triethylene Glycol (TEG) | 50 | g/liter |
| Glycerin (GR) | 100 | g/liter |
| Triethylene Glycol Monobutyl Ether (TGB) | 50 | g/liter |
| 1,5-Pentanediol (PTD) | 40 | g/liter |
| Isopropanol (IPA) | 20 | g/liter |
| Triethanolamine | 6.9 | g/liter |
| Surfynol STG (SW) | 10 | g/liter |

(Formulation of Yellow Ink)

(Solid Components)

| | | |
|---|---|---|
| Yellow Dye (Y-1) | 35 | g/liter |
| Proxel XL2 (PXL) | 3.5 | g/liter |
| Benzotriazole (BTZ) | 0.08 | g/liter |
| Urea | 10 | g/liter |

(Liquid Components)

| | | |
|---|---|---|
| Triethylene Glycol (TEG) | 80 | g/liter |
| Glycerin (GR) | 120 | g/liter |
| Triethylene Glycol Monobutyl Ether (TGB) | 70 | g/liter |
| 1,5-Pentanediol (PTD) | 60 | g/liter |
| Isopropanol (IPA) | 20 | g/liter |
| Triethanolamine (TEA) | 8 | g/liter |
| Surfynol STG (SW) | 10 | g/liter |

-continued (Formulation of Black Ink)

(Solid Components)

| | | |
|---|---|---|
| Black Dye (Bk-1) | 75 | g/liter |
| Yellow Dye (Y-1) | 30 | g/liter |
| Proxel (XL2 (PXL) | 5 | g/liter |
| Urea | 10 | g/liter |
| Benzotriazole (BTZ) | 3 | g/liter |

(Liquid Components)

| | | |
|---|---|---|
| Triethylene Glycol (TEG) | 60 | g/liter |
| Glycerin (GR) | 100 | g/liter |
| Triethylene Glycol Monobutyl Ether (TGB) | 70 | g/liter |
| 1,5-Pentanediol (PTD) | 50 | g/liter |
| Isopropanol (IPA) | 20 | g/liter |
| Triethanolamine (TEA) | 8 | g/liter |
| Surfynol STG (SW) | 10 | g/liter |

An ink set of these inks was prepared. This is IS-201.

Like the ink set IS-201, other ink sets IS-202 to IS-205 were prepared in which, however, the solvent amount in the yellow ink and the black ink was varied as in Table 26 below.

TABLE 26

| | Yellow Ink | | Black Ink | |
|---|---|---|---|---|
| | Solvent | g/liter | Solvent | g/liter |
| IS-201 | TEG | 80 | TEG | 60 |
| (comparative | GR | 120 | GR | 100 |
| sample) | TGB | 70 | TGB | 70 |
| | PTD | 60 | PTD | 50 |
| | IPA | 20 | IPA | 20 |
| IS-202 | TEG | 110 | TEG | 90 |
| (comparative | GR | 130 | GR | 100 |
| sample) | TGB | 90 | TGB | 80 |
| | IPA | 15 | IPA | 10 |
| IS-203 | TEG | 50 | TEG | 60 |
| (sample of the | GR | 90 | GR | 100 |
| invention) | TGB | 60 | TGB | 70 |
| | PTD | 40 | PTD | 50 |
| | IPA | 20 | IPA | 20 |
| IS-204 | TEG | 80 | TEG | 90 |
| (sample of the | GR | 90 | GR | 120 |
| invention) | TGB | 70 | TGB | 100 |
| | IPA | 15 | IPA | 20 |
| IS-205 | TEG | 100 | TEG | 110 |
| (sample of the | GR | 120 | GR | 130 |
| invention) | TGB | 70 | TGB | 80 |
| | IPA | 15 | IPA | 20 |

These inks were charged in ink cartridges of Canon's inkjet printer PIXUS950i. The printer was set in a mode of 6-color printing, and driven to print a stepwise density-varying image pattern of 6 colors C, M, Y, B, G and R and gray on an image-receiving sheet. The image-receiving sheet used herein is Fuji Photo Film's inkjet paper, photo-glossy paper "Gasai".

The printed images were tested and evaluated in the same manner as in Example 1. The results are shown in Table 27 below. The control sample is a commercial product ink set for PIXUS950i.

TABLE 27

| Ink Set No. | Ozone Resistance Evaluation | Light Fastness Evaluation |
|---|---|---|
| PIXUS950i (control) | x | x |
| IS-201 (comparative Sample) | x | x |

TABLE 27-continued

| Ink Set No. | Ozone Resistance Evaluation | Light Fastness Evaluation |
|---|---|---|
| IS-202 (comparative Sample) | x | x |
| IS-203 (sample of the invention) | ○ | ○ |
| IS-204 (sample of the invention) | ○ | ○ |
| IS-205 (sample of the invention) | ○ | ○ |

The results in Table 25 confirm that the ink sets of the second aspect of the invention, in which the water-soluble organic solvent concentration in the yellow ink is lower than that in the black ink, or the total solvent concentration in the yellow ink is lower than that in the black ink, give good images that have good weather resistance and may keep good color balance even after faded, therefore clearly supporting the effect of the invention.

Example 5

Deionized water was added to the components mentioned below to make one liter, and then stirred under heat at 30 to 40° C. for 1 hour. Next, the resulting mixture was controlled to have a pH of 9 with KOH (10 mol/liter) added thereto, and then filtered under reduced pressure through a micro-filter having a mean pore size of 0.25 μm. Thus prepared, this is yellow ink.

| | |
|---|---|
| Yellow Dye (A-3) | 65 g/liter |
| Diethylene glycol | 85 g/liter |
| Glycerin | 154 g/liter |
| Triethylene Glycol Monobutyl Ether | 130 g/liter |
| Triethanolamine | 1 g/liter |
| Benzotriazole | 0.03 g/liter |
| Proxel XL2 | 3 g/liter |
| Surfactant (W-1) | 10 g/liter |

The dyes and the additives were varied to prepare other inks, light magenta ink, magenta ink, light cyan ink, cyan ink, dark yellow ink and black ink, as in Table 28 that shows an in ink set 101.

TABLE 28

| | Light Cyan | Cyan | Light Magenta | Magenta | Yellow | Dark Yellow | Black |
|---|---|---|---|---|---|---|---|
| Dye (g/liter) | No. 154 | No. 154 | a-36 | a-36 | A-3 | A-3 | B-1 |
| | 15.0 | 50.0 | 8.2 | 24.4 | 65.0 | 49.0 | 55.0 |
| | | | | | | No. 154 | B-2 |
| | | | | | | 5.1 | 20.0 |
| | | | | | | a-36 | A-3 |
| | | | | | | 8.9 | 20.0 |
| Diethylene Glycol (g/liter) | 167 | 110 | 43 | 76 | 85 | — | 20 |
| Urea (g/liter) | — | — | 4 | 4 | — | — | — |
| Glycerin (g/liter) | 164 | 148 | 124 | 150 | 154 | 147 | 120 |
| Triethylene Glycol Monobutyl Ether (g/liter) | 125 | 132 | 114 | 107 | 130 | 127 | 230 |
| 2-Pyrrolidone (g/liter) | — | 2 | 3 | — | — | — | 8 |
| Triethanolamine (g/liter) | 6.5 | 10 | 3 | 3 | 1 | 1 | 18 |
| Benzotriazole (g/liter) | 0.02 | 0.02 | 0.02 | 0.02 | 0.03 | 0.03 | 0.03 |
| Proxel XL2 (g/liter) | 2 | 3 | 2 | 3 | 3 | 3 | 4 |
| Surfactant (g/liter) | 10 | 10 | 10 | 10 | 10 | 10 | 10 |

Deionized water added to make 1 liter.

195
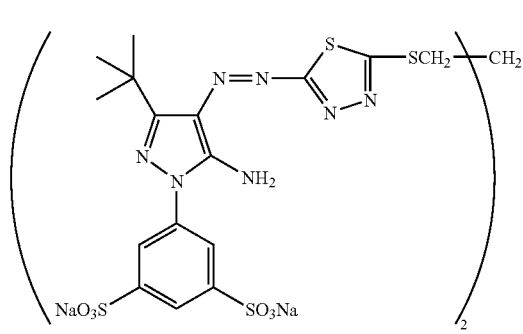
A-3
(Compound X2-3)
(n-C₅H₁₁)₂CHO(CH₂CH₂O)₁₀H
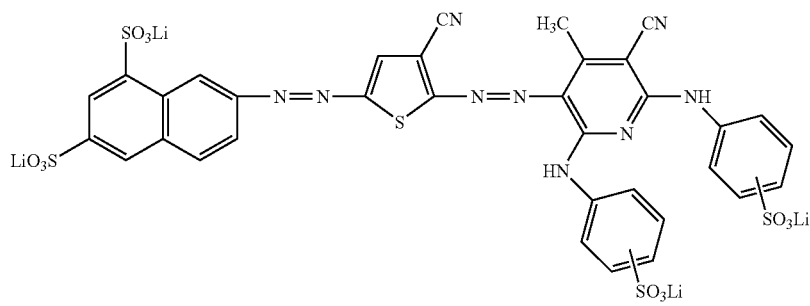
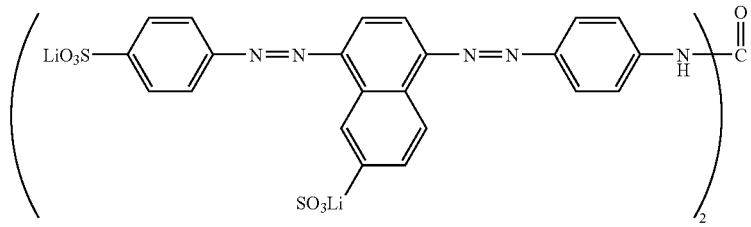
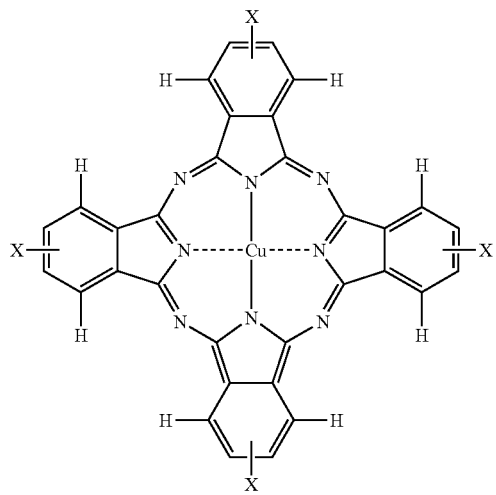
X = A or B
A: SO₂(CH₂)₃SO₃Li
B: SO₂(CH₂)₃SO₂NHCH₂CH(CH₃)OH
A/B = 75/25
196
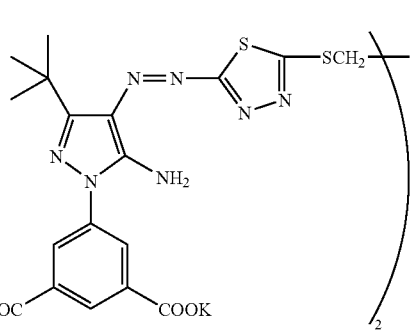
Y-3
(Compound X1-3)
W-1
W-2
W-3
B-1
B-2
No. 154

Like the ink set 101, other ink sets, 102 to 106 were prepared, in which, however, the surfactant, the water-miscible high-boiling-point organic solvent and the dye were varied as in Table 29 below.

two points are average (B); and those having a dye retentiveness of less than 70% at all three points are not good (C).

4) The density fluctuation resistance is evaluated as follows: An image having a reflection density of 1.5 at the

TABLE 29

| Ink Set | Surfactant | Water-Miscible Organic Solvent | Dye (oxidation potential) | | | | | Remarks |
|---|---|---|---|---|---|---|---|---|
| | | | LC, C | LM, M | Y | DY | BK | |
| 101 | W-1 10 g/liter | triethylene glycol monobutyl ether | No. 154 (1.11) | a-36 (1.35) | A-3 (1.03) | A-3 (1.03) No. 154 (1.11) a-36 (1.35) | B-1 (1.3) B-2 (1.31) A-3 (1.03) | comparative sample |
| 102 | W-1 10 g/liter | triethylene glycol monobutyl ether | No. 154 (1.11) | a-36 (1.35) | Dye-1 (1.04) | Dye-3 (1.04) No. 154 (1.11) a-36 (1.35) | B-1 (1.3) B-2 (1.31) Dye-3 (1.04) | sample of the invention |
| 103 | W-1 10 g/liter | triethylene glycol monobutyl ether | No. 154 (1.11) | a-36 (1.35) | Dye-1 (1.04) | Dye-3 (1.04) No. 154 (1.11) a-36 (1.35) | B-1 (1.3) B-2 (1.31) Dye-3 (1.04) | sample of the invention |
| 104 | W-2 20 g/liter | triethylene glycol monobutyl ether | No. 154 (1.11) | a-36 (1.35) | Dye-1 (1.04) | Dye-3 (1.04) No. 154 (1.11) a-36 (1.35) | B-1 (1.3) B-2 (1.31) Dye-3 (1.04) | sample of the invention |
| 105 | W-2 10 g/liter | tripropylene glycol monomethyl ether | No. 154 (1.11) | a-36 (1.35) | Dye-1 (1.04) | Dye-1 (1.04) No. 154 (1.11) a-36 (1.35) | B-1 (1.3) B-2 (1.31) Dye-1 (1.03) | sample of the invention |
| 106 | W-3 20 g/liter | triethylene glycol monobutyl ether | No. 154 (1.11) | a-36 (1.35) | Y-3 (1.04) | Y-3 (1.04) No. 154 (1.11) a-36 (1.35) | B-1 (1.3) B-2 (1.31) Y-3 (1.04) | sample of the invention |

These ink sets 101 to 106 were charged in ink cartridges for Epson's inkjet printer PM-920C, and an image was printed on Fuji Photo Film's inkjet paper, photo-glossy paper "Gasai", and evaluated in the manner mentioned below.

1) The printability is evaluated as follows: The cartridges are charged in the printer, and inkjet from all nozzles is confirmed. Then, all the nozzle caps are kept opened for 3 days, and a nozzle check pattern is printed repeatedly. The number of cleaning times needed for stable inkjet is counted, and this indicates the printability with the ink sets tested.

2) The image stability (fastness to light) is evaluated as follows: A sample with an yellow solid image printed thereon is prepared. The image density Ci of the fresh sample just after printed is measured with X-Rite 310. Then, the printed image is exposed to xenon light (85,000 lux) from Atlas' weather meter for 7 days, and then its image density Cf is measured. The dye retentiveness is obtained from {(Cf/Ci)× 100}, and this indicates the light fastness of the ink tested. Regarding the dye retentiveness, three points having a reflection density of 1, 1.5 and 2 are analyzed in every sample. The samples having a dye retentiveness of at least 85% at every point are good (A); those having a dye retentiveness of less than 85% at two points are average (B); and those having a dye retentiveness of less than 85% at all three points are not good (C).

3) The ozone resistance is evaluated as follows: The printed samples are kept in a box having a constant ozone gas concentration of 5 ppm, for 3 days. Before and after exposure to ozone gas, the image density of each sample is measured with a reflection densitometer (X-Rite 310TR), and the dye retentiveness in every sample is determined. Regarding the dye retentiveness, three points having an original image density of 1, 1.5 and 2 are analyzed in every sample. The samples having a dye retentiveness of at least 80% at every point are good (A); those having a dye retentiveness of less than 85% at one or maximum % max is printed, and the initial density of the image, Da is determined. Just after printed, the sample is left in an atmosphere at 80° C. and 15% % H for 7 days, and its density, Db is determined. The density change is represented by the following equation:

Density Change (%)=$(Db-Da)/Da \times 100$.

The results of 1) to 4) are shown in Table 30.

TABLE 30

| Ink Set | Printability Cleaning Times | Light Fastness | Ozone Resistance | Yellow Density Change | Remarks |
|---|---|---|---|---|---|
| 101 | 1 | B | A | 32% | comparative sample |
| 102 | 2 | A | A | 4% | sample of the invention |
| 103 | 1 | A | A | 11% | sample of the invention |
| 104 | 1 | A | A | 8% | sample of the invention |
| 105 | 2 | A | A | 5% | sample of the invention |
| 106 | 2 | A | A | 10% | sample of the invention |

Table 30 confirms that the ink compositions of the invention ensure good inkjet stability and image fastness.

When the image-receiving paper was changed to Epson's PM photographic paper PM and Canon's PR101, then the same results as above were also obtained.

Example 6

The same inks as in Example 5 were charged in ink cartridges for Canon's inkjet printer BJ-F850, and an image was printed on Fuji Photo Film's inkjet paper, photo-glossy paper "EX", and evaluated in the manner as in Example 5. Also in this case, the same results as in Example 5 were obtained. In addition, when the image-receiving paper was changed to Epson's PM photographic paper PM and Canon's PR101, then the same results as herein were also obtained.

INDUSTRIAL APPLICABILITY

According to the first aspect thereof, the present invention provides an ink which contains at least one heterocyclic structure having dye and at least one compound capable of chemically interacting with the dye and which has good color hue and image fastness; an ink set for inkjet that comprises the ink; and an inkjet recording method that comprises using any of them.

According to the second aspect thereof, the invention provides an ink set, which gives images having good weather resistance and having good color balance even after faded.

According to the third aspect thereof, the invention provides an aqueous ink set, which is advantageous in point of the handlability, the odorlessness and the safety thereof and which ensures good jetting stability to give recorded images of good weather resistance.

The invention claimed is:

1. An ink comprising: a dye; and water and/or a water-miscible organic solvent,
wherein the dye comprises a dye compound having at least one heterocyclic structure, and the ink further comprises, as an additive, at least one compound capable of chemically interacting with the dye compound, and wherein $\lambda_{max}$ of a visible-range absorption spectrum of a diluted aqueous solution is shifted by at least 5 nm as compared with that in an absence of the additive, the diluted aqueous solution being a mixture of the additive and a heterocyclic structure-having dye mixed in a molar ratio of 1/1 and having a concentration of at most 1 mmol/liter.

2. The ink according to claim 1, wherein the dye compound has two hetero-aromatic rings bonded to each other via an azo bond.

3. The ink according to claim 1, wherein the dye compound has a metal-chelated hetero-aromatic ring structure.

4. The ink according to claim 1, wherein the additive is a hydrogen-bonding compound.

5. The ink according to claim 1, wherein the additive has a cyclic amide structure and the dye compound has a nitrogen-containing 6-membered hetero-aromatic ring.

6. The ink according to claim 1, wherein the additive is a compound having a partial structure represented by the following formula (A):

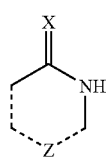

(A)

wherein X represents an oxygen atom, a sulfur atom, or N—R (R represents a hydrogen atom, or any of an alkyl group, an alkenyl group, an alkynyl group, an aralkyl group, an aryl group or a heterocyclic group); Z represents an atomic group capable of forming a 5- to 8-membered ring.

7. An ink set containing the ink according to claim 1.

8. An inkjet recording method, which comprises recording an image by using the ink according to claim 1 with an inkjet printer.

9. The ink set comprising:
at least one yellow ink, the yellow ink comprising an aqueous medium and yellow dye dispersed or dissolved in the aqueous medium, and the yellow dye having:
an oxidation potential of more positive than 1.0 V (vs. SCE); $\lambda_{max}$ within a range of from 390 nm to 470 nm; and an absorbance ratio of $I(\lambda_{max}+70 \text{ nm})/I(\lambda_{max})$ of at most 0.4, wherein $I(\lambda_{max})$ is an absorbance $\lambda_{max}$, and $I(\lambda_{max}+70 \text{ nm})$ is an absorbance of $\lambda_{max}+70$ nm;
black ink comprising at least one of the yellow dye; and
wherein an accelerated fading rate of the yellow ink is smaller than that of the black ink and wherein the accelerated fading rate constant is determined as the following method: an ink to be analyzed is printed on a reflection medium, and a reflection density ($D_B$) thereof is measured through a status A filter; one point of a sample having the reflection density ($D_B$) of from 0.90 to 1.10 in a yellow region is defined as an initial density of the ink, and the printed sample is forcedly faded by using an ozone fading tester where 5 ppm ozone is generated all time; a period of time in which the reflection density of the faded sample is reduced to 80% of the initial density of the original sample is counted, and the accelerated fading rate constant of the ink is derived from the above method.

10. The ink set according to claim 9, wherein the absorbance ratio of $I(\lambda_{max}+70 \text{ nm})/I(\lambda_{max})$ of the yellow dye is at most 0.2.

11. The ink set according to claim 9, wherein the yellow dye is a compound represented by the following formula (1):

$$(A-N=N-B)n-L \qquad (1)$$

wherein A and B each independently represents an optionally-substituted heterocyclic group; n is 1 or 2; and L represents a hydrogen atom or a substituent bonding to A or B at any desired position.

12. The ink set according to claim 9, wherein a concentration of a water-soluble organic solvent in the yellow ink is lower than that in the black ink.

13. The ink set according to claim 9, wherein a total solvent concentration in the yellow ink is lower than that in the black ink, and the total solvent concentration being determined by summing up concentrations of at least any two solvents selected from a glycol-type organic solvent, a glycol alkyl ether-type organic solvent and an amide-type organic solvent.

14. An inkjet color recording method, comprising recording an image on an image-receiving material having an image-receiving layer on a support by using an ink composition, the ink composition containing at least one of yellow azo die and black azo dye and a water-miscible organic solvent, wherein an absolute value of an image density change at a point where a reflection density at a $\lambda_{max}$ region of the recorded image is 1.5, is at most 20%; and
wherein said yellow dye is represented by the following formula (1):

$$(A-N=N-B)n-L \qquad (1)$$

wherein A and B each independently represents an optionally-substituted heterocyclic group; L represents a hydrogen atom, a chemical bond or a divalent linking group; n is 2; and L is a chemical bond or a divalent linking group, and one of A and B is a monovalent heterocyclic group and other one is a divalent heterocyclic group; and two A's may be the same or different, and two B's may be the same or different.

15. The inkjet color recording method according to claim 14, wherein the image having a reflection density of 1.5 at a $\lambda_{max}$ region thereof is printed, and the density change is represented by the following formula in which Da indicates an initial density of an image area, and Db indicates a density thereof after left in an atmosphere of 80° C. and 15% RH for 7 days:

Density Change (%)=$(Db-Da)/Da \times 100$.

16. The inkjet color recording method according to claim 14, wherein the ink composition further contains a surfactant and the surfactant is a betaine-type surfactant.

17. The inkjet color recording method according to claim 16, wherein the betaine-type surfactant is represented by the following formula (6):

$$(R)p\text{-}N\text{-}[L\text{-}(COOM)q]r \quad (6)$$

wherein R represents a hydrogen atom, an alkyl group, an aryl group, or a heterocyclic group; L represents a divalent linking group; M represents a hydrogen atom, an alkali metal atom, an ammonium group, a protonated organic amine or nitrogen-containing heterocyclic group, or a quaternary ammonium ion group, and when it is a counter ion to the ammonium ion with the N atom in the formula, then it is a group not existing as a cation; q indicates an integer of 1 or more; r indicates an integer of from 1 to 4; p indicates an integer of from 0 to 4; p+r is 3 or 4; when p+r is 4, then the N atom in the formula is a protonated ammonium atom (=N+=); when q is 2 or more, then COOM's may be the same or different; when r is 2 or more, then (L-(COOM)q)'s may be the same or different; when p is 2 or more, then R's may be the same or different.

18. The inkjet color recording method according to claim 14, wherein the ink composition contains as the water-miscible organic solvent at least one of triethylene glycol monobutyl ether, diethylene glycol monobutyl ether, tripropylene glycol monomethyl ether, and dipropylene glycol monomethyl ether.

19. The inkjet color recording method according to claim 14, wherein the dye has an oxidation potential of more positive than 1.0V (vs SCE).

20. The inkjet color recording method according to claim 14, wherein the image-receiving layer contains a white inorganic pigment particle.

* * * * *